US012591347B2

(12) United States Patent
Rochette et al.

(10) Patent No.: US 12,591,347 B2
(45) Date of Patent: Mar. 31, 2026

(54) USER INTERFACES FOR INDICATING STATUS OF A TRACKED ENTITY

(71) Applicant: Apple Inc., Cupertino, CA (US)

(72) Inventors: Tommy Rochette, Santa Cruz, CA (US); Marcello Luppi, The Hague (NL); Jean-Francois M. Albouze, Santa Cruz, CA (US); Elizabeth C. Cranfill, San Francisco, CA (US); Deena Khattab, San Francisco, CA (US); William M. Tyler, San Francisco, CA (US); Roberto Garcia, Los Gatos, CA (US); Austin A. Marusco, San Francisco, CA (US); Scott Lopatin, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/663,816

(22) Filed: May 17, 2022

(65) Prior Publication Data

US 2022/0365633 A1 Nov. 17, 2022

Related U.S. Application Data

(60) Provisional application No. 63/189,600, filed on May 17, 2021.

(51) Int. Cl.
*G06F 3/0481* (2022.01)
*G06F 3/04842* (2022.01)
(Continued)

(52) U.S. Cl.
CPC ........ *G06F 3/0481* (2013.01); *G06F 3/04842* (2013.01); *G06F 3/04845* (2013.01); *G06F 3/0488* (2013.01); *H04L 67/52* (2022.05)

(58) Field of Classification Search
CPC .............. G06F 3/0481; G06F 3/04842; G06F 3/04845; G06F 3/0488; G06F 3/04817; H04L 67/52
See application file for complete search history.

(56) References Cited

U.S. PATENT DOCUMENTS

| | | | |
|---|---|---|---|
| 5,672,820 A | 9/1997 | Rossi et al. | |
| 5,956,038 A | 9/1999 | Rekimoto | |
| | (Continued) | | |

FOREIGN PATENT DOCUMENTS

| | | | |
|---|---|---|---|
| CN | 103269510 A | 8/2013 | |
| CN | 205769155 U | 12/2016 | |
| | (Continued) | | |

OTHER PUBLICATIONS

Stolyar, Google Maps' location sharing now lets you track battery status, Aug. 3, 2018, digitaltrends.com, https://www.digitaltrends.com/mobile/google-maps-lets-you-share-your-location-and-battery-level/, pp. 1-4 (Year: 2018).*
(Continued)

*Primary Examiner* — Daniel W Parcher
(74) *Attorney, Agent, or Firm* — Kubota & Basol LLP

(57) ABSTRACT

In some embodiments, an electronic device displays status for tracked entities. In some embodiments, an electronic device provides indications of the status of one or more users. In some embodiments, an electronic device presents information about consenting users selected by the user of the electronic device in an aggregated matter that makes accessing and interacting with such information more efficient. In some embodiments, an electronic device facilitates display of widgets associated with users of a family account.

37 Claims, 97 Drawing Sheets

(51) Int. Cl.
　　G06F 3/04845　　(2022.01)
　　G06F 3/0488　　(2022.01)
　　H04L 67/52　　(2022.01)

(56)　　　References Cited

U.S. PATENT DOCUMENTS

| | | | |
|---|---|---|---|
| 6,144,318 A | 11/2000 | Hayashi et al. | |
| 6,144,956 A | 11/2000 | Yajima et al. | |
| 6,323,846 B1 | 11/2001 | Westerman et al. | |
| 6,421,608 B1 | 7/2002 | Motoyama et al. | |
| 6,553,236 B1 | 4/2003 | Dunko et al. | |
| 6,570,557 B1 | 5/2003 | Westerman et al. | |
| 6,636,249 B1 | 10/2003 | Rekimoto | |
| 6,677,932 B1 | 1/2004 | Westerman | |
| 7,274,292 B2 | 9/2007 | Velhal et al. | |
| 7,372,276 B2 | 5/2008 | Mulcahey | |
| 7,523,871 B1 | 4/2009 | Wilson et al. | |
| 7,575,065 B1 | 8/2009 | Podhrasky | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,788,032 B2 | 8/2010 | Moloney | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,094,011 B2 | 1/2012 | Faris et al. | |
| 8,239,784 B2 | 8/2012 | Hotelling et al. | |
| 8,279,180 B2 | 10/2012 | Hotelling et al. | |
| 8,380,430 B2 | 2/2013 | Malone et al. | |
| 8,381,135 B2 | 2/2013 | Hotelling et al. | |
| 8,433,722 B2 | 4/2013 | Shin et al. | |
| 8,462,591 B1 | 6/2013 | Marhaben | |
| 8,479,122 B2 | 7/2013 | Hotelling et al. | |
| 8,526,677 B1 | 9/2013 | Crichton et al. | |
| 8,576,669 B2 | 11/2013 | Onda | |
| 8,847,754 B2 | 9/2014 | Buchheim et al. | |
| 8,878,671 B2 | 11/2014 | Buchheim et al. | |
| 9,002,372 B2 | 4/2015 | Shakespeare et al. | |
| 9,348,458 B2 | 5/2016 | Hotelling et al. | |
| 9,357,348 B2 | 5/2016 | Evans et al. | |
| 9,443,414 B2 | 9/2016 | Scavezze et al. | |
| 9,514,630 B1 | 12/2016 | Steven | |
| 9,547,939 B2 | 1/2017 | Hittel et al. | |
| 9,549,282 B1 | 1/2017 | Mcdonough et al. | |
| 9,609,515 B2 | 3/2017 | Tredoux et al. | |
| 9,654,598 B1 | 5/2017 | Crawford et al. | |
| 9,706,357 B2 | 7/2017 | Heo et al. | |
| 9,836,187 B2 | 12/2017 | Lee et al. | |
| 9,892,535 B1 * | 2/2018 | Guy | G06F 3/048 |
| 9,900,733 B2 | 2/2018 | Beattie, Jr. | |
| 9,911,310 B2 | 3/2018 | Neumeyer et al. | |
| 9,933,937 B2 | 4/2018 | Lemay et al. | |
| 9,997,043 B2 | 6/2018 | H. Kazerouni | |
| 10,102,749 B1 | 10/2018 | Wagner | |
| 10,147,303 B1 | 12/2018 | Carter | |
| 10,154,379 B2 | 12/2018 | Mei et al. | |
| 10,212,541 B1 * | 2/2019 | Brody | G06Q 50/01 |
| 10,292,006 B2 | 5/2019 | Yu et al. | |
| 10,318,811 B1 | 6/2019 | Gold et al. | |
| 10,373,463 B1 | 8/2019 | Herring | |
| 10,386,960 B1 | 8/2019 | Smith | |
| 10,424,189 B2 | 9/2019 | Daoura et al. | |
| 10,438,409 B2 | 10/2019 | Todeschini et al. | |
| 10,448,211 B1 | 10/2019 | Shen et al. | |
| 10,462,611 B1 | 10/2019 | Klinkner et al. | |
| 10,568,035 B1 | 2/2020 | Tong | |
| 10,757,057 B2 | 8/2020 | Friend et al. | |
| 10,757,540 B1 | 8/2020 | Klinkner et al. | |
| 10,757,676 B1 | 8/2020 | De La Broise et al. | |
| 10,777,053 B2 | 9/2020 | Jenkins et al. | |
| 10,852,918 B1 * | 12/2020 | Voss | G06F 3/0484 |
| 11,047,702 B1 | 6/2021 | Meyer et al. | |
| 11,138,251 B2 | 10/2021 | Estruch Tena et al. | |
| 11,145,183 B2 | 10/2021 | Daoura et al. | |
| 11,216,624 B2 | 1/2022 | Zarshchikov et al. | |
| 11,221,752 B2 | 1/2022 | Howard et al. | |
| 11,222,203 B2 | 1/2022 | Dante et al. | |
| 11,792,605 B2 | 10/2023 | Daoura et al. | |
| 11,823,558 B2 | 11/2023 | Persson | |
| 12,287,220 B1 | 4/2025 | Cummings | |
| 2002/0015024 A1 | 2/2002 | Westerman et al. | |
| 2002/0055362 A1 | 5/2002 | Aoyama | |
| 2002/0183077 A1 | 12/2002 | Fomukong | |
| 2004/0021567 A1 | 2/2004 | Dunn | |
| 2004/0212630 A1 | 10/2004 | Hobgood et al. | |
| 2004/0217859 A1 | 11/2004 | Pucci et al. | |
| 2005/0190059 A1 | 9/2005 | Wehrenberg | |
| 2006/0017692 A1 | 1/2006 | Wehrenberg et al. | |
| 2006/0033724 A1 | 2/2006 | Chaudhri et al. | |
| 2006/0197753 A1 | 9/2006 | Hotelling | |
| 2006/0255935 A1 | 11/2006 | Scalisi et al. | |
| 2006/0277469 A1 * | 12/2006 | Chaudhri | G06F 3/04817 |
| | | | 715/709 |
| 2007/0021108 A1 | 1/2007 | Bocking et al. | |
| 2007/0037582 A1 | 2/2007 | Mohi et al. | |
| 2007/0037587 A1 | 2/2007 | Mohi et al. | |
| 2007/0037588 A1 | 2/2007 | Mohi et al. | |
| 2007/0042790 A1 | 2/2007 | Mohi et al. | |
| 2007/0101291 A1 * | 5/2007 | Forstall | G06F 3/0482 |
| | | | 715/805 |
| 2007/0106457 A1 | 5/2007 | Rosenberg | |
| 2007/0157089 A1 | 7/2007 | Van et al. | |
| 2007/0197229 A1 | 8/2007 | Kalliola et al. | |
| 2007/0229350 A1 | 10/2007 | Scalisi et al. | |
| 2007/0252696 A1 | 11/2007 | Belisle et al. | |
| 2007/0291104 A1 | 12/2007 | Petersen et al. | |
| 2008/0102786 A1 | 5/2008 | Griffin | |
| 2008/0125040 A1 | 5/2008 | Kalayjian | |
| 2008/0129491 A1 | 6/2008 | Ruperto | |
| 2008/0143516 A1 | 6/2008 | Mock et al. | |
| 2008/0170118 A1 | 7/2008 | Albertson et al. | |
| 2008/0242278 A1 | 10/2008 | Rekimoto | |
| 2008/0254808 A1 | 10/2008 | Rekimoto | |
| 2008/0254811 A1 | 10/2008 | Stewart | |
| 2009/0040048 A1 | 2/2009 | Locker et al. | |
| 2009/0076723 A1 | 3/2009 | Moloney | |
| 2009/0260022 A1 * | 10/2009 | Louch | G06F 9/451 |
| | | | 717/100 |
| 2009/0300511 A1 | 12/2009 | Behar et al. | |
| 2010/0002938 A1 | 1/2010 | Mulcahey | |
| 2010/0107179 A1 | 4/2010 | Quintanilla et al. | |
| 2010/0151840 A1 | 6/2010 | Bauchot et al. | |
| 2010/0198867 A1 | 8/2010 | Rekimoto | |
| 2010/0255882 A1 * | 10/2010 | Kozitsyn | G09G 5/003 |
| | | | 345/55 |
| 2010/0325194 A1 * | 12/2010 | Williamson | H04W 4/029 |
| | | | 709/203 |
| 2011/0052083 A1 | 3/2011 | Rekimoto | |
| 2011/0081920 A1 * | 4/2011 | Hung | G06Q 10/109 |
| | | | 455/456.3 |
| 2011/0148625 A1 | 6/2011 | Velusamy | |
| 2011/0181289 A1 | 7/2011 | Rushing | |
| 2011/0187527 A1 | 8/2011 | Goodwill et al. | |
| 2011/0210847 A1 | 9/2011 | Howard et al. | |
| 2011/0222729 A1 | 9/2011 | Gabara | |
| 2011/0234399 A1 | 9/2011 | Yan | |
| 2011/0285506 A1 | 11/2011 | Hillis | |
| 2011/0286310 A1 | 11/2011 | Onda | |
| 2012/0008526 A1 * | 1/2012 | Borghei | H04W 4/021 |
| | | | 370/254 |
| 2012/0052870 A1 | 3/2012 | Habicher | |
| 2012/0075099 A1 | 3/2012 | Brown | |
| 2012/0092373 A1 | 4/2012 | Ryu et al. | |
| 2012/0166077 A1 | 6/2012 | Herzog et al. | |
| 2012/0171998 A1 | 7/2012 | Kang | |
| 2012/0229400 A1 | 9/2012 | Bimbaum et al. | |
| 2012/0303270 A1 | 11/2012 | Su et al. | |
| 2013/0030931 A1 | 1/2013 | Moshfeghi | |
| 2013/0107057 A1 | 5/2013 | Zhou et al. | |
| 2013/0113715 A1 | 5/2013 | Grant et al. | |
| 2013/0172016 A1 | 7/2013 | Ooka | |
| 2013/0288719 A1 | 10/2013 | Alonzo | |

(56)  References Cited

U.S. PATENT DOCUMENTS

| | | |
|---|---|---|
| 2013/0328665 A1 | 12/2013 | Cranfill et al. |
| 2013/0332721 A1 | 12/2013 | Chaudhri et al. |
| 2013/0345953 A1 | 12/2013 | Udeshi et al. |
| 2014/0044305 A1 | 2/2014 | Scavezze et al. |
| 2014/0047413 A1 | 2/2014 | Sheive et al. |
| 2014/0089810 A1 | 3/2014 | Chen et al. |
| 2014/0101189 A1 | 4/2014 | Schenkel |
| 2014/0135042 A1 | 5/2014 | Buchheim et al. |
| 2014/0136633 A1 | 5/2014 | Murillo et al. |
| 2014/0162685 A1 | 6/2014 | Edge |
| 2014/0173439 A1 | 6/2014 | Gutierrez et al. |
| 2014/0213301 A1 | 7/2014 | Evans et al. |
| 2014/0222280 A1 | 8/2014 | Salomonsson et al. |
| 2014/0242972 A1 | 8/2014 | Slotznick |
| 2014/0266698 A1 | 9/2014 | Hall et al. |
| 2014/0267411 A1 | 9/2014 | Fein et al. |
| 2014/0300452 A1 | 10/2014 | Rofe et al. |
| 2014/0327518 A1 | 11/2014 | Loutit |
| 2014/0329460 A1 | 11/2014 | Loutit |
| 2014/0364099 A1 | 12/2014 | Pai et al. |
| 2014/0365923 A1* | 12/2014 | Lee .................... G06F 3/04842 715/753 |
| 2014/0365945 A1 | 12/2014 | Karunamuni et al. |
| 2015/0012307 A1 | 1/2015 | Moss |
| 2015/0058744 A1* | 2/2015 | Dhingra ................. G06F 9/451 715/747 |
| 2015/0154851 A1 | 6/2015 | Vincent et al. |
| 2015/0170496 A1 | 6/2015 | King et al. |
| 2015/0172393 A1 | 6/2015 | Oplinger et al. |
| 2015/0195804 A1 | 7/2015 | Stewart et al. |
| 2015/0356393 A1 | 12/2015 | Daoura et al. |
| 2016/0026869 A1 | 1/2016 | Rekimoto |
| 2016/0027307 A1* | 1/2016 | Abhyanker ............ G08G 1/202 701/117 |
| 2016/0034855 A1 | 2/2016 | Guy et al. |
| 2016/0044451 A1 | 2/2016 | Marth |
| 2016/0055676 A1 | 2/2016 | Kasahara et al. |
| 2016/0092705 A1 | 3/2016 | Wadman et al. |
| 2016/0171777 A1 | 6/2016 | Todeschini et al. |
| 2016/0203641 A1 | 7/2016 | Bostick et al. |
| 2016/0335876 A1 | 11/2016 | Verma |
| 2016/0350639 A1 | 12/2016 | Tere |
| 2016/0357354 A1 | 12/2016 | Chen et al. |
| 2016/0381499 A1 | 12/2016 | Draghici et al. |
| 2017/0006577 A1 | 1/2017 | Koum et al. |
| 2017/0048686 A1* | 2/2017 | Chang ............... H04W 52/0209 |
| 2017/0053560 A1 | 2/2017 | Aldossary et al. |
| 2017/0064504 A1 | 3/2017 | Jose |
| 2017/0064511 A1 | 3/2017 | Mccormick |
| 2017/0092085 A1 | 3/2017 | Agarwal |
| 2017/0092090 A1 | 3/2017 | Lemmer |
| 2017/0168159 A1 | 6/2017 | Gatland |
| 2017/0180934 A1 | 6/2017 | Brice et al. |
| 2017/0276498 A1 | 9/2017 | Tsai |
| 2017/0307388 A1 | 10/2017 | Mcconathy et al. |
| 2017/0353833 A1 | 12/2017 | De Barros Chapiewski et al. |
| 2017/0357320 A1 | 12/2017 | Chaudhri et al. |
| 2017/0357520 A1 | 12/2017 | De Vries et al. |
| 2017/0365100 A1 | 12/2017 | Walton |
| 2018/0035257 A1 | 2/2018 | Mccormick |
| 2018/0077097 A1 | 3/2018 | Alfaro et al. |
| 2018/0084517 A1 | 3/2018 | Do et al. |
| 2018/0091951 A1 | 3/2018 | Sandel et al. |
| 2018/0147472 A1 | 5/2018 | Deangelis et al. |
| 2018/0158197 A1 | 6/2018 | Dasgupta et al. |
| 2018/0165924 A9 | 6/2018 | Olsson et al. |
| 2018/0184286 A1 | 6/2018 | Patterson |
| 2018/0189567 A1 | 7/2018 | Maheriya et al. |
| 2018/0198973 A1 | 7/2018 | Eronen et al. |
| 2018/0227393 A1 | 8/2018 | Daub |
| 2018/0240176 A1 | 8/2018 | Cronin et al. |
| 2018/0241488 A1 | 8/2018 | Daoura et al. |
| 2018/0276427 A1 | 9/2018 | Depew et al. |
| 2018/0278888 A1 | 9/2018 | Kasahara et al. |
| 2018/0343561 A1 | 11/2018 | Patterson |
| 2018/0349516 A1* | 12/2018 | Dutta .................... G06F 3/0481 |
| 2018/0357876 A1 | 12/2018 | Smoak |
| 2019/0050901 A1 | 2/2019 | Vincent et al. |
| 2019/0073113 A1 | 3/2019 | Yang |
| 2019/0086666 A1 | 3/2019 | Wu |
| 2019/0102372 A1 | 4/2019 | Hailpern et al. |
| 2019/0103012 A1 | 4/2019 | Daoura et al. |
| 2019/0114887 A1 | 4/2019 | Brantley |
| 2019/0114921 A1 | 4/2019 | Cazzoli |
| 2019/0163748 A1 | 5/2019 | Cuthbert et al. |
| 2019/0174265 A1 | 6/2019 | Chen |
| 2019/0182626 A1* | 6/2019 | Miller ..................... H04W 4/40 |
| 2019/0285413 A1 | 9/2019 | Hallett |
| 2019/0362556 A1 | 11/2019 | Ben-Dor et al. |
| 2019/0370544 A1 | 12/2019 | Wright et al. |
| 2020/0015040 A1 | 1/2020 | Baird et al. |
| 2020/0107164 A1 | 4/2020 | Lopatin et al. |
| 2020/0107165 A1* | 4/2020 | Pai .................... H04W 12/0471 |
| 2020/0110934 A1 | 4/2020 | Paul |
| 2020/0117339 A1 | 4/2020 | Amitay et al. |
| 2020/0139929 A1 | 5/2020 | Turley |
| 2020/0169848 A1 | 5/2020 | Daoura et al. |
| 2020/0193783 A1 | 6/2020 | Peoples |
| 2020/0220914 A1 | 7/2020 | Carrigan et al. |
| 2020/0242848 A1 | 7/2020 | Ambler et al. |
| 2020/0257865 A1 | 8/2020 | Zarshchikov et al. |
| 2020/0259908 A1 | 8/2020 | Klinkner et al. |
| 2020/0260142 A1 | 8/2020 | Kasahara et al. |
| 2020/0273235 A1 | 8/2020 | Emami et al. |
| 2020/0284585 A1 | 9/2020 | Lee |
| 2020/0379946 A1 | 12/2020 | Coffman et al. |
| 2020/0382908 A1 | 12/2020 | Behzadi et al. |
| 2020/0382912 A1* | 12/2020 | Dancie .................... H04W 4/14 |
| 2020/0409537 A1 | 12/2020 | Story et al. |
| 2021/0004759 A1 | 1/2021 | Arunachalam et al. |
| 2021/0126889 A1 | 4/2021 | Springstroh |
| 2021/0190503 A1 | 6/2021 | Landers |
| 2021/0264154 A1 | 8/2021 | Lamont |
| 2021/0314735 A1 | 10/2021 | Klinkner et al. |
| 2022/0023136 A1 | 1/2022 | Xia et al. |
| 2022/0035510 A1 | 2/2022 | Behzadi et al. |
| 2022/0050563 A1 | 2/2022 | Behzadi et al. |
| 2022/0051182 A1 | 2/2022 | Fox et al. |
| 2022/0075503 A1 | 3/2022 | Behzadi et al. |
| 2022/0100286 A1 | 3/2022 | De Jong et al. |
| 2022/0103974 A1 | 3/2022 | De Jong et al. |
| 2022/0107187 A1 | 4/2022 | Okabe et al. |
| 2022/0223013 A1 | 7/2022 | Persson et al. |
| 2022/0335807 A1 | 10/2022 | Jong et al. |
| 2023/0164103 A1 | 5/2023 | Ham et al. |
| 2023/0262420 A1 | 8/2023 | Behzadi et al. |
| 2023/0342009 A1 | 10/2023 | De Jong et al. |
| 2023/0375359 A1 | 11/2023 | Fleizach et al. |
| 2024/0012531 A1 | 1/2024 | Behzadi et al. |
| 2024/0062634 A1 | 2/2024 | Persson |
| 2024/0272773 A1 | 8/2024 | De Jong et al. |
| 2024/0334161 A1 | 10/2024 | De Jong et al. |
| 2024/0406672 A1 | 12/2024 | Sart |
| 2024/0406677 A1 | 12/2024 | Allen |
| 2025/0088584 A1 | 3/2025 | De Jong et al. |

FOREIGN PATENT DOCUMENTS

| | | |
|---|---|---|
| CN | 109146954 A | 1/2019 |
| CN | 110297594 A | 10/2019 |
| EP | 2439920 A1 | 4/2012 |
| EP | 2482164 A1 | 8/2012 |
| IT | 20163647 A1 | 11/2017 |
| JP | 2006-284458 A | 10/2006 |
| JP | 2007-088943 A | 4/2007 |
| JP | 2017-015593 A | 1/2017 |
| JP | 2018-101831 A | 6/2018 |
| JP | 2019046502 A | 3/2019 |
| JP | 2020-531938 A | 11/2020 |
| WO | 2001/037004 A1 | 5/2001 |
| WO | 2012/047920 A1 | 4/2012 |
| WO | 2013/169849 A2 | 11/2013 |
| WO | 2014/105276 A1 | 7/2014 |

(56) References Cited

FOREIGN PATENT DOCUMENTS

| | | |
|---|---|---|
| WO | 2018/034053 A1 | 2/2018 |
| WO | 2020/214864 A1 | 10/2020 |
| WO | 2023105450 A1 | 6/2023 |

OTHER PUBLICATIONS

HowTechs, Motorola Moto G—How to reorganize app and widget, Dec. 22, 2013, youtube.com, https://www.youtube.com/watch?v=0szKlr7xnqs, pp. 1-15 (Year: 2013).*

Extended European Search Report received for European Patent Application No. 20790659.5, mailed on Nov. 29, 2022, 11 pages.

Extended European Search Report received for European Patent Application No. 20798438.6, mailed on Jan. 3, 2023, 11 pages.

Final Office Action received for U.S. Appl. No. 17/455,821, mailed on Jul. 29, 2022, 20 pages.

Final Office Action received for U.S. Appl. No. 17/455,843, mailed on Oct. 3, 2022, 27 pages.

Google Maps' Location Sharing Feature Can Show Your Friends' Battery Status, Available online at: < https://www.firstpost.com/tech/news-analysis/google-maps-location-sharing-feature-can-show-your-friends-battery-status-4885521.html>, [Retrieved Jan. 27, 2023], Aug. 3, 2018, 2 pages.

International Search Report received for PCT Patent Application No. PCT/US2022/071806, mailed on Oct. 21, 2022, 6 pages.

International Search Report received for PCT Patent Application No. PCT/US2022/072389, mailed on Nov. 30, 2022, 7 pages.

Non-Final Office Action received for U.S. Appl. No. 17/448,491, mailed on Jul. 27, 2022, 16 pages.

Non-Final Office Action received for U.S. Appl. No. 17/452,971, mailed on Feb. 15, 2023, 17 pages.

Non-Final Office Action received for U.S. Appl. No. 17/455,821, mailed on Dec. 8, 2022, 24 pages.

Non-Final Office Action received for U.S. Appl. No. 17/455,843, mailed on Feb. 15, 2023, 28 pages.

Notice of Allowance received for U.S. Appl. No. 17/448,491, mailed on Jan. 18, 2023, 8 pages.

Notice of Allowance received for U.S. Appl. No. 17/503,246, mailed on Dec. 7, 2022, 10 pages.

Notice of Allowance received for U.S. Appl. No. 17/503,246, mailed on Jan. 25, 2023, 9 pages.

Notice of Allowance received for U.S. Appl. No. 17/594,742, mailed on Mar. 29, 2023, 9 pages.

Hill, Spencer, "Does Airplane Mode Stop GPS Tracking?", Retrieved from the Internet: <https://web.archive.org/web/20200921071851/https://www.imyfone.com/change-location/does-airplane-mode-stop-tracking/>, [retrieved on Aug. 18, 2022], Part 1. Does Airplane Mode Stop GPS Tracking?, Sep. 21, 2020, pp. 1-2.

Roberts et al., "The Use of Augmented Reality, GPS and INS for Subsurface Data Visualisation", FIG XXII International Congress, Washington, D.C. USA, Apr. 19-26, 2002, 12 pages.

Final Office Action received for U.S. Appl. No. 17/452,971, mailed on Jun. 1, 2022, 22 Pages.

Final Office Action received for U.S. Appl. No. 17/503,246, mailed on May 20, 2022, 17 Pages.

International Search Report received for PCT Patent Application No. PCT/US2020/028595, mailed on Aug. 14, 2020, 5 pages.

International Search Report received for PCT Patent Application No. PCT/US2020/030149, mailed on Sep. 4, 2020, 6 pages.

International Search Report received for PCT Patent Application No. PCT/US2021/071555, mailed on Feb. 14, 2022, 6 pages.

Non-Final Office Action received for U.S. Appl. No. 17/452,971, mailed on Jan. 21, 2022, 12 pages.

Non-Final Office Action received for U.S. Appl. No. 17/455,821, mailed on Apr. 7, 2022, 18 Pages.

Non-Final Office Action received for U.S. Appl. No. 17/455,843, mailed on May 26, 2022, 20 Pages.

Non-Final Office Action received for U.S. Appl. No. 17/503,246, mailed on Feb. 3, 2022, 15 pages.

Mokatren et al., "Exploring the Potential of a Mobile Eye Tracker as an Intuitive Indoor Pointing Device: A Case Study in Cultural Heritage", In: Future Generation Computer Systems, Available online at: <https://is-web.hevra.haifa.ac.il/images/lecturers_files/ishimshoni_files/MokatrenFGCS.pdf>, [retrieved on Jul. 26, 2020], Jul. 1, 2017, 14 pages.

International Search Report received for PCT Application No. PCT/US2023/019402, mailed on Sep. 19, 2023, 6 pages.

International Search Report received for PCT Patent Application No. PCT/US2023/022602, mailed on Sep. 4, 2023, 4 pages.

Notice of Allowance received for U.S. Appl. No. 17/448,491, mailed on May 4, 2023, 7 pages.

Notice of Allowance received for U.S. Appl. No. 17/452,971, mailed on Aug. 17, 2023, 11 pages.

Notice of Allowance received for U.S. Appl. No. 17/452,971, mailed on Dec. 12, 2023, 7 pages.

Notice of Allowance received for U.S. Appl. No. 17/455,821, mailed on Dec. 12, 2023, 9 pages.

Notice of Allowance received for U.S. Appl. No. 17/455,821, mailed on Sep. 20, 2023, 8 pages.

Notice of Allowance received for U.S. Appl. No. 17/455,843, mailed on Jul. 19, 2023, 9 pages.

Notice of Allowance received for U.S. Appl. No. 17/455,843, mailed on Nov. 1, 2023, 7 pages.

Notice of Allowance received for U.S. Appl. No. 17/503,246, mailed on May 18, 2023, 9 pages.

Notice of Allowance received for U.S. Appl. No. 17/594,742, mailed on Jul. 24, 2023, 8 pages.

Notice of Allowance received for U.S. Appl. No. 18/309,492, mailed on Nov. 24, 2023, 10 pages.

Search Report received for Chinese Patent Application No. 202210059059.2, mailed on Dec. 22, 2023, 5 pages (2 pages of English Translation and 3 pages of Official Copy).

Corrected Notice of Allowability received for U.S. Appl. No. 17/452,971, mailed on Mar. 11, 2024, 3 pages.

Corrected Notice of Allowability received for U.S. Appl. No. 17/455,843, mailed on Mar. 14, 2024, 3 pages.

Final Office Action received for U.S. Appl. No. 18/474,133, mailed on Aug. 26, 2024, 13 pages.

International Search Report received for PCT Patent Application No. PCT/US2024/015620, mailed on Jul. 17, 2024, 7 pages.

Non-Final Office Action received for U.S. Appl. No. 17/659,830, mailed on Mar. 14, 2024, 14 pages.

Non-Final Office Action received for U.S. Appl. No. 18/474,133, mailed on Jul. 3, 2024, 13 pages.

Non-Final Office Action received for U.S. Appl. No. 18/499,157, mailed on Jun. 5, 2024, 7 pages.

Notice of Allowance received for U.S. Appl. No. 18/309,492, mailed on Mar. 8, 2024, 10 pages.

Wikipedia, "Virtual Network Computing", Wikipedia, Available online at <https://en.wikipedia.org/w/index.php?t%20itle=Virtual%20Network%20Computing&oldid=1120211990>, Nov. 5, 2024, 5 pages.

European Search Report received for European Patent Application No. 21799155.3, mailed on Sep. 27, 2024, 4 pages.

Final Office Action received for U.S. Appl. No. 17/659,830, mailed on Nov. 19, 2024, 16 pages.

International Search Report received for PCT Patent Application No. PCT/US2024/031500, mailed on Nov. 21, 2024, 6 pages.

International Search Report received for PCT Patent Application No. PCT/US2024/031781, mailed on Aug. 13, 2024, 5 pages.

Non-Final Office Action received for U.S. Appl. No. 18/304,911, mailed on Sep. 12, 2024, 41 pages.

Notice of Allowance received for U.S Appl. No. 18/499,157, mailed on Dec. 12, 2024, 7 pages.

Non-Final Office Action received for U.S. Appl. No. 18/474,133, mailed on Mar. 24, 2025, 12 pages.

Non-Final Office Action received for U.S. Appl. No. 18/319,394, mailed on Jun. 17, 2025, 18 pages.

Advisory Action received for U.S. Appl. No. 17/659,830, mailed on Mar. 26, 2025, 3 pages.

International Search Report received for PCT Patent Application No. PCT/US2024/046045, mailed on Nov. 28, 2024, 4 pages.

(56)          References Cited

OTHER PUBLICATIONS

Non-Final Office Action received for U.S. Appl. No. 18/304,911, mailed on Apr. 28, 2025, 41 pages.
Notice of Allowance received for U.S. Appl. No. 18/499,157, mailed on Apr. 11, 2025, 7 pages.
Non-Final Office Action received for U.S. Appl. No. 17/659,830, mailed on Jun. 4, 2025, 8 pages.
Non-Final Office Action received for U.S. Appl. No. 18/440,762, mailed on Sep. 30, 2025, 12 pages.
Final Office Action received for U.S. Appl. No. 18/474,133, mailed on Sep. 16, 2025, 13 pages.
Notice of Allowance received for U.S. Appl. No. 17/659,830, mailed on Oct. 14, 2025, 7 pages.

* cited by examiner

700

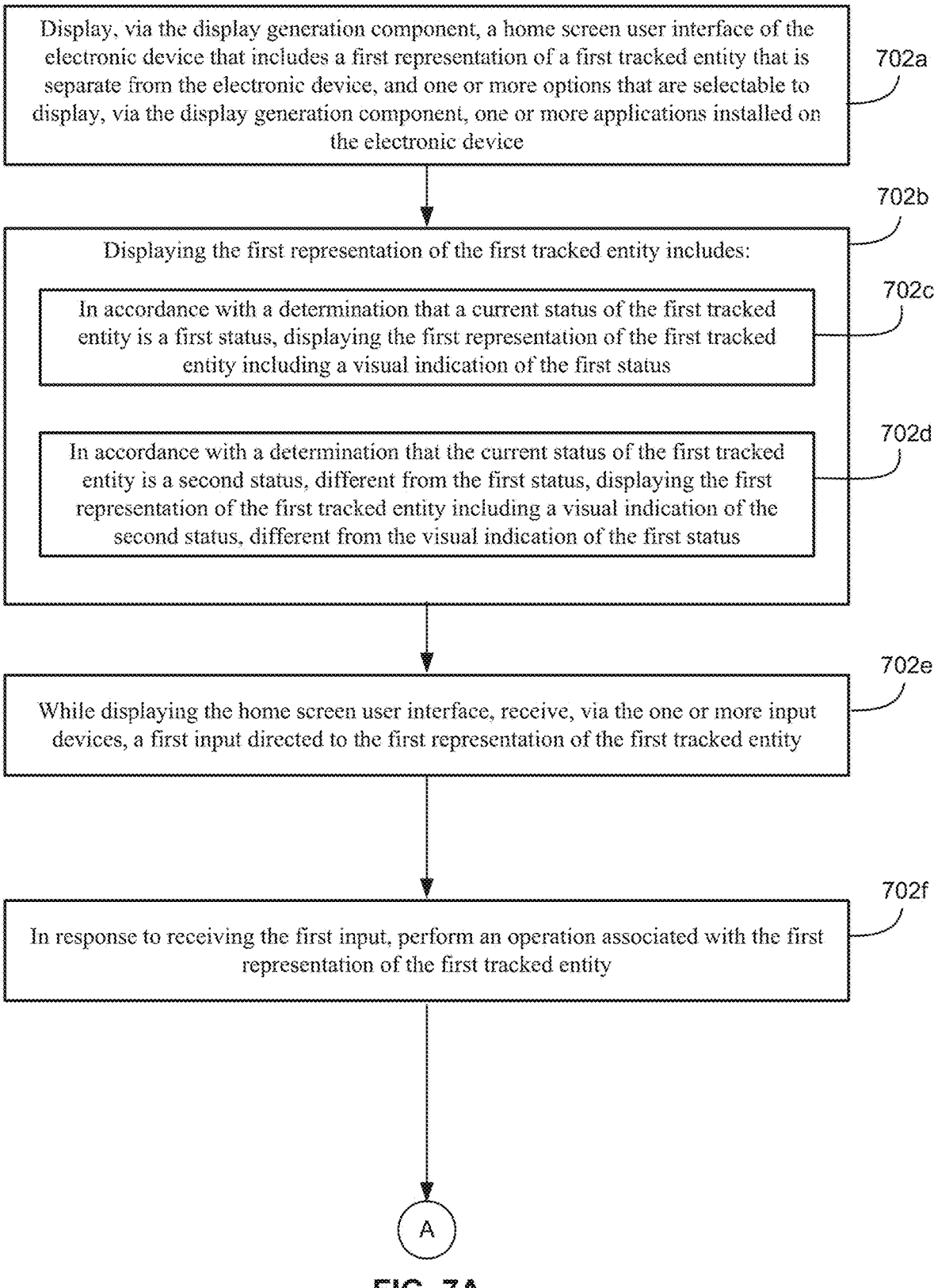

Display, via the display generation component, a home screen user interface of the electronic device that includes a first representation of a first tracked entity that is separate from the electronic device, and one or more options that are selectable to display, via the display generation component, one or more applications installed on the electronic device — 702a Displaying the first representation of the first tracked entity includes: — 702b In accordance with a determination that a current status of the first tracked entity is a first status, displaying the first representation of the first tracked entity including a visual indication of the first status — 702c In accordance with a determination that the current status of the first tracked entity is a second status, different from the first status, displaying the first representation of the first tracked entity including a visual indication of the second status, different from the visual indication of the first status — 702d While displaying the home screen user interface, receive, via the one or more input devices, a first input directed to the first representation of the first tracked entity — 702e In response to receiving the first input, perform an operation associated with the first representation of the first tracked entity — 702f

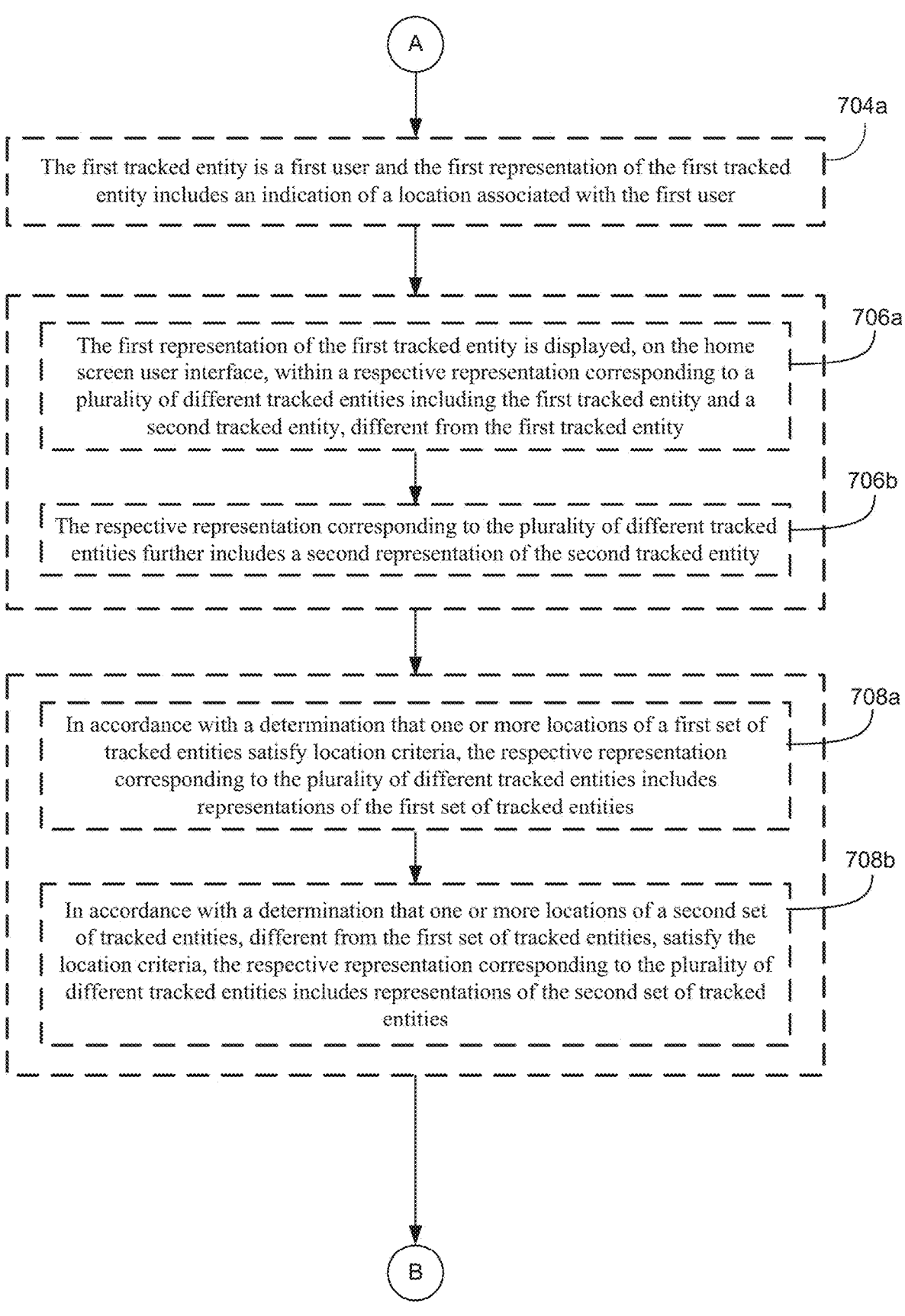

A

704a
The first tracked entity is a first user and the first representation of the first tracked entity includes an indication of a location associated with the first user 706a
The first representation of the first tracked entity is displayed, on the home screen user interface, within a respective representation corresponding to a plurality of different tracked entities including the first tracked entity and a second tracked entity, different from the first tracked entity 706b
The respective representation corresponding to the plurality of different tracked entities further includes a second representation of the second tracked entity 708a
In accordance with a determination that one or more locations of a first set of tracked entities satisfy location criteria, the respective representation corresponding to the plurality of different tracked entities includes representations of the first set of tracked entities 708b
In accordance with a determination that one or more locations of a second set of tracked entities, different from the first set of tracked entities, satisfy the location criteria, the respective representation corresponding to the plurality of different tracked entities includes representations of the second set of tracked entities

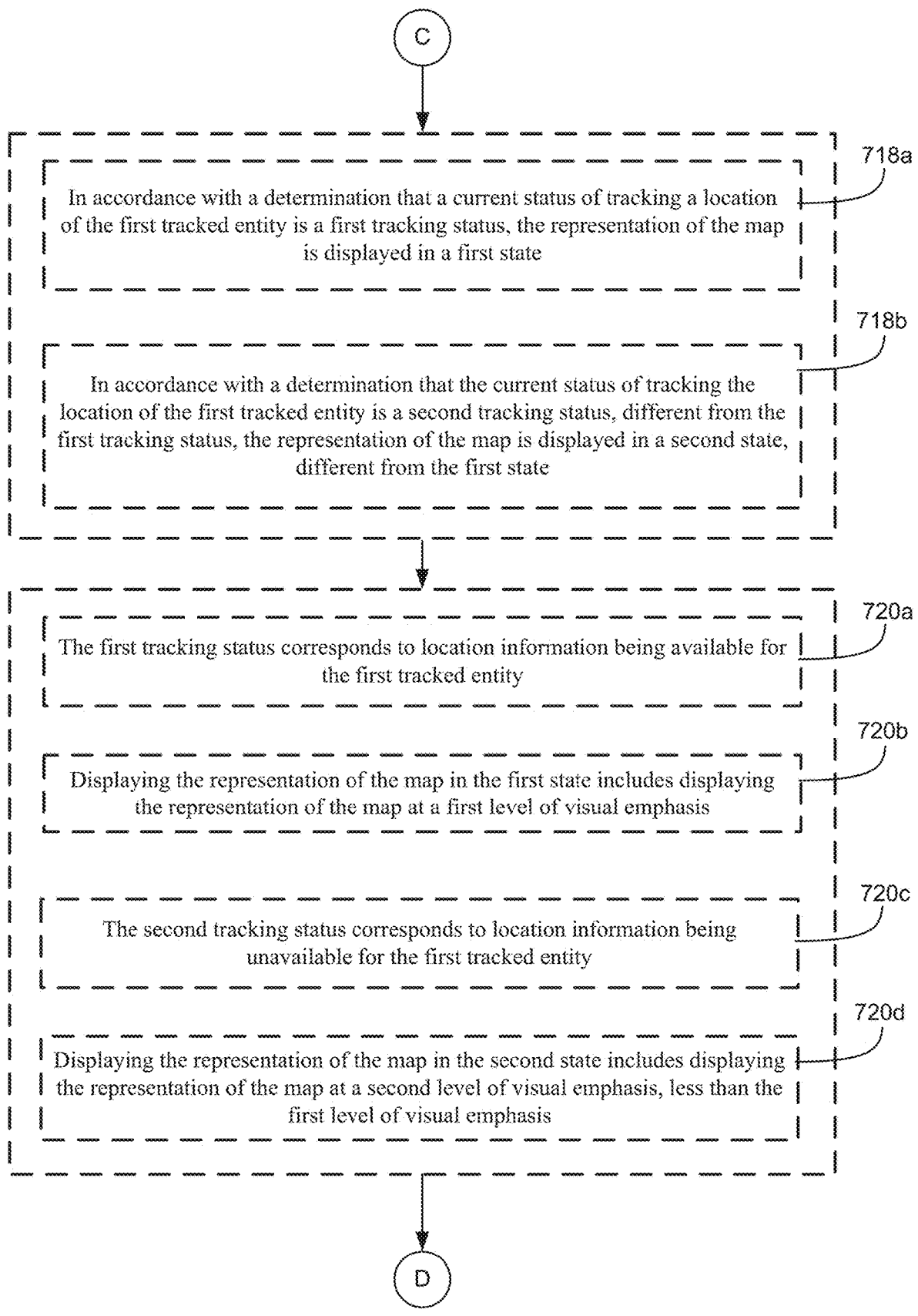

C

In accordance with a determination that a current status of tracking a location of the first tracked entity is a first tracking status, the representation of the map is displayed in a first state 718a In accordance with a determination that the current status of tracking the location of the first tracked entity is a second tracking status, different from the first tracking status, the representation of the map is displayed in a second state, different from the first state 718b The first tracking status corresponds to location information being available for the first tracked entity 720a Displaying the representation of the map in the first state includes displaying the representation of the map at a first level of visual emphasis 720b The second tracking status corresponds to location information being unavailable for the first tracked entity 720c Displaying the representation of the map in the second state includes displaying the representation of the map at a second level of visual emphasis, less than the first level of visual emphasis 720d

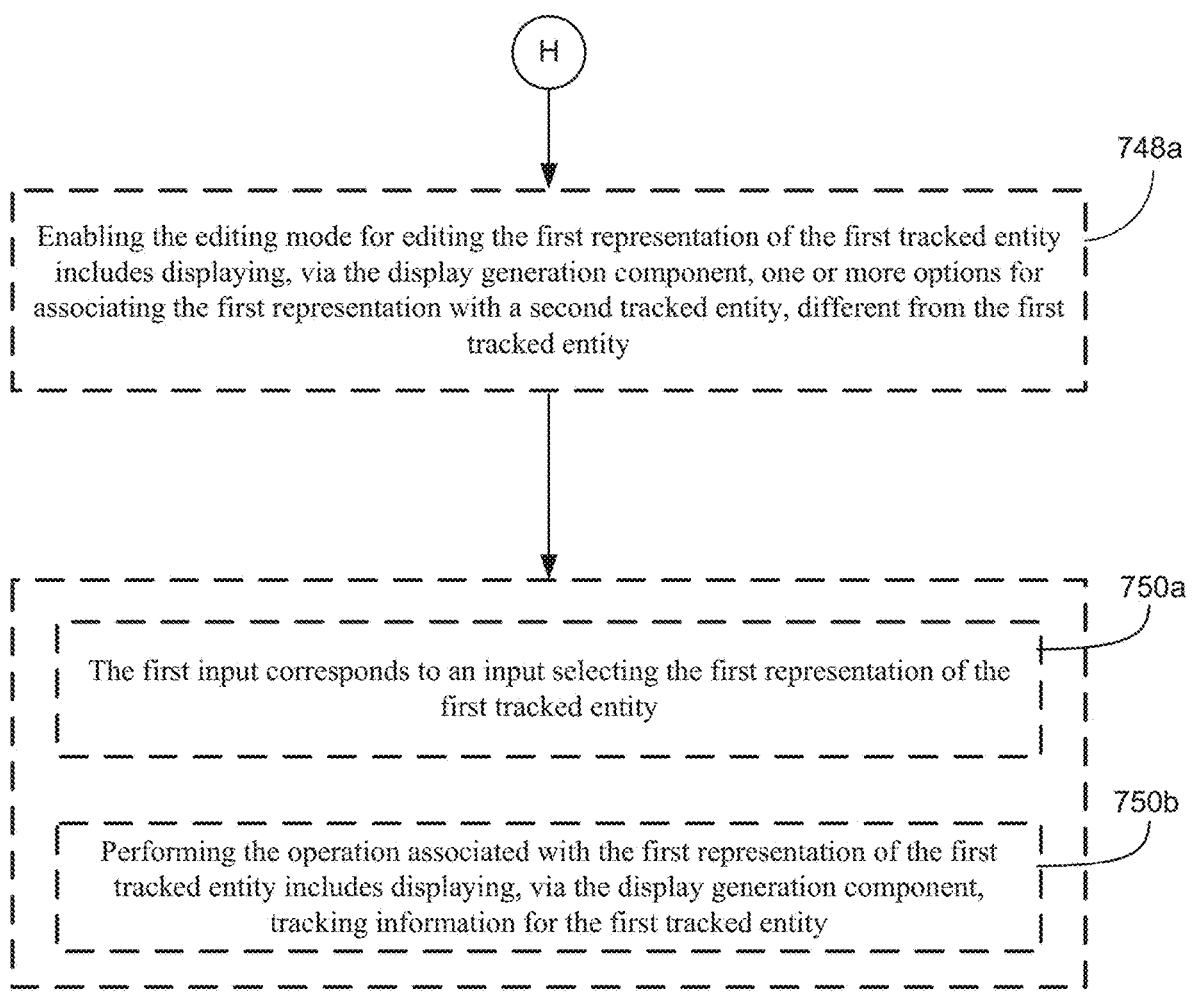

H

748a

Enabling the editing mode for editing the first representation of the first tracked entity includes displaying, via the display generation component, one or more options for associating the first representation with a second tracked entity, different from the first tracked entity 750a The first input corresponds to an input selecting the first representation of the first tracked entity 750b Performing the operation associated with the first representation of the first tracked entity includes displaying, via the display generation component, tracking information for the first tracked entity

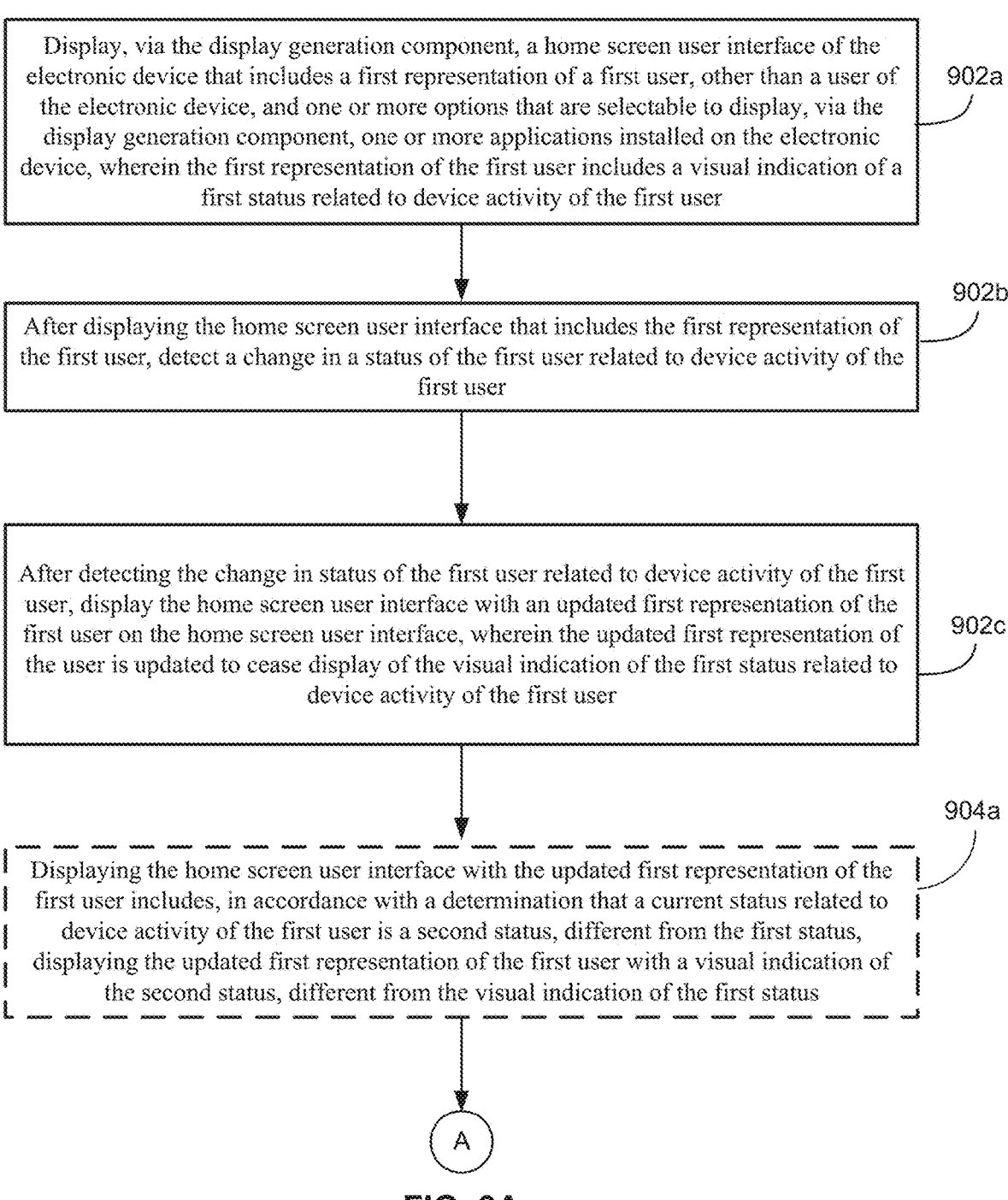

Display, via the display generation component, a home screen user interface of the electronic device that includes a first representation of a first user, other than a user of the electronic device, and one or more options that are selectable to display, via the display generation component, one or more applications installed on the electronic device, wherein the first representation of the first user includes a visual indication of a first status related to device activity of the first user 902a After displaying the home screen user interface that includes the first representation of the first user, detect a change in a status of the first user related to device activity of the first user 902b After detecting the change in status of the first user related to device activity of the first user, display the home screen user interface with an updated first representation of the first user on the home screen user interface, wherein the updated first representation of the user is updated to cease display of the visual indication of the first status related to device activity of the first user 902c Displaying the home screen user interface with the updated first representation of the first user includes, in accordance with a determination that a current status related to device activity of the first user is a second status, different from the first status, displaying the updated first representation of the first user with a visual indication of the second status, different from the visual indication of the first status 904a

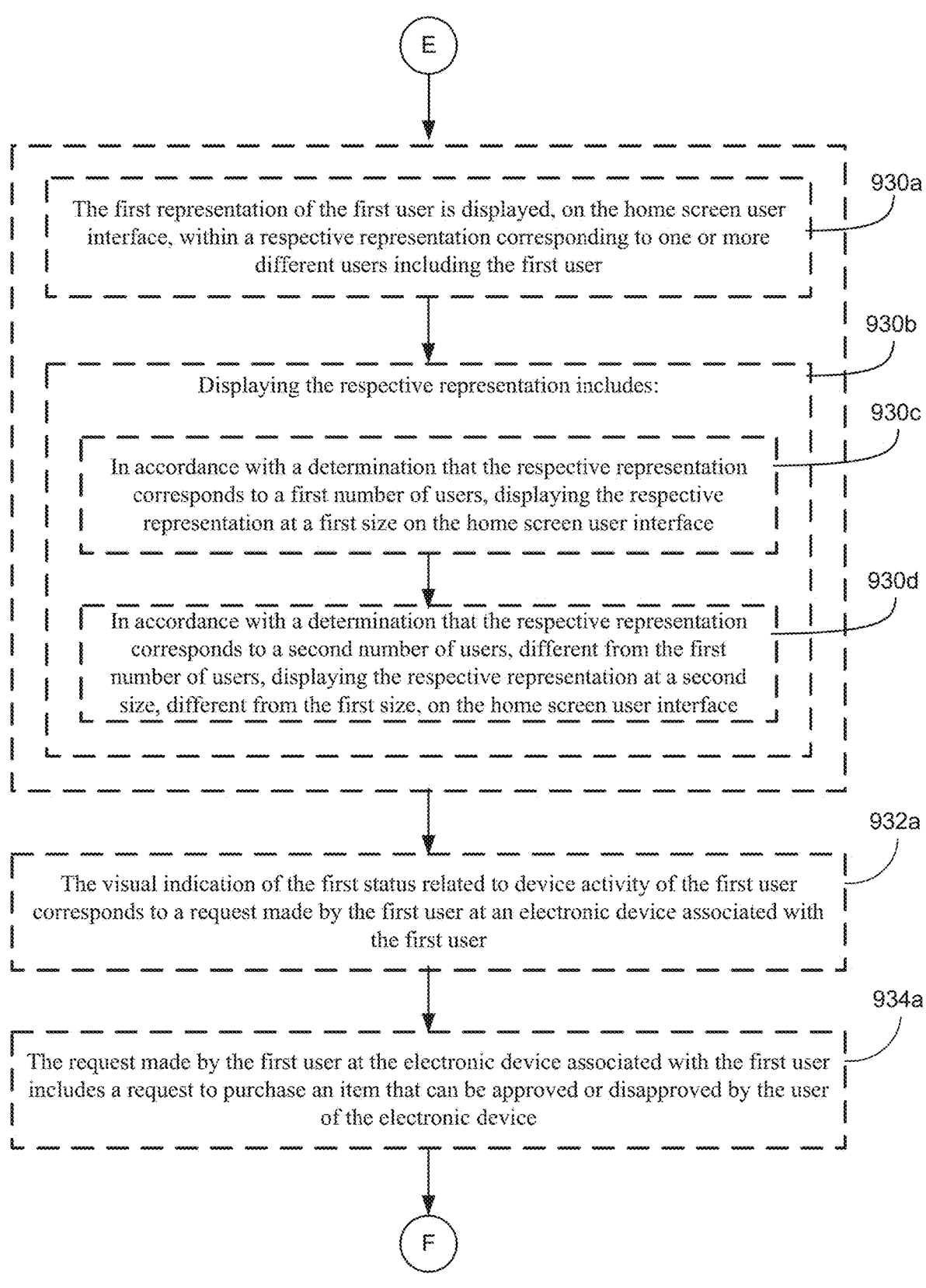

E

The first representation of the first user is displayed, on the home screen user interface, within a respective representation corresponding to one or more different users including the first user 930a Displaying the respective representation includes:

930b

In accordance with a determination that the respective representation corresponds to a first number of users, displaying the respective representation at a first size on the home screen user interface 930c In accordance with a determination that the respective representation corresponds to a second number of users, different from the first number of users, displaying the respective representation at a second size, different from the first size, on the home screen user interface 930d The visual indication of the first status related to device activity of the first user corresponds to a request made by the first user at an electronic device associated with the first user 932a The request made by the first user at the electronic device associated with the first user includes a request to purchase an item that can be approved or disapproved by the user of the electronic device 934a

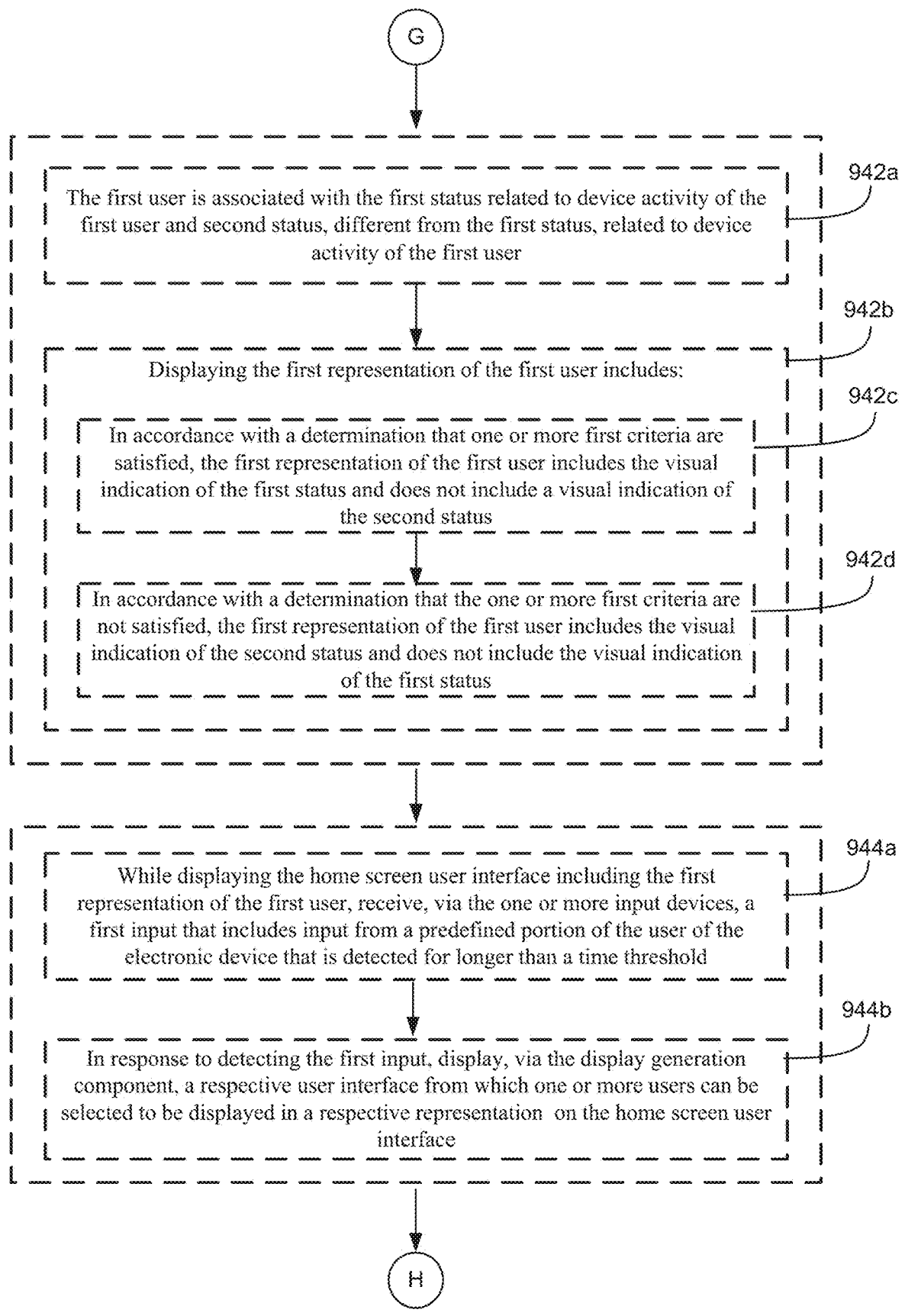

G

The first user is associated with the first status related to device activity of the first user and second status, different from the first status, related to device activity of the first user 942a Displaying the first representation of the first user includes:

942b

In accordance with a determination that one or more first criteria are satisfied, the first representation of the first user includes the visual indication of the first status and does not include a visual indication of the second status 942c In accordance with a determination that the one or more first criteria are not satisfied, the first representation of the first user includes the visual indication of the second status and does not include the visual indication of the first status 942d While displaying the home screen user interface including the first representation of the first user, receive, via the one or more input devices, a first input that includes input from a predefined portion of the user of the electronic device that is detected for longer than a time threshold 944a In response to detecting the first input, display, via the display generation component, a respective user interface from which one or more users can be selected to be displayed in a respective representation on the home screen user interface 944b

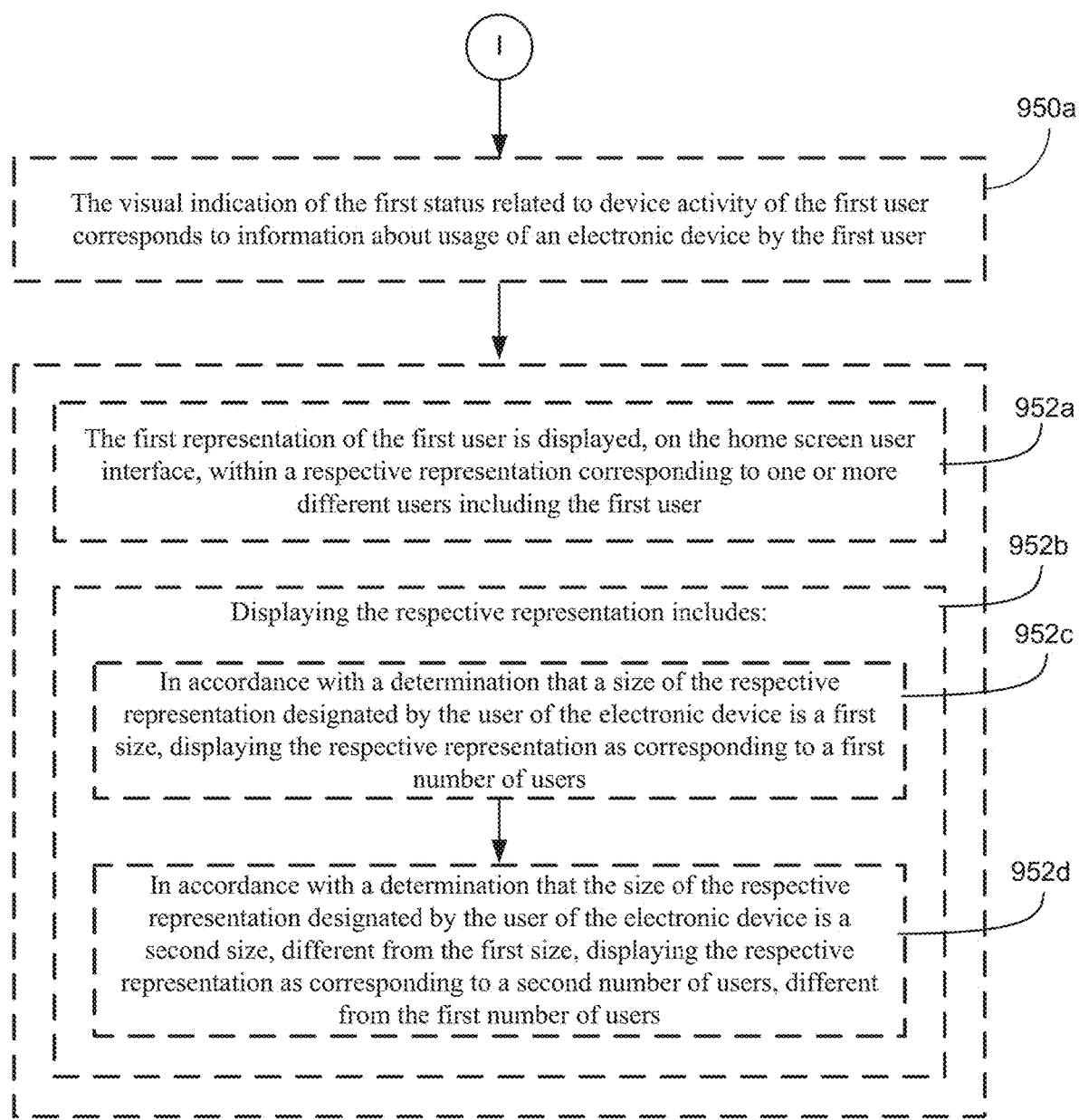

950a

The visual indication of the first status related to device activity of the first user corresponds to information about usage of an electronic device by the first user 952a The first representation of the first user is displayed, on the home screen user interface, within a respective representation corresponding to one or more different users including the first user 952b Displaying the respective representation includes:

952c

In accordance with a determination that a size of the respective representation designated by the user of the electronic device is a first size, displaying the respective representation as corresponding to a first number of users 952d In accordance with a determination that the size of the respective representation designated by the user of the electronic device is a second size, different from the first size, displaying the respective representation as corresponding to a second number of users, different from the first number of users

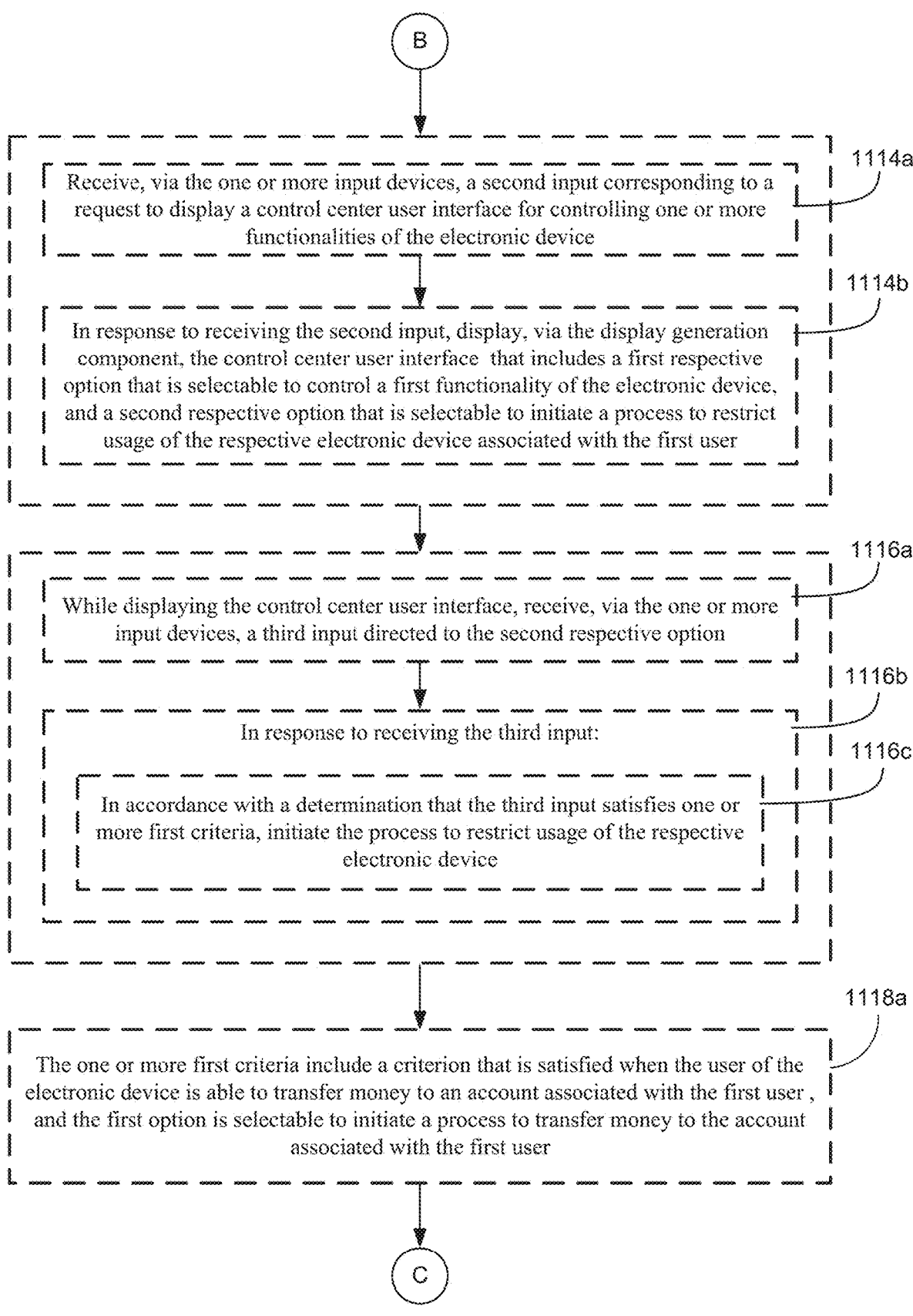

B

Receive, via the one or more input devices, a second input corresponding to a request to display a control center user interface for controlling one or more functionalities of the electronic device 1114a In response to receiving the second input, display, via the display generation component, the control center user interface that includes a first respective option that is selectable to control a first functionality of the electronic device, and a second respective option that is selectable to initiate a process to restrict usage of the respective electronic device associated with the first user 1114b While displaying the control center user interface, receive, via the one or more input devices, a third input directed to the second respective option 1116a In response to receiving the third input:

1116b

In accordance with a determination that the third input satisfies one or more first criteria, initiate the process to restrict usage of the respective electronic device 1116c The one or more first criteria include a criterion that is satisfied when the user of the electronic device is able to transfer money to an account associated with the first user, and the first option is selectable to initiate a process to transfer money to the account associated with the first user 1118a

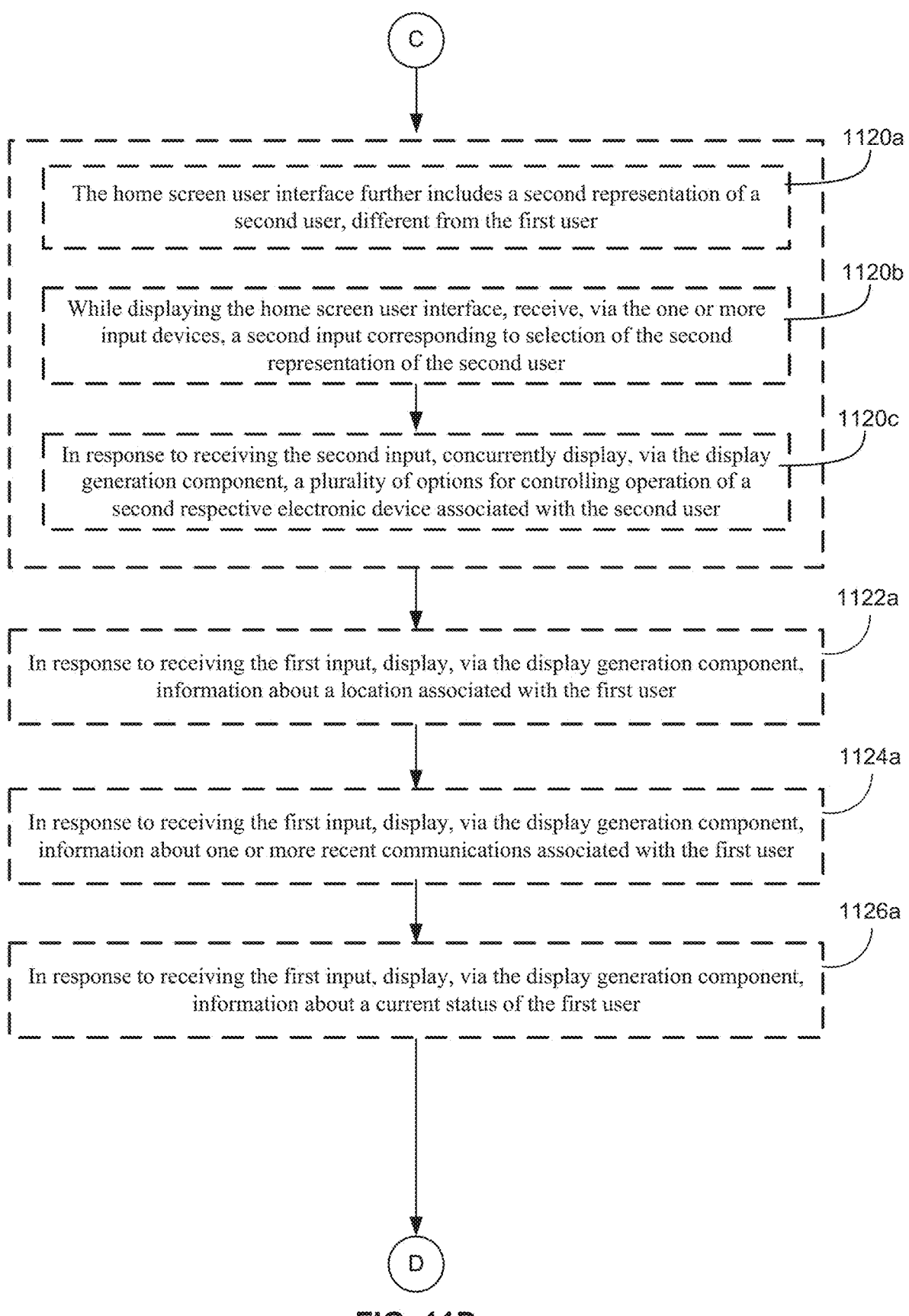

C

1120a

The home screen user interface further includes a second representation of a second user, different from the first user 1120b While displaying the home screen user interface, receive, via the one or more input devices, a second input corresponding to selection of the second representation of the second user 1120c In response to receiving the second input, concurrently display, via the display generation component, a plurality of options for controlling operation of a second respective electronic device associated with the second user 1122a In response to receiving the first input, display, via the display generation component, information about a location associated with the first user 1124a In response to receiving the first input, display, via the display generation component, information about one or more recent communications associated with the first user 1126a In response to receiving the first input, display, via the display generation component, information about a current status of the first user

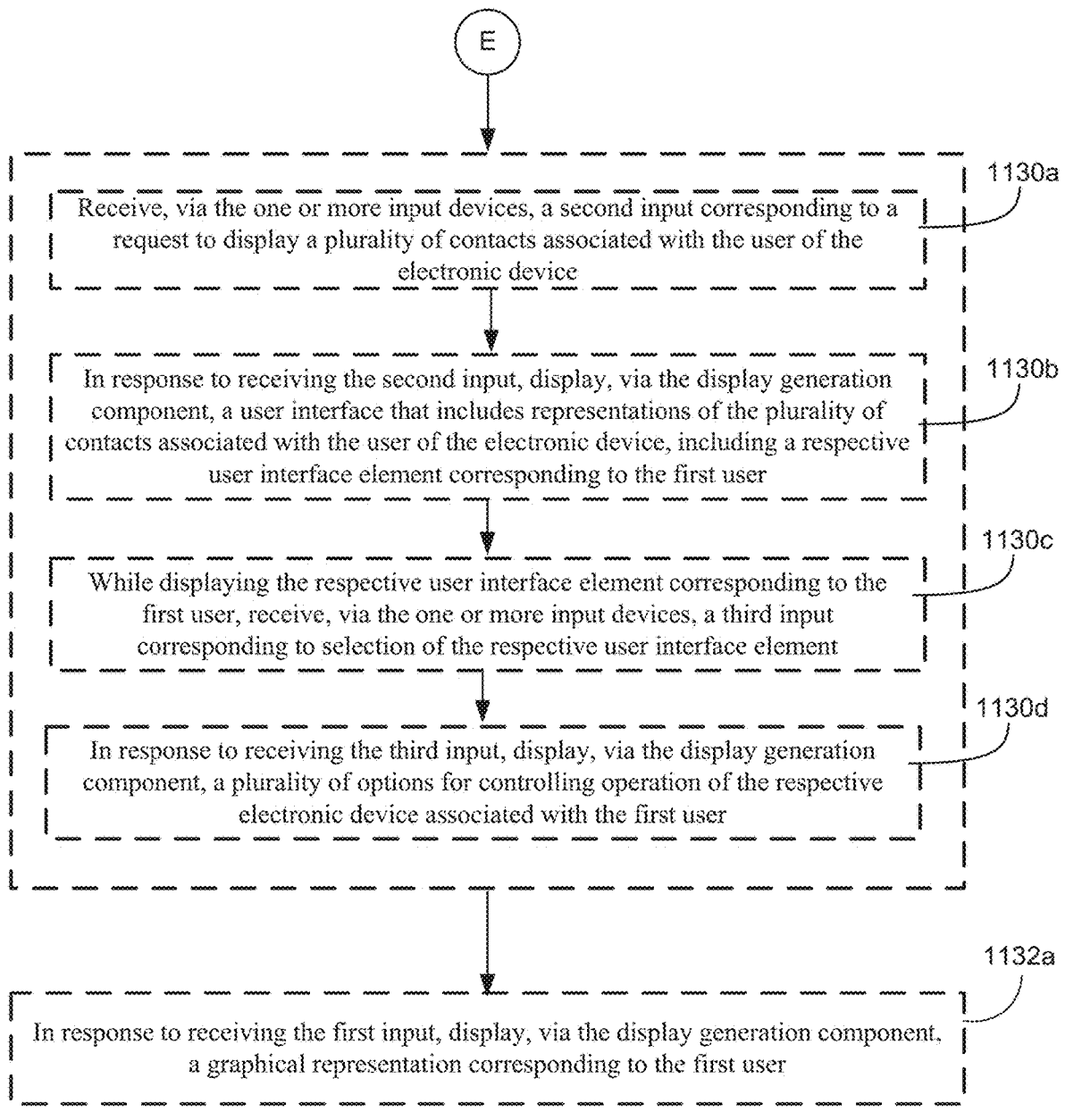

E

Receive, via the one or more input devices, a second input corresponding to a request to display a plurality of contacts associated with the user of the electronic device 1130a In response to receiving the second input, display, via the display generation component, a user interface that includes representations of the plurality of contacts associated with the user of the electronic device, including a respective user interface element corresponding to the first user 1130b While displaying the respective user interface element corresponding to the first user, receive, via the one or more input devices, a third input corresponding to selection of the respective user interface element 1130c In response to receiving the third input, display, via the display generation component, a plurality of options for controlling operation of the respective electronic device associated with the first user 1130d In response to receiving the first input, display, via the display generation component, a graphical representation corresponding to the first user 1132a

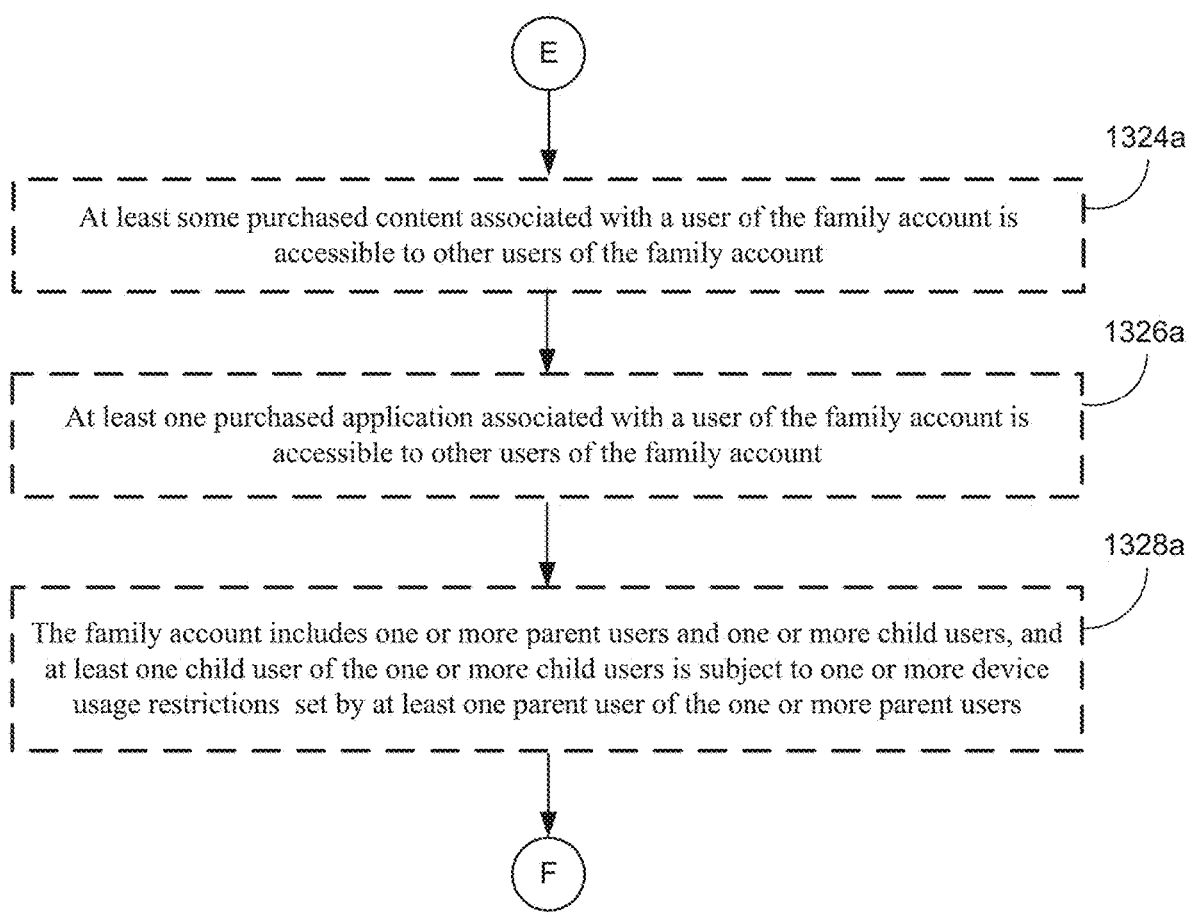

1324a

At least some purchased content associated with a user of the family account is accessible to other users of the family account 1326a At least one purchased application associated with a user of the family account is accessible to other users of the family account 1328a The family account includes one or more parent users and one or more child users, and at least one child user of the one or more child users is subject to one or more device usage restrictions set by at least one parent user of the one or more parent users

FIG. 13F

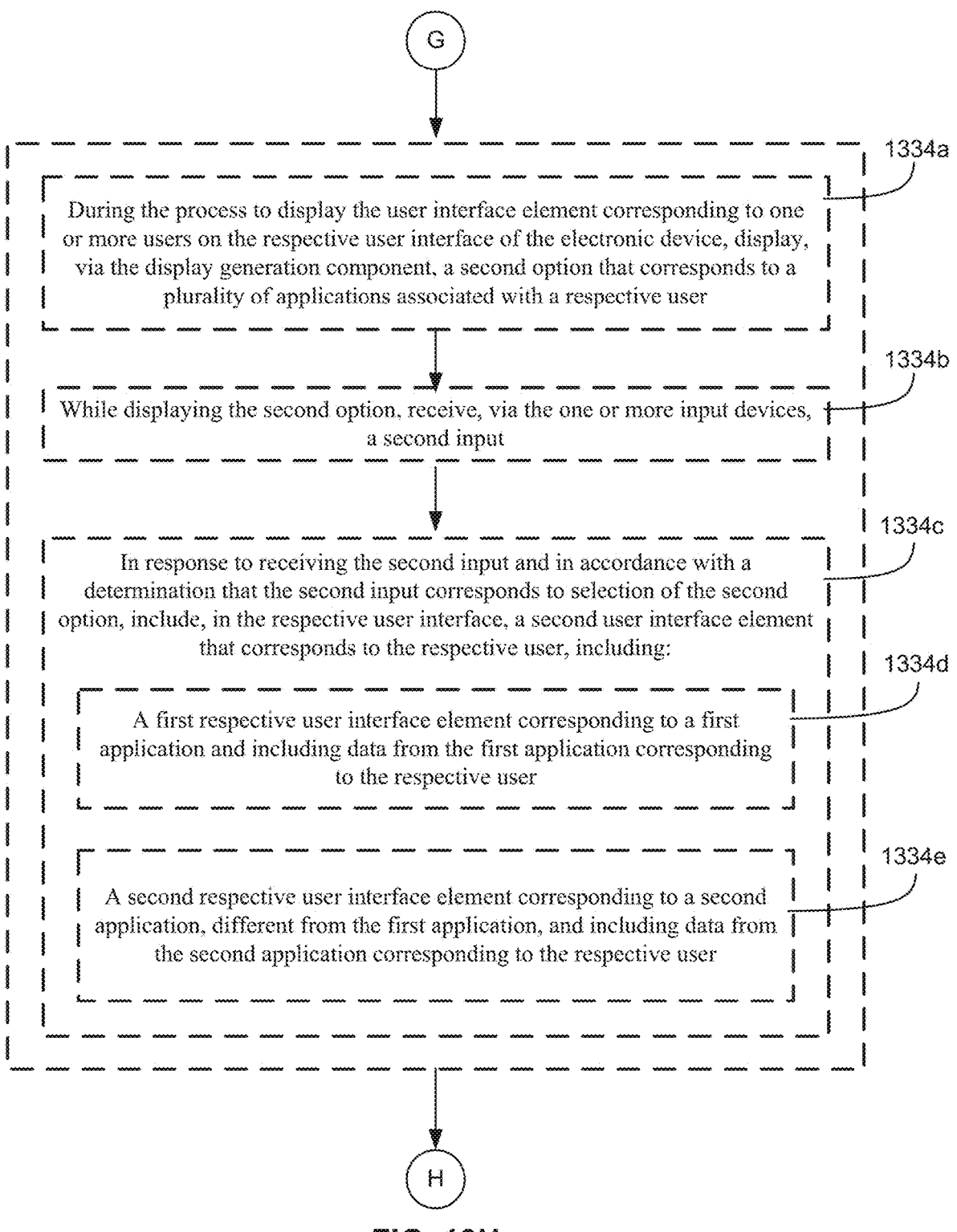

G

During the process to display the user interface element corresponding to one or more users on the respective user interface of the electronic device, display, via the display generation component, a second option that corresponds to a plurality of applications associated with a respective user 1334a While displaying the second option, receive, via the one or more input devices, a second input 1334b In response to receiving the second input and in accordance with a determination that the second input corresponds to selection of the second option, include, in the respective user interface, a second user interface element that corresponds to the respective user, including:

1334c

A first respective user interface element corresponding to a first application and including data from the first application corresponding to the respective user 1334d A second respective user interface element corresponding to a second application, different from the first application, and including data from the second application corresponding to the respective user 1334e

USER INTERFACES FOR INDICATING STATUS OF A TRACKED ENTITY

CROSS-REFERENCE TO RELATED APPLICATIONS

This application claims the benefit of U.S. Provisional Application No. 63/189,600, filed May 17, 2021, the contents of which are incorporated herein by reference in its entirety for all purposes.

FIELD OF THE DISCLOSURE

This relates generally to user interfaces associated with indicating status of tracked entities.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, users may wish to use such devices to indicate status for objects, users, etc. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that display status for tracked entities. Some embodiments described in this disclosure are directed to one or more electronic devices that provide indications of the status of one or more users. Some embodiments described in this disclosure are directed to one or more electronic devices that present information about consenting users selected by the user of the electronic device in an aggregated matter that makes accessing and interacting with such information more efficient. Some embodiments described in this disclosure are directed to one or more devices that facilitate display of widgets associated with users of a family account. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7I are flow diagrams illustrating a method of displaying status for tracked entities in accordance with some embodiments FIGS. 9A-9J are flow diagrams illustrating a method of providing indications of the status of one or more users in accordance with some embodiments

FIGS. 11A-11F are flow diagrams illustrating a method of presenting information about consenting users selected by the user of the electronic device in an aggregated matter that makes accessing and interacting with such information more efficient in accordance with some embodiments FIGS. 13A-13J are flow diagrams illustrating a method of facilitating display of widgets associated with users of a family account in accordance with some embodiments

DETAILED DESCRIPTION

Figure 1A:
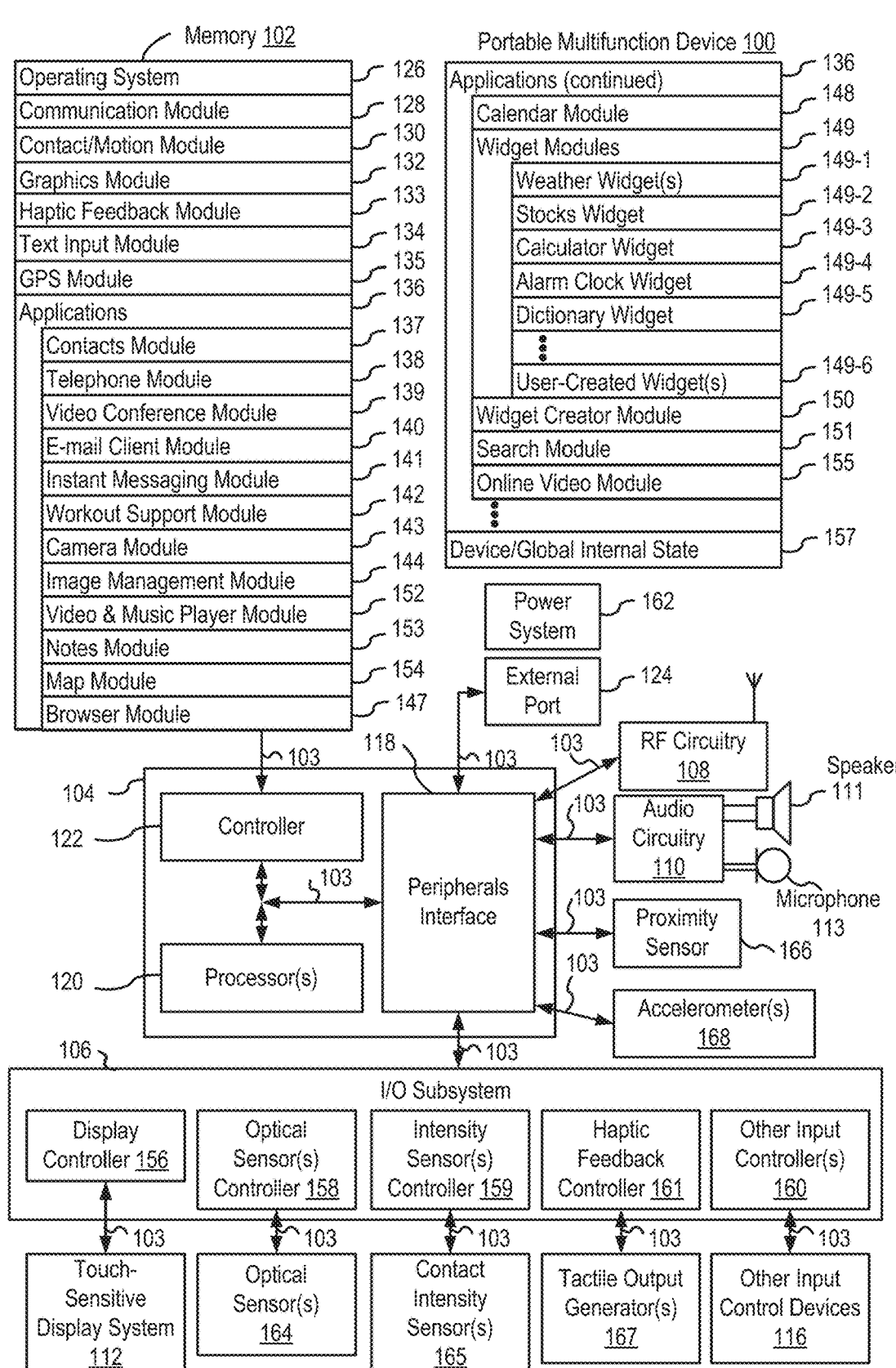
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices to efficiently provide information and/or status about tracked objects, users, etc. There is also a need for electronic devices to efficiently provide such status for groups of objects, users, etc. Such techniques can reduce the cognitive burden on a user who uses such devices and/or wishes to control their use of such devices, and such technique can provide enhanced privacy or security. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touch-pads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228, 700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
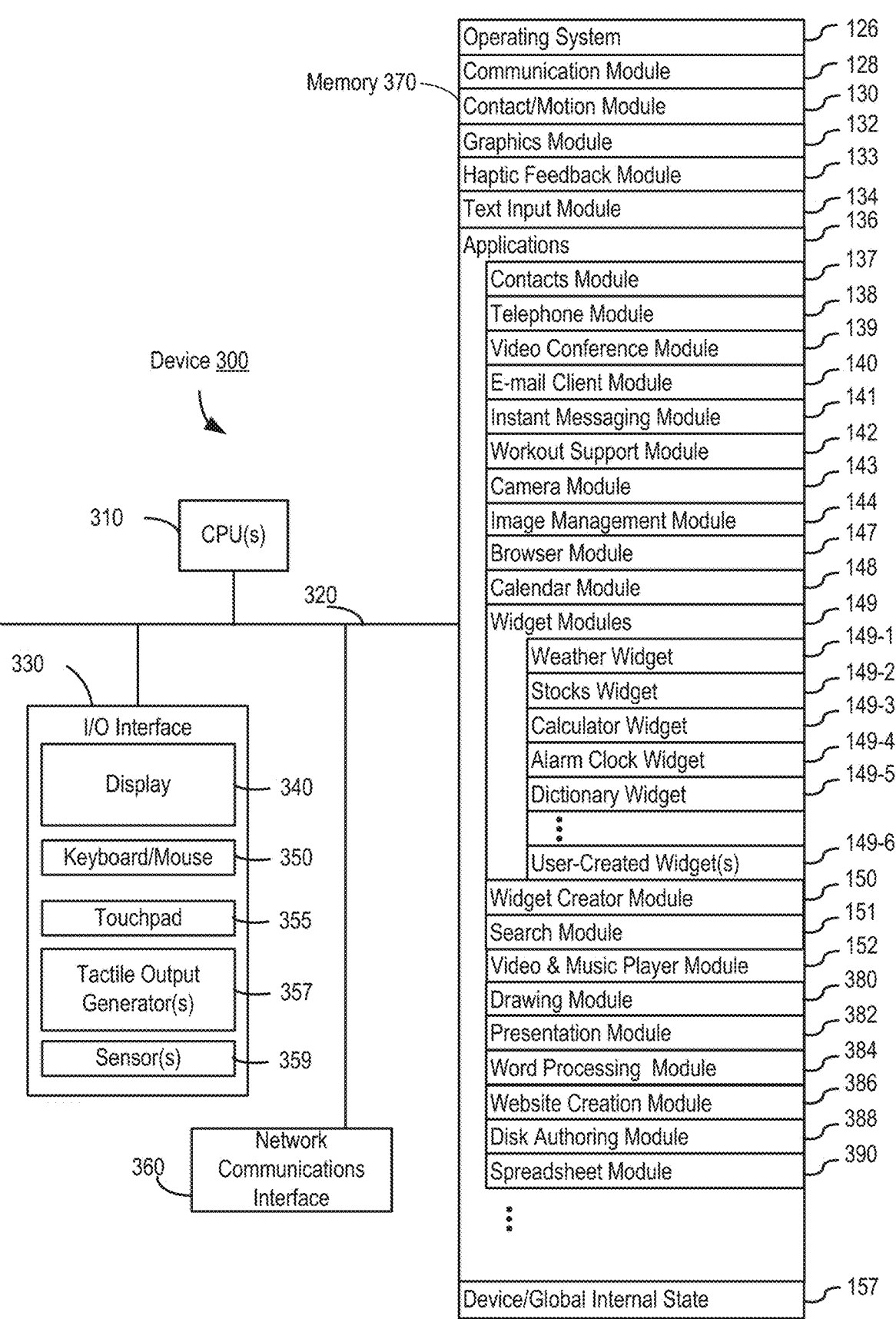
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-drag-ging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display con-troller 156 detect contact on a touchpad.

In some embodiments, contact/motion module 130 uses a set of one or more intensity thresholds to determine whether an operation has been performed by a user (e.g., to deter-mine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresh-olds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a par-ticular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subse-quently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, anima-tions, and the like.

In some embodiments, graphics module 132 stores data representing graphics to be used. Each graphic is, optionally, assigned a corresponding code. Graphics module 132 receives, from applications etc., one or more codes speci-fying graphics to be displayed along with, if necessary, coordinate data and other graphic property data, and then generates screen image data to output to display controller 156.

Haptic feedback module 133 includes various software components for generating instructions used by tactile out-put generator(s) 167 to produce tactile outputs at one or more locations on device 100 in response to user interactions with device 100.

Text input module 134, which is, optionally, a component of graphics module 132, provides soft keyboards for enter-ing text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather wid-gets, local yellow page widgets, and map/navigation wid-gets).

Applications 136 optionally include the following mod-ules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created wid-gets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing appli-cations, other image editing applications, drawing applica-tions, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
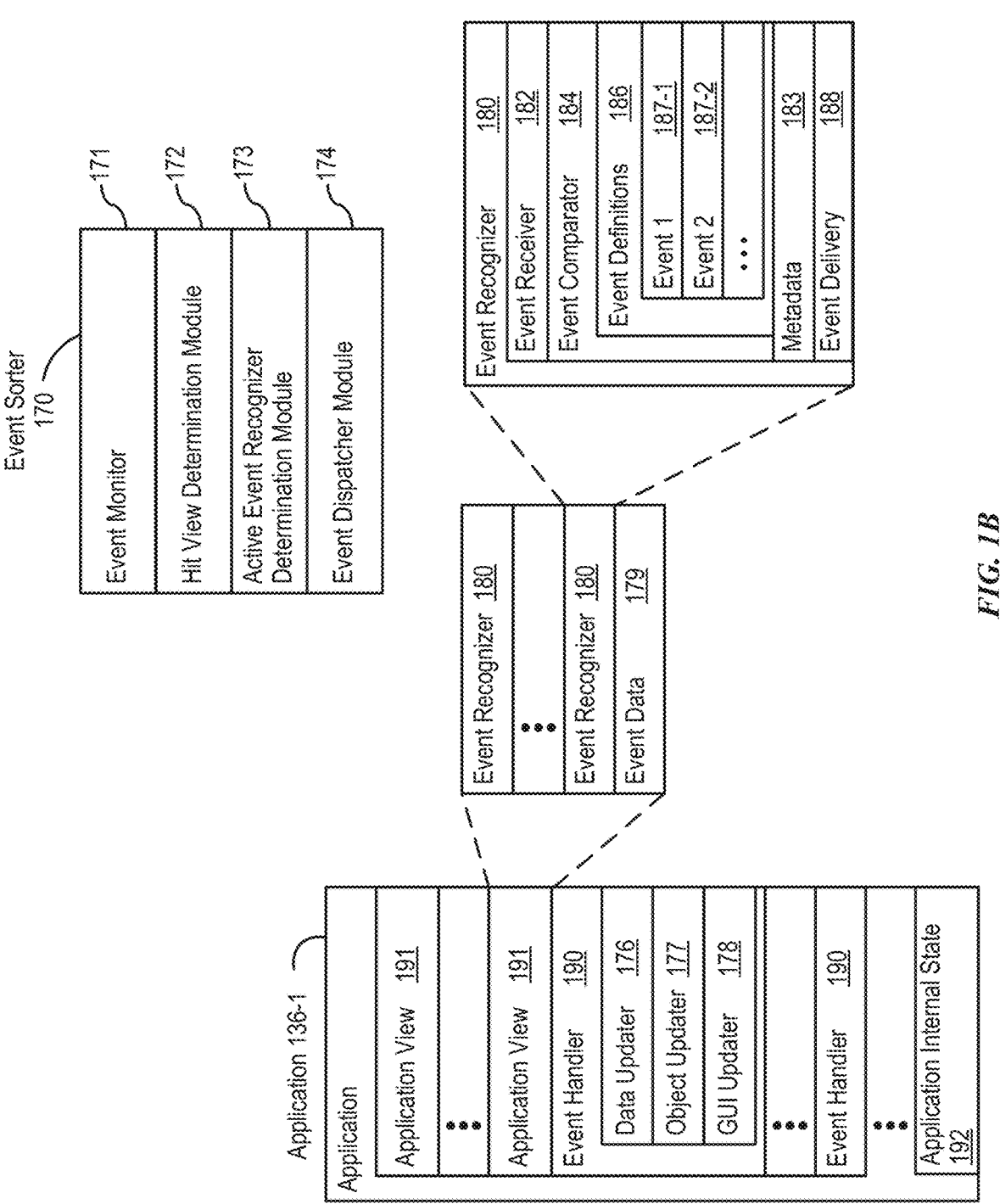
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur.

The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
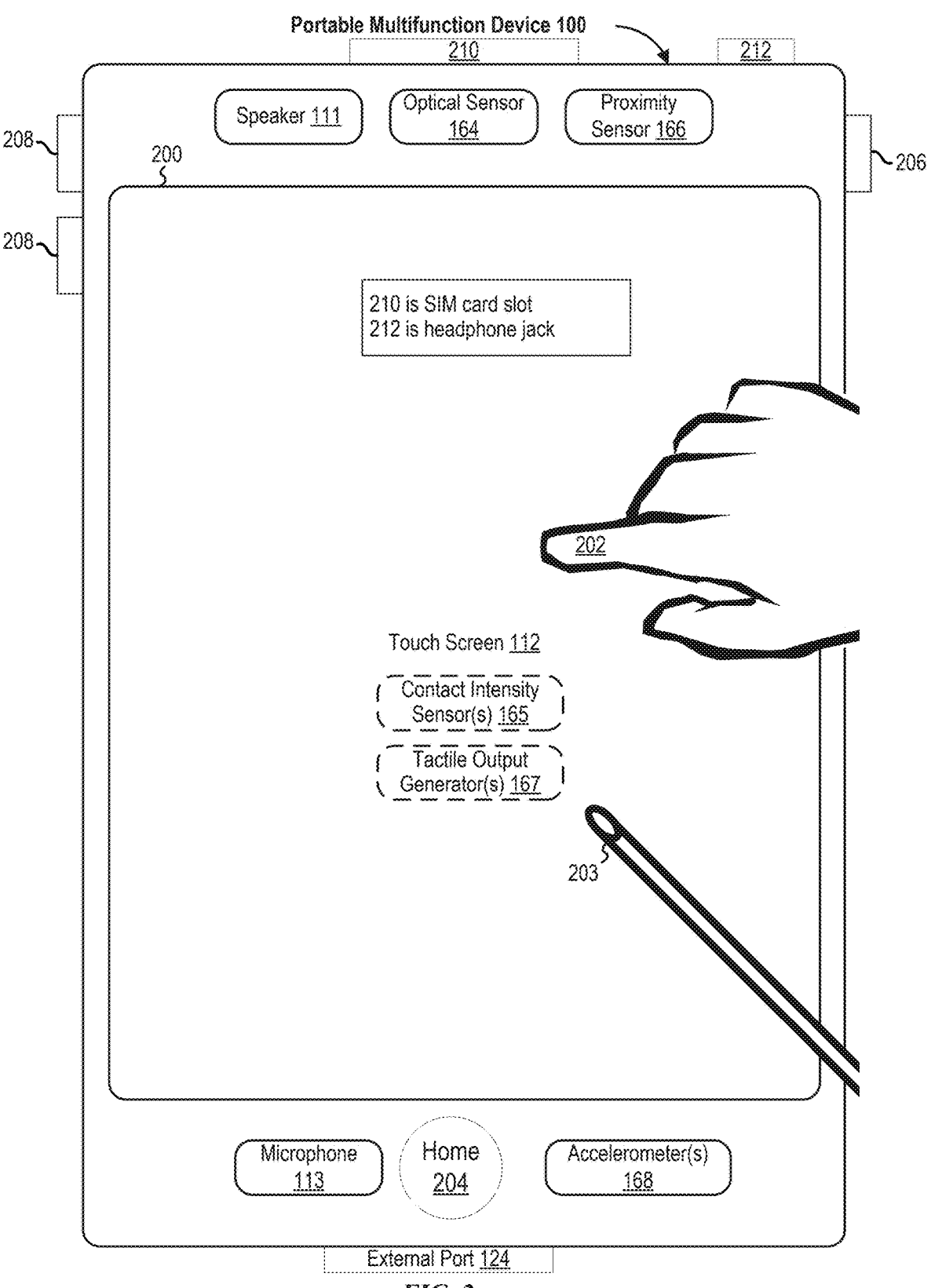
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
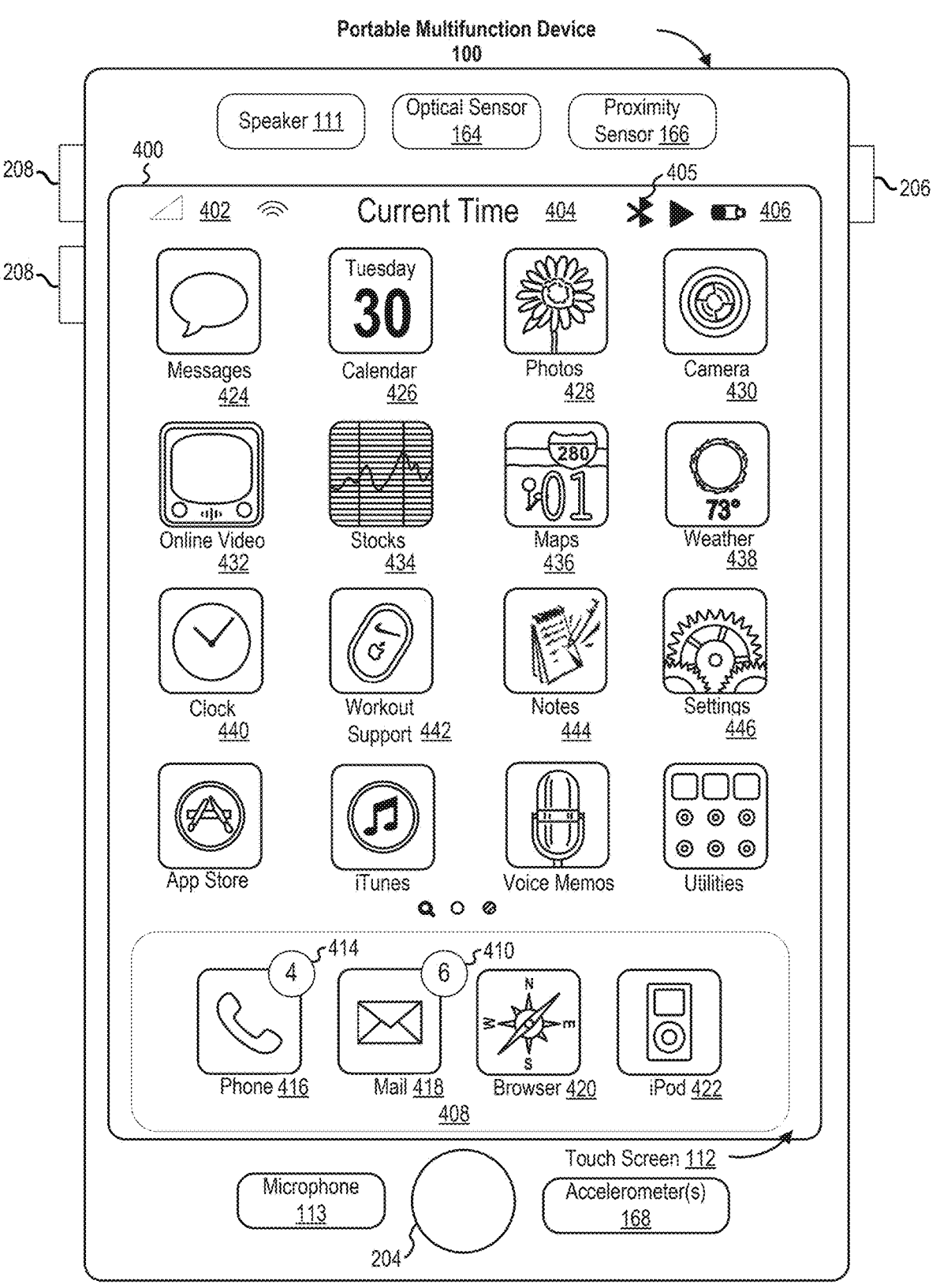
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

Icon 416 for telephone module 138, labeled "Phone," which optionally includes an indicator 414 of the number of missed calls or voicemail messages;

Icon 418 for e-mail client module 140, labeled "Mail," which optionally includes an indicator 410 of the number of unread e-mails;

Icon 420 for browser module 147, labeled "Browser;" and

Icon 422 for video and music player module 152, also referred to as iPod (trademark of Apple Inc.) module 152, labeled "iPod;" and Icons for other applications, such as:

Icon 424 for IM module 141, labeled "Messages;"

Icon 426 for calendar module 148, labeled "Calendar;"

Icon 428 for image management module 144, labeled "Photos;"

Icon 430 for camera module 143, labeled "Camera;"

Icon 432 for online video module 155, labeled "Online Video;"

Icon 434 for stocks widget 149-2, labeled "Stocks;"

Icon 436 for map module 154, labeled "Maps;"

Icon 438 for weather widget 149-1, labeled "Weather;"

Icon 440 for alarm clock widget 149-4, labeled "Clock;"

Icon 442 for workout support module 142, labeled "Workout Support;"

Icon 444 for notes module 153, labeled "Notes;" and

Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
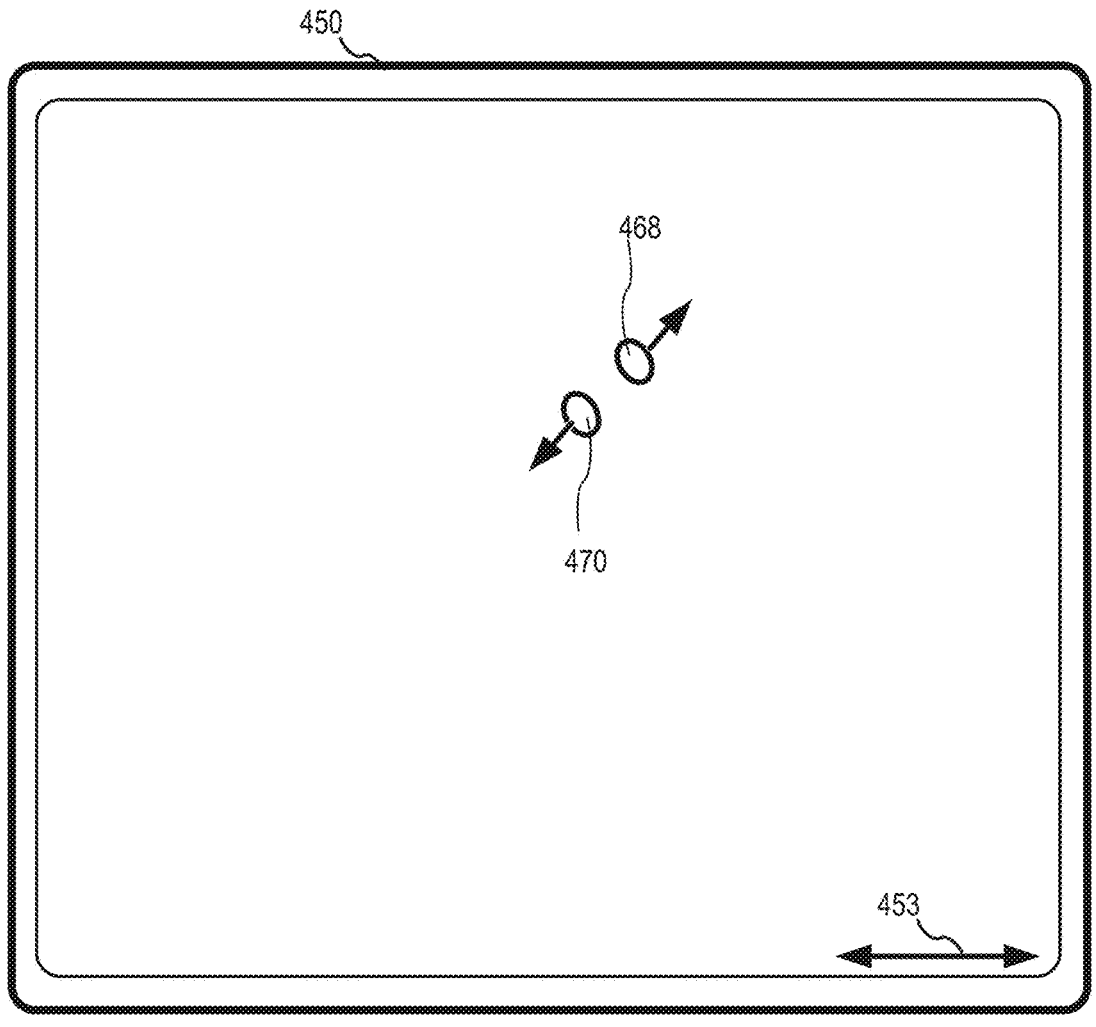
FIG. 4B illustrates an exemplary user interface for a multifunction device with a touch-sensitive surface that is separate from the display in accordance with some embodiments.
Figure 4B:
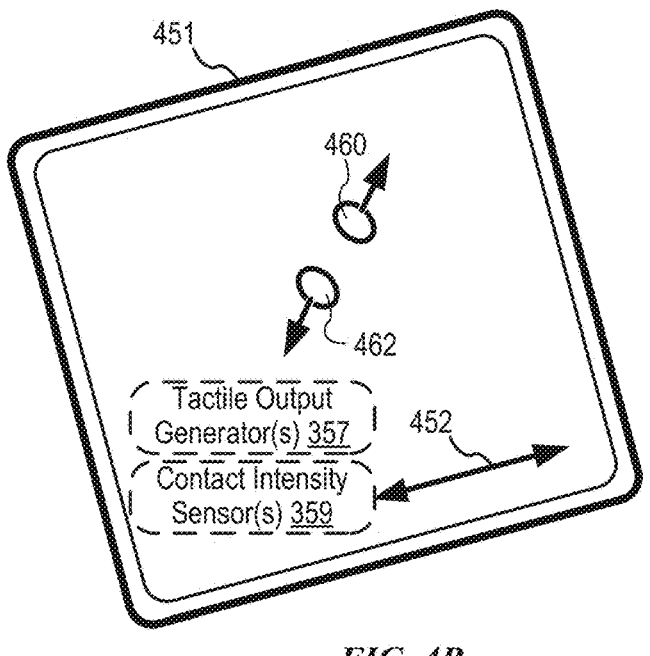

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
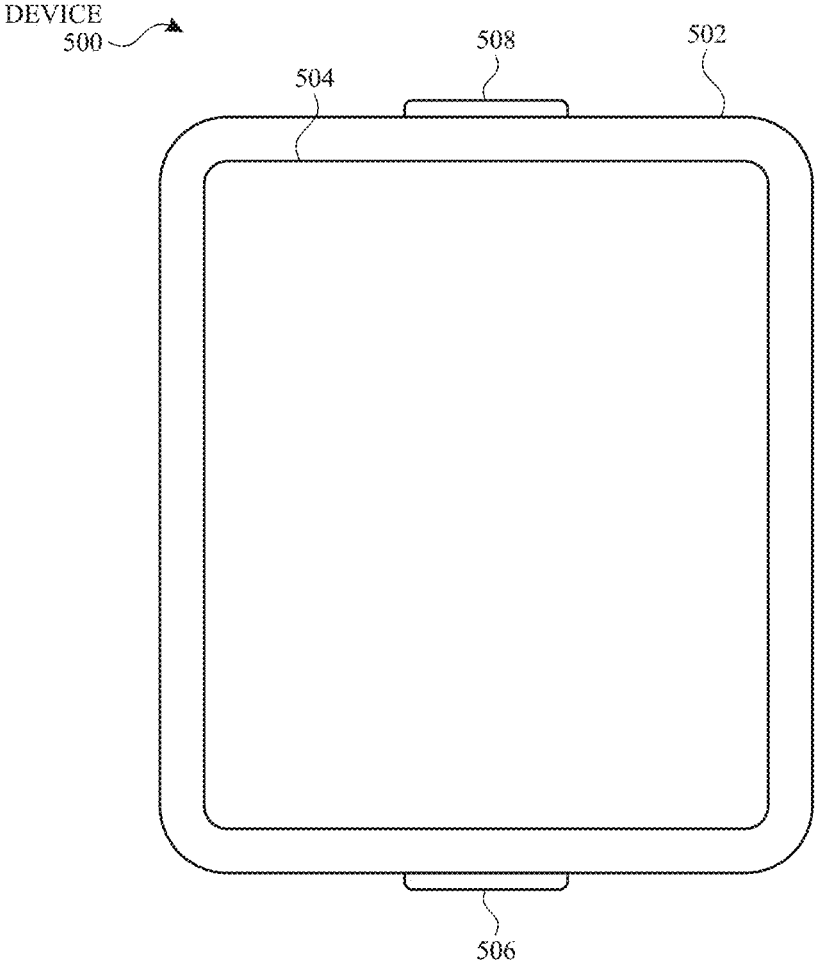
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
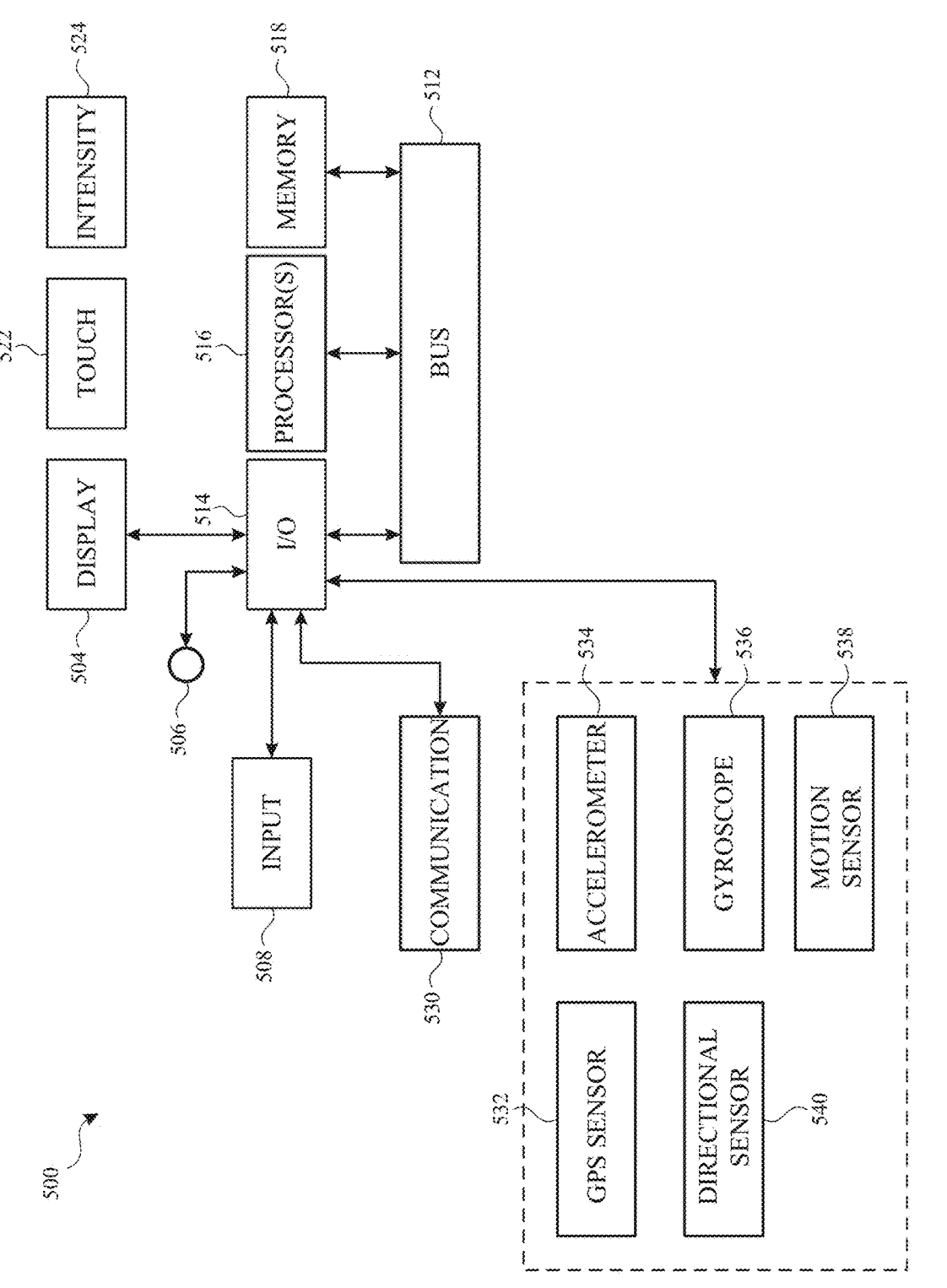
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, 1100 and 1300 (FIGS. 7, 9, 11 and 13). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or

500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
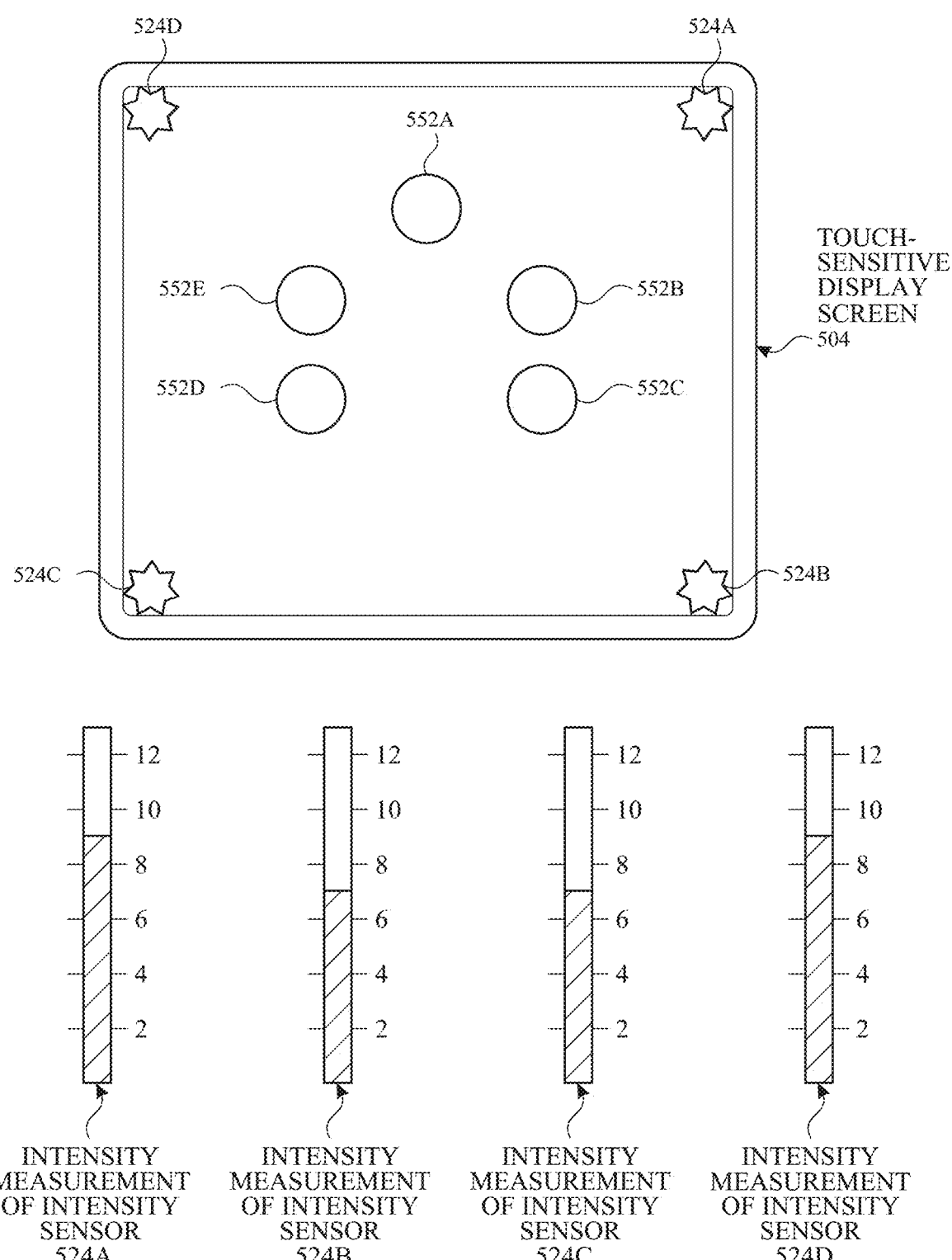
FIGS. 5C-5D illustrate exemplary components of a personal electronic device having a touch-sensitive display and intensity sensors in accordance with some embodiments.
Figure 5D:
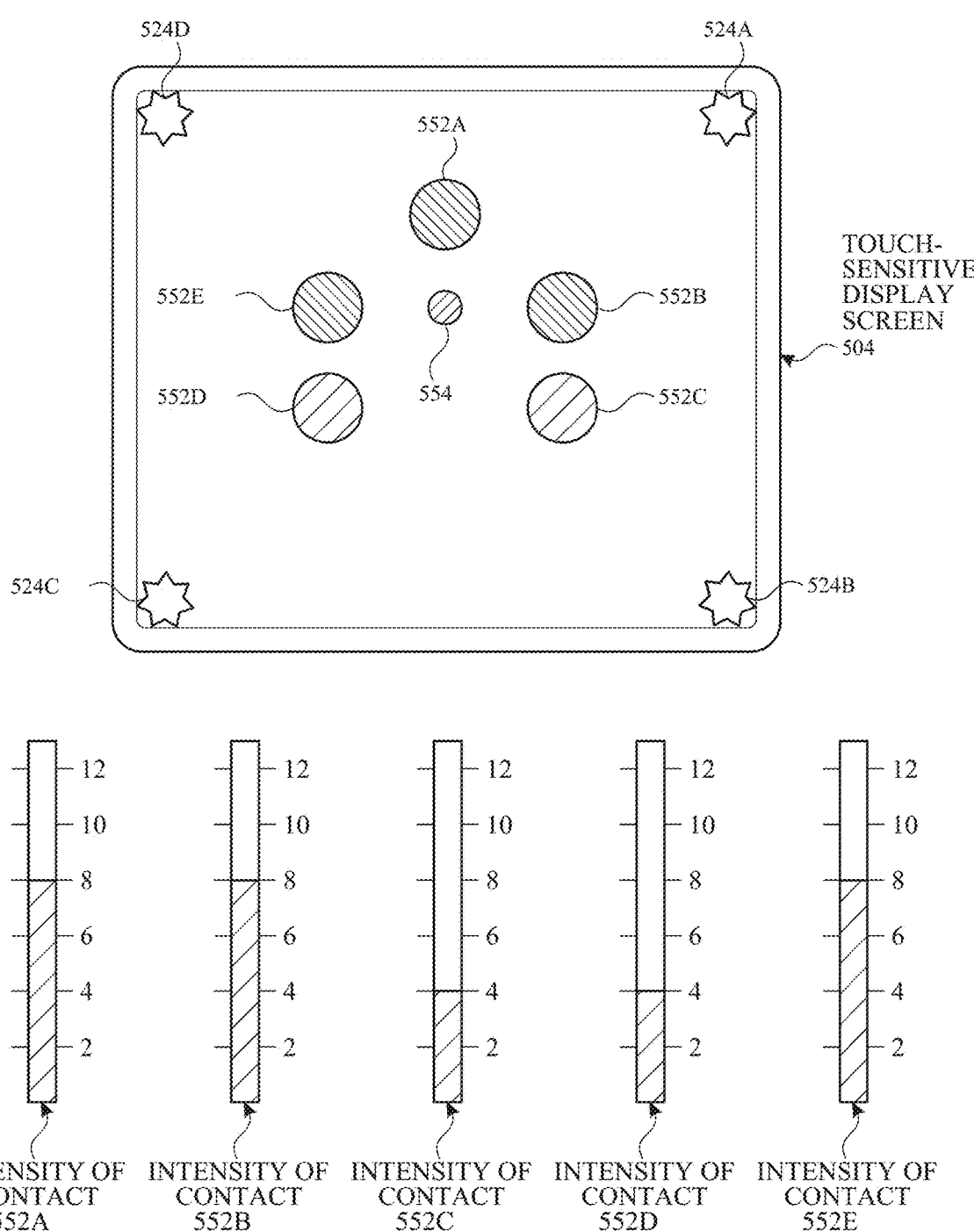

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
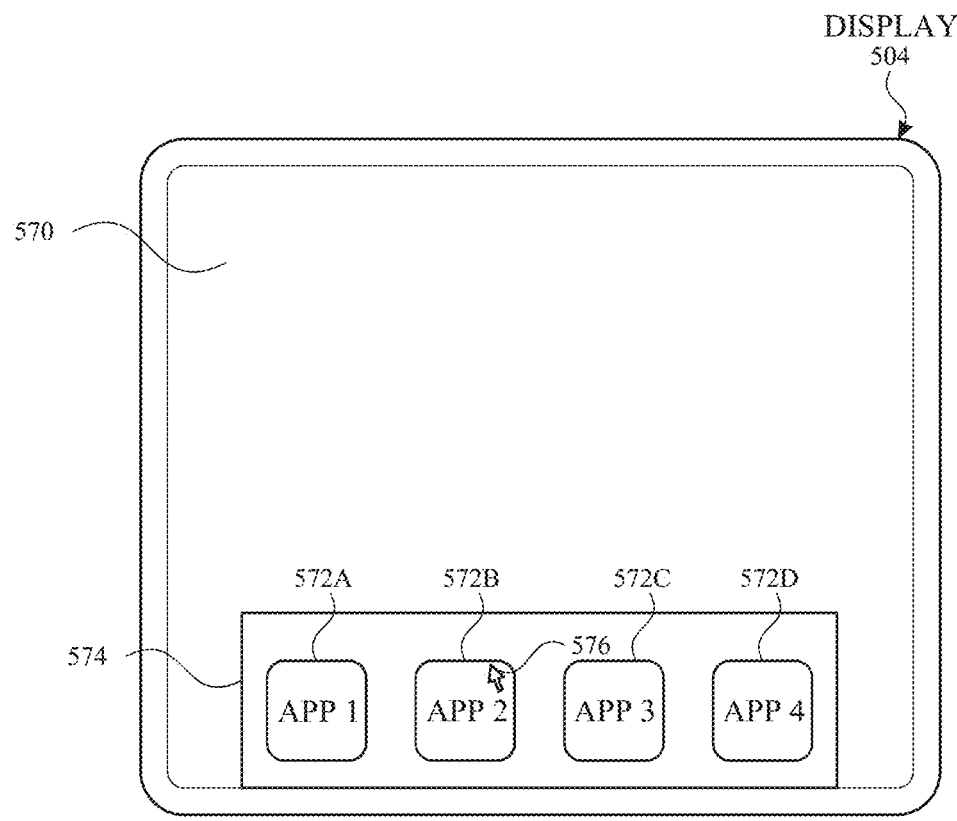
FIGS. 5E-5H illustrate exemplary components and user interfaces of a personal electronic device in accordance with some embodiments.
Figure 5E:
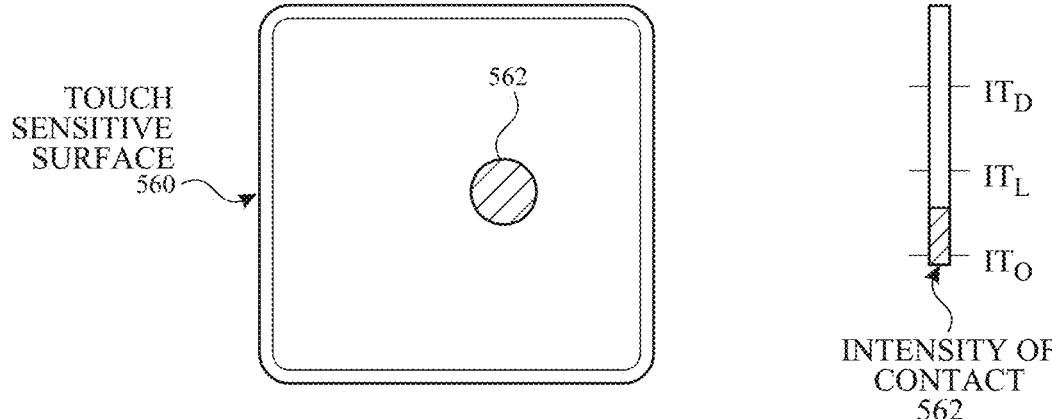
Figure 5F:
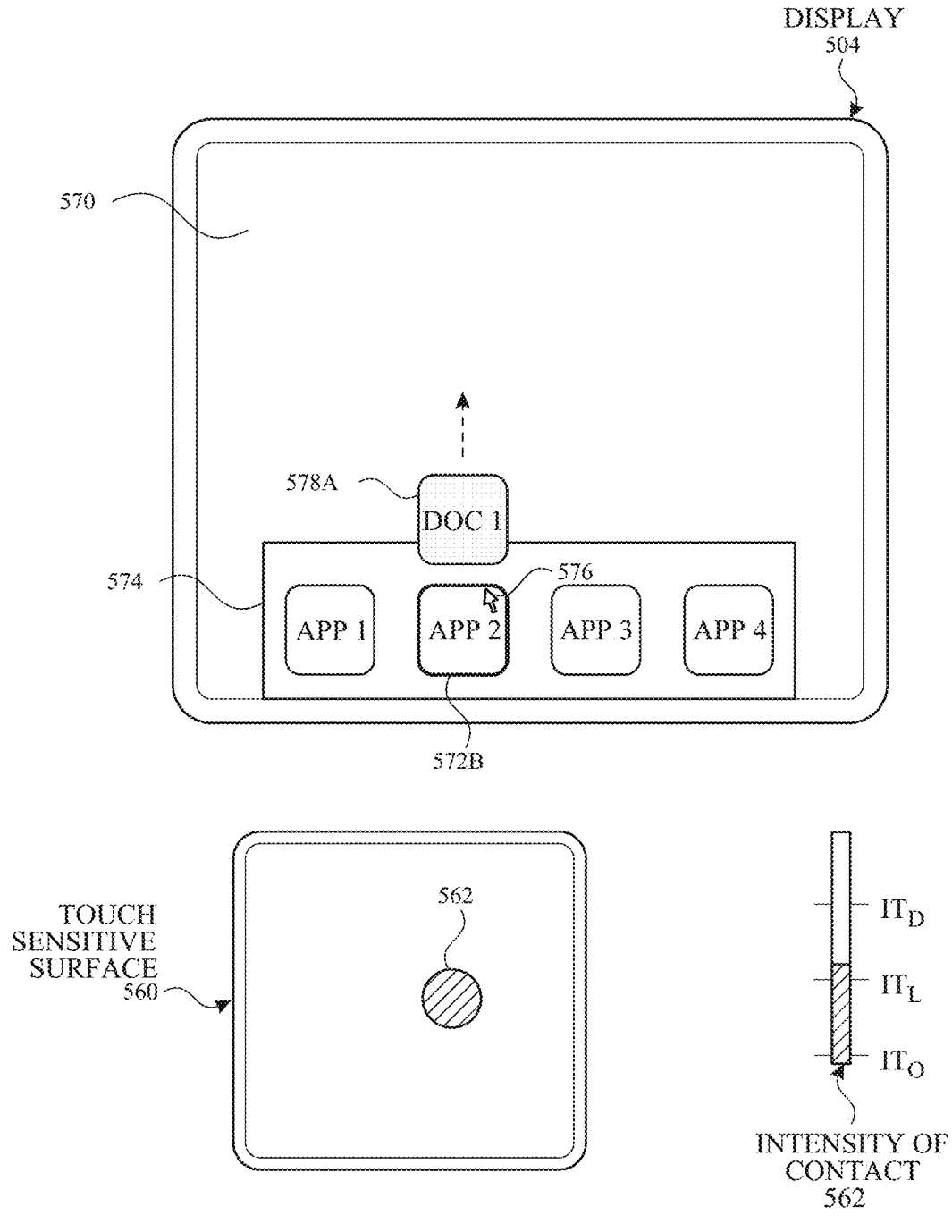
Figure 5G:
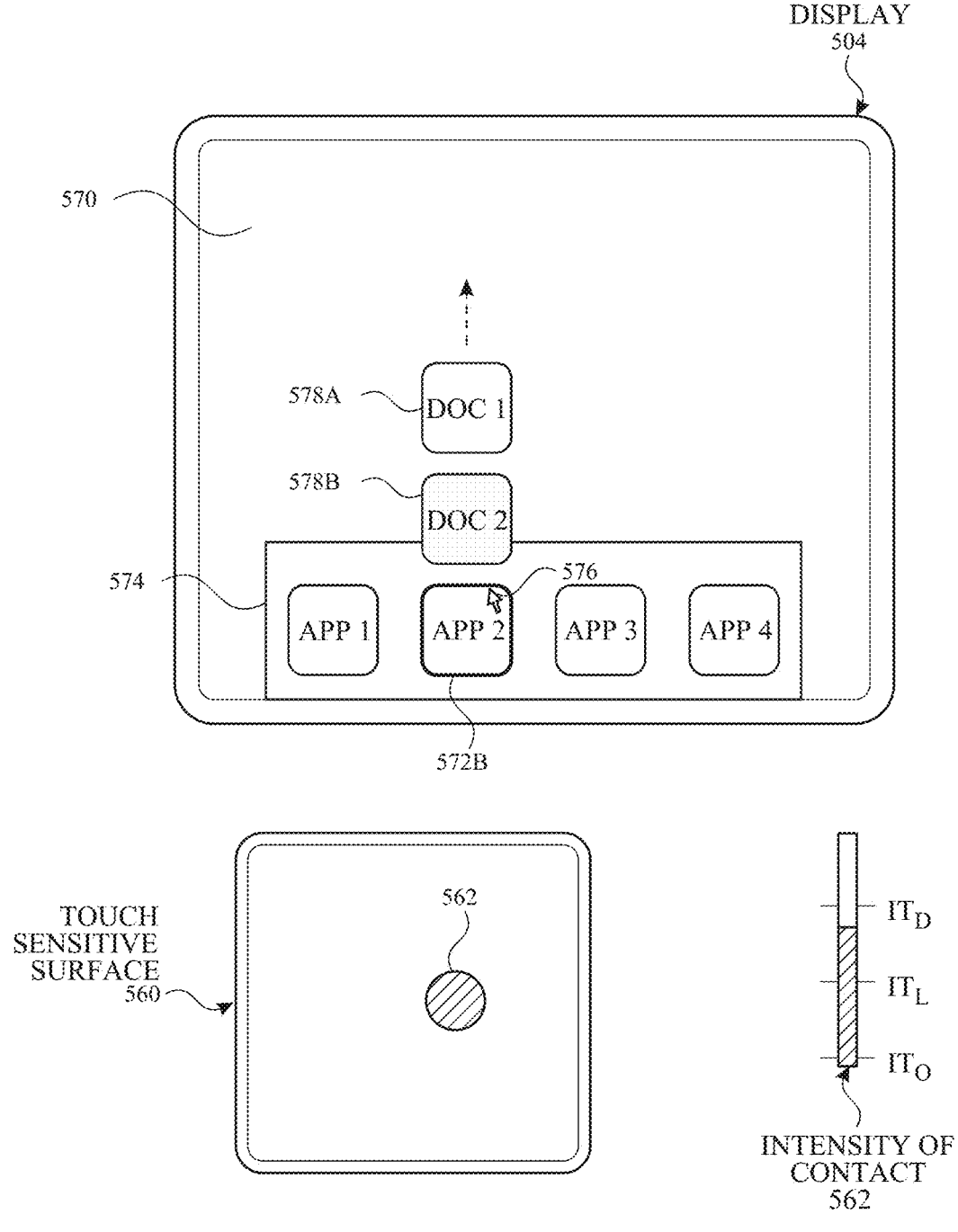
Figure 5H:
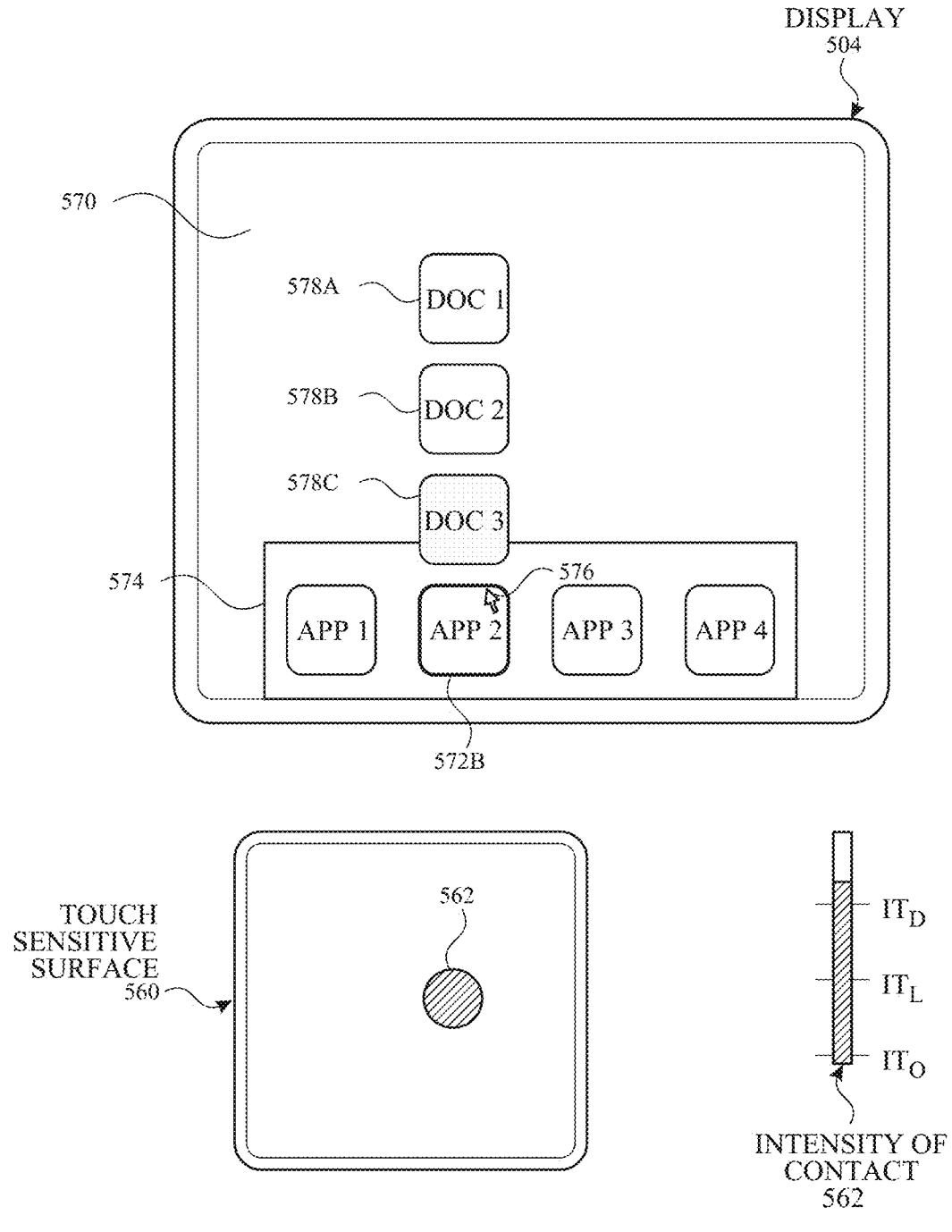

FIGS. 5E-5H illustrate detection of a gesture that includes a press input that corresponds to an increase in intensity of a contact 562 from an intensity below a light press intensity threshold (e.g., "IT$_L$") in FIG. 5E, to an intensity above a deep press intensity threshold (e.g., "IT$_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "IT$_D$"). Contact 562 is maintained on touch-sensitive surface 560. In response to the detection of the gesture, and in accordance with contact 562 having an intensity that goes above the deep press intensity threshold (e.g., "IT$_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "IT$_D$"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UP") and associated processes that are implemented on an electronic device, such as portable multifunction device 100, device 300, or device 500.

User Interfaces and Associated Processes

User Interfaces for Indicating Status of Tracked Entities

Users interact with electronic devices in many different manners. In some embodiments, an electronic device is able to determine the status (e.g., location, battery status, etc.) of a tracked entity (e.g., a device, a person, etc.). The embodiments described below provide ways in which an electronic device displays user interfaces for indicating status of tracked entities. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6B:
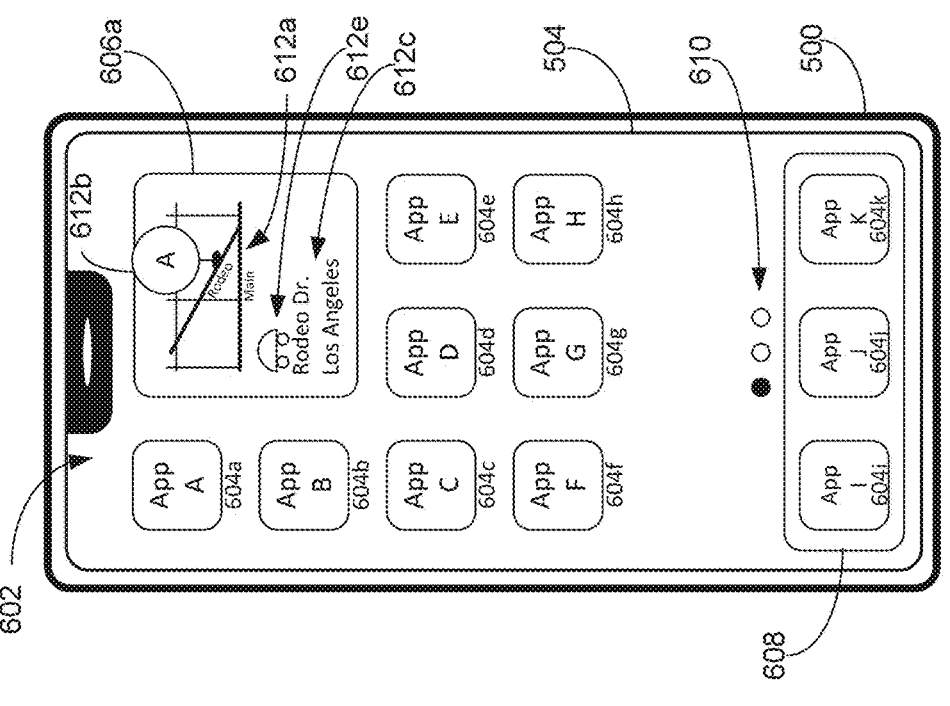
FIGS. 6A-6AG illustrate exemplary ways of displaying status for tracked entities in accordance with some embodiments of the disclosure.
Figure 6A:
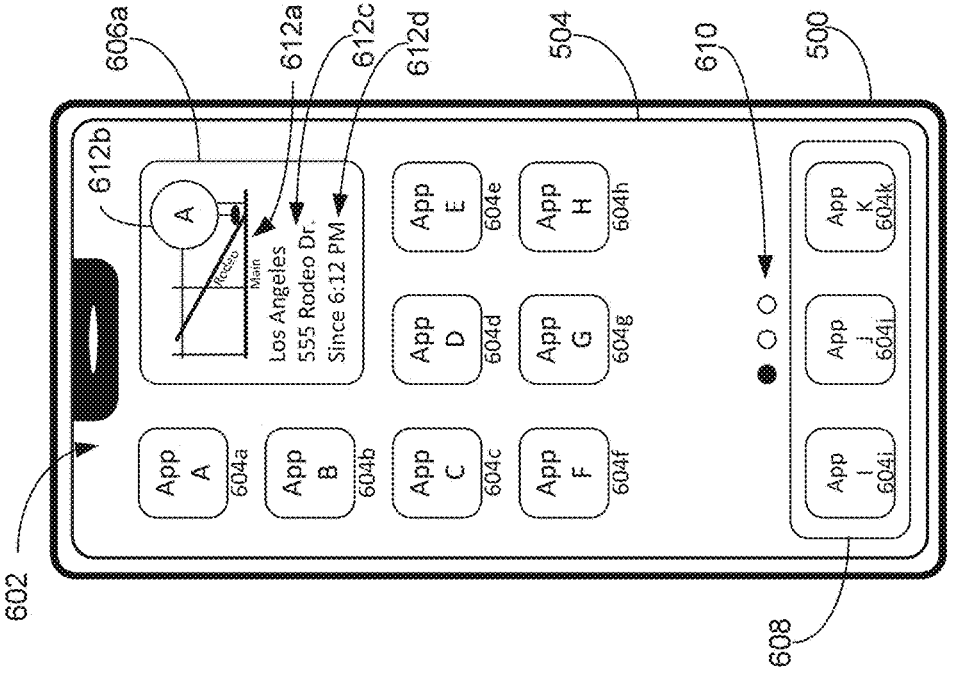

FIGS. 6A-6AG illustrate exemplary ways of displaying status for tracked entities in accordance with some embodiments of the disclosure. The embodiments in these figures are used to illustrate the processes described below, including the processes described with reference to FIGS. 7A-7I.

FIG. 6A illustrates electronic device 500 displaying user interface 602 (e.g., via a display device, via a display generation component, etc.). In some embodiments, user interface 602 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

User interface 602 in FIG. 6A is a home screen user interface (e.g., as described with reference to FIG. 4A) of device 500. User interface 602 includes application icons 604*a*-604*k* that are selectable to cause device 500 to display respective user interfaces of the selected application (e.g., device 500 launches the selected application). User interface 602 is optionally divided into two or more pages, and device optionally displays one page of user interface 602 at a time. For example, in FIG. 6A, device 500 is displaying the first page of user interface 602 (e.g., as indicated by the left-most dot of indicator 610 being filled, and the other two dots of indicator 610 being unfilled). Further, application icons 604*i*-604*k* are displayed in dock 608, which is optionally displayed by device 500 regardless of which page of user interface 602 is currently being displayed.

In some embodiments, user interface 602 includes one or more widgets associated with different tracked entities (e.g., users, objects, devices, etc.). For example, in FIG. 6A, user interface 602 includes widget 606*a*. Widget 606*a* is optionally a widget of a location tracking and/or information application that is installed on device 500 that has access to and/or displays information about the status of and/or location of users, objects, devices, etc. designated by a user of device 500. For example, a user of device 500 is able to select users, objects, devices, etc. whose location and/or status to track using the location tracking and/or information application, and the user of device 500 is able to associate one or more widgets with one or more of those users, objects, devices, etc. for inclusion on user interface 602 (or any other user interface of device 500 that can display widgets). Widget 606*a* (and other widgets associated with users, devices, objects, etc. described herein) optionally has one or more of the characteristics of such widgets described with reference to methods 700, 900, 1100 and/or 1300.

In FIG. 6A, widget 606*a* is associated with User A (e.g., a contact of the user of device 500). Widget 606*a* includes a representation of a map 612*a*, and a representation 612*b* of User A (e.g., an avatar for User A) displayed on map 612*a* at a location that corresponds to the current or last known location of User A (e.g., at the corner of Rodeo Drive and Main Street). Widget 606*a* optionally additionally or alternatively includes other status information for User A. For example, widget 606*a* includes location information 612*c* that indicates the city in which User A is located (e.g., Los Angeles) and/or an address corresponding to the current or last known location for User A (e.g., 555 Rodeo Drive). Widget 606*a* optionally additionally or alternatively includes indication 612*d* that indicates how long and/or since when User A has been at the location indicated by map 612*a* and/or indication 612*c* (e.g., since 6:12 pm).

In some embodiments, device 500 includes transit status information in widget 606*a* for User A. For example, in FIG. 6B, device 500 has determined (e.g., based on characteristics of the movement of User A as described with reference to method 700) that User A is (e.g., likely) currently driving. In some embodiments, in response, device 500 updates widget 606*a* to include transit indication 612*e* that indicate that User A is in a driving transit state. In some embodiments, device 500 similarly indicates when User A is in a cycling transit state, as shown by transit indication 612*e* in FIG. 6C.

Figure 6D:
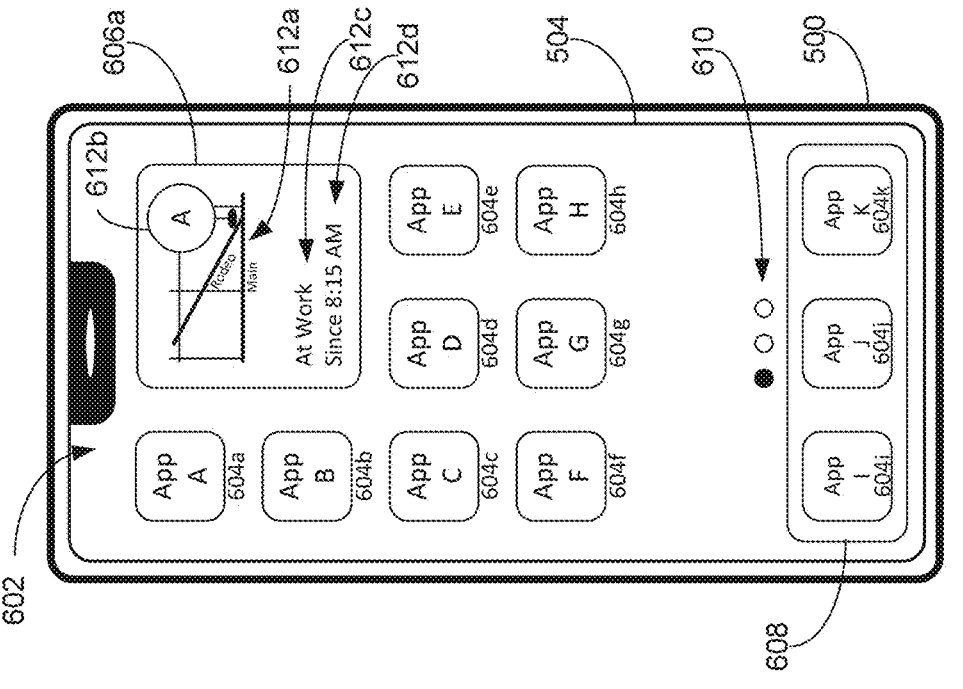
Figure 6C:
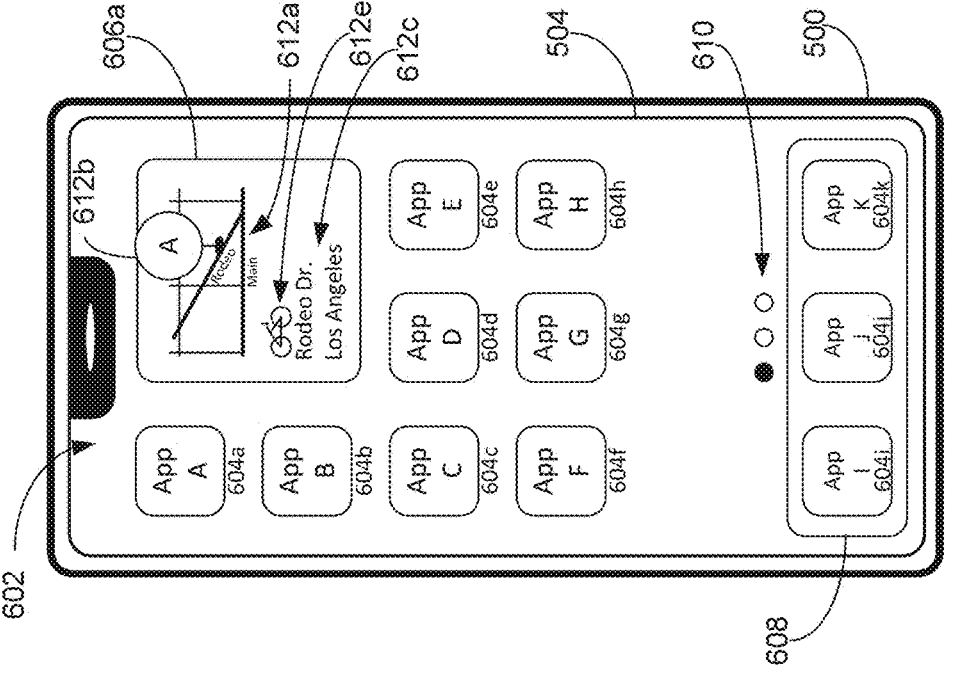

In some embodiments, device 500 additionally or alternatively displays a semantic indication of the location of User A (e.g., instead of providing an address, street name and/or city) in widget 606*a*. For example, in FIG. 6D, widget 606*a* includes location indication 612*c* that indicates that User A is "At Work". "Work" is optionally a known, labeled location for the device 500 and/or User A (e.g., home, work, school, gym, etc. are locations indicated in the past by the user of device 500 and/or User A for the location). In FIG. 6D, widget 606*a* also indicates that User A has been "At Work" since 8:15 am (e.g., via indication 612*d*).

In some embodiments, device 500 additionally or alternatively displays a generic or landmark-based indication of the location of User A (e.g., instead of providing an address, street name and/or city) in widget 606*a*. For example, in FIG. 6E, widget 606*a* includes location indication 612*c* that indicates that User A is "At Coliseum" (e.g., where the Coliseum is a landmark indicated in map data accessible to device 500, and is data not necessarily provided by the user of device 500 and/or User A). In FIG. 6E, widget 606*a* also indicates that User A has been "At Coliseum" since 12:05 pm (e.g., via indication 612*d*).

In some embodiments, device 500 additionally or alternatively displays an indication of the time zone corresponding to the location of User A in widget 606*a*. For example, in FIG. 6F, widget 606*a* includes indication 612*f* that indicates "Pacific Time Zone," which corresponds to the location associated with User A. If location of User A were within a different time zone, widget 606*a* would optionally include an indication of that time zone, instead.

It is understood that while FIGS. 6A-6F have been described in the context of displaying a widget corresponding to the status and/or location of a user, one or more of the characteristics of widget 606*a* described with reference to FIGS. 6A-6F optionally also apply to widgets corresponding to the status and/or location of an object (e.g., a device, a remote locator object, etc., as described with reference to method 700). Further, one or more of the characteristics of widgets described as corresponding to objects—such as described with reference to FIGS. 6G-6K—optionally also apply to widgets corresponding to users.

Figure 6F:
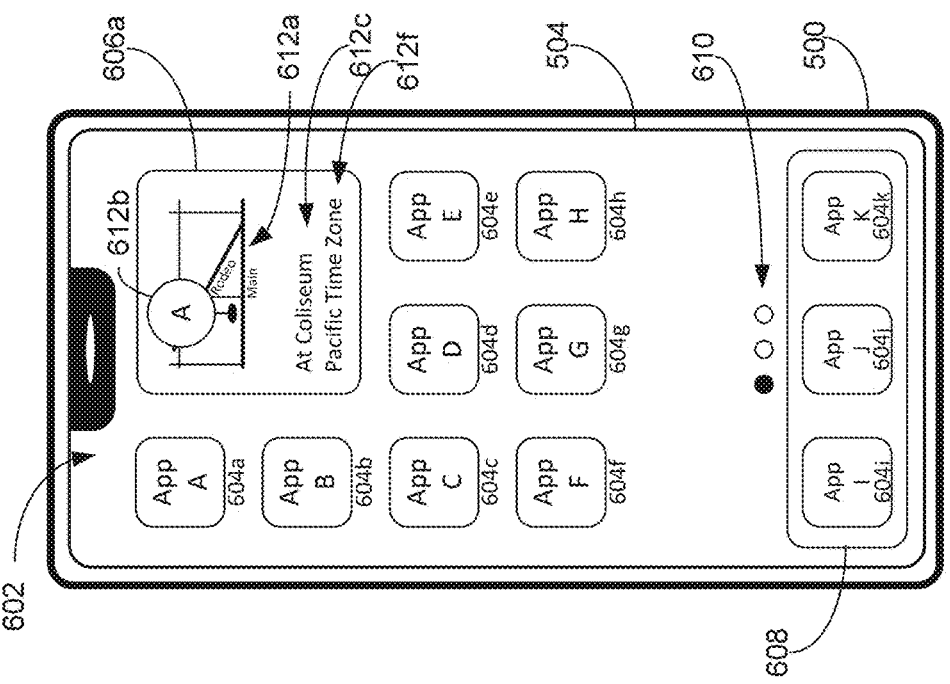
Figure 6E:
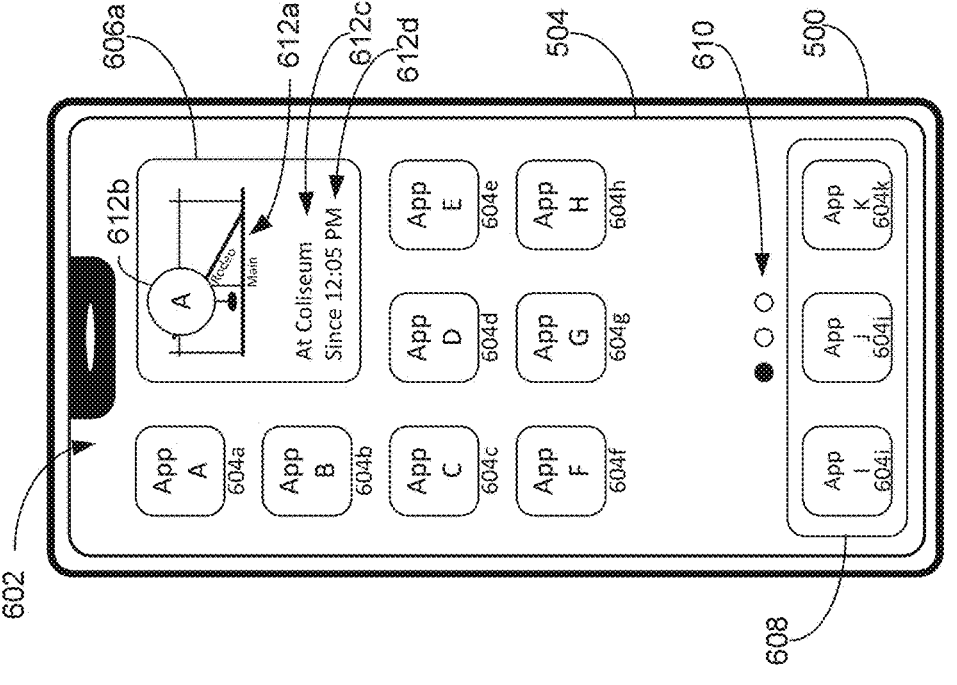
Figure 6H:
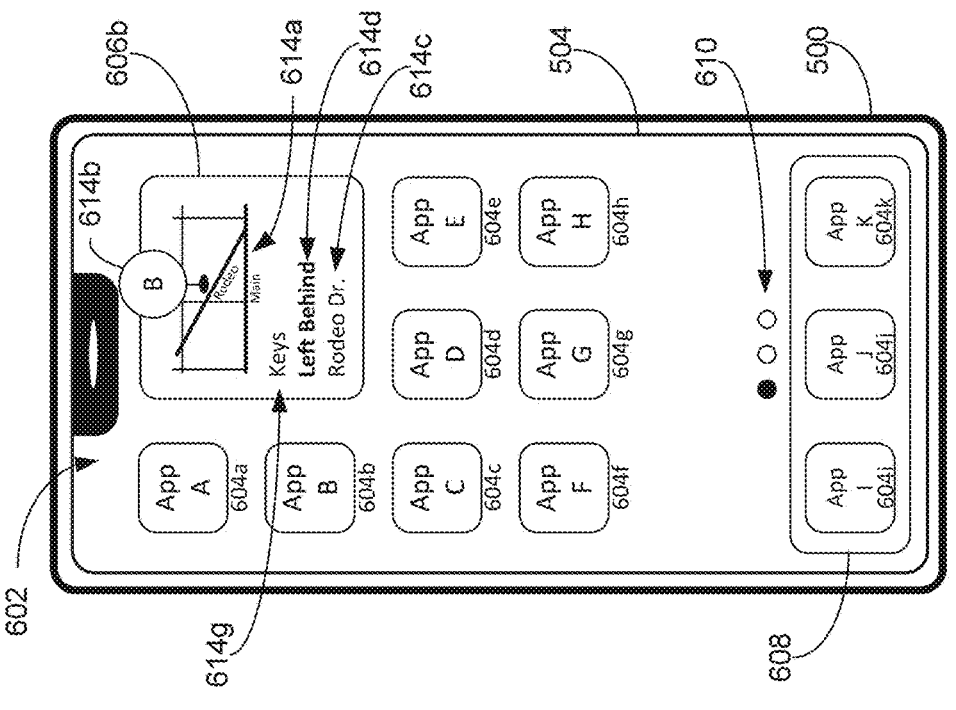
Figure 6G:
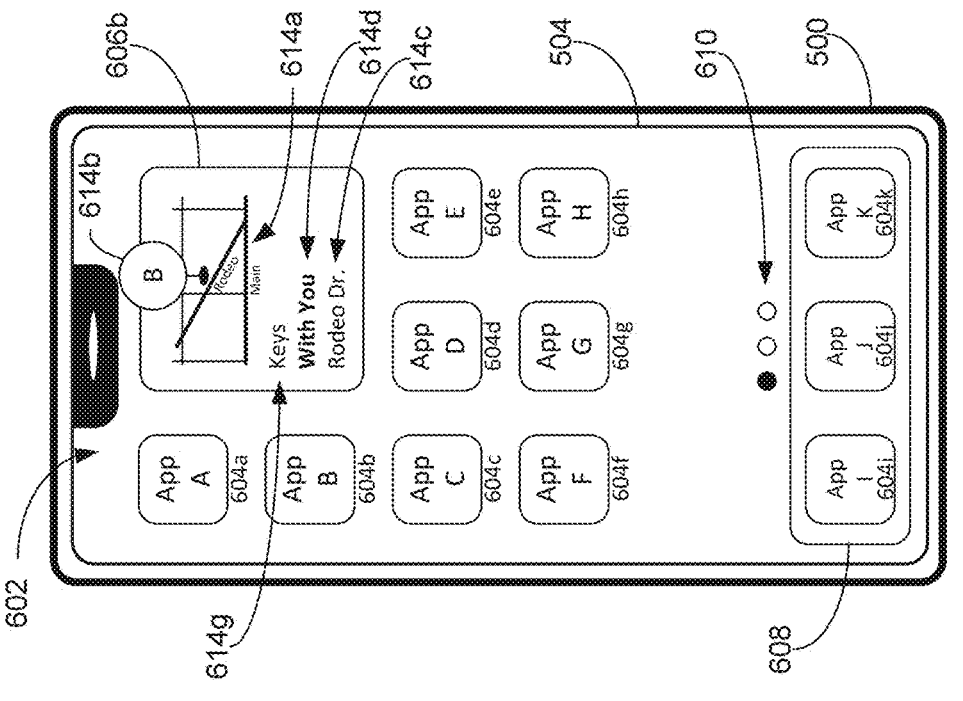

For example, in FIG. 6G, device 500 is displaying widget 606*b* that corresponds to an Object B (e.g., the keys of the user, which the user has indicated should be included in widget 606*b*). Widget 606*b* includes representation 614*a* of a map that includes the current or last known location of Object B, and a representation 614*b* (e.g., icon) corresponding to Object B displayed at a location on map 614*a* that corresponds to the current or last known location of Object B. Widget 606*b* additionally or alternatively includes indication 614*g* that indicates the name associated with Object B (e.g., Keys) and/or location indication 612C that indicates an address and/or street corresponding to the location of Object B (e.g., Rodeo Drive).

In some embodiments, widget 606*b* additionally or alternatively includes an indication 614*d* of a separation status associated with Object B. For example, if device 500 determines that Object B is within a threshold distance (e.g., 1, 3, 5, 10, 20, 50 feet) of device 500 and/or that device 500 has an active and/or strong wireless connection (e.g., Bluetooth connection) with Object B, widget 606*d* includes indication 614*d* that indicates that Object B is with or within the proximity of device 500 (e.g., With You), as shown in FIG. 6G. In contrast, if device 500 determines that Object B is further than the threshold distance (e.g., 1, 3, 5, 10, 20, 50 feet) of device 500 and/or that device 500 has an inactive and/or weak wireless connection (e.g., Bluetooth connection) with Object B, widget 606*d* includes indication 614*d* that indicates that Object B is not with or not within the proximity of device 500 (e.g., Left Behind), as shown in FIG. 6H.

In some embodiments, device 500 additionally or alternatively displays an indication of the battery status of Object B in widget 606*b*. For example, in FIG. 6I, widget 606*b* includes indication 614h that indicates a low battery status for Object B (e.g., because the battery level for Object B has fallen below a threshold (e.g., 1%, 3%, 5%, 10%, 20%) level). If the battery level of Object B were higher than the threshold level, widget 606b would optionally not include indication 614h. In some embodiments, widget includes indication 614h that indicates the current battery level of Object B regardless of the current battery level of Object B.

Figure 6J:
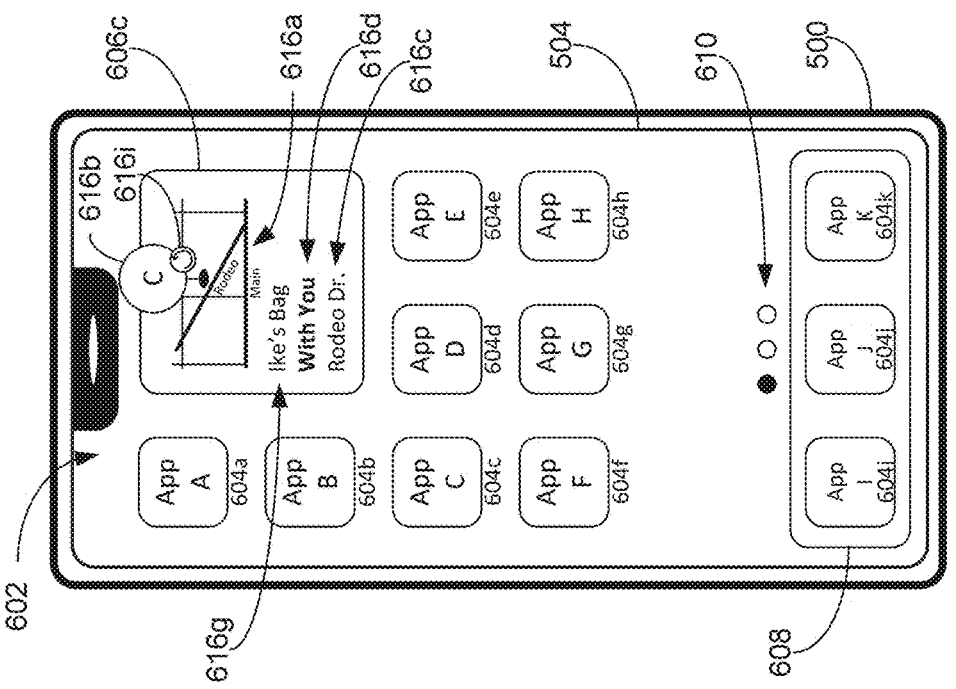

In some embodiments, device 500 has temporary access to the location and/or status of an object (e.g., because a user associated with that object has granted the user of device 500 such access). For example, device 500 might have access to the status and/or location of an object associated with another user for an amount of time (e.g., 1 hr., 2 hrs., etc.) that is predetermined and/or defined by the other user, and after that amount of time passes, might no longer have access to the status and/or location of the object. However, device 500 is optionally able to display widgets associated with such temporarily-shared objects in manners similar to as described herein with respect to users and/or objects (e.g., in response to the user of device 500 associating a widget with a temporarily-shared object). For example, in FIG. 6J, device 500 is displaying widget 606c, which is associated with Object C. Object C is optionally a shared object, shared by a contact of the user of device 500 (e.g., Ike). Object C is optionally associated with the label "Ike's Bag" to indicate that Object C is one of Ike's bags. In FIG. 6J, widget 606c includes representation 616a of a map that includes a representation (e.g., icon) 616b of Object C that is displayed at a location on map 616a that corresponds to the location of Object C. Further, representation 616b is displayed with indication 616i (e.g., overlapping a portion of representation 616b) that indicates that Object C is temporarily shared with device 500. In FIG. 6J, widget 606c also includes indication 616g that indicates the name/label of Object C (e.g., Ike's Bag), indication 616d that indicates the separation status of Object C from device 500 (e.g., With You) as previously described, and indication 616c that indicates the street associated with the location of Object C (e.g., Rodeo Drive).

Figure 6I:
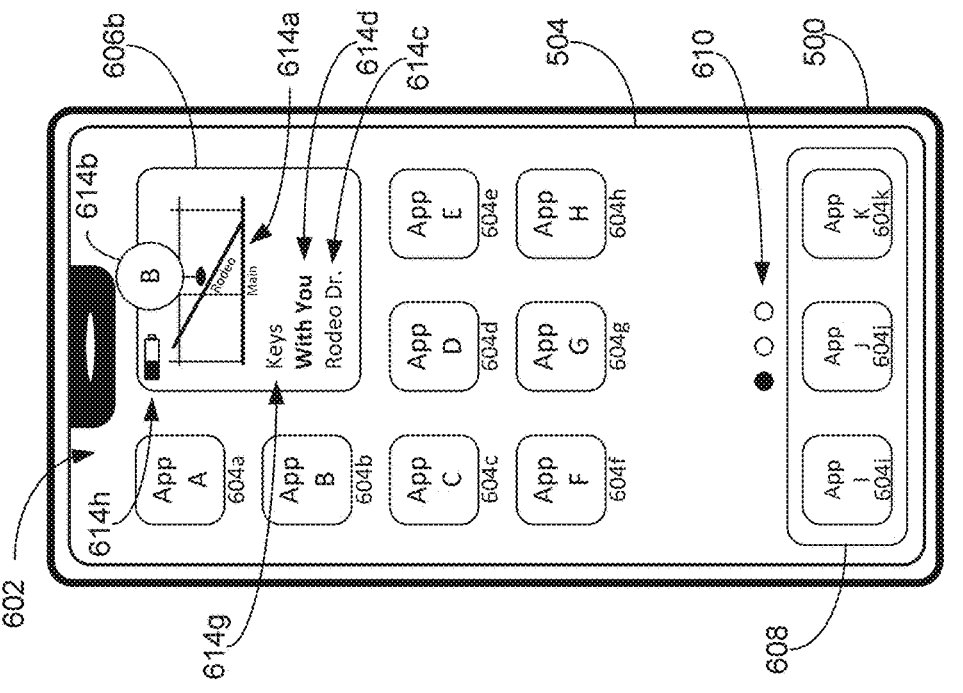

In some embodiments, the state of the map displayed in a widget corresponds to the current status of locating the tracked entity (e.g., user, object, etc.) and/or the current status of the availability of the location/status of the tracked entity to device 500. For example, in FIG. 6K, widget 606b is associated with Object B, as previously described. In FIG. 6K, device 500 has access to the location/status of Object B, but is currently in the process of locating Object B (e.g., device 500 does not have data corresponding to the current location of Object B). As a result, device 500 displays map 614a with a visually deemphasized appearance (e.g., greyed out, dimmed, blurred, etc.), as shown in FIG. 6K. Device 500 also displays representation 614b of Object B within/on map 614a, but does not display representation 614b at a location on map 614a that corresponds to the location associated with Object B. In FIG. 6K, widget 606b also includes indication 614g indicating the name/label of Object B (e.g., Keys), and an indication 614d that indicates that device 500 is currently locating Object B (e.g., Locating . . . ).

Figure 6L:
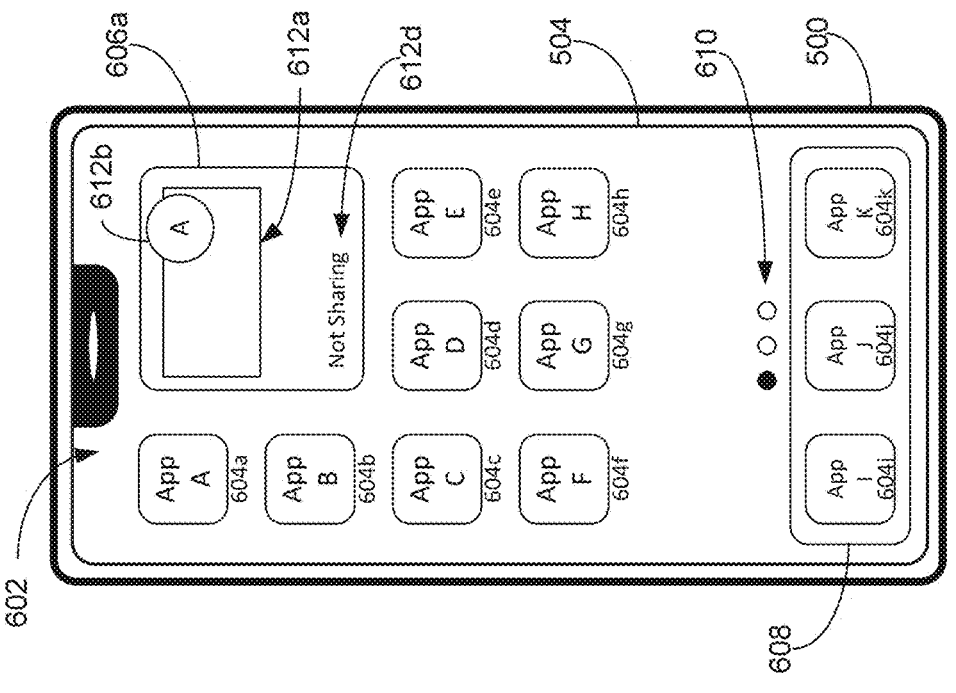
Figure 6K:
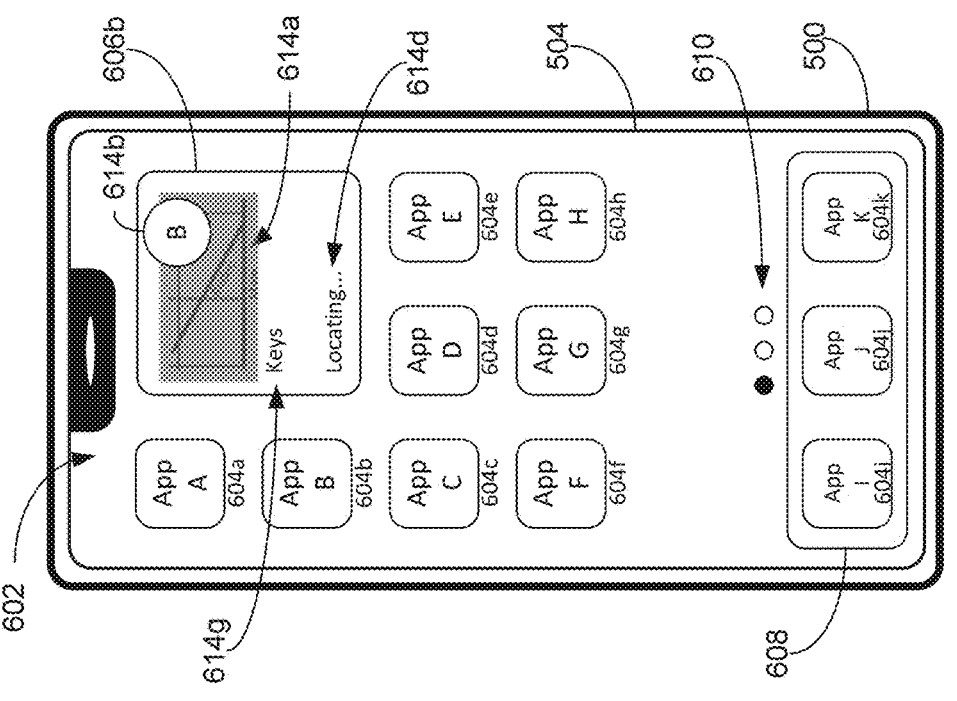

As another example, in FIG. 6L, the location/status of the tracked entity (e.g., User A) is no longer being shared with device 500 (e.g., due to such access being revoked by User A). As a result, widget 606a—which corresponds to User A—displays a blank map or outline 612a, and representation 612b of User A on/within map or outline 612a. Widget 606a also includes an indication 612d that User is no longer sharing location/status information with device 500 (e.g., Not Sharing).

In some embodiments, user interface 602 concurrently includes widgets that correspond to users and objects. For example, in FIG. 6M, user interface 602 includes widget 606a that corresponds to User A, and widget 606b that corresponds to Object B. Widget 606a optionally has one or more of the characteristics of widget 606a described previously, and widget 606b optionally has one or more of the characteristics of widget 606b described previously. For example, widget 606a includes indication 612c that indicates At Work (e.g., the semantic label for the location of user A), and indication 612d that indicates Since 8:15 am (e.g., the time at which and since when User A has been at the location associated with the Work label). Widget 606b includes indication 614g that indicates Keys (e.g., the label for Object B), and indication 614c that indicates At Home (e.g., the semantic label for the location of Object B).

Figure 6N:
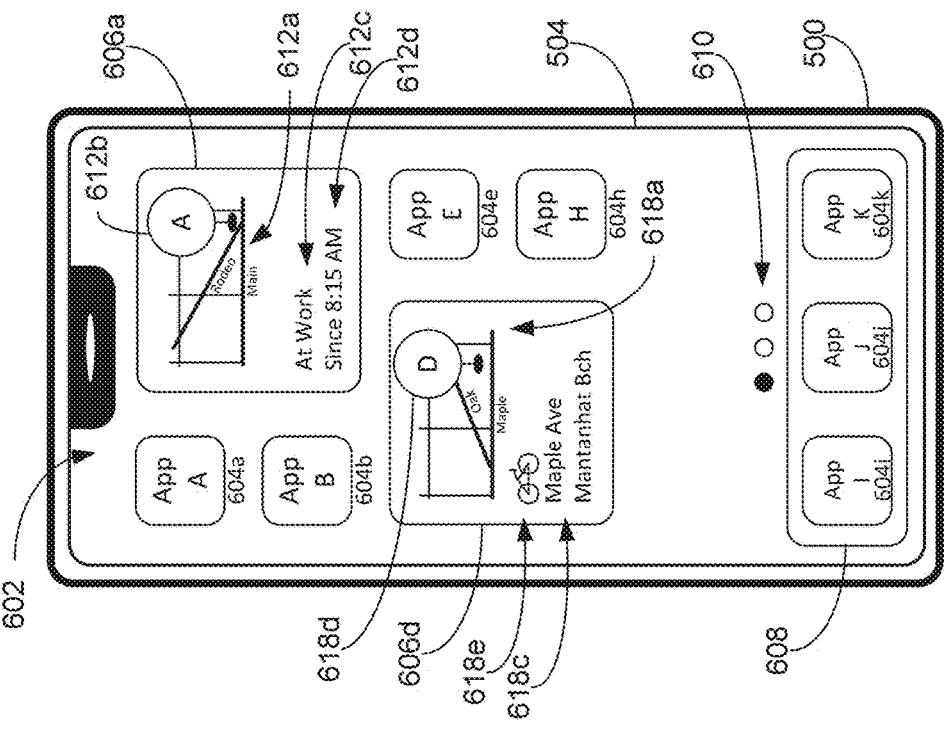

In some embodiments, user interface 602 additionally or alternatively concurrently includes widgets that correspond to multiple different users. For example, in FIG. 6N, user interface 602 includes widget 606a that corresponds to User A, and widget 606d that corresponds to User D. Widget 606a optionally has one or more of the characteristics of widget 606a described previously, and widget 606d optionally has one or more of the characteristics of widget 606b described previously. For example, widget 606a includes indication 612c that indicates At Work (e.g., the semantic label for the location of user A), and indication 612d that indicates Since 8:15 am (e.g., the time at which and since when User A has been at the location associated with the Work label). Widget 606d includes indicating 618e that indicates User D is in the cycling transit state, and indication 618c that indicates a street/city for the location associated with User D (e.g., Maple Avenue in Mantanhat Beach). Widget 606d also includes map 618a and representation 618d of User D at a location on map 618a that corresponds to the location of User D.

In some embodiments, device 500 displays a widget on user interface 602 that corresponds to multiple objects—and in some embodiments, those objects are automatically selected by device 500 based on some criteria. For example, in FIG. 6O, user interface 602 includes widget 606e that corresponds to objects that are determined to be with device 500 (e.g., objects that device 500 determines are within a threshold distance (e.g., 1, 3, 5, 10, 20, 50 feet) of device 500 and/or with which device 500 has an active and/or strong wireless connection (e.g., Bluetooth connection)). Device 500 is optionally configured (e.g., via a location tracking and/or information application) to track the location/status of a set of objects. Widget 606e optionally includes representations of objects from that set of objects that are determined to be with device 500, and optionally does not include representations of objects from that set of objects that are determined to not be with device 500 (e.g., objects that device 500 determines are not within the threshold distance (e.g., 1, 3, 5, 10, 20, 50 feet) of device 500 and/or with which device 500 has an inactive and/or weak wireless connection (e.g., Bluetooth connection)). For example, in FIG. 6O, widget 606e includes representation 614b of Object B, representation 616b of Object C and representation 620b of Object E. In some embodiments, the representations of objects are displayed with indications of status and/or location for those objects in ways previously described. For example, because Object C is temporarily shared with device 500, representation 616b is displayed with indication 616*i* (e.g., overlapping a portion of representation 616*b*) that indicates that Object C is temporarily shared with device 500. As another example, because the battery level of Object E is low, representation 620*b* is displayed with indication 620*i* (e.g., overlapping a portion of representation 620*b*) that indicates that the battery level of Object E is low.

Device 500 optionally automatically updates (e.g., without user input to do so) the objects displayed in widget 606*e* as the determinations as to whether objects are with device 500 change. For example, in FIG. 6P, device 500 has updated widget 606*e* to no longer include Objects B and C (e.g., because those objects are determined to no longer be with device 500), and to include Objects F and H, corresponding to representations 690*b* and 692*b*, respectively, because those objects are determined to now be with device 500. Object E, corresponding to representation 620*b*, continues to be with device 500, and therefore remains displayed in widget 606*e*.

Figure 6M:
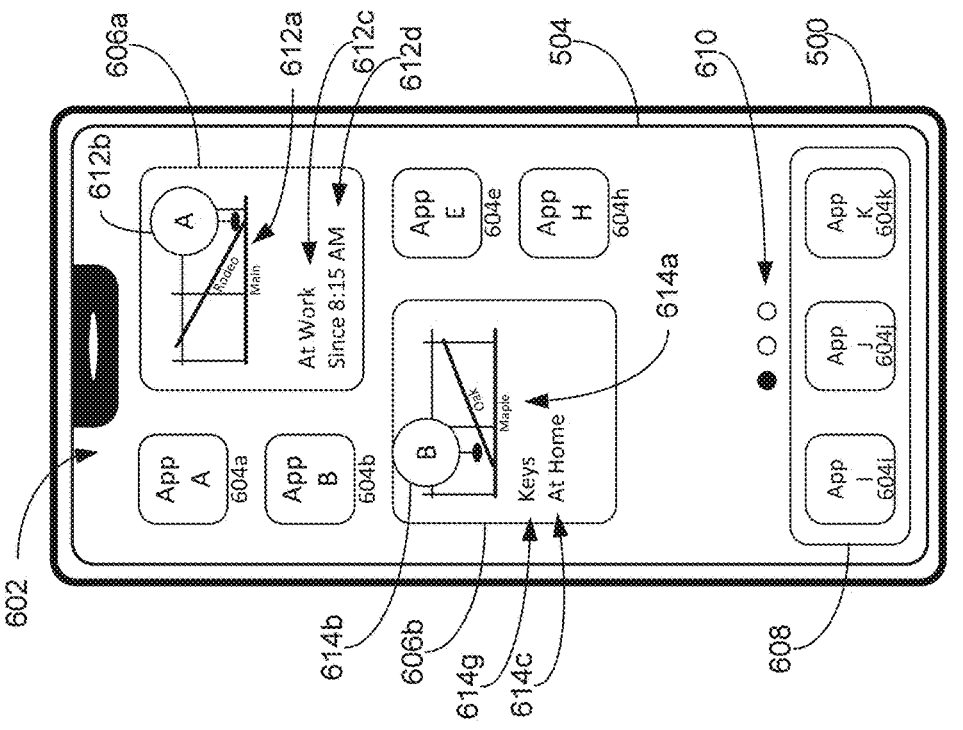
Figure 6P:
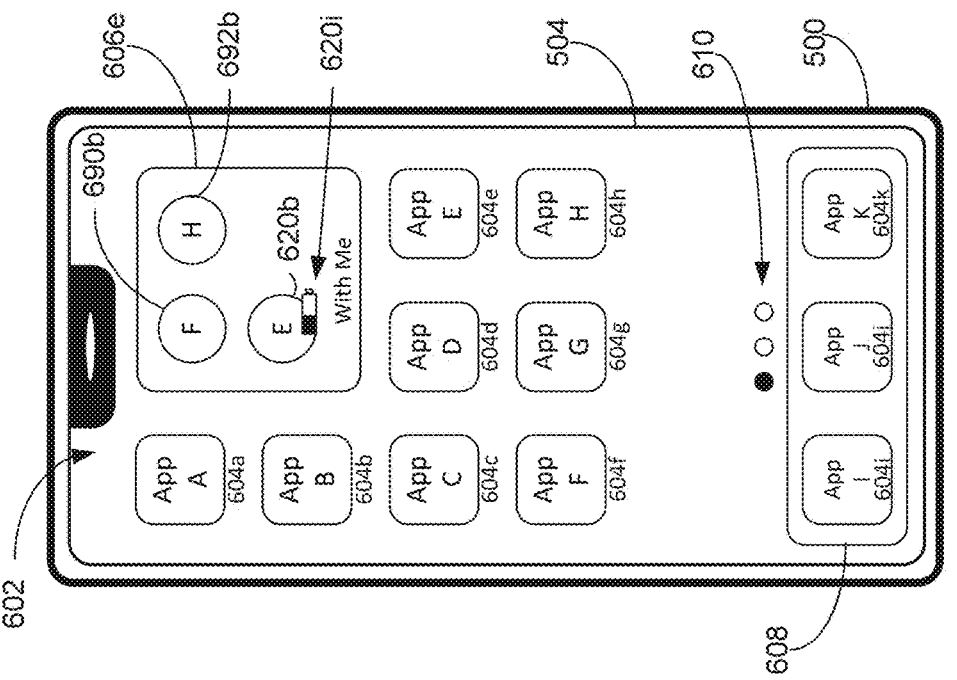

In some embodiments, device 500 displays additional information for a selected tracked entity (e.g., object or user) depending on which tracked entity is selected. For example, in FIG. 6Q, device 500 detects selection of representation 692*b* (corresponding to Object H) in widget 606*e*. In response, in FIG. 6R, device 500 displays user interface 611 of a location tracking and/or information application installed on device 500, where user interface 611 includes information specific to Object H. For example, in FIG. 6R, user interface 611 includes map 613 that includes a representation 692*b* of Object H displayed at a location on map 613 corresponding to the location of Object H. User interface 611 also includes user interface element 615*a* that includes an indication 619*a* of the name and/or location and/or separation status of Object H, a selectable option 617*a* that is selectable to cause Object H to emit an audible sound (e.g., to aid a user in finding Object H) and a selection option 621*a* that is selectable to cause device 500 to display directions or finding instructions for locating Object H.

Figure 6O:
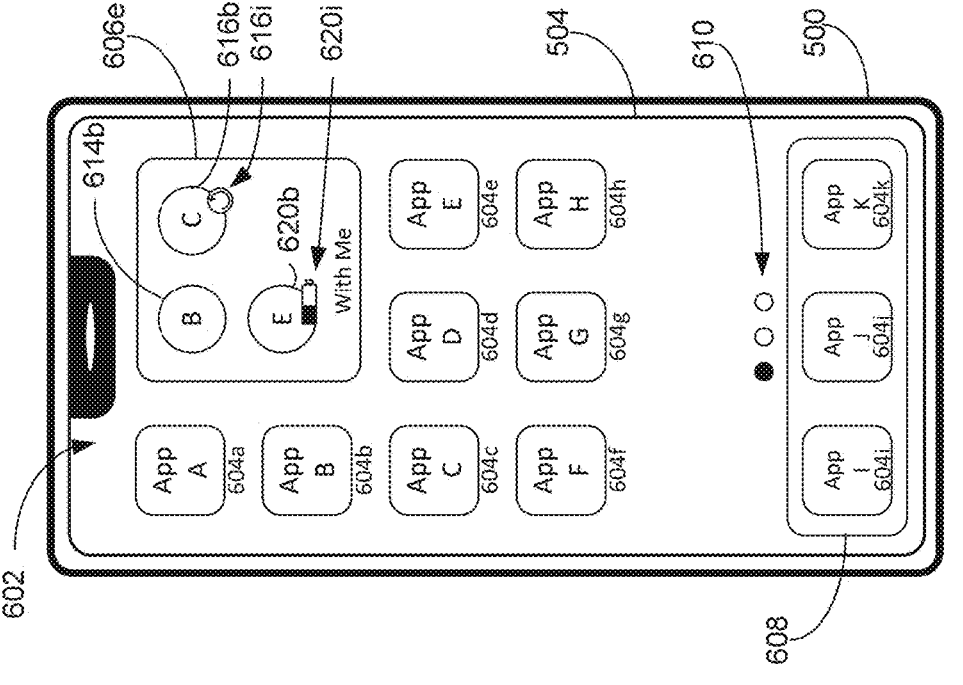
Figure 6R:
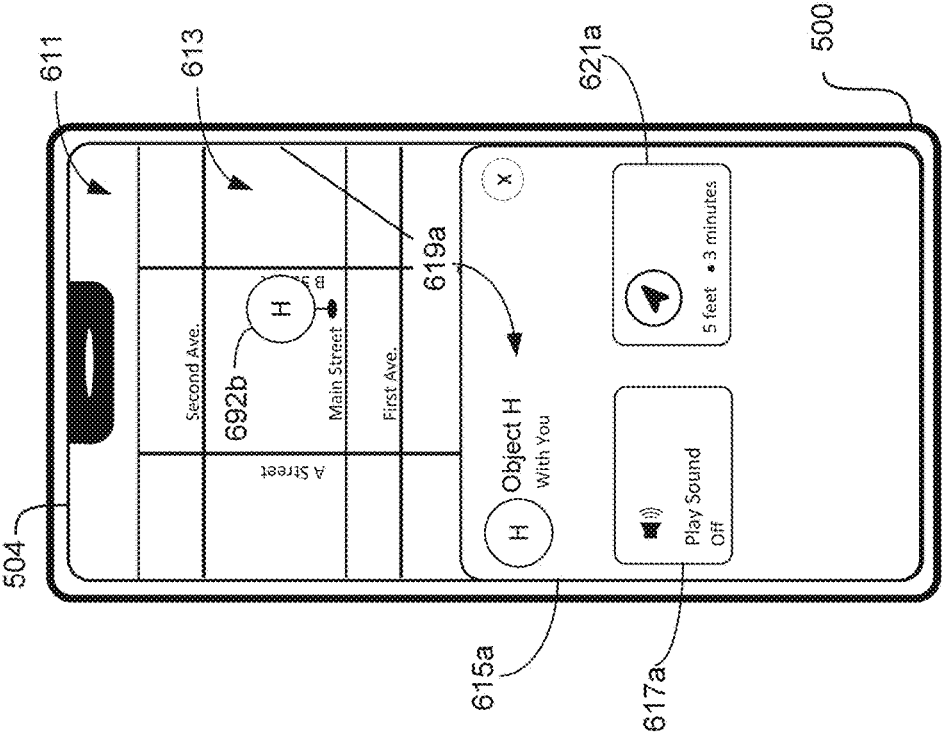
Figure 6Q:
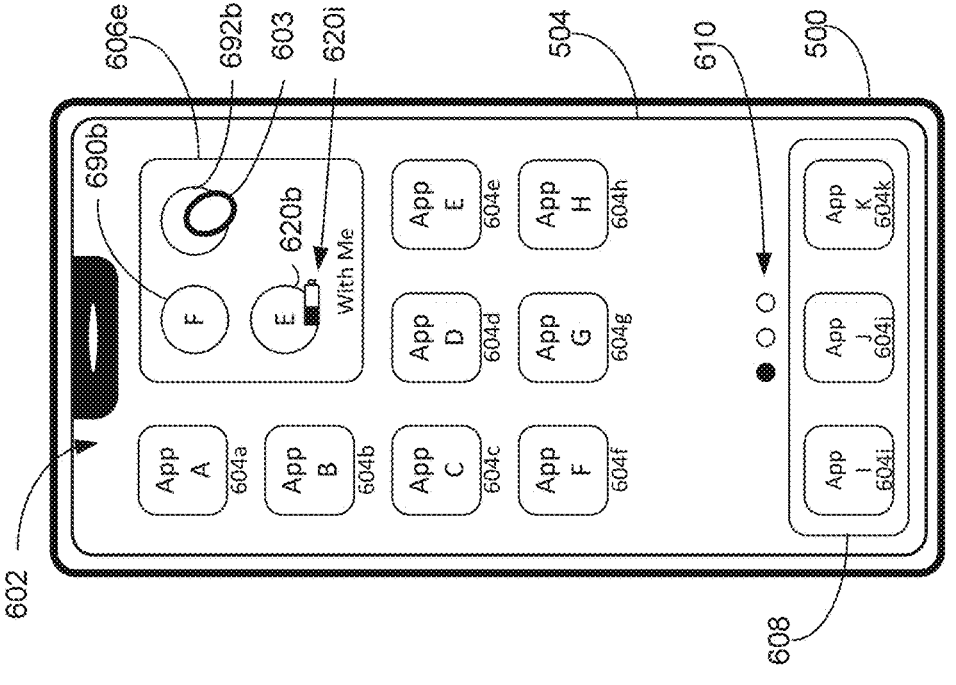
Figure 6T:
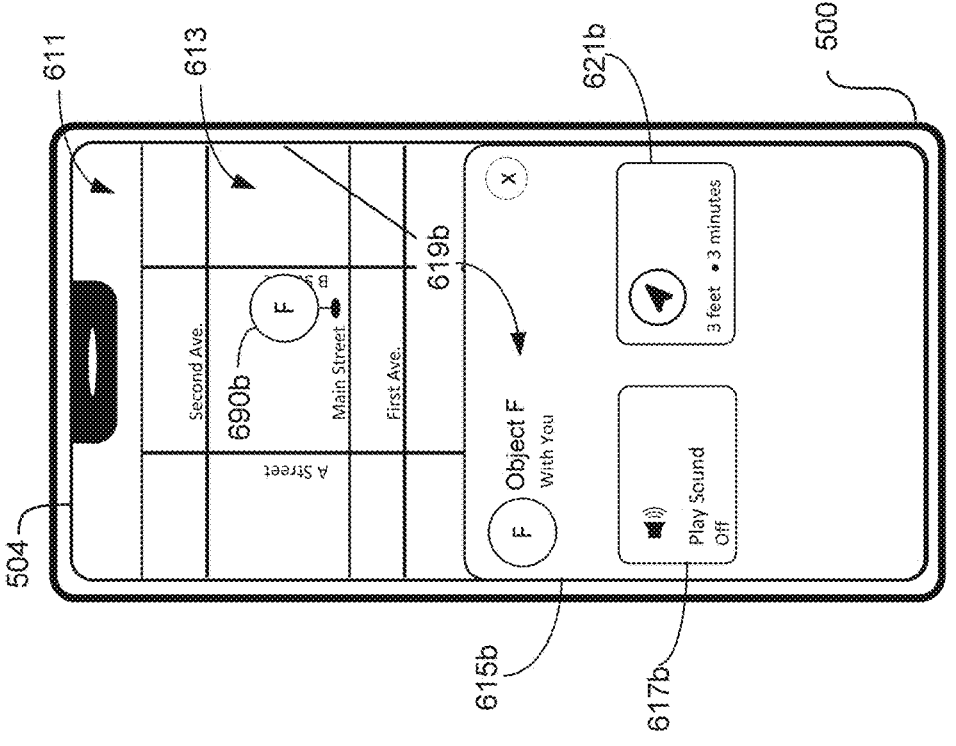
Figure 6S:
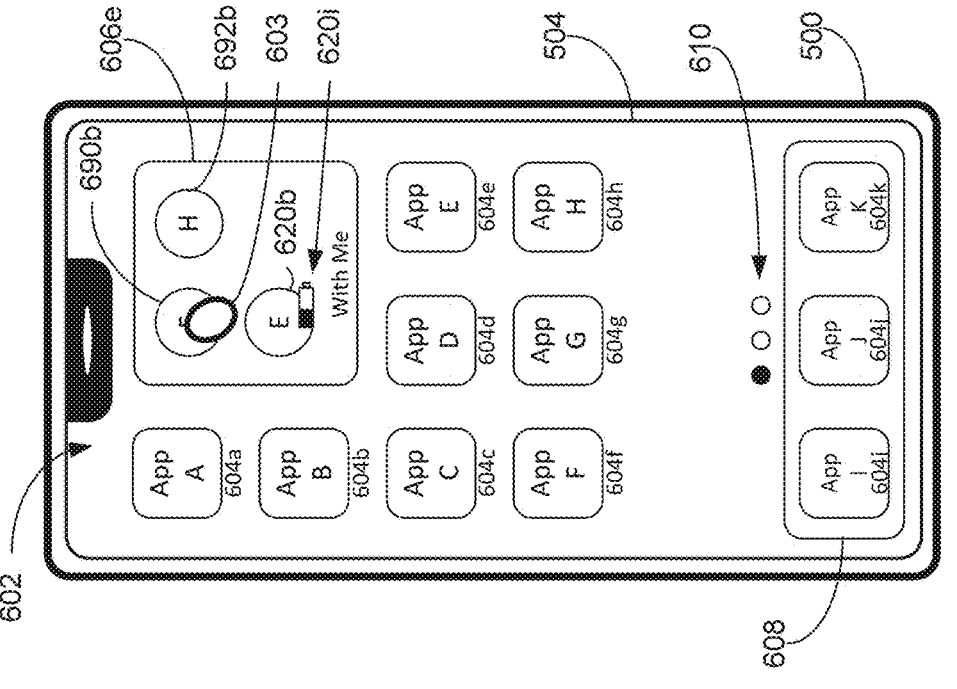

In FIG. 6S, device 500 instead detects selection of representation 690*b* (e.g., corresponding to Object F) in widget 606*e*. In response, in FIG. 6T, device 500 displays user interface 611 of a location tracking and/or information application installed on device 500, where user interface 611 includes information specific to Object F. For example, in FIG. 6T, user interface 611 includes map 613 that includes a representation 690*b* of Object F displayed at a location on map 613 corresponding to the location of Object F. User interface 611 also includes user interface element 615*b* that includes an indication 619*b* of the name and/or location and/or separation status of Object F, a selectable option 617*b* that is selectable to cause Object F to emit an audible sound (e.g., to aid a user in finding Object F) and a selection option 621*b* that is selectable to cause device 500 to display directions or finding instructions for locating Object F.

Figure 6V:
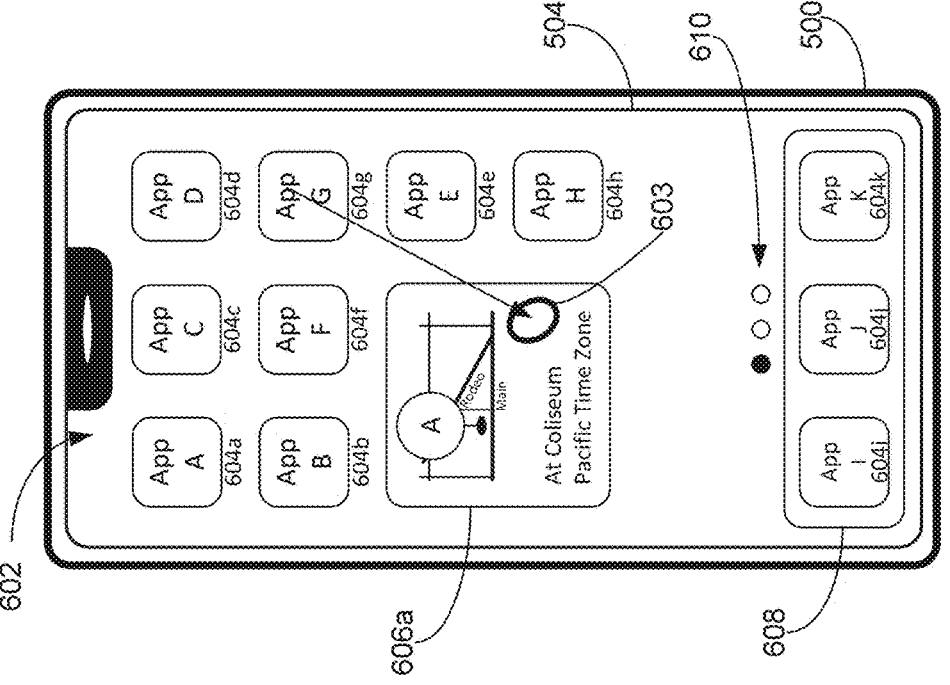

In some embodiments, device 500 repositions widgets associated with tracked entities on user interface 602 in accordance with tap and/or drag inputs. For example, in FIG. 6U, device 500 detects a touchdown of contact 603 on widget 606*a*. In FIG. 6V, device 500 detects movement of contact 603 in a downward-leftward direction, and device 500 moves widget 606*a* on user interface 602 in accordance with the movement of contact 603 (e.g., downward and leftward). In FIG. 6V, if device 500 detects liftoff of contact 603 after the movement of contact 603, device 500 maintains widget 606*a* at the location shown in FIG. 6V.

In some embodiments, widgets associated with tracked entities can be moved from one page of user interface 602 to another page of user interface 602 in accordance with tap and/or drag inputs. For example, in FIG. 6W, device 500 detects movement of contact 603 (e.g., while touched down on widget 606*a*) to the right edge of touch screen 504. In response, device 500 ceases displaying the first page of user interface 602 (e.g., as was illustrated in FIG. 6W), and displays the second page of user interface 602, as shown in FIG. 6X. Device 500 has also moved widget 606*a* to the second page of user interface 602 (e.g., and has removed widget 606*a* from the first page of user interface 602). The second page of user interface 602 optionally includes different content than the first page of user interface 602. For example, as shown in FIG. 6X, the second page of user interface 602 includes different application icons 604*l* and 604*m* than the first page of user interface 602.

In FIG. 6X, after displaying the second page of user interface 602, device 500 detects movement of contact 603 (e.g., while remaining touched down on widget 606*a*) upward and leftward, and in response, moves widget 606*a* upward and leftward on the second page of user interface 602. In response to detecting liftoff of contact 603 after the upward and leftward movement of contact 603, device 500 would optionally maintain widget 606*a* at the location shown in FIG. 6V.

Device 500 can also cycle through different pages of user interface 602 independently of input for moving widget 606*a*. For example, in FIGS. 6Y-6Z, device 500 detects a rightward horizontal swipe of contact 603 while displaying the second page of user interface 602 (e.g., as indicated by indicator 610) including widget 606*a*. In response, in FIG. 6Z, device 500 displays the first page of user interface 602 (e.g., as indicated by indicator 610) without moving widget 606*a* from its location in FIG. 6Y.

In some embodiments, one or more (or any) of the widgets associated with tracked entities described herein can be edited in response to user input. For example, in FIG. 6AA, device 500 detects a tap of contact 603, and a hold of contact 603 for longer than a time threshold (e.g., 0.1, 0.5, 1, 2, 3, 5, 10 seconds), on widget 606*a*. In response, in FIG. 6AB, device 500 displays menu 622 adjacent to widget 606*a*. Menu 622 includes selectable option 624*a* that is selectable to initiate a process to edit widget 606*a*, selectable option 624*b* that is selectable to initiate a process to edit user interface 602 (e.g., reposition items on user interface 602, delete items from user interface 602, etc.), and selectable option 624*c* that is selectable to initiate a process to remove widget 606*a* from user interface 602.

In FIG. 6AB, device 500 detects selection of selectable option 624*a*. In response, device 500 displays user interface 626 (e.g., overlaid on user interface 602) that includes entries 628*a*-628*d* that indicate the names of tracked entities (e.g., object or users) that are associated with widget 606*a*, as shown in FIG. 6AC. For example, entry 628*a* indicates that widget 606*a* is associated with Allison Frost (e.g., User A). Entries 628*b*-628*d* indicate that no other users are associated with widget 606*a*. User input that populates one or more of entries 628*b*-628*d* with tracked entities would optionally result in widget 606*a* also being associated with those populated tracked entities. A user input (e.g., a tap) directed to an entry 628 optionally causes device 500 to display a list of potential tracked entities that can be selected to populate that entry 628 (and/or entries 628*a-d*).

For example, in FIG. 6AC, device 500 detects a tap of contact 603 on entry 628*a* corresponding to Allison Frost. In response, device 500 displays user interface 630 that includes a list of potential tracked entities (e.g., objects, users, etc.). User interface 630 includes the names of users Allison Frost, Betty Green, Charlie Stone, Dennis Fang and Eric Jones. Additional names are optionally accessible in response to vertical scrolling inputs directed to user interface 630. User interface 630 also includes indication 632*a* next to the name of Allison Frost to indicate that she is currently selected for inclusion in widget 606*a* (e.g., in entry 628*a*), and does not include such indications next to the other names to indicate that they are not currently selected for inclusion in widget 606*a*. Selection of different name(s) in user interface 630 via user input would optionally result in widget 606*a* additionally or alternatively including those users.

In some embodiments, device 500 displays a user interface associated with a tracked entity associated with a widget in response to selection of that widget. For example, in FIG. 6AE, device 500 detects selection of widget 606*a* (e.g., via a tap of contact 603) associated with Allison Frost (e.g., User A). In response, device 500 displays user interface 605 as shown in FIG. 6AF, which is optionally a user interface that includes information about and/or selectable options for interacting with Allison Frost. For example, user interface 605 includes a graphical representation 634 of Allison Frost (e.g., a photo, an avatar, etc.), an indication 636 of the name of Allison Frost, a selectable option 638*a* that is selectable to initiate a messaging communication between the user of device 500 and Allison Frost, a selectable option 638*b* that is selectable to initiate a phone communication between the user of device 500 and Allison Frost, a selectable option 638*c* that is selectable to initiate a video call communication between the user of device 500 and Allison Frost, and a selectable option 638*d* that is selectable to display additional contact information (e.g., email address, phone number, home address, etc.) for Allison Frost. User interface 605 in FIG. 6AF also includes a representation 640 of a map that includes a representation 642 (e.g., icon, avatar, etc.) of Allison Frost displayed at a location on map 640 corresponding to the current or last known location of Allison Frost.

In FIG. 6AF, device 500 detects selection of map 640 (e.g., via a tap of contact 603). In response, device 500 displays a user interface 607 of a location tracking and/or information application installed on device 500, as shown in FIG. 6AG. User interface 607 includes a representation of a map 641 and representation 642 of Allison Frost displayed at a location on the map 641 corresponding to the location of Allison Frost. User interface 607 also includes user interface element 650 that includes information about Allison Frost (e.g., name, address of current location, the last time the current location was updated, etc.), a selectable option 652*a* that is selectable to initiate communication with Allison Frost, and a selectable option 652*b* that is selectable to display driving or finding directions for reaching the location associated with Allison Frost.

FIGS. 7A-7I are flow diagrams illustrating a method 700 of displaying status for tracked entities in accordance with some embodiments, such as in FIGS. 6A-6AG. The method 700 is optionally performed at an electronic device such as device 100, device 300, or device 500 as described above with reference to FIGS. 1A-1B, 2-3, 4A-4B and 5A-5H. Some operations in method 700 are, optionally combined and/or order of some operations is, optionally, changed.

As described below, the method 700 provides ways to display status for tracked entities. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 700 is performed at an electronic device in communication with a display generation component and one or more input devices. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (702*a*), via the display generation component, a home screen user interface of the electronic device, such as user interface 602 in FIG. 6A (e.g., a home screen user interface such as described with reference to FIG. 4A, such as a user interface that includes a plurality of application icons and/or widgets that are selectable to display respective applications that are (e.g., installed) on the electronic device) that includes a first representation of a first tracked entity, such as widget 606*a* in FIG. 6A (e.g., a representation or widget or "card" that corresponds to a user other than the user associated with the electronic device, a contact of the user of the electronic device, an object (e.g., headphones, another electronic device, a remote locator object, etc.), etc.).

In some embodiments, the first tracked entity is designated in response to input from the user of the electronic device. In some embodiments, the representation of the first tracked entity includes an image associated with or of the first tracked entity (e.g., avatar of a user, icon of a device or object, etc.) and/or a textual description of the first tracked entity (e.g., name of the user, name of the device or object, etc.). In some embodiments, the first representation of the first tracked entity has one or more of the characteristics of corresponding representations or user interface elements described with reference to methods 900, 1100 and/or 1300. In some embodiments, the first tracked entity is separate from the electronic device (e.g., whether or not in the same location as the electronic device). In some embodiments, the home screen user interface further includes one or more options that are selectable to display, via the display generation component, one or more applications installed on the electronic device, such as application icons 604*a*-604*k* in FIG. 6A (e.g., one or more application icons that are selectable to display the selected application). In some embodiments, displaying the first representation of the first tracked entity includes (702*b*), in accordance with a determination that a current status of the first tracked entity is a first status, displaying the first representation of the first tracked entity including a visual indication of the first status (702*c*), such as any of indications 612*a*, 612*c* or 612*d* in FIG. 6A, and in accordance with a determination that the current status of the first tracked entity is a second status, different from the first status, displaying the first representation of the first tracked entity including a visual indication of the second status, different from the visual indication of the first status (702*d*), such as any of indications 612*c* and 612*e* in FIG. 6B (e.g., if the first tracked entity is at a particular address or landmark, the representation of the first tracked entity includes the address or the name or icon of the landmark. In some embodiments, if the first tracked entity has a battery level below a threshold (e.g., a low battery level), the representation of the first tracked entity includes an icon and/or text of the low battery level).

In some embodiments, while displaying the home screen user interface, the electronic device receives (702e), via the one or more input devices, a first input directed to the first representation of the first tracked entity, such as the input(s) from contact 603 shown in FIGS. 6U-6X (e.g., a tap on the first representation of the first tracked entity, a tap and drag of the representation of the first tracked entity, etc.). In some embodiments, in response to receiving the first input, the electronic device performs (702f) an operation associated with the first representation of the first tracked entity, such as repositioning widget 606a on user interface 602 as shown in FIGS. 6U-6X (e.g., in response to detecting a tap on the representation of the first tracked entity, displaying a user interface that includes more location information about the first tracked entity, in response to detecting a tap and drag of the representation of the first tracked entity, rearranging the representation of the first tracked entity relative to the one or more selectable options on the home screen user interface in accordance with the drag, etc.). In some embodiments, the electronic device is configured to track one or more characteristics of the first tracked entity; for example, the electronic device and/or tracked entity are configured to and/or have consented to sharing of location and/or current status information with the electronic device. The above-described manner of displaying a representation of a tracked entity on a home screen user interface of the device provides a quick and efficient manner of indicating status information for tracked entities on the electronic device, which simplifies the interaction between the user and the electronic device and enhances the operability of the electronic device and makes the user-device interface more efficient (e.g., by avoiding the need for additional inputs to access such status information), which additionally reduces power usage and improves battery life of the electronic device by enabling the user to use the electronic device more quickly and efficiently.

In some embodiments, the first tracked entity is a first user (e.g., other than a user associated with the electronic device), and the first representation of the first tracked entity includes an indication of a location associated with the first user (704a), such as widget 606a associated with Allison Frost in FIG. 6A including indication(s) 612a and/or 612c. For example, the first user is a contact of the user of the electronic device who has agreed to share a location associated with the first user (e.g., a location of an electronic device, such as a smartphone, of the first user) with the user of the electronic device. In some embodiments, the widget for the first user includes an indication of the current or last known location for the first user and/or the device associated with the first user. For example, the widget includes an address for the location associated with the first user, a city of the location associated with the first user, a map of the location associated with the first user, etc. The above-described manner of indicating a location of the first user provides a quick and efficient manner of conveying location information for the first user to the user of the electronic device, which simplifies the interaction between the user and the electronic device and enhances the operability of the electronic device and makes the user-device interface more efficient (e.g., by avoiding the need for additional inputs to access such location information), which additionally reduces power usage and improves battery life of the electronic device by enabling the user to use the electronic device more quickly and efficiently.

In some embodiments, the first representation of the first tracked entity is displayed, on the home screen user interface, within a respective representation corresponding to a plurality of different tracked entities including the first tracked entity and a second tracked entity, different from the first tracked entity (706a), and the respective representation corresponding to the plurality of different tracked entities further includes a second representation of the second tracked entity (706b), such as widget 606e in FIG. 6O corresponding to tracked entities B, C and E. For example, the widget that includes the representation of the first tracked entity also includes a representation of a second tracked entity, different from the first tracked entity. In some embodiments, the representation of the second tracked entity, similar to the representation of the first tracked entity, is displayed with an indication of a current status of the second tracked entity. In some embodiments, the first and second tracked entities are objects or devices that the electronic device is able to track. In some embodiments, the first and second tracked entities are different users that the electronic device is able to track. The above-described manner of displaying multiple tracked entities in a single widget provides a quick and efficient manner of conveying information about multiple tracked entities using limited display space, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that one or more locations of a first set of tracked entities (e.g., one or more tracked entities that the electronic device is configured to track) satisfy location criteria (e.g., the location of a respective tracked entity satisfies the location criteria if the current or last known location of the respective tracked entity is within a threshold distance (e.g., 1, 3, 5, 10, 20, 50, 100, 200 feet) of the current location of the electronic device), the respective representation corresponding to the plurality of different tracked entities includes representations of the first set of tracked entities (708a), such as tracked entities B, C and E in FIG. 6O being included in widget 606e because those tracked entities are determined to be with device 500. In some embodiments, if the one or more locations of the first set of tracked entities does not satisfy the location criteria, the respective representation does not include representations of the first set of tracked entities.

In some embodiments, in accordance with a determination that one or more locations of a second set of tracked entities (e.g., one or more tracked entities that the electronic device is configured to track), different from the first set of tracked entities, satisfy the location criteria, the respective representation corresponding to the plurality of different tracked entities includes representations of the second set of tracked entities (708b), such as tracked entities F, H and E in FIG. 6O being included in widget 606e because those tracked entities are determined to be with device 500. In some embodiments, if the one or more locations of the second set of tracked entities does not satisfy the location criteria, the respective representation does not include representations of the second set of tracked entities. Thus, in some embodiments, the widget is a widget that automatically (e.g., without user input) displays representations of tracked entities based on the locations of those tracked entities relative to the location of the electronic device. In some embodiments, the widget is a widget that includes representations of tracked entities that are determined to be "with" the user of the electronic device, and does not include representations of tracked entities that are determined to not be "with" the user of the electronic device. In some embodiments, as different tracked entities satisfy the location criteria over time, the widget includes representations of those tracked entities, and as different tracked entities no longer satisfy the location criteria over time, the widget no longer includes representations of those tracked entities. The above-described manner of displaying representations of tracked entities based on location provides a quick and efficient manner of conveying information about which tracked entities are still in the vicinity of the user, and which tracked entities are no longer in the vicinity of the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first tracked entity is a first user (e.g., other than a user associated with the electronic device. For example, the first user is a contact of the user of the electronic device who has agreed to share a location associated with the first user (e.g., a location of an electronic device, such as a smartphone, of the first user) with the user of the electronic device), and the home screen user interface further includes a second representation of a second user (e.g., other than a user associated with the electronic device. For example, the second user is a contact of the user of the electronic device who has agreed to share a location associated with the second user (e.g., a location of an electronic device, such as a smartphone, of the second user) with the user of the electronic device), different from the first user, that includes an indication of a current status of the second user (710a), such as widgets 606a and 606d associated with different users and included in user interface 602 in FIG. 6N (e.g., similar to the indication of the current status of the first tracked entity that is displayed with the representation of the first tracked entity). In some embodiments, the home screen user interface includes multiple different widgets (e.g., different widgets associated with the same application—for example, a location information application on the electronic device that has access to location information for one or more tracked entities) that are associated with different users. The above-described manner of displaying different widgets for different users provides a quick and efficient manner of conveying information about those users while avoiding potential confusion about with which user given status information is associated, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first tracked entity is a respective object (e.g., an electronic device such as a smart phone, a remote locator object that can be tracked by the electronic device). In some embodiments, a remote locator object is a device with a battery, one or more wireless antenna and a processor (e.g., a low power processor) that enables the device to function as a special-purpose remote locator object when associated with another physical object (e.g., wallet, purse, backpack, suitcase, car, set of keys, or the like). In some embodiments, the remote locator object is a multi-purpose device with location tracking capabilities such as a smartphone, tablet, computer, or watch. In some embodiments, a remote locator object is capable of transmitting location data to the electronic device. For example, a remote locator object optionally includes a GPS locator.

In some embodiments, the home screen user interface further includes a second representation of a respective user (e.g., other than a user associated with the electronic device) that includes an indication of a current status of the respective user (712a), such as widget 606a associated with a user and widget 606b associated with an object both being included in user interface 602 in FIG. 6M (e.g., similar to the indication of the current status of the first tracked entity that is displayed with the representation of the first tracked entity). For example, the respective user is a contact of the user of the electronic device who has agreed to share a location associated with the respective user (e.g., a location of an electronic device, such as a smartphone, of the respective user) with the user of the electronic device. In some embodiments, the home screen user interface includes multiple different widgets (e.g., different widgets associated with the same application—for example, a location information application on the electronic device that has access to location information for one or more tracked entities), wherein at least one widget is associated with a user, and at least one widget is associated with an object. The above-described manner of concurrently displaying widgets for different types of tracked entities provides a quick and efficient manner of conveying information about different types of tracked entities at the same time, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, displaying the first representation of the first tracked entity includes (714a) in accordance with a determination that the first tracked entity is an object (e.g., an electronic device such as a smart phone, a remote locator object that can be tracked by the electronic device), displaying the first representation of the first tracked entity is with a first visual appearance (714b), such as widget 606b including the "Keys" label in FIG. 6M, and in accordance with a determination that the first tracked entity is a user (e.g., other than a user associated with the electronic device), displaying the first representation of the first tracked entity is with a second visual appearance, different from the first visual appearance (714c), such as widget 606a not including an identifier label in FIG. 6M. For example, in some embodiments, a widget that is associated with an object includes indications of status that indicate whether the object is with the user or is no longer with the user. In some embodiments, a widget that is associated with a user does not include such an indication. As another example, in some embodiments, a widget that is associated with a user includes an indication of a current transit status of that user (e.g., currently driving, currently walking, currently biking, etc.), but a widget associated with an object does not include such an indication. In some embodiments, widgets for objects and users both include a representation of a map that indicates the current or last known location for that object or user. The above-described manner of displaying widgets for different types of tracked entities with different visual appearances provides a quick and efficient manner of indicating the type of tracked entity that is associated with the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that one or more criteria are satisfied (e.g., location information for the tracked entity is available, or location information for the tracked entity is not yet available (e.g., still being determined), but the electronic device still has access to such location information. In some embodiments, the one or more criteria are not satisfied if access of the electronic device to the location information for the tracked entity has been revoked (e.g., by the tracked entity and/or the user associated with the tracked entity)), the first representation of the first tracked entity includes a representation of a map that indicates information associated with a (e.g., current or last known) location of the first tracked entity (716*a*), such as widget 606*c* including map 616*a* because the location of tracked entity C is available to device 500. For example, the widget associated with the tracked entity includes a map that includes a graphic image (e.g., icon) of the tracked entity displayed at a location on the map that corresponds to the current location of the tracked entity, or if the current location is not available to the electronic device, the last known location of the tracked entity. The above-described manner of displaying the representation of the map in the widget for the tracked entity provides a quick and efficient manner of indicating location information for the tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in accordance with a determination that a current status of tracking a location of the first tracked entity is a first tracking status, the representation of the map is displayed in a first state (718*a*), such as map 616*a* in FIG. 6J being displayed with normal clarity/color/etc. when the location of tracked entity C is available to device 500, and in accordance with a determination that the current status of tracking the location of the first tracked entity is a second tracking status, different from the first tracking status, the representation of the map is displayed in a second state, different from the first state (718*b*), such as map 614*a* in FIG. 6K being displayed with reduced clarity/color/brightness/etc. and/or increased blur when the location of tracked entity C is not yet available to device 500. For example, the representation of the map is optionally displayed in with different visual appearances depending on the current status of tracking the location of the first tracked entity. For example, tracking statuses optionally include: 1) a status in which current or last known location information for the first tracked entity is not yet available but is in the process of being determined; 2) a status in which current location information for the first tracked entity is available; 3) a status in which current location information for the first tracked entity is not available, but last-known location information for the first tracked entity is available (e.g., the electronic device was not able to obtain current location information for the first tracked entity, but did previously receive earlier location information for the first tracked entity); etc. The above-described manner of changing the state of the map depending on tracking status provides a quick and efficient manner of indicating the current tracking status for the first tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first tracking status corresponds to location information being available for the first tracked entity (720*a*), displaying the representation of the map in the first state includes displaying the representation of the map at a first level of visual emphasis (720*b*) (e.g., displaying the map with full clarity, with full color, with full brightness, and/or without blurring, etc.), such as with respect to map 616*a* in FIG. 6J, the second tracking status corresponds to location information being unavailable for the first tracked entity (720*c*) (e.g., the current location for the first tracked entity cannot be determined and/or locating the first tracked entity is currently in progress), and displaying the representation of the map in the second state includes displaying the representation of the map at a second level of visual emphasis, less than the first level of visual emphasis (720*d*), such as with respect to map 614*a* in FIG. 6K (e.g., displaying the map with reduced clarity, with reduced saturation, with reduced brightness, and/or with increased blurring, etc.). The above-described manner of changing the state of the map depending on tracking status provides a quick and efficient manner of indicating the current tracking status for the first tracked entity while also avoiding conveying incorrect location information when current location information is not available, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more criteria include a criterion that is satisfied when the first tracked entity is available for tracking (e.g., the electronic device and/or the first tracked entity are still configured to share location information with one another), such as entity C being available for tracking in FIG. 6J, and not satisfied when the first tracked entity is not available for tracking (722*a*), such as entity A not being available for tracking in FIG. 6L (e.g., the electronic device and/or the first tracked entity are no longer configured to share location information with one another. For example, the first tracked entity (e.g., a user) has revoked permission for the electronic device to track the first tracked entity and/or the user of the electronic device has removed the first tracked entity from tracking). In some embodiments, in accordance with a determination that the one or more criteria are not satisfied, the first representation of the first tracked entity does not include the representation of the map (722*b*), such as widget 606*a* not including a map in FIG. 6L. Thus, in some embodiments, when a tracked entity is no longer available for tracking, the widget for the tracked entity no longer includes a representation of a map for indicating location information for the first tracked entity. The above-described manner of removing the map from the widget provides a quick and efficient manner of indicating that a tracked entity is no longer available for tracking while also avoiding conveying incorrect location information when such location information is no longer available, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first representation of the first tracked entity includes a graphical indication of the first tracked entity (e.g., an icon corresponding an object associated with the first tracked entity (e.g., if the first tracked entity is a remote locator object associated with keys, the icon is a graphic/image of keys), an avatar of the first tracked entity if the first tracked entity is a user, etc.), and a visual indication of a location associated with the first tracked entity (724*a*), such as widget 606*a* in FIG. 6A including representation 612*b* and indication 612*c* and/or 612*a* (e.g., an address for the location associated with the first tracked entity, a city for the location associated with the first tracked entity, a street name for the location associated with the first tracked entity, and/or a map indicating the location associated with the first tracked entity. In some embodiments, the graphical indication of the first tracked entity is displayed at a location on the map that corresponds to the location of the first tracked entity). The above-described manner of displaying a graphical indication of the tracked entity provides a quick and efficient manner of conveying the identity of the tracked entity, which simplifies the interaction between the user and the electronic device and enhances the operability of the electronic device and makes the user-device interface more efficient (e.g., by avoiding incorrect association of location information with a tracked entity), which additionally reduces power usage and improves battery life of the electronic device by enabling the user to use the electronic device more quickly and efficiently.

In some embodiments, the first representation of the first tracked entity includes a graphical indication of the first tracked entity (e.g., an icon corresponding an object associated with the first tracked entity (e.g., if the first tracked entity is a remote locator object associated with keys, the icon is a graphic/image of keys), an avatar of the first tracked entity if the first tracked entity is a user, etc.), and a visual indication of a current status of the first tracked entity (726*a*), such as widget 606*b* in FIG. 6B including representation 614*b* and indication 614*h* (e.g., an indication that the address for the tracked entity is unknown, an indicating that the electronic device is currently locating the tracked entity, an indication that the tracked entity is no longer sharing its location with the electronic device, an indication that the tracked entity is no longer an entity that is being tracked by the electronic device, an indication that the location for the tracked entity was not found by the electronic device, and/or an indication that the battery level of the tracked entity is low, etc.). The above-described manner of displaying a graphical indication of the tracked entity provides a quick and efficient manner of conveying the identity of the tracked entity, which simplifies the interaction between the user and the electronic device and enhances the operability of the electronic device and makes the user-device interface more efficient (e.g., by avoiding incorrect association of status information with a tracked entity), which additionally reduces power usage and improves battery life of the electronic device by enabling the user to use the electronic device more quickly and efficiently.

In some embodiments, the first representation of the first tracked entity includes a visual indication of a current transit state of the first tracked entity (728*a*), such as indication 612*e* in FIG. 6B. For example, based on location and/or movement of the first tracked entity (e.g., using accelerometer or other inertial measurement unit data for the first tracked entity), the electronic device displays information about the current transit state for the first tracked entity. If the first tracked entity is moving at speed above a respective speed threshold and/or is moving on a road or highway, the widget for the first tracked entity optionally includes a visual indication indicating that the first tracked entity is in a "driving" transit state. If the first tracked entity is moving at relatively modest speeds on a road or highway or bike path, the widget for the first tracked entity optionally includes a visual indication indicating that the first tracked entity is in a "biking" transit state. If the first tracked entity is moving at relatively low speeds on a road or highway or pedestrian path, the widget for the first tracked entity optionally includes a visual indication indicating that the first tracked entity is in a "walking" transit state. In some embodiments, the widget includes such transit state indications if the tracked entity is a user, but does not include such indications if the tracked entity is an object. The above-described manner of displaying an indication of the transit state of the tracked entity provides a quick and efficient manner of conveying transit information of the tracked entity, which simplifies the interaction between the user and the electronic device and enhances the operability of the electronic device and makes the user-device interface more efficient (e.g., by avoiding the need for additional input for locating such information and/or avoiding input for communicating with the tracked entity when the tracked entity is in a transit state not conducive to communication), which additionally reduces power usage and improves battery life of the electronic device by enabling the user to use the electronic device more quickly and efficiently.

In some embodiments, the first representation of the first tracked entity includes a visual indication of a battery status of the first tracked entity (730*a*), such as indication 614*h* in FIG. 6I. For example, in some embodiments if the first tracked entity is an object, the widget for the first tracked entity always includes an indication of a current battery level of the object. In some embodiments, the widget for the first tracked entity only includes an indication of the current battery level of the object if the current battery level is low (e.g., below a threshold level, such as 2%, 5%, 10%, 20%, 30%, etc.). In some embodiments, the indication indicates the current battery level of the tracked entity; in some embodiments, the indication indicates that the current battery level is low without indicating the current batter level. The above-described manner of displaying an indication of the battery level for the tracked entity provides a quick and efficient manner of conveying such battery information and indicating that tracking of the tracked entity might soon become unavailable, which simplifies the interaction between the user and the electronic device and enhances the operability of the electronic device and makes the user-device interface more efficient (e.g., by avoiding the need for additional input for locating such information), which additionally reduces power usage and improves battery life of the electronic device by enabling the user to use the electronic device more quickly and efficiently.

In some embodiments, the first representation of the first tracked entity includes a semantic indication of a location associated with the first tracked entity (732*a*), such as the "At Work" indication 612*c* in FIG. 6D. For example, if the current or last known location of the first tracked entity corresponds to a known, labeled location for the electronic device (e.g., home, work, school, gym, etc. locations indicated in the past by the user for the location), the widget for the tracked entity includes that semantic label. In some embodiments, the widget for the tracked entity does not include non-semantic information for the location (e.g., when the tracked entity is at a labeled location, the widget includes the label rather than an address, and when the tracked entity is at a non-labeled location, the widget includes the address for that location rather than a label). The above-described manner of displaying a semantic indication of the location of the tracked entity provides a quick and efficient manner of conveying that the tracked entity is at a location known to the device and/or user, which simplifies the interaction between the user and the electronic device and enhances the operability of the electronic device and makes the user-device interface more efficient (e.g., by avoiding unnecessary interactions with the device or tracked entity based on incorrect location information), which additionally reduces power usage and improves battery life of the electronic device by enabling the user to use the electronic device more quickly and efficiently.

In some embodiments, the first representation of the first tracked entity includes a generic indication of a location associated with the first tracked entity (734*a*), such as the "At Coliseum" indication 612*c* in FIG. 6E. For example, if the current or last known location of the first tracked entity corresponds to a known, labeled location for the electronic device (e.g., a landmark, etc. location indicated in map data accessible to the electronic device, not necessarily provided by the user of the electronic device, such as "bridge" or "Eiffel Tower"), the widget for the tracked entity includes that generic label. In some embodiments, the widget for the tracked entity does not include non-generic information for the location (e.g., when the tracked entity is at a generic location, the widget includes the generic label rather than an address, and when the tracked entity is at a non-generic location, the widget includes the address for that location rather than a generic label). The above-described manner of displaying a generic indication of the location of the tracked entity provides a quick and efficient manner of conveying that the tracked entity is at a location known to the device and/or user, which simplifies the interaction between the user and the electronic device and enhances the operability of the electronic device and makes the user-device interface more efficient (e.g., by avoiding unnecessary interactions with the device or tracked entity based on incorrect location information), which additionally reduces power usage and improves battery life of the electronic device by enabling the user to use the electronic device more quickly and efficiently.

In some embodiments, the first representation of the first tracked entity includes a visual indication of a time zone associated with a location associated with the first tracked entity (736*a*), such as the "Pacific Time Zone" indication in FIG. 6F. For example, if the tracked entity is at a location within the Pacific Time Zone, the widget for the tracked entity includes an indication of "Pacific Time Zone," or if the tracked entity is at a location within the Eastern Time Zone, the widget for the tracked entity includes an indication of "Eastern Time Zone." The above-described manner of displaying time zone information provides a quick and efficient manner of conveying the likelihood of the availability of the tracked entity for communications or other interactions, which simplifies the interaction between the user and the electronic device and enhances the operability of the electronic device and makes the user-device interface more efficient (e.g., by avoiding unnecessary interactions with the device or tracked entity based on incorrect availability information), which additionally reduces power usage and improves battery life of the electronic device by enabling the user to use the electronic device more quickly and efficiently.

In some embodiments, the first representation of the first tracked entity includes a visual indication of an amount of time the first tracked entity has been located at a current location associated with the first tracked entity (738*a*), such as indication 612*d* in FIG. 6E. For example, if the tracked entity has been at its current or last known location (or within a threshold distance of that location, such as 1, 3, 5, 10, 20, 30, 50, 100, 200, 400 feet) for the last 5 minutes, the widget for the tracked entity includes an indication such as "for 5 minutes", or if the tracked entity has been at its current or last known location (or within a threshold distance of that location, such as 1, 3, 5, 10, 20, 30, 50, 100, 200, 400 feet) for the last 2 hours, the widget for the tracked entity includes an indication such as "since 12 pm" (if the current time is 2 pm). In some embodiments, the widget for the tracked entity only includes such an indication if the tracked entity has been at its current or last known location for at least a predetermined length of time (e.g., 5, 10, 20, 30, 60, 120 minutes). The above-described manner of displaying time information provides a quick and efficient manner of conveying how long the tracked entity has been at its current location and/or the likelihood of when/if the tracked entity will soon change locations, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first tracked entity is an entity whose status is temporarily shared with the electronic device (740*a*), such as item C in FIG. 6J (e.g., the tracked entity is a second user, different from the user of the electronic device, or remote locator object associated with the second user that the second user has designated to share location and/or status with the electronic device for a temporary time period, such as 5, 10, 20, 60, 120 minutes, 1, 2, 4, 5, 10 days, etc.). In some embodiments, the electronic device detects that the status of the first tracked entity is no longer shared with the electronic device (740*b*), such as detecting that item C in FIG. 6J is no longer shared with device 500 (e.g., because the temporary time period has expired, or because the second user has revoked status/location sharing). In some embodiments, in response to detecting that the status of the first tracked entity is no longer shared with the electronic device, the electronic device ceases (740*c*) display of the status of the first tracked entity in the first representation of the first tracked entity, such as shown in widget 606*a* in FIG. 6L. In some embodiments, the electronic device continues to display the widget for the first tracked entity, but the widget includes an indication that the first tracked entity is no longer available for tracking. In some embodiments, if the first tracked entity subsequently becomes available for tracking again (e.g., because the second user has again temporarily granted tracking access to the electronic device), the widget for the first tracked entity is updated to indicate tracking information for the first tracked entity. The above-described manner of displaying temporarily shared entity information in the widget provides a quick and efficient manner of conveying tracking information even for temporarily shared entities, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

Figure 6U:
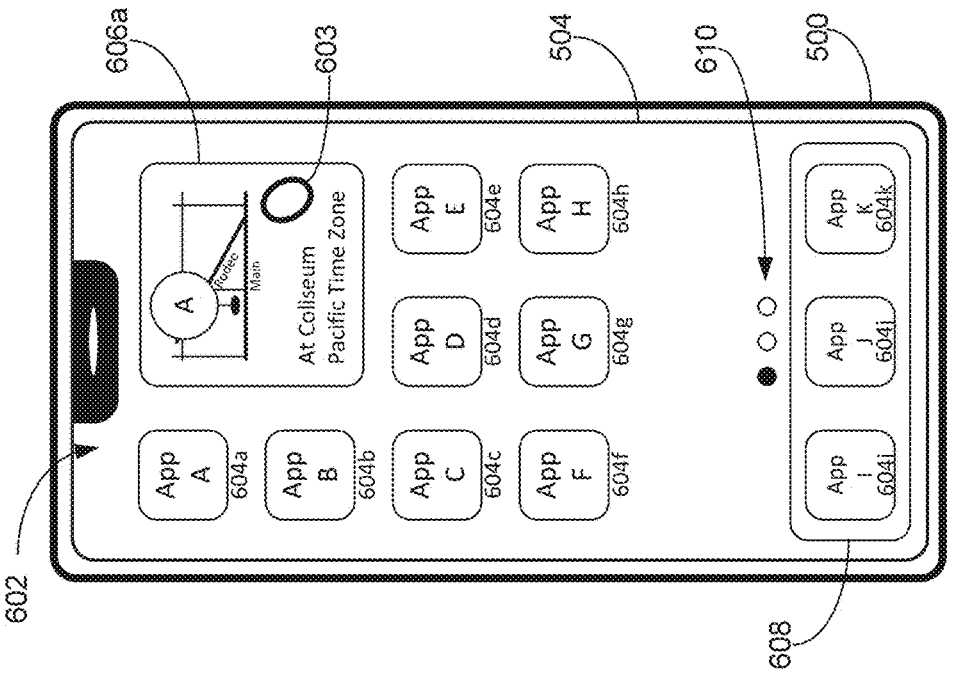
Figure 6X:
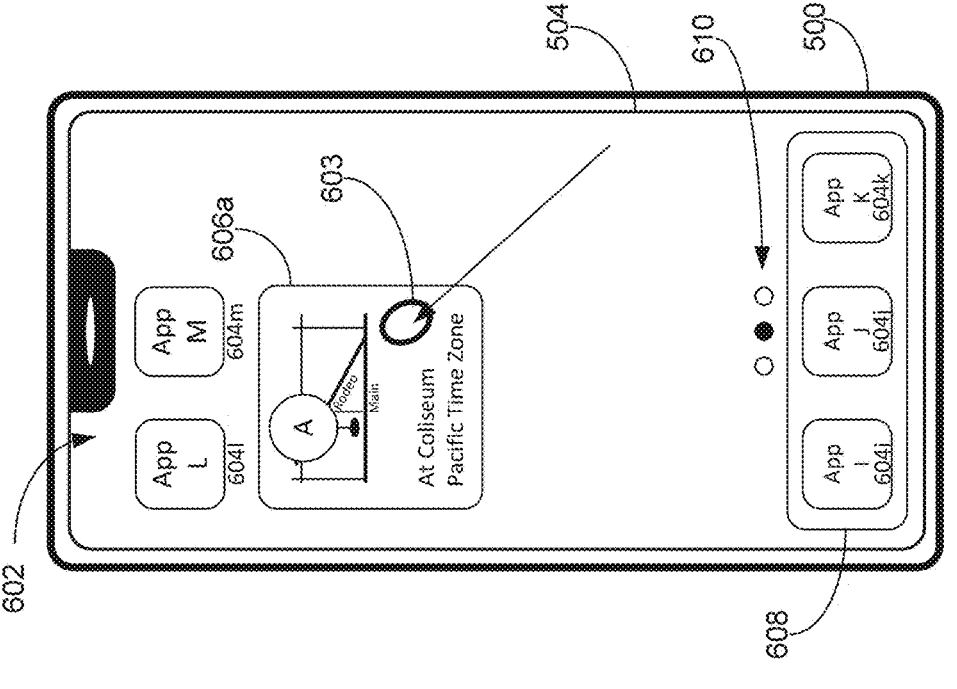

In some embodiments, the first input includes a first portion from a predefined portion of a user of the electronic device, followed by movement of the predefined portion of the user (742*a*), such as the input from contact 603 in FIGS. 6U-6T (e.g., a tap on the widget and subsequent drag by a finger of a user of the electronic device in the case of a touch screen display, or a pinch of two fingers of the user followed by movement of the hand of the user while the fingers remain pinched in the case of a hover or spatial detection-capable input system), and the operation associated with the first representation of the first tracked entity includes repositioning the first representation of the first tracked entity on the home screen user interface in accordance with the movement of the predefined portion of the user (742*b*), such as shown in FIGS. 6U-6T. For example, the widget for the first tracked entity can be repositioned on the home screen user interface in response to user input. In some embodiments, other widgets (e.g., widgets for other applications installed on the electronic device that are also displayed on the home screen user interface) can similarly be repositioned on the home screen user interface in response to similar/the same inputs directed to those widgets. The above-described manner of repositioning the widget provides a quick and efficient manner of arranging elements on the home screen user interface, including the widget for the tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

Figure 6W:
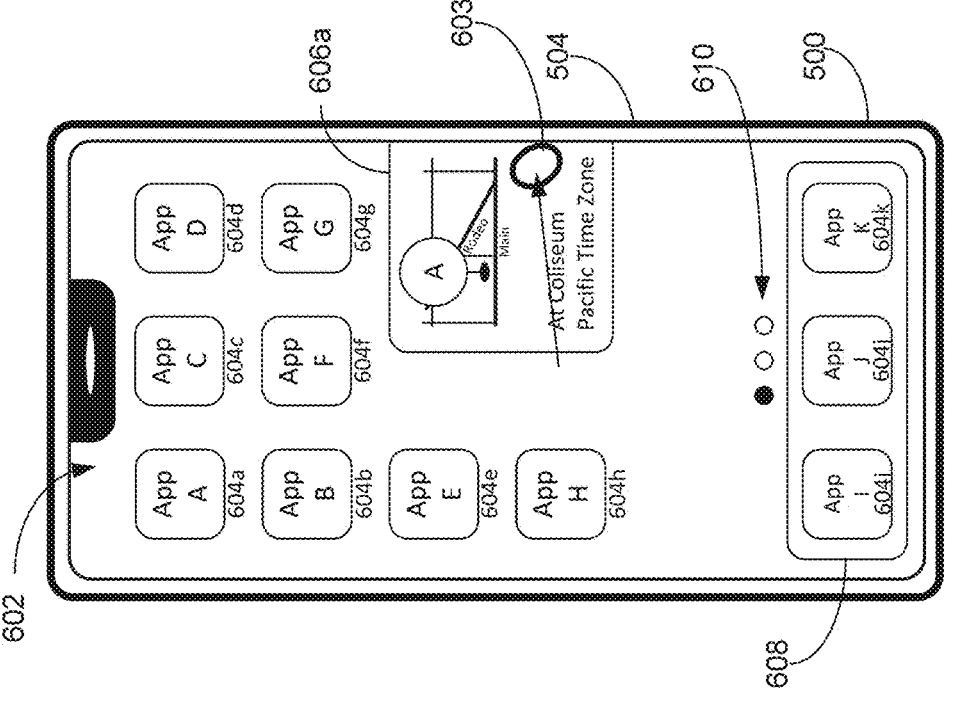
Figure 6Z:
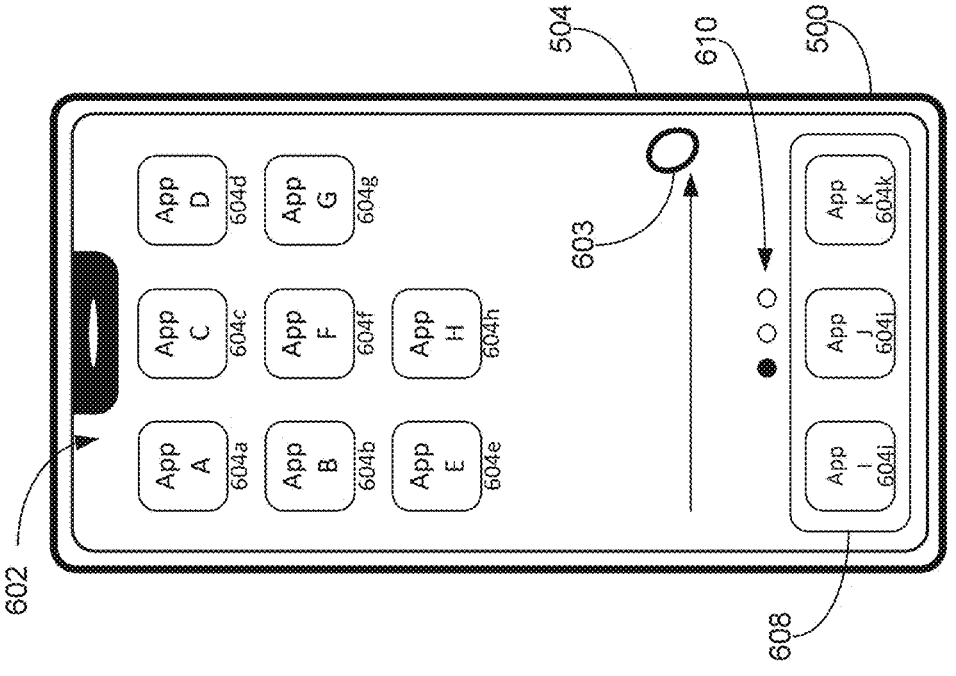
Figure 6Y:
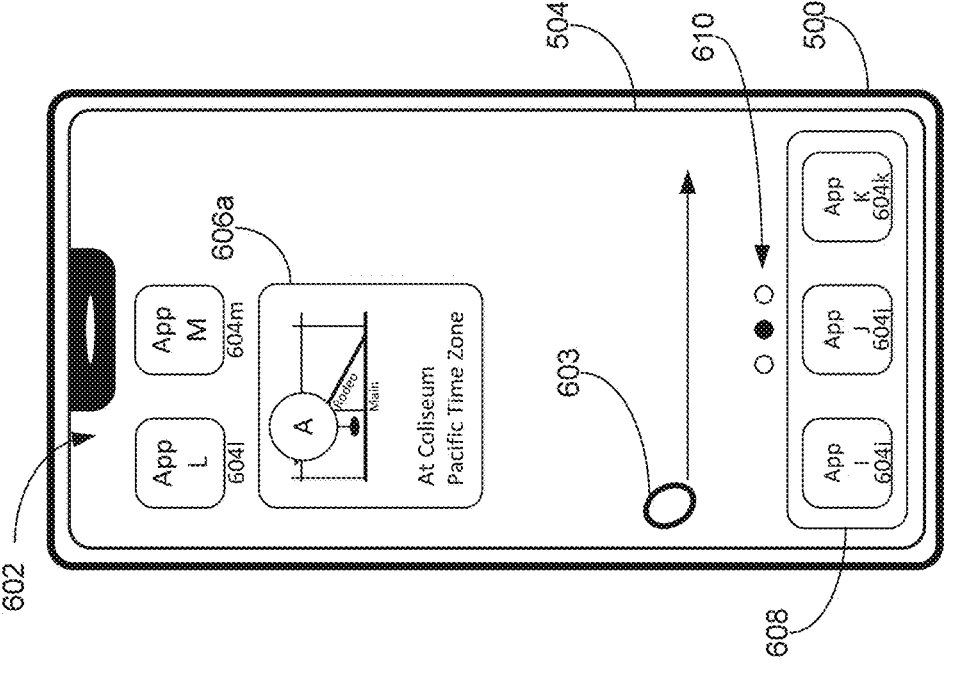
Figure 6A:
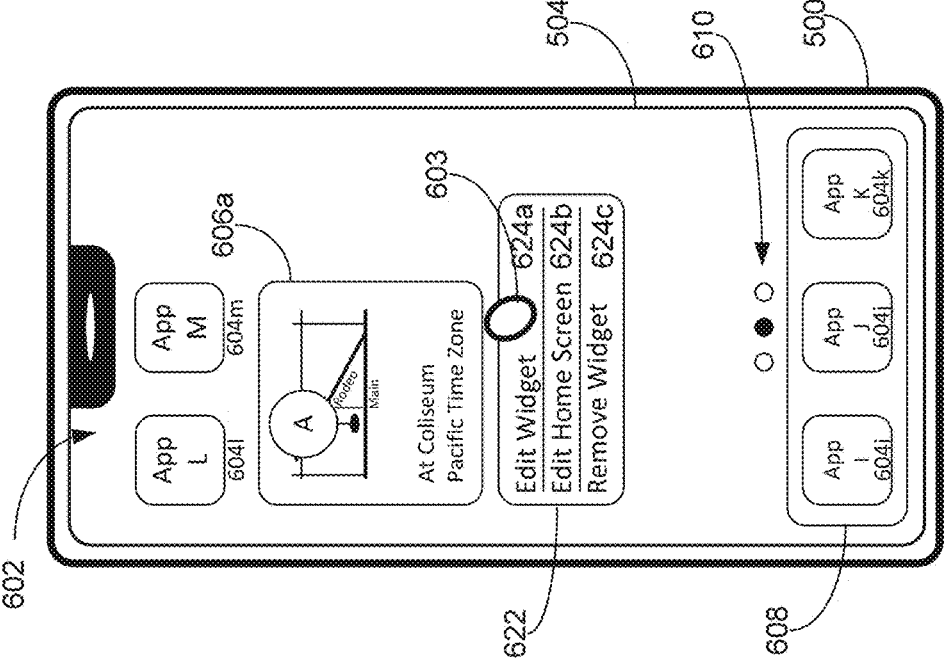
Figure 6A:
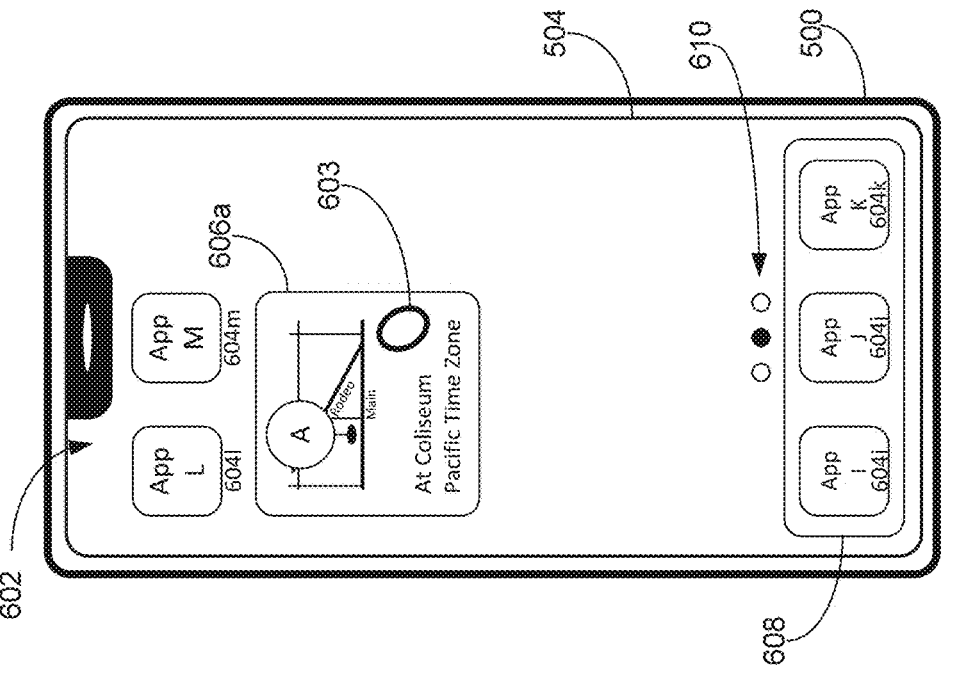
Figure 6A:
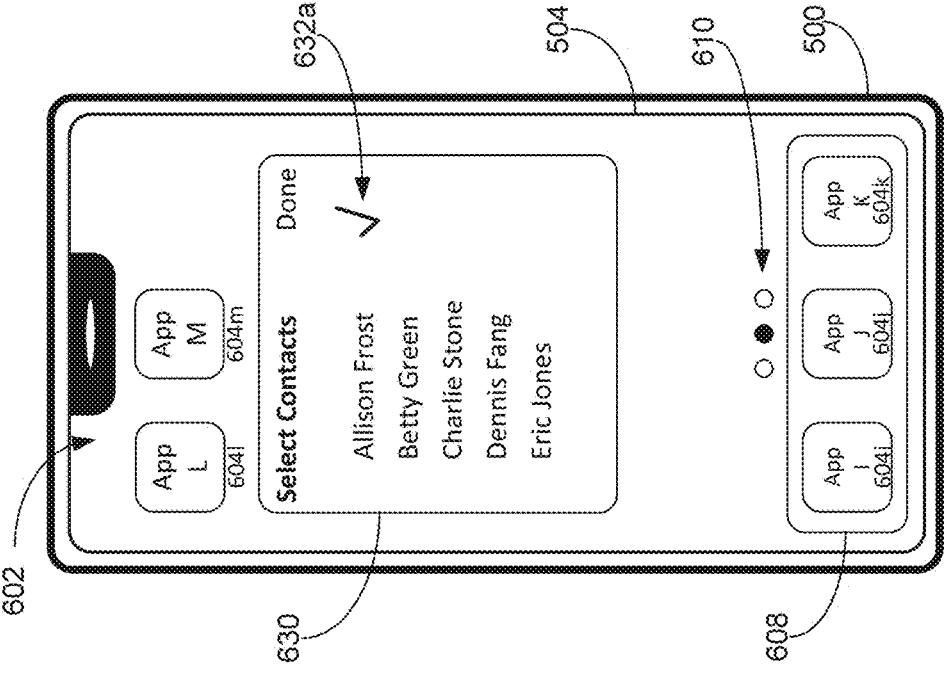
Figure 6A:
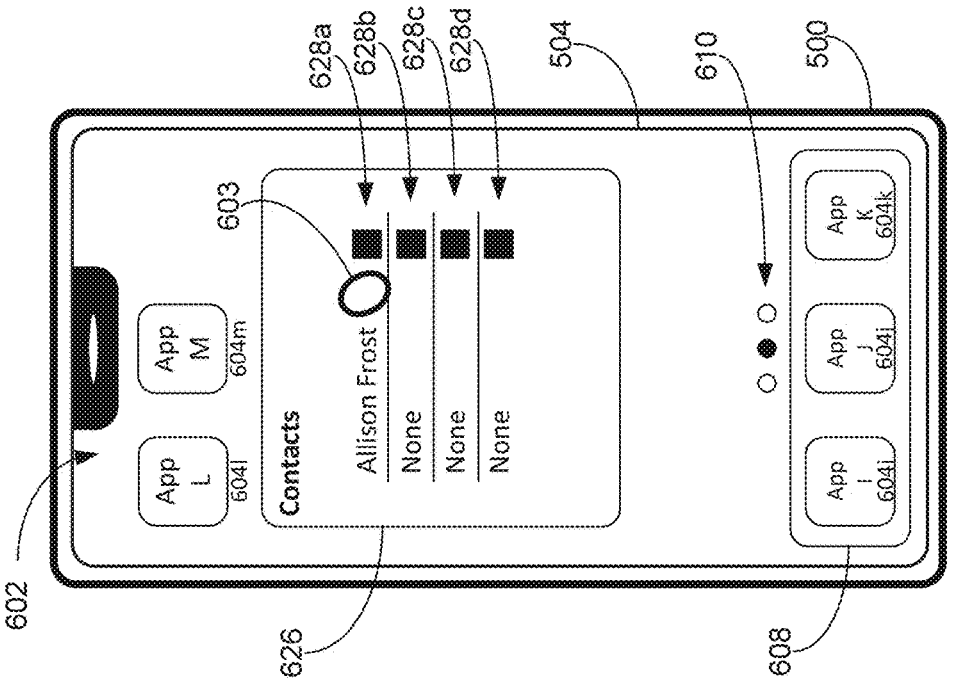
Figure 6A:
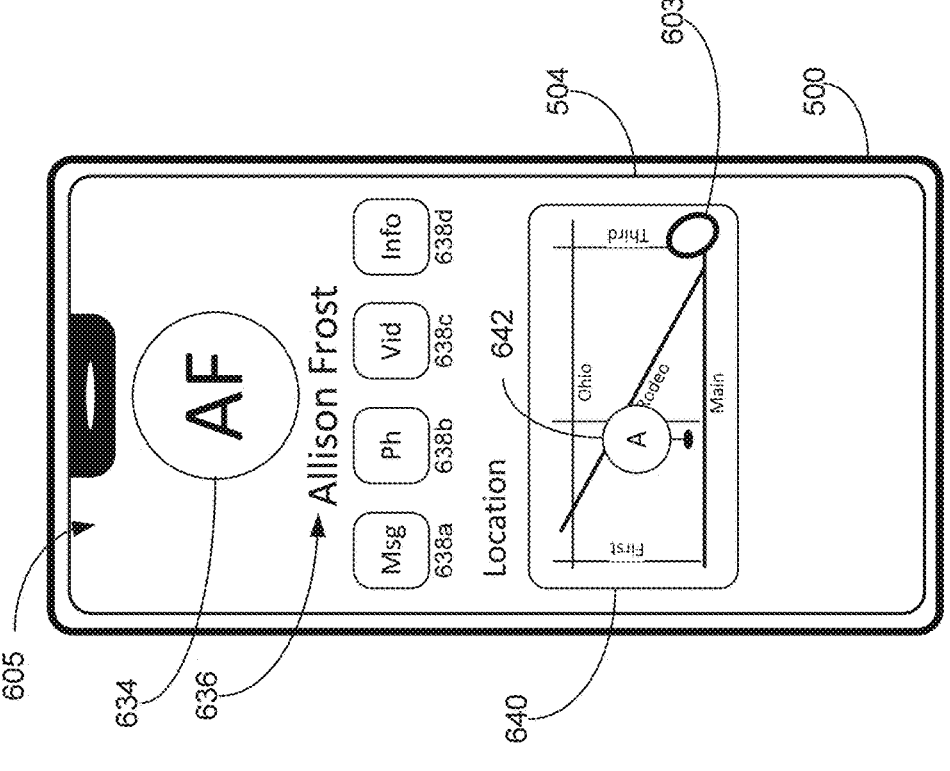
Figure 6A:
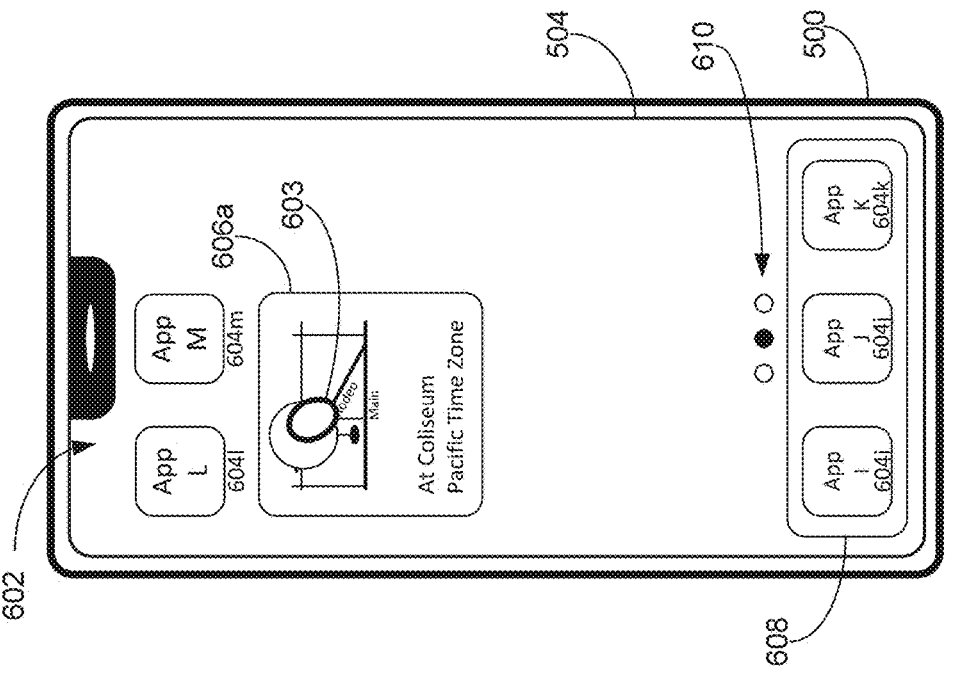
Figure 6A:
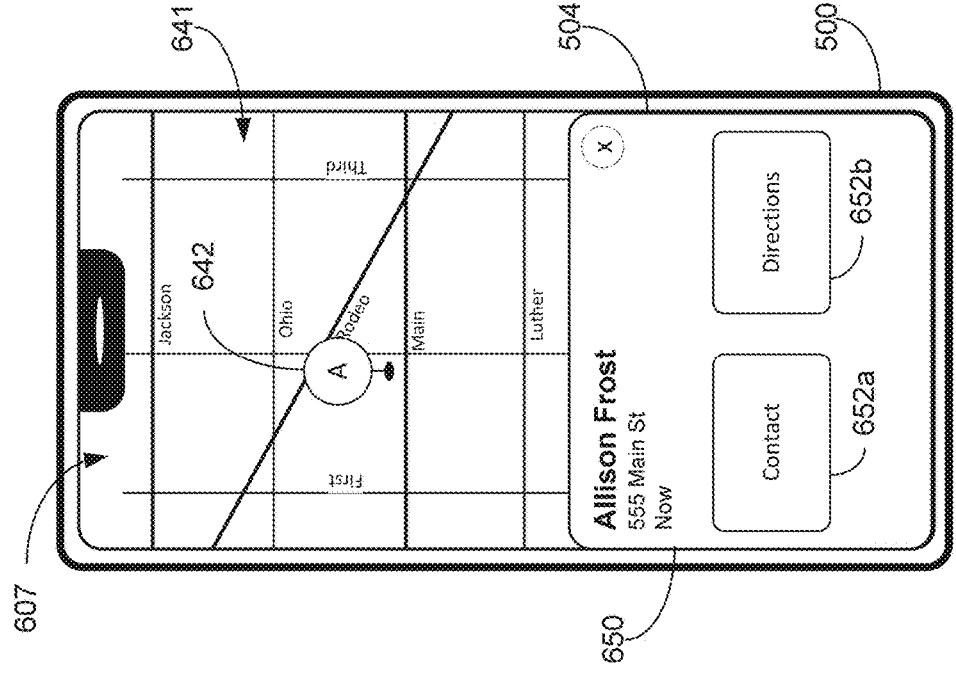
Figure 7C:
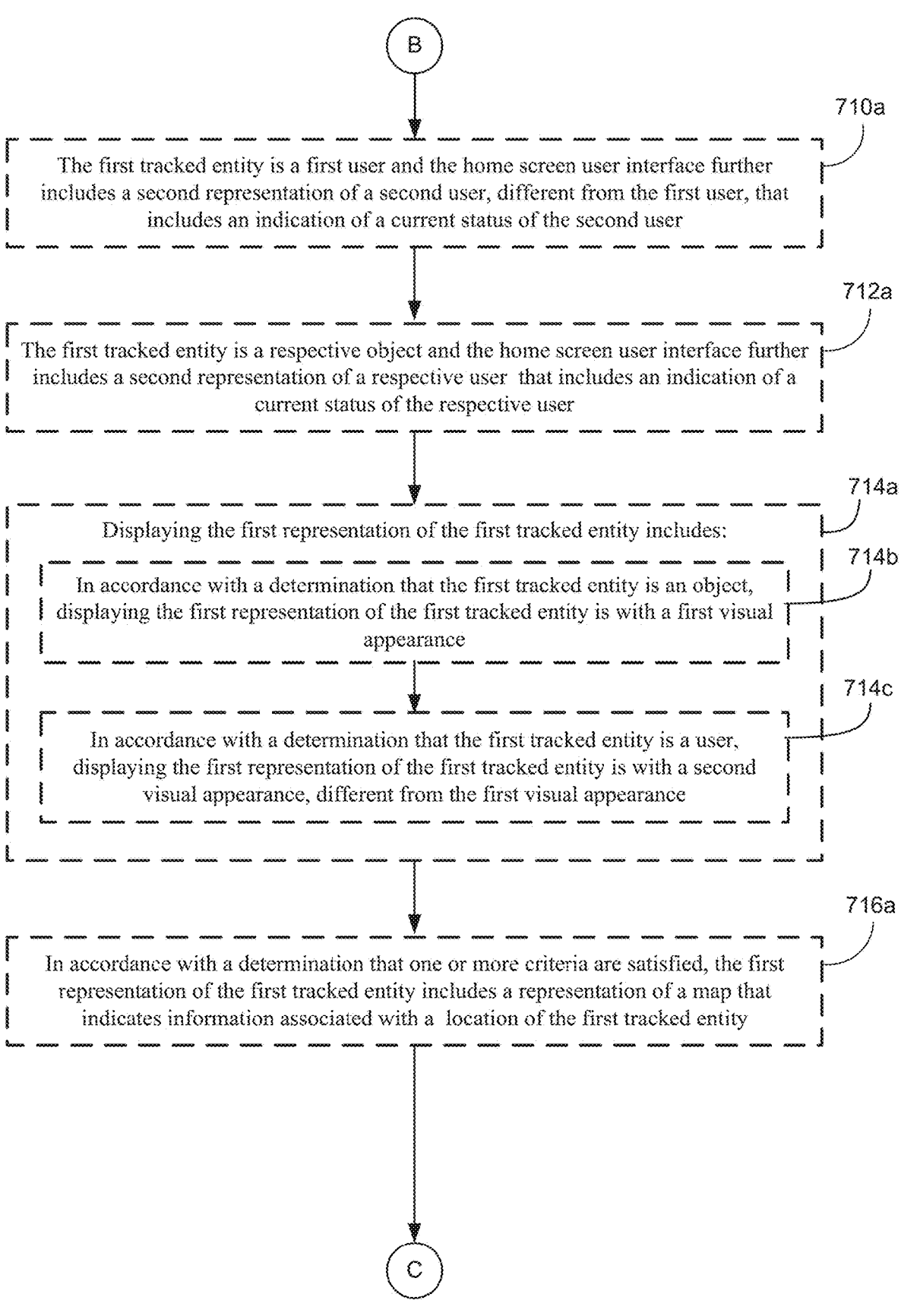
Figure 7E:
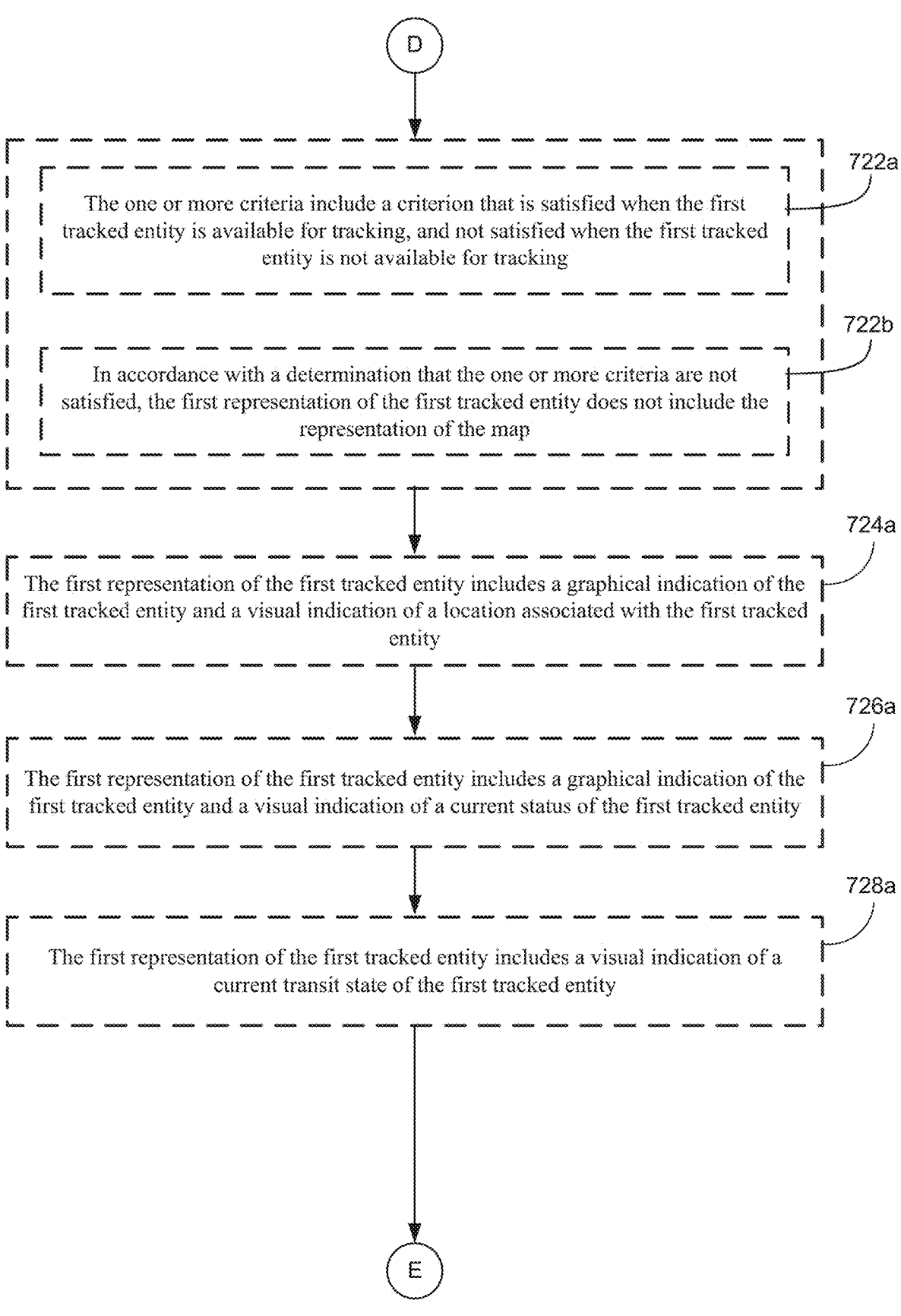
Figure 7F:
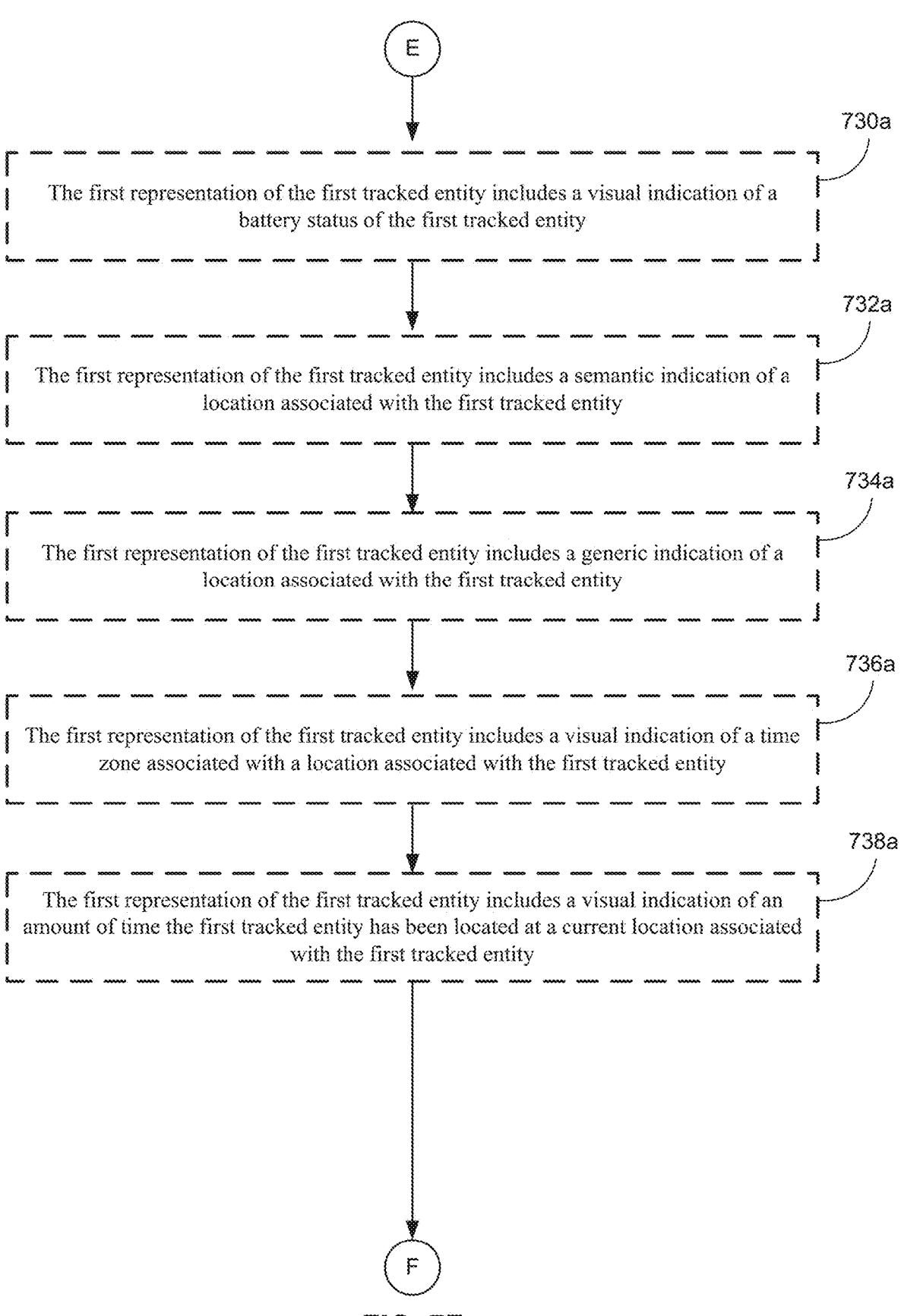
Figure 7G:
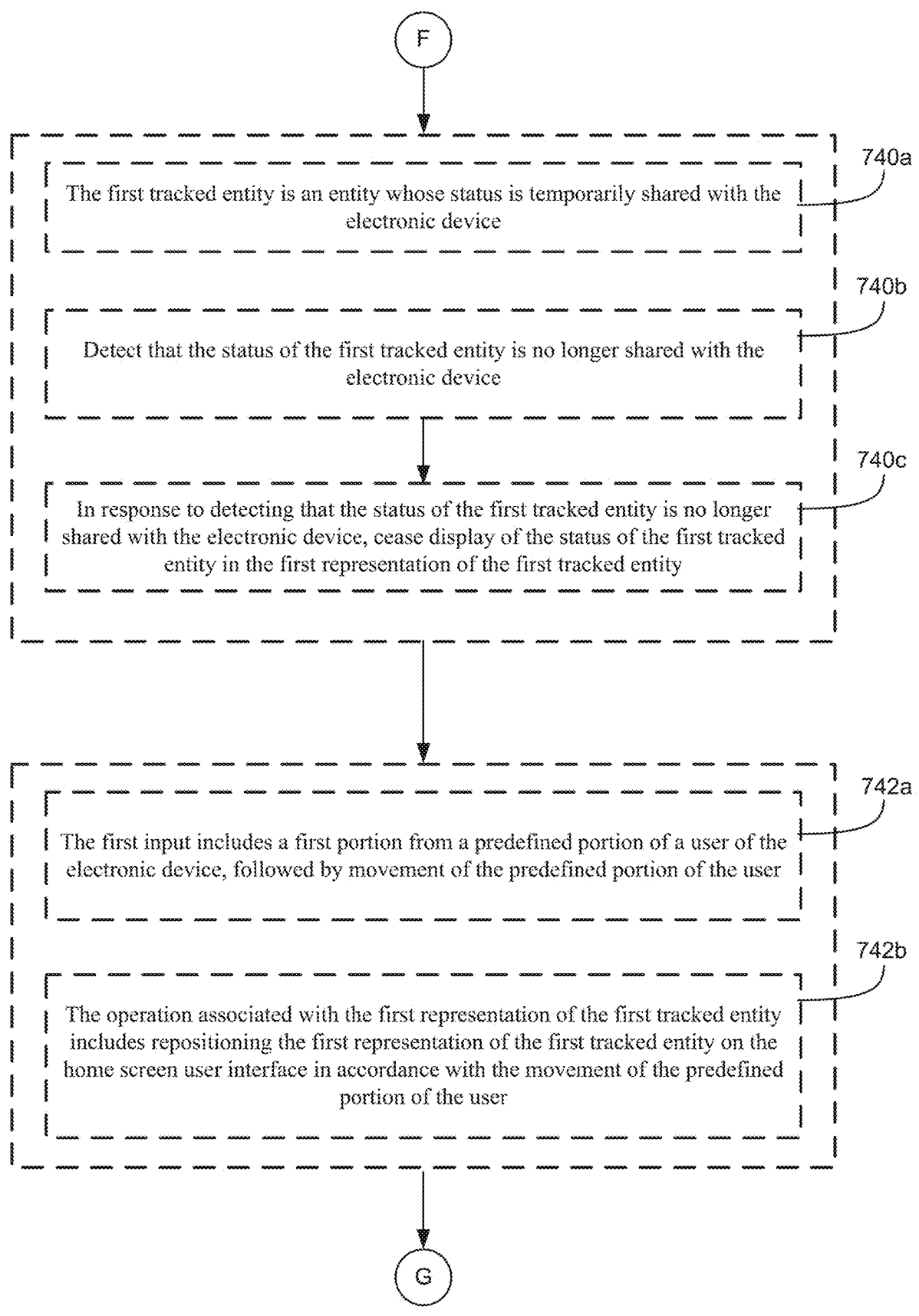
Figure 7H:
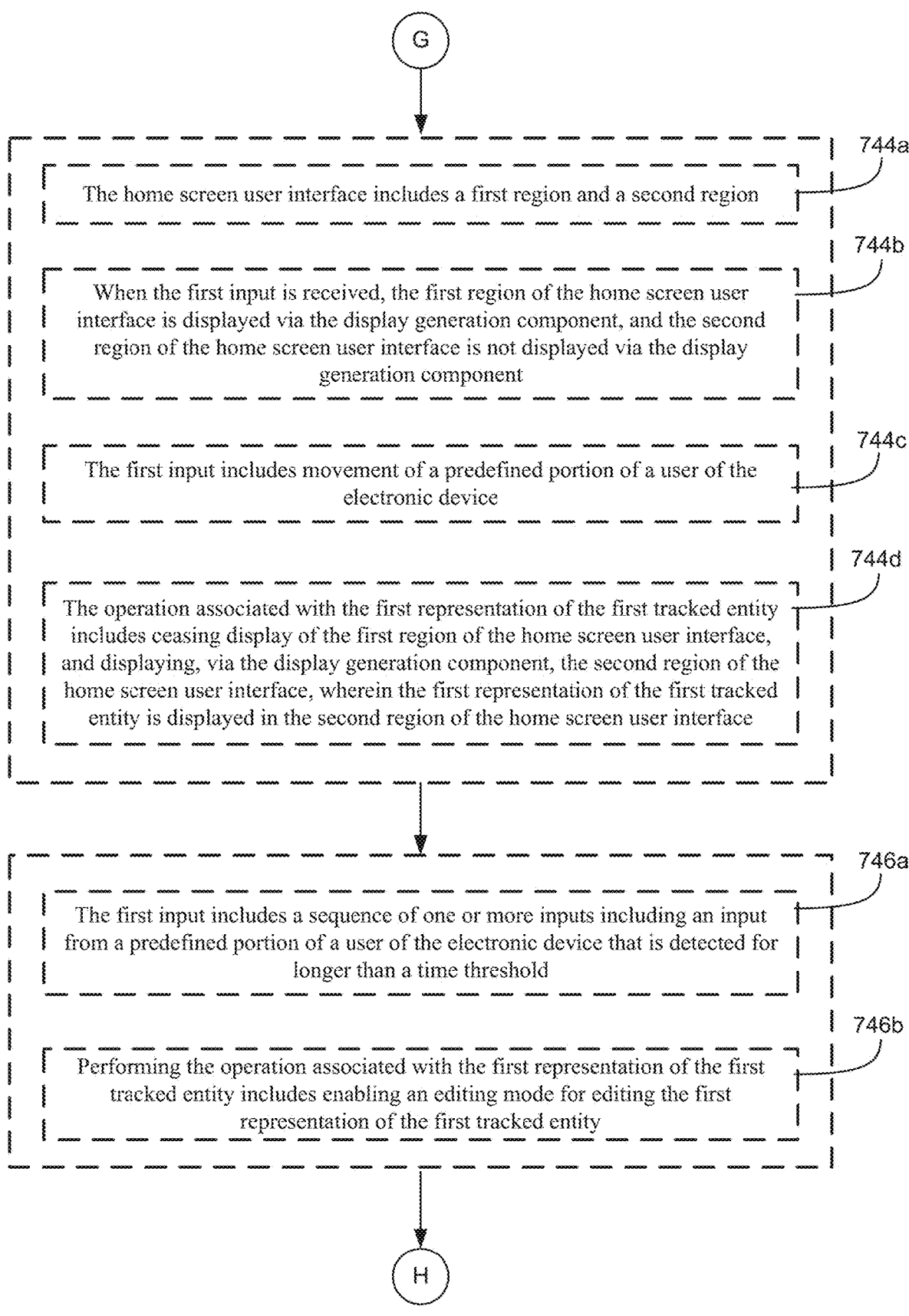

In some embodiments, the home screen user interface includes a first region and a second region (744*a*), such as shown in FIGS. 6W-6X (e.g., a first page of the home screen user interface that can include one or widgets and/or one or more application icons, and a second page of the home screen user interface that can include one or more widgets and/or one or more application icons), when the first input is received, the first region of the home screen user interface is displayed via the display generation component, and the second region of the home screen user interface is not displayed via the display generation component (744*b*), such as shown in FIG. 6W (e.g., the electronic device was displaying the first page of the home screen, including its one or widgets and/or one or more application icons, and not displaying a second page of the home screen including its one or widgets and/or one or more application icons. In some embodiments, the widget for the first tracked entity at the time the first input was received was included in the first page of the home screen but not the second page of the home screen). In some embodiments, the first input includes movement of a predefined portion of a user of the electronic device (744*c*), such as the movement of contact 603 in FIGS. 6W-6X (e.g., a tap on the widget and subsequent drag by a finger of a user of the electronic device in the case of a touch screen display, or a pinch of two fingers of the user followed by movement of the hand of the user while the fingers remain pinched in the case of a hover or spatial detection-capable input system), and the operation associated with the first representation of the first tracked entity includes ceasing display of the first region of the home screen user interface, and displaying, via the display generation component, the second region of the home screen user interface, wherein the first representation of the first tracked entity is displayed in the second region of the home screen user interface (744*d*), such as shown in FIG. 6X. For example, dragging the widget for the first tracked entity to an edge of the first page of the home screen user interface optionally causes the device to cease displaying the first page, and start displaying the second page of the home screen user interface. Further, the widget for the first tracked entity is optionally no longer included in the first page of the home screen user interface, but is included in the second page of the home screen user interface. The above-described manner of moving the widget between home screen pages provides a quick and efficient manner of arranging elements on different pages of the home screen user interface, including the widget for the tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input includes a sequence of one or more inputs including an input from a predefined portion of a user of the electronic device that is detected for longer than a time threshold (746*a*), such as the tap and hold input from contact 603 in FIG. 6AA (e.g., a tap on the widget and holding of the tap for longer than a time threshold (e.g., 0.2, 0.5, 1, 2, 3, 5, 10 seconds) in the case of a touch screen display, or a pinch of two fingers of the user of the electronic device directed to the widget, and holding of the pinch for longer than the time threshold in the case of a hover or spatial detection-capable input system. In some embodiments, the sequence of inputs also includes selecting an "edit widget" button that is displayed in response to the tap and hold input directed to the widget). In some embodiments, performing the operation associated with the first representation of the first tracked entity includes enabling an editing mode for editing the first representation of the first tracked entity (746*b*), such as shown in FIGS. 6AB-6AC. For example, the operation includes displaying a menu adjacent to the widget for the tracked entity that includes an option that is selectable to change the tracked entity whose tracking information is displayed in the widget, an option that is selectable to reposition the widget on the home screen user interface, and an option that is selectable to remove the widget from the home screen user interface. The above-described manner of enabling the editing mode provides a quick and efficient manner of changing one or more characteristics of the widget for the tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, enabling the editing mode for editing the first representation of the first tracked entity includes displaying, via the display generation component, one or more options for associating the first representation with a second tracked entity, different from the first tracked entity (748*a*), such as the list of contacts in user interface 630 in FIG. 6AD. For example, the menu displayed for the widget in the editing mode includes an option that is selectable to change the tracked entity associated with the widget. For example, selection of the option causes the electronic device to display a list of eligible entities (e.g., users and/or objects) whose tracking information can be displayed in the widget. Selection of one or more of those entities optionally causes the widget to display tracking information for those selected one or more entities (e.g., instead of the first tracked entity). One or more aspects of selecting one or more entities to be associated with the widget optionally have one or more characteristics of such selecting described with reference to methods 900 and/or 1300. The above-described manner of providing options for potential tracked entities provides a quick and efficient manner of designating one or more entities for the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first input corresponds to an input selecting the first representation of the first tracked entity (750*a*), such as via contact 603 in FIG. 6AE (e.g., a tap and release on the widget and in the case of a touch screen display, or a pinch and release of two fingers of the user directed to the widget in the case of a hover or spatial detection-capable input system), and performing the operation associated with the first representation of the first tracked entity includes displaying, via the display generation component, tracking information for the first tracked entity (750*b*), such as shown in FIG. 6AF and/or 6AG (e.g., including tracking information not displayed in the widget). For example, in response to detecting selection of the widget, the electronic device displays a user interface of a location tracking application installed on the electronic device, and ceases display of the widget and/or the home screen user interface. In some embodiments, the user interface of the location tracking application includes location information for the first tracked entity (e.g., and does not include location information for other entities tracked by the electronic device and accessible via the location tracking application), such as a map indicating a location of the first tracked entity, a distance of the first tracked entity from the electronic device, a selectable option that is selectable to cause the first tracked entity to emit an audible sound for locating purposes, and a selectable option that is selectable to cause the electronic device to display information for locating the first tracked entity (e.g., driving direction to the first tracked entity, or information about the distance and/or relative location of the first tracked entity relative to the electronic device). The above-described manner of displaying tracking information for the first tracked entity provides a quick and efficient manner of accessing additional and/or different tracking information for the first tracked entity, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIGS. 7A-7I have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100 and 1300) are also applicable in an analogous manner to method 700 described above with respect to FIGS. 7A-7I. For example, the display of information and/or status for tracked entities described above with reference to method 700 optionally has one or more of the characteristics of the display of information and/or status for users or groups of users described herein with reference to other methods described herein (e.g., methods 900, 1100 and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5H) or application specific chips. Further, the operations described above with reference to FIGS. 7A-7I are, optionally, implemented by components depicted in FIGS. 1A-1B. For example, displaying operations 702*a*, 702*c*, 702*d* and receiving operation 702*e* are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Device Activity Status for Users

Users interact with electronic devices in many different manners. In some embodiments, an electronic device has access to information about the status of one or more users (e.g., contacts of a user of the electronic device). The embodiments described below provide ways in which an electronic device provides indications of the status of such users, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8B:
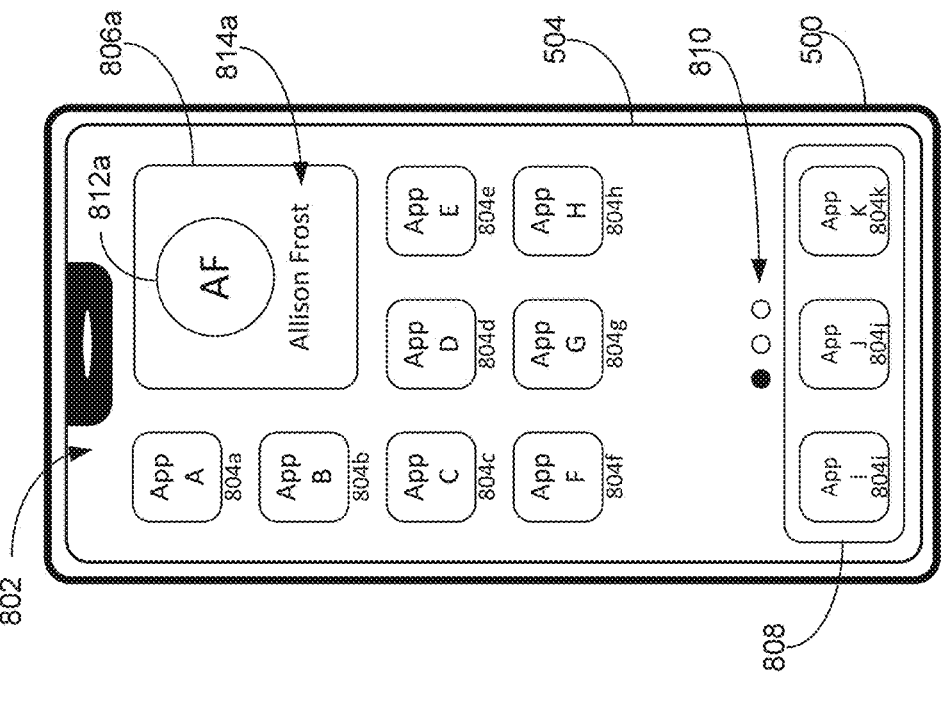
FIGS. 8A-8R illustrate exemplary ways in which an electronic device provides indications of the status of one or more users in accordance with some embodiments of the disclosure
Figure 8A:
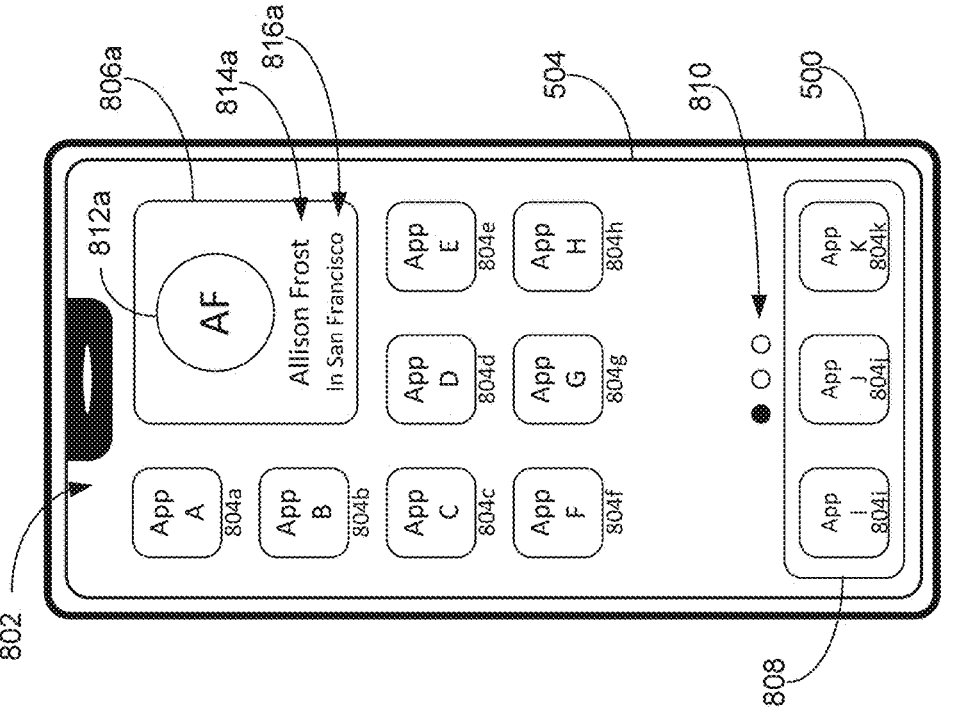
Figure 8D:
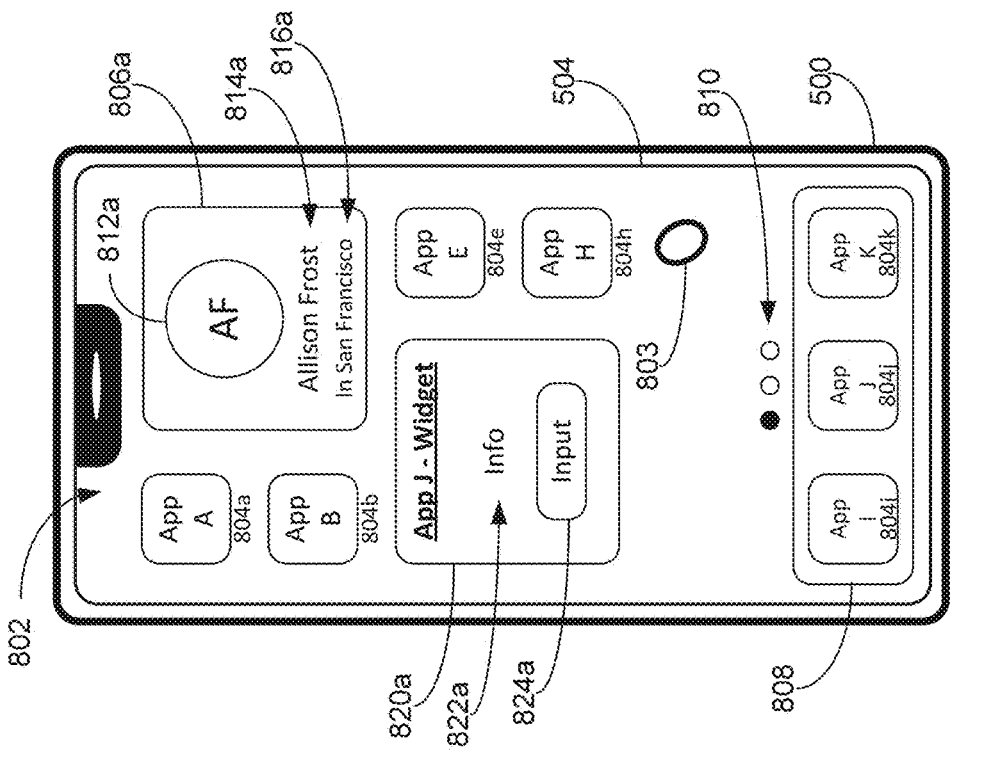
Figure 8C:
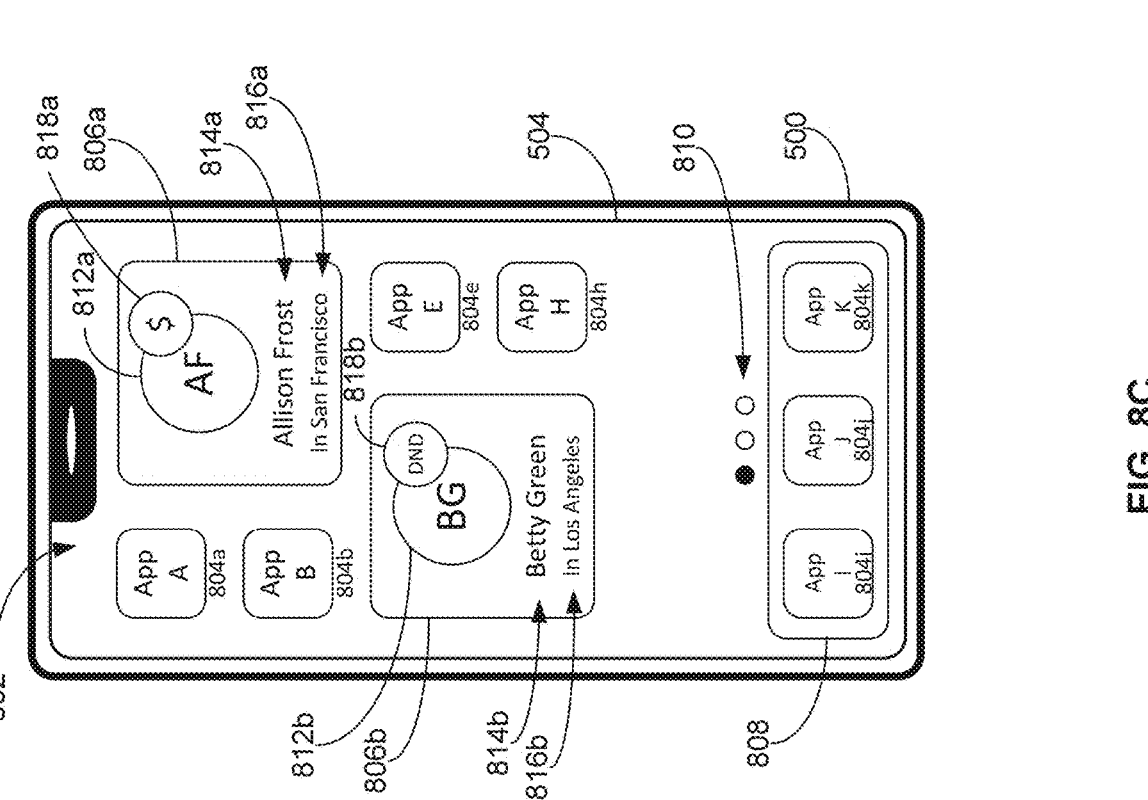
Figure 8F:
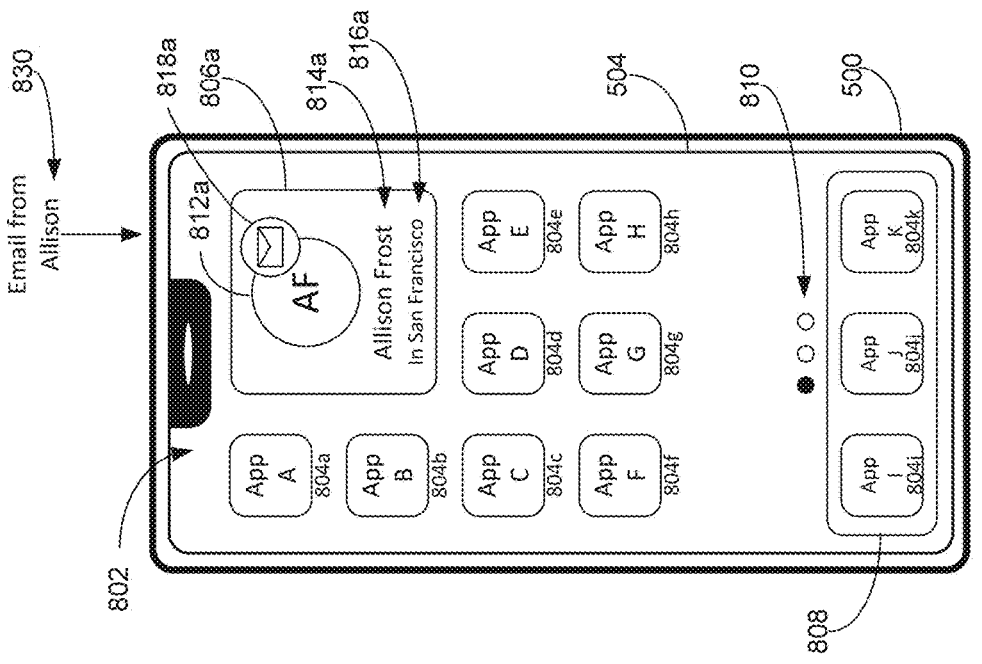
Figure 8E:
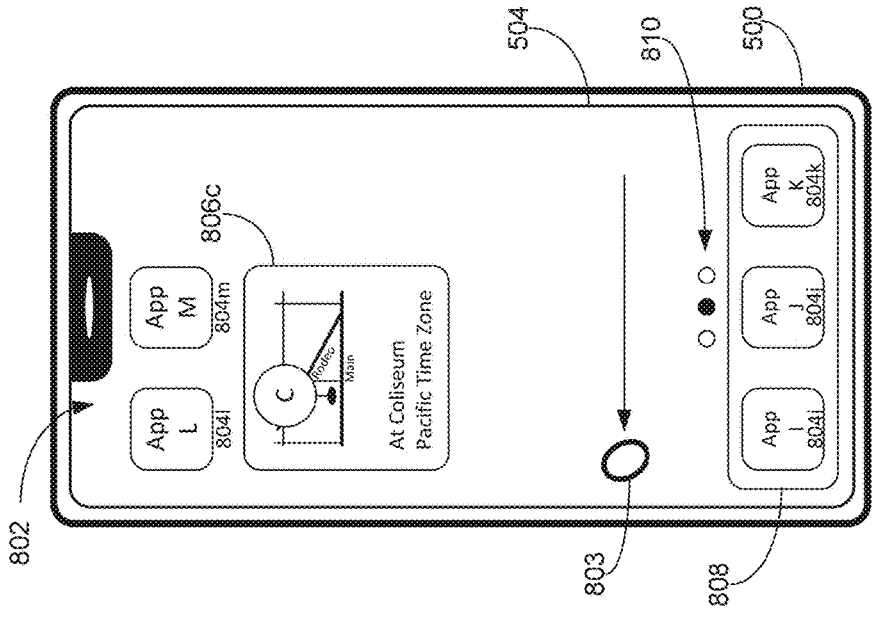
Figure 8H:
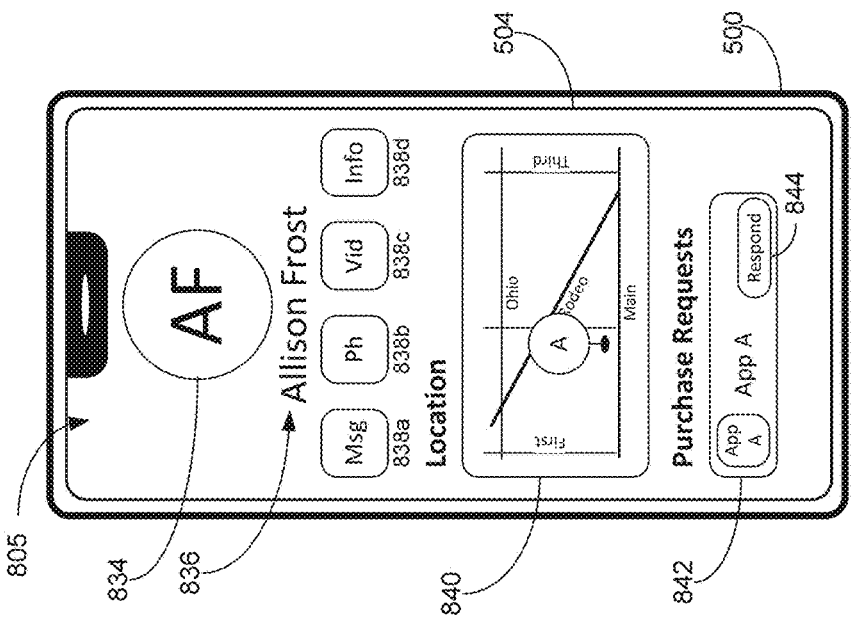
Figure 8G:
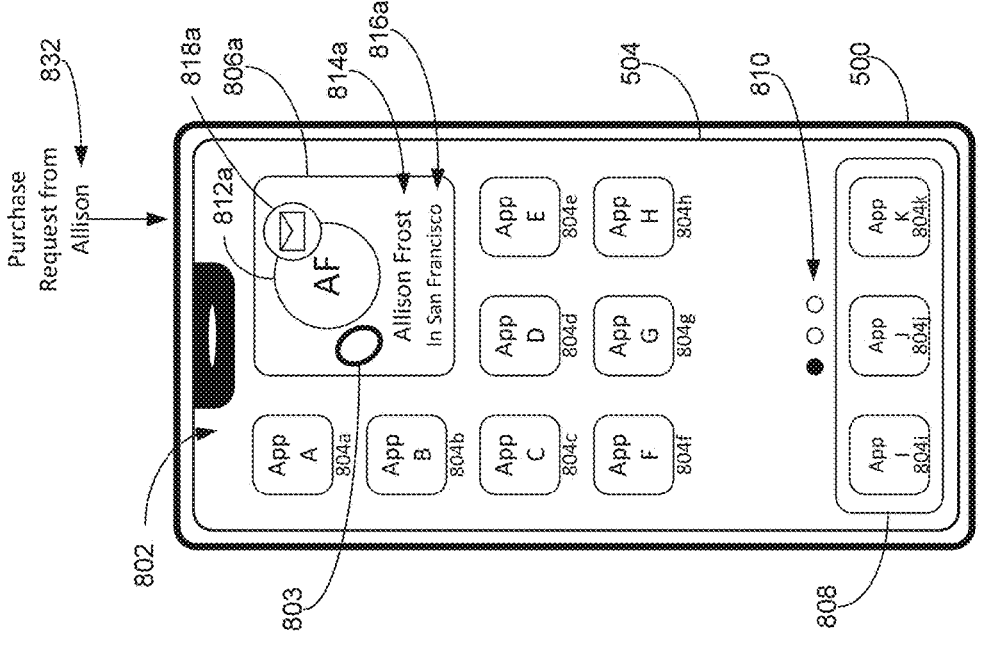
Figure 8J:
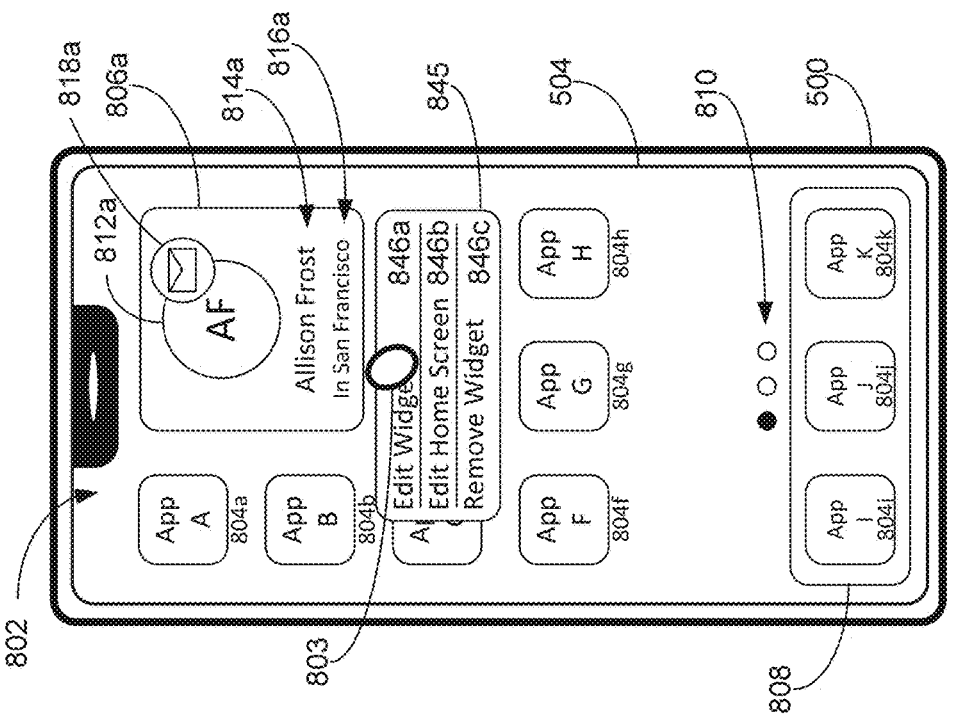
Figure 8I:
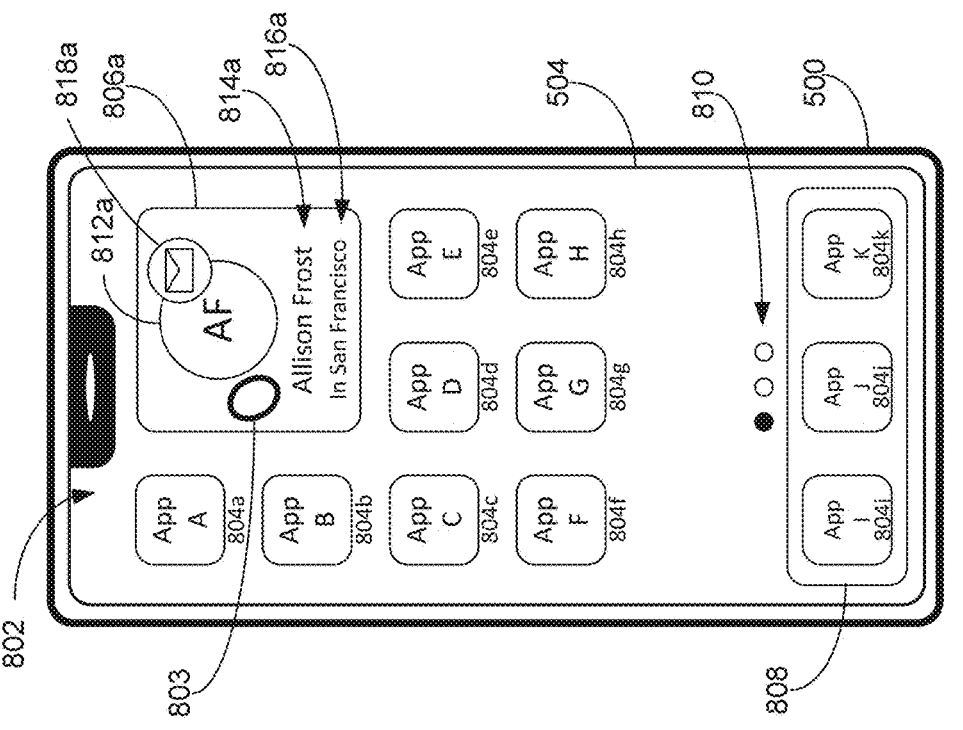
Figure 8L:
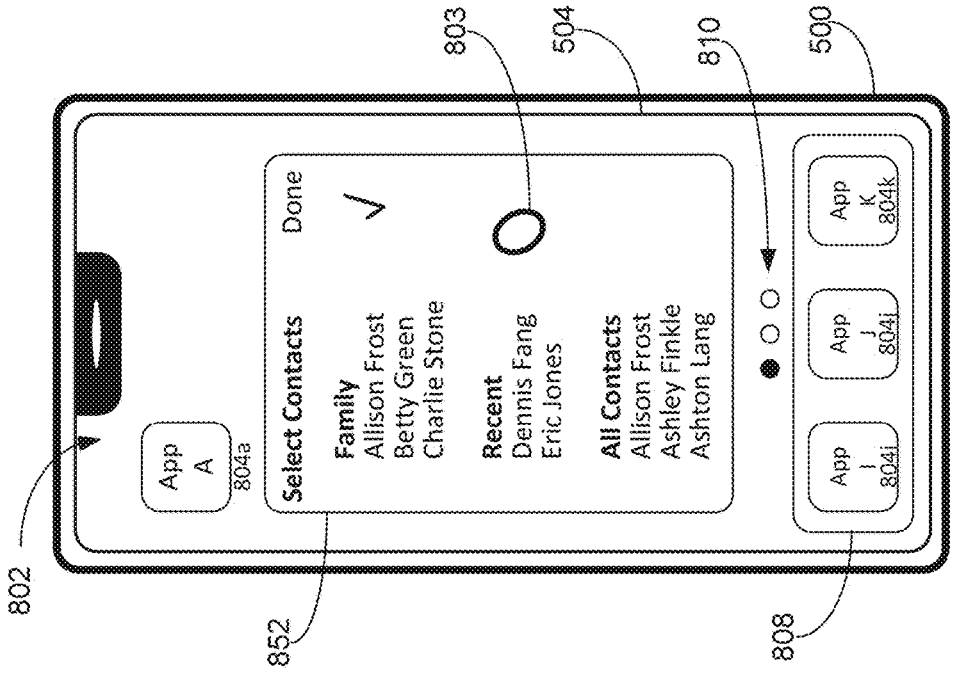
Figure 8K:
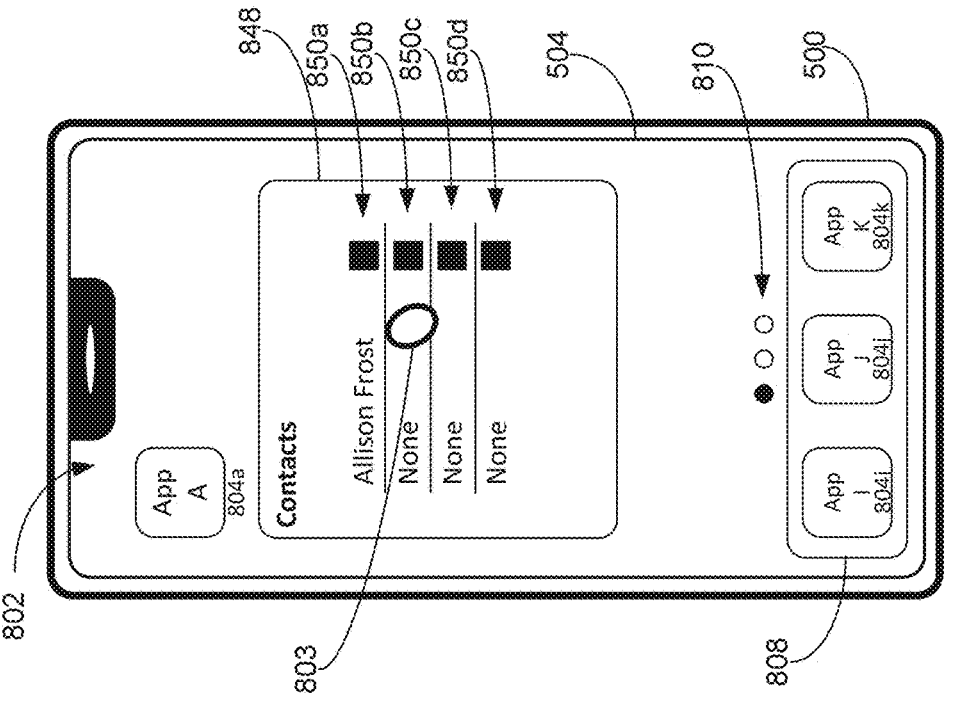
Figure 8N:
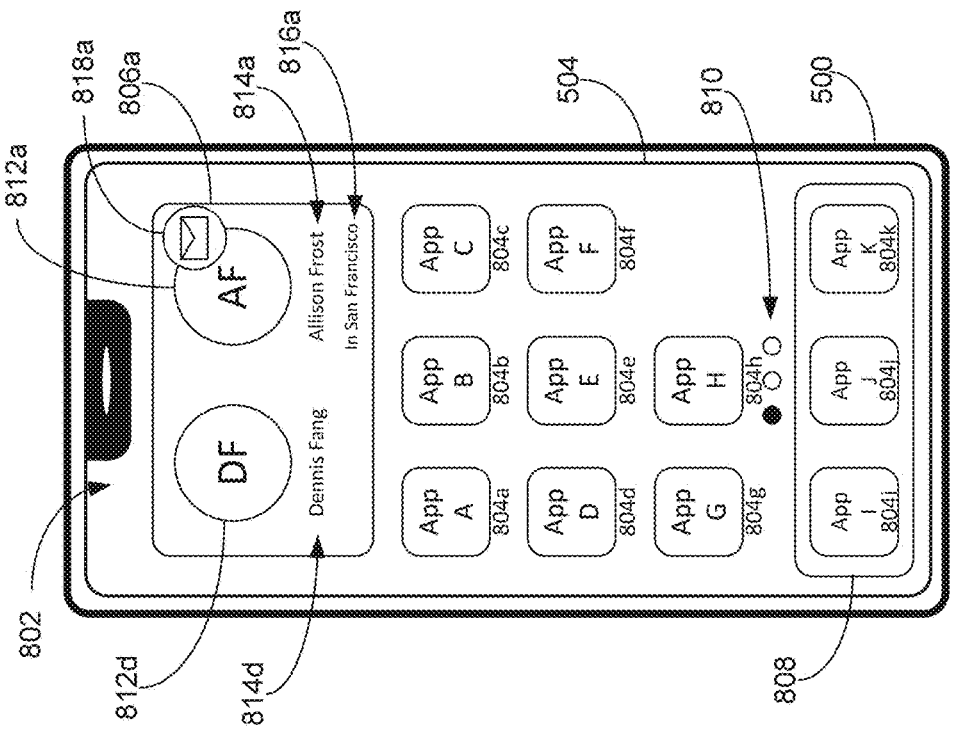
Figure 8M:
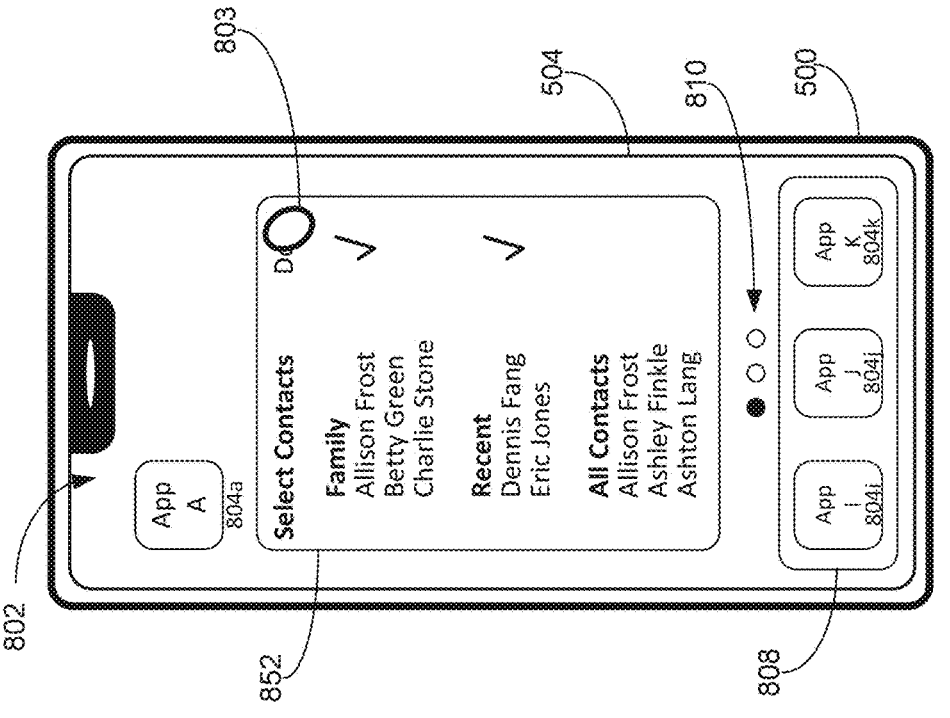
Figure 8P:
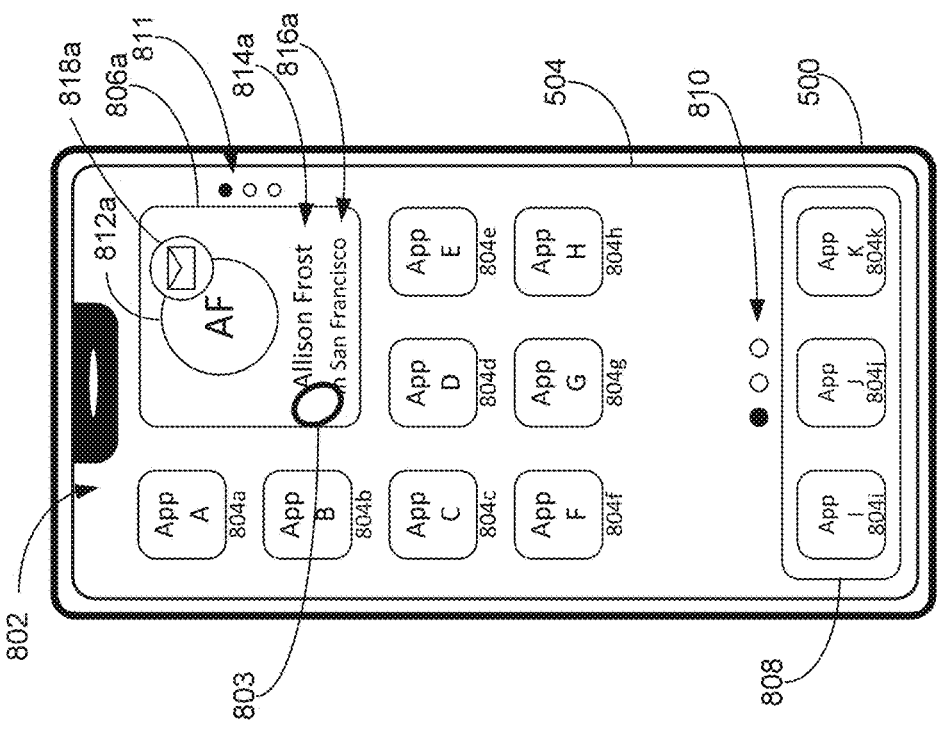
Figure 8O:
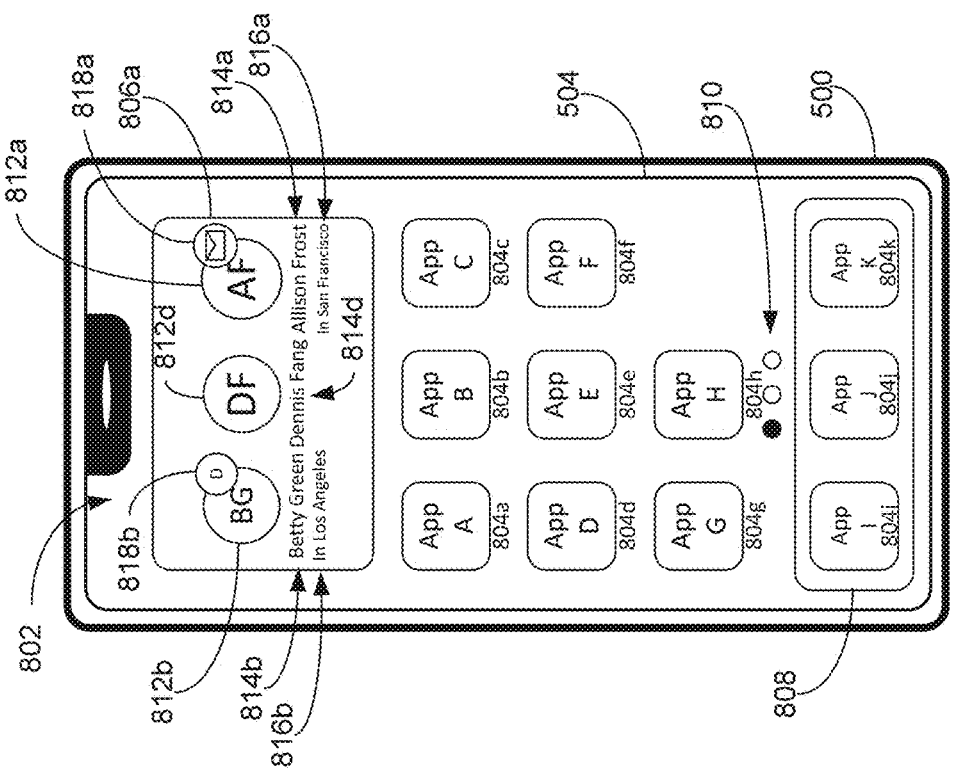
Figure 8R:
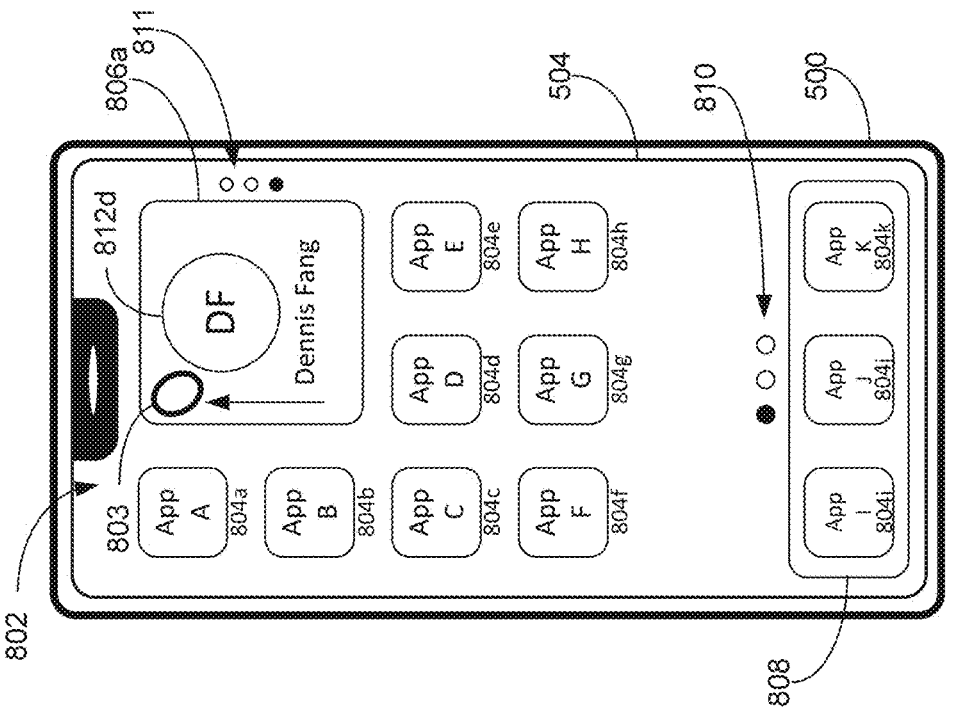

FIGS. 8A-8R illustrate exemplary ways in which an electronic device provides indications of the status of one or more users in accordance with some embodiments of the disclosure. The embodiments in these figures are used to illustrate the processes described below, including the processes described with reference to FIGS. 9A-9J.

FIG. 8A illustrates electronic device 500 displaying user interface 802 (e.g., via a display device, via a display generation component, etc.). In some embodiments, user interface 802 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

User interface 802 in FIG. 8A is a home screen user interface (e.g., as described with reference to FIG. 4A) of device 500. User interface 802 includes application icons 804a-804k that are selectable to cause device 500 to display respective user interfaces of the selected application (e.g., device 500 launches the selected application). User interface 802 is optionally divided into two or more pages, and device optionally displays one page of user interface 802 at a time. For example, in FIG. 8A, device 500 is displaying the first page of user interface 802 (e.g., as indicated by the left-most dot of indicator 810 being filled, and the other two dots of indicator 810 being unfilled). Further, application icons 804i-804k are displayed in dock 808, which is optionally displayed by device 500 regardless of which page of user interface 802 is currently being displayed.

In some embodiments, user interface 802 includes one or more widgets associated with different users. For example, in FIG. 8A, user interface 802 includes widget 806a. Widget 806a is optionally a widget of a contacts or people application that is installed on device 500 that has access to and/or displays information about the status of and/or location of users designated by a user of device 500. For example, a user of device 500 is able to select users whose location and/or status to track using the contacts or people application, and the user of device 500 is able to associate one or more widgets with one or more of those users for inclusion on user interface 802 (or any other user interface of device 500 that can display widgets). Widget 806a (and other widgets associated with users, devices, objects, etc. described herein) optionally has one or more of the characteristics of such widgets described with reference to methods 700, 900, 1100 and/or 1300.

In FIG. 8A, widget 806a is associated with Allison Frost (e.g., a contact of the user of device 500). Widget 806a includes a graphical representation 812a of Allison Frost (e.g., a photo, an avatar, etc.), an indication 814a of the name of Allison Frost and an indication 816a of the current or last known location for Allison Frost. In some embodiments, if the location of Allison Frost is not available to device 500 (e.g., because Allison Frost has disabled or not allowed such access and/or because the location of Allison Frost is unable to be determined), widget 806a does not include indication 816a, such as shown in FIG. 8B.

In some embodiments, widgets associated with users additionally or alternatively include indications of status related to device activity of those users. For example, in FIG. 8C, widget 806a associated with Allison Frost includes a status indication 818a (e.g., overlaid on a portion of representation 812a) that indicates that Allison Frost has made a request at a device associated with Allison Frost that should be reviewed by the user of device 500. For example, in some embodiments, the user of device 500 and Allison Frost are part of a family account, and the user of device 500 is a parent user in that family account while Allison Frost is a child user in that family account. In such arrangements, a child user might have restrictions set on their device usage by a parent user, and might require parent approval to deviate from or most past such restrictions. For example, in FIG. 8C, Allison Frost has provided input to purchase something (e.g., a movie, a television show, an application, etc.) at her device, which requires approval from the user of device 500. Allison Frost has requested such approval, which has caused device 500 to display indication 818a in widget 806a corresponding to Allison Frost. In response to selection of widget 806a, device 500 optionally displays a user interface from which to respond to the request by Allison Frost, as will be described later with reference to FIGS. 8G-8H.

In FIG. 8C, user interface 802 also includes widget 806b that is associated with Betty Green. Similar to widget 806a, widget 806b includes a graphical representation 812b of Betty Green, an indication 814b of the name of Betty Green, and an indication 816b of a location of Betty Green. In FIG. 8C, widget 806b also includes an indication 818b related to device activity of Betty Green—in particular, indication 818b indicates that the device associated with Betty Green is currently in a Do Not Disturb mode (e.g., enabled during hours set by Betty Green or another user during which the device of Betty Green will not generate notifications in response to receiving incoming events such as phone calls, text messages, emails, etc.).

In some embodiments, user interface 802 includes one or more widgets associated with users concurrently with one or more widgets for applications. For example, in FIG. 8D, user interface 802 includes widget 806a associated with Allison Frost, and widget 820a for Application J, which is optionally an application installed on device 500 (e.g., an email application). Widget 820a optionally includes data and/or information 822a corresponding to content accessible via Application J (e.g., previews of content of unread emails) and/or elements 824a that can accept user input to interact with functionalities provided by Application J (e.g., inputs to respond to and/or compose emails from widget 820a).

As mentioned previously, user interface 802 optionally has multiple pages. For example, in FIGS. 8D-8E, device 500 detects contact 803 perform a leftward swipe on touch screen 504 while displaying the first page of user interface 802. In response, as shown in FIG. 8E, device 500 displays the second page of user interface 802 (e.g., as indicated by indicator 810). The second page of user interface 802 optionally has different application icons 804l and 804m than the first page of user interface 802, and/or has different widgets 806c than the first page of user interface 802.

In some embodiments, a widget associated with a given user displays only a single indication of status related to that user at a time, even if multiple status states exist for the user. For example, in FIG. 8F, device 500 detects an incoming email 830 from Allison Frost for the user of device 500. In response, device 500 displays indication 818a in widget 806a that indicates that the user of device 500 has an unread and/or recent email from Allison Frost. In FIG. 8G, while the email remains unread, device 500 detects an incoming purchase request from Allison Frost. In response, device 500 optionally displays only a single status indication in widget 806a. For example, in FIG. 8G, device 500 maintains display of indication 818a corresponding to the incoming email in widget 806a without displaying an indication corresponding to the incoming purchase request 832. In some embodiments, device 500 instead displays an indication of the incoming purchase request 832 in place of indication 818a in widget 806a. A person of ordinary skill in the art would understand that device 500 optionally utilizes various criteria for determining which status indication to display. In some embodiments, device 500 displays the single status indication corresponding to the most recent status state. In some embodiments, device 500 displays the single status indication corresponds to the highest priority status state. For example, in some embodiments, which status indication is displayed in the widget changes over time, as different types of status are optionally associated with a (e.g., different) priority function (e.g., a function that defines the priority of that status indication as a function of time since that status came about, including a priority value that increases over time, a priority value that remains constant over time, or a priority value that decreases over time) that defines the relative importance of a given status as a function of time since that status came into existence. Thus, in some embodiments, when a communication and a request status are both in existence, the communication status might take higher priority than the request status for a certain amount of time while its priority function is higher than the priority function of the request status (e.g., during which time the electronic device displays the visual indication of the communication status and not the visual indication of the request status), and subsequently, the request status might take higher priority than the communication status because its priority function is now higher than the priority function of the communication status (e.g., during which time the electronic device displays the visual indication of the request status and not the visual indication of the communication status).

In FIG. 8G, while the unread email and the purchase request from Allison Frost are outstanding, device 500 detects selection of widget 806a (e.g., via a tap of contact 803). In response, device 500 displays user interface 805, as shown in FIG. 8H. User interface 805 is optionally a user interface that includes information about and/or selectable options for interacting with Allison Frost. For example, user interface 805 includes a graphical representation 834 of Allison Frost (e.g., a photo, an avatar, etc.), an indication 836 of the name of Allison Frost, a selectable option 838a that is selectable to initiate a messaging communication between the user of device 500 and Allison Frost, a selectable option 838b that is selectable to initiate a phone communication between the user of device 500 and Allison Frost, a selectable option 838c that is selectable to initiate a video call communication between the user of device 500 and Allison Frost, and a selectable option 838d that is selectable to display additional contact information (e.g., email address, phone number, home address, etc.) for Allison Frost. User interface 805 in FIG. 8H also includes a representation 840 of a map that includes a representation (e.g., icon, avatar, etc.) of Allison Frost displayed at a location on map 840 corresponding to the current or last known location of Allison Frost. Finally, in FIG. 8H, user interface 805 includes element 842 corresponding to the purchase request from Allison Frost (e.g., that was detected in FIG. 8G). In FIG. 8H, the purchase request is a request to purchase App A. Thus, element 842 optionally includes information about App A (e.g., an icon for App A, the name of App A, a description of App A, etc.), and option 844 that is selectable to respond to (e.g., approve or deny) the purchase request made by Allison Frost for purchasing App A.

In some embodiments, widgets associated with users can be edited based on inputs to device 500. For example, in FIG. 8I, while displaying user interface 802 including widget 806a, device 500 detects a tap of contact 603, and a hold of contact 603 for longer than a time threshold (e.g., 0.1, 0.5, 1, 2, 3, 5, 10 seconds), on widget 806a. In response, in FIG. 8J, device 500 displays menu 845 adjacent to widget 806a. Menu 845 includes selectable option 846a that is selectable to initiate a process to edit widget 806a, selectable option 846b that is selectable to initiate a process to edit user interface 802 (e.g., reposition items on user interface 802, delete items from user interface 802, etc.), and selectable option 846c that is selectable to initiate a process to remove widget 806a from user interface 802.

In FIG. 8J, device 500 detects selection of selectable option 846a. In response, device 500 displays user interface 848 (e.g., overlaid on user interface 802) that includes entries 850a-850d that indicate the names of users that are associated with widget 806a, as shown in FIG. 8K. For example, entry 850a indicates that widget 806a is associated with Allison Frost. Entries 850b-850d indicate that no other users are associated with widget 806a. User input that populates one or more of entries 850b-850d with users would optionally result in widget 806a also being associated with those populated users. A user input (e.g., a tap) directed to an entry 850 optionally causes device 500 to display a list of potential users that can be selected to populate that entry 850 (and/or entries 850a-d).

For example, in FIG. 8K, device 500 detects a tap of contact 603 on entry 850b corresponding to an empty entry. In response, device 500 displays user interface 852 that includes a list of potential users to be associated with widget 806a, as shown in FIG. 8L. The potential users in user interface 852 are optionally contacts of the user of device 500. Further, user interface 852 is optionally organized to promote users that are in a family account with the user of the device 500 and/or users with which the user of device 500 has recently been in contact. For example, in FIG. 8L, user interface 852 includes a group of users listed at the top of user interface 852 corresponding to users that are in the same family account as the user of device 500 (e.g., Allison Frost, Betty Green and Charlie Stone under the "Family" heading). User interface 852 also includes a group of users listed at or towards the top of user interface 852 corresponding to user with which the user of device 500 has recently communicated (e.g., Dennis Fang and Eric Jones under the "Recent" heading). After the "Family" and/or "Recent" users, user interface 852 includes a listing of all contacts of the user of device 500 (e.g., listed in alphabetical order). User interface 852 is optionally vertically scrollable to reveal additional contacts of the user of device 500.

As shown in FIG. 8L, Allison Frost is displayed with a check mark in user interface 852 to indicate that widget 806a is already associated with Allison Frost. In FIG. 8L, device 500 detects selection of Dennis Fang (e.g., via a tap of contact 803), and in response, displays a check mark next to Dennis Fang in user interface 852 to indicate that Dennis Fang is now also selected for association with widget 806a, as shown in FIG. 8M. In FIG. 8M, device 500 detects input for dismissing user interface 852 (e.g., via a tap of contact 803 on a "Done" affordance in user interface 852), and in response, device 500 ceases display of user interface 852 and displays user interface 802 including widget 806a, as shown in FIG. 8N. As shown in FIG. 8N, widget 806a has been updated to be associated with both Allison Frost and Dennis Fang based on the inputs received in FIGS. 8L-8M. In some embodiments, device 500 concurrently displays representations of the users in widget 806a with which it is associated and optionally automatically resizes widget 806s to accommodate those representations. For example, in FIG. 8N, device 500 has automatically increased the size of widget 806a (e.g., as compared with the size of widget in FIG. 8J), and widget 806a concurrently displays representation 812d of Dennis Fang and indication 814d of the name of Dennis Fang along with representation 812a of Allison Frost, indication 814a of the name of Allison Frost, indication 816a of the location of Allison Frost, and indication 818a of unread communications from Allison Frost. If Dennis Fang were also associated with a status related to device activity of Dennis Fang, widget 806a would optionally also include an indication of such status (e.g., unread communication, purchase request, do not disturb mode, etc.) overlaid on representation 812d of Dennis Fang. In FIG. 8N, Dennis Fang is optionally not sharing location information with device 500—therefore, widget 806a does not include an indication of the location of Dennis Fang. However, if Dennis Fang were sharing location information with device 500, widget 806a would optionally also include an indication of the location of Dennis Fang (e.g., displayed below indication 814d of the name of Dennis Fang).

In some embodiments, in addition or alternatively to automatically resizing widget 806a based on the number of users associated with the widget, device 500 automatically resizes the representations of users displayed in the widget based on the number of users associated with the widget. For example, in FIG. 8O, widget 806a is associated with three users in response to user input (e.g., similar to inputs described with reference to FIGS. 8I-8M). In particular, widget 806a is associated with Betty Green, Dennis Fang and Allison Frost. Widget concurrently displays representation 812b of Betty Green, representation 812d of Dennis Fang and representation 812a of Allison Frost. Representations 812b, 812d and 812a in FIG. 8O are optionally smaller in size than representations 812a and 812d in FIGS. 8J and/or 8N, because device 500 optionally displays representations 812b, 812d and 812a at a smaller size to be able to concurrently display those representations within widget 806a. Further, in the example of FIG. 8O, widget 806a includes indication 818b (e.g., overlaid on a portion of representation 812b) indicating that Betty Green is in a do not disturb mode, and indication 816b indicating that Betty Green is in Los Angeles. Widget 806a does not include a status indication for Dennis Fang or a location indication for Dennis Fang (e.g., because Dennis Fang is not currently sharing location information with the user of device 500 and/or because the location of Dennis Fang has not yet been determined). Widget 806a also includes status indication 818a (e.g., overlaid on a portion of representation 812a) indicating that unread communications exist from Allison Frost, and indication 816a indicating that Allison Frost is currently in San Francisco.

Figure 8Q:
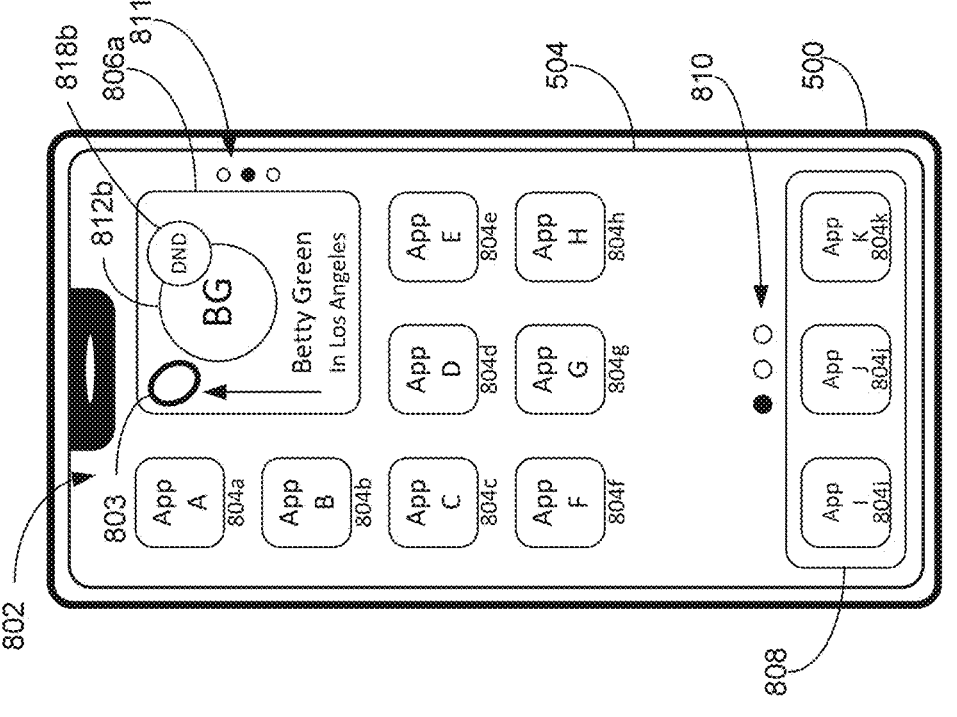
Figure 9B:
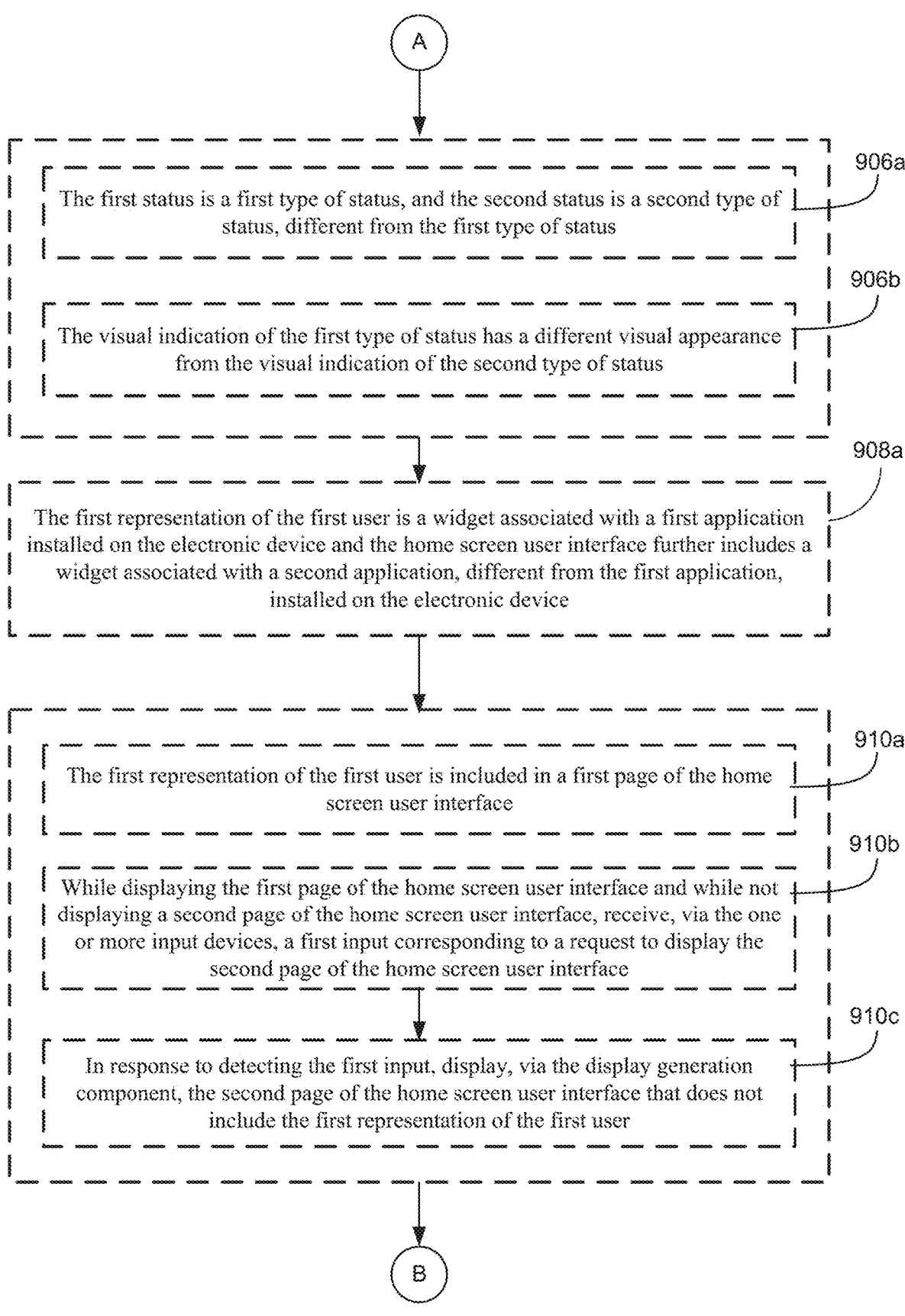
Figure 9C:
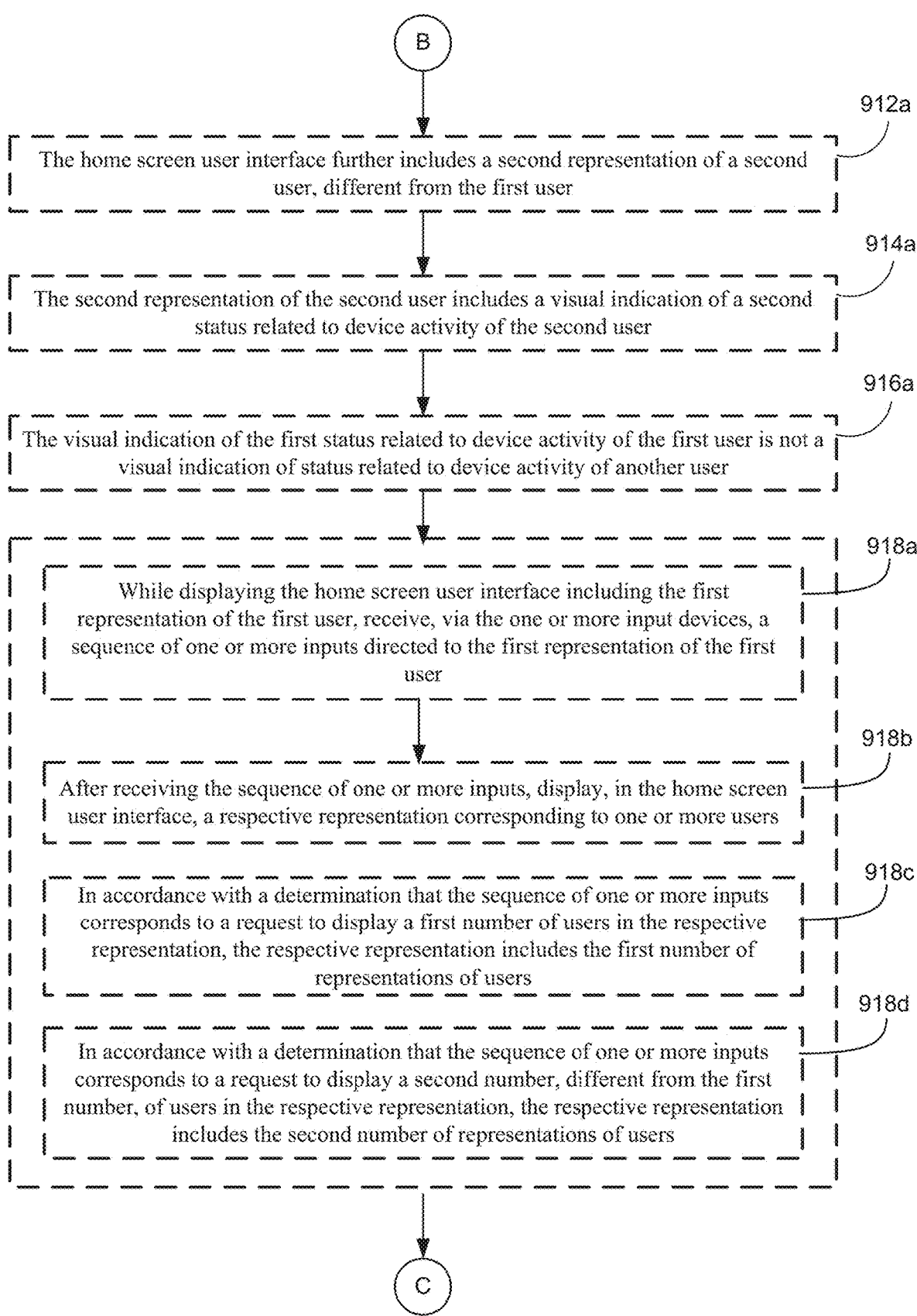
Figure 9D:
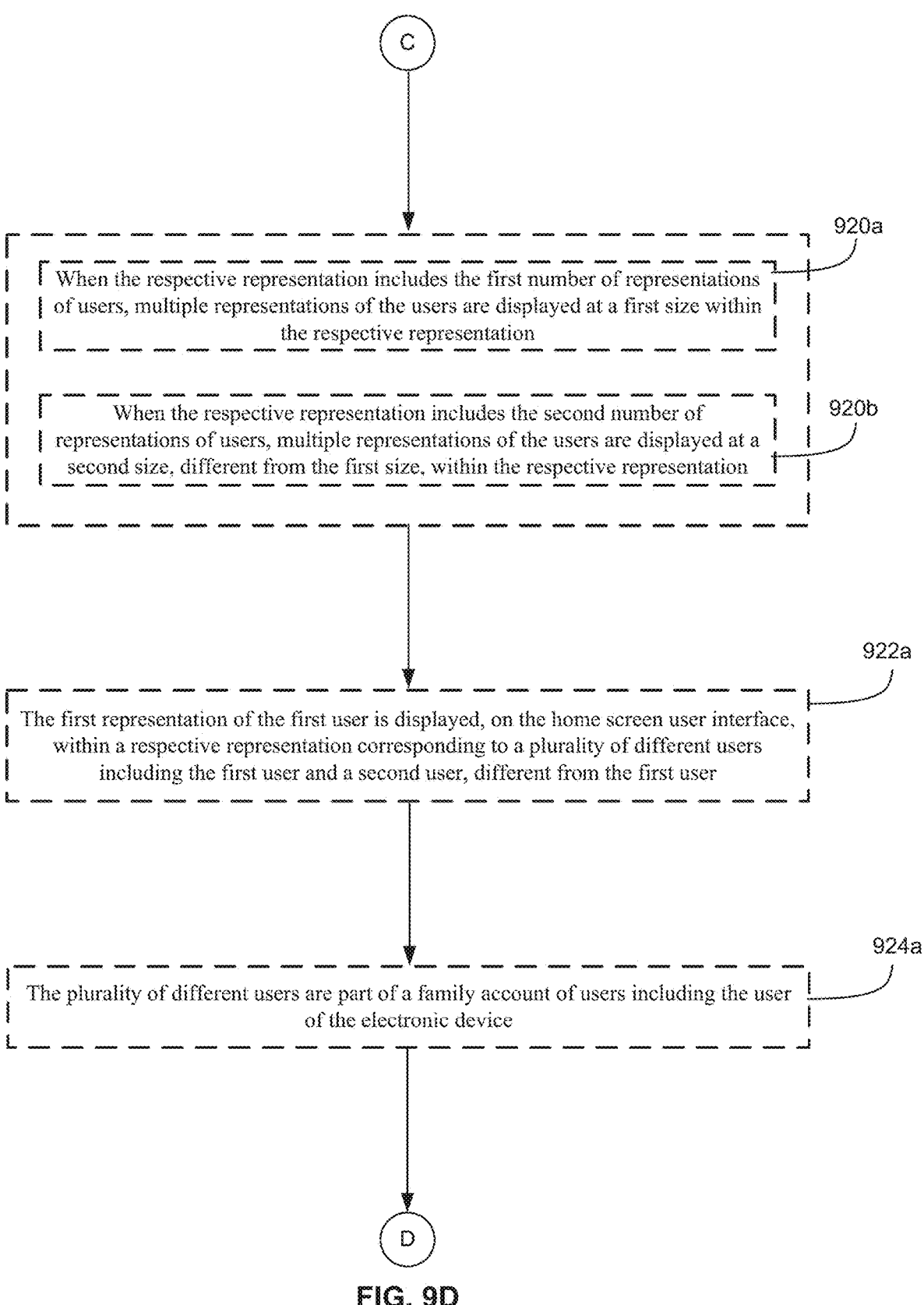
Figure 9E:
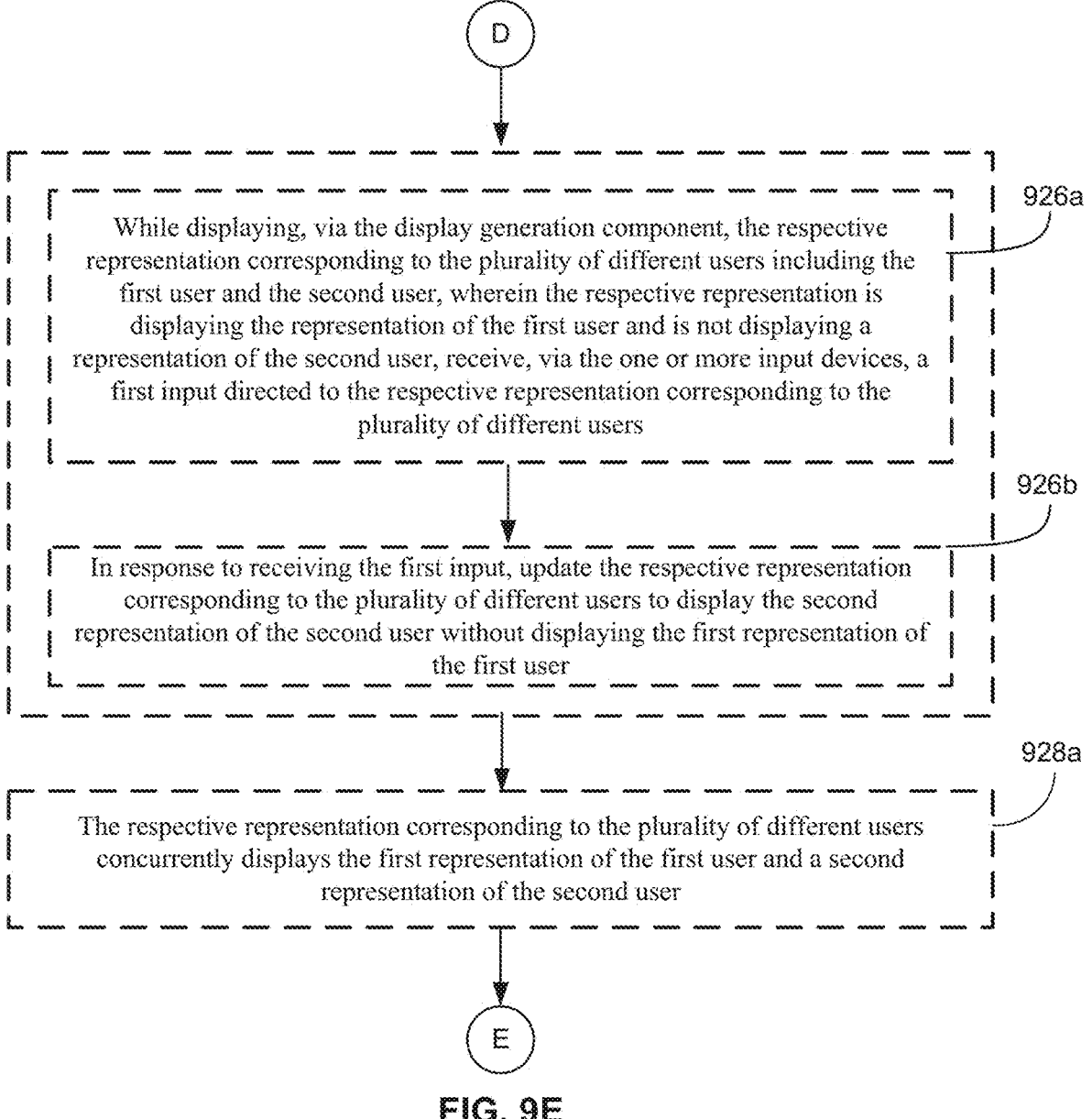
Figure 9G:
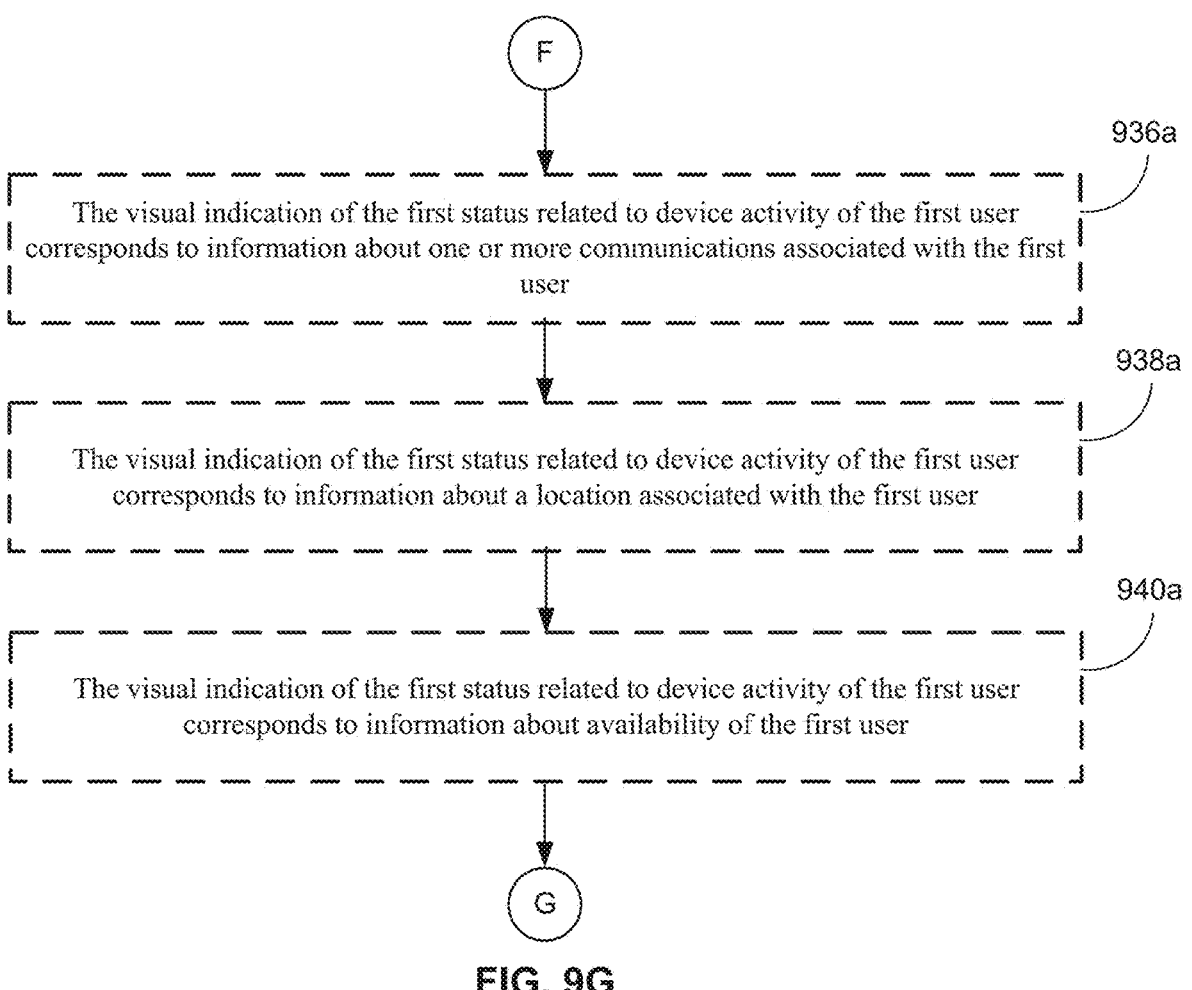
Figure 9I:
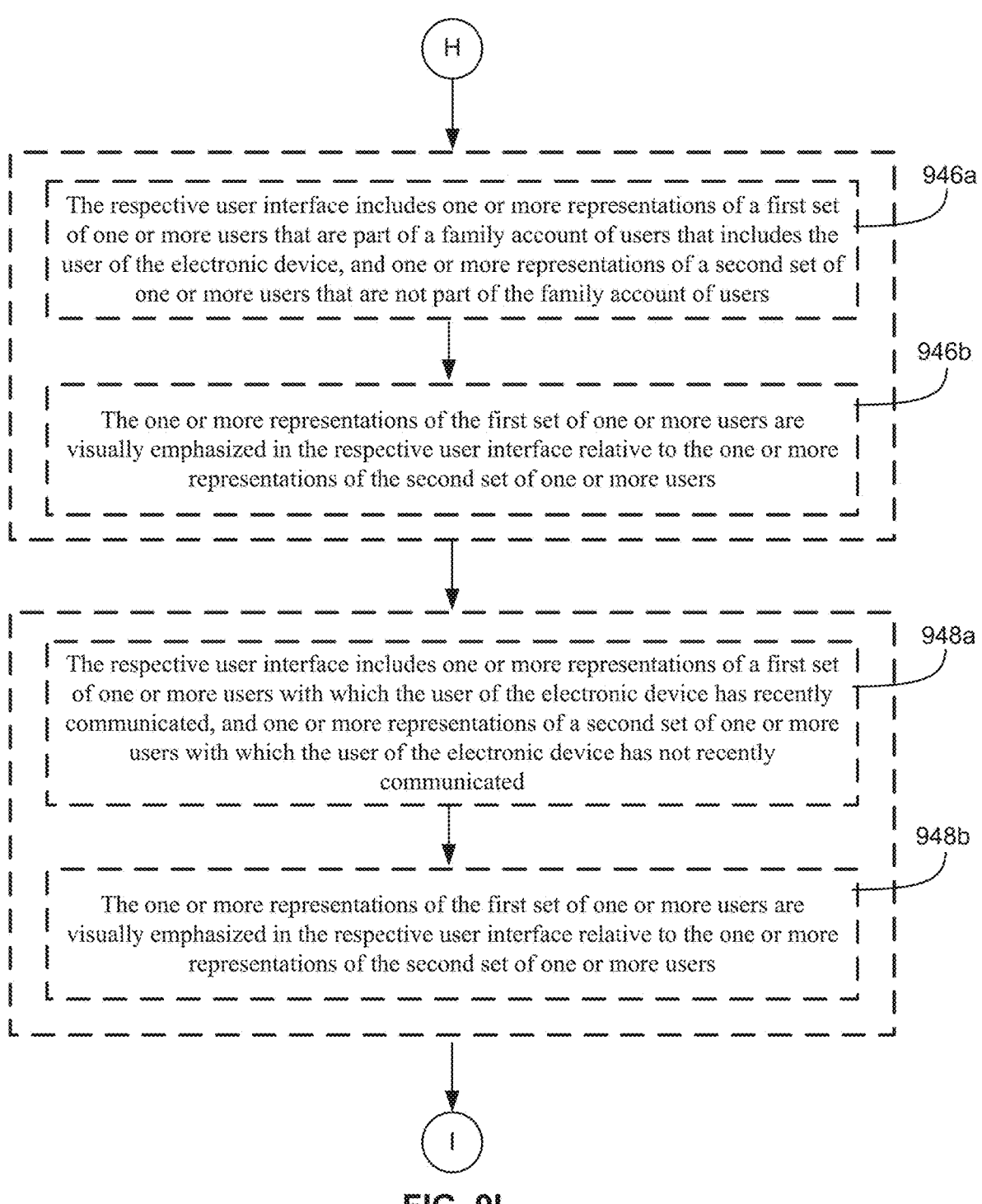

In some embodiments, instead of concurrently displaying multiple representations of multiple users associated with widget 806a, device 500 displays a given representation of a user at a time, and switches between displaying different representations in response to user input. For example, in FIG. 8P, widget 806a is associated with Betty Green, Dennis Fang and Allison Frost (e.g., as in FIG. 8O). However, in FIG. 8P, device 500 displays within widget 806a the information (e.g., representation 812a, indication 818a, indication 814a and indication 816a) for Allison Frost without displaying the information for Betty Green or Dennis Fang. Because widget 806a is associated with users not currently displayed by device 500, device 500 displays indication 811 adjacent to widget 806a indicating that the currently displayed user is one of three users associated with widget 806a (e.g., indicated by three dots of indication 811, and the top-most of those dots being filled). In response to user input directed to widget 806a (e.g., upward or downward swipes), device 500 cycles between displaying different users in widget 806a. For example, in FIGS. 8P-8Q, device 500 detects an upward swipe of contact 803 in widget 806a. In response, device 500 switches to displaying the information (e.g., representation 812b, indication 818b, name and location) for Betty Green, as shown in FIG. 8Q, and ceases displaying the information for Allison Frost. Further, indication 811 has been updated to indicate that a second user of the three users associated with widget 806a is now being displayed in widget 806a. In response to a further upward swipe of contact 803 in widget 806a, device 500 switches to displaying the information (e.g., representation 812d and name) for Dennis Fang, as shown in FIG. 8R, and ceases displaying the information for Betty green. Further, indication 811 has been updated to indicate that a third user of the three users associated with widget 806a is now being displayed in widget 806a.

FIGS. 9A-9J are flow diagrams illustrating a method 900 of providing indications of the status of one or more users in accordance with some embodiments, such as in FIGS. 8A-8R. The method 900 is optionally performed at an electronic device such as device 100, device 300, or device 500 as described above with reference to FIGS. 1A-1B, 2-3, 4A-4B and 5A-5H. Some operations in method 900 are, optionally combined and/or order of some operations is, optionally, changed.

As described below, the method 900 provides ways to provide indications of the status of one or more users. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device in communication with a display generation component and one or more input devices. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (902a), via the display generation component, a home screen user interface of the electronic device, such as user interface 802 in FIG. 8A (e.g., a home screen user interface such as described with reference to FIG. 4A, such as a user interface that includes a plurality of application icons and/or widgets that are selectable to display respective applications that are (e.g., installed) on the electronic device) that includes a first representation of a first user, other than a user of the electronic device, such as widget 806a in FIG. 8A (e.g., a representation or widget or "card" that corresponds to a user other than the user associated with the electronic device, a contact of the user of the electronic device). In some embodiments, the first user is designated in response to input from the user of the electronic device. In some embodiments, the representation of the first user includes an image associated with or of the first user (e.g., avatar of a user)

and/or a name of the user. In some embodiments, the first representation of the first user has one or more of the characteristics of corresponding representations or user interface elements described with reference to methods 700, 1100 and/or 1300. In some embodiments, the home screen user interface includes one or more options that are selectable to display, via the display generation component, one or more applications installed on the electronic device, such as icons 804a-804k in FIG. 8A (e.g., one or more application icons that are selectable to display the selected application).

In some embodiments, the first representation of the first user includes a visual indication of a first status related to device activity of the first user, such as indication 818a in FIG. 8C (e.g., the "card" corresponding to the first user includes a status badge or indicator that indicates the current status of the first user with respect to activity of the user on a second electronic device, different from the electronic device, associated with the second user). For example, the "card" includes an indication of downtime or a restricted usage mode if the second electronic device associated with the second user is currently within a time period (e.g., range of hours) during which access to the second device is limited (e.g., limited allowed usage time, limited applications that can be accessed, limited functionality that can be accessed, etc.), such as during designated sleep hours (e.g., 10 pm to 6 am). Other example indications of status include one or more of an indication that the first user has reached a usage limit on the second electronic device (e.g., only allowed 2 hours of usage of the second electronic device over a 24 hour period), an indication that the first user is using the second electronic device to perform a particular activity, such as using a workout or fitness application on the second electronic device, an indication that the first user has not interacted with the second electronic device in the last 1, 2, 5, 10, 20, 30, 60 minutes (e.g., an "away" status), an indication that the first user has exceeded a budget set on a purchase account (e.g., electronic credit card) associated with the second electronic device, etc.

In some embodiments, after displaying the home screen user interface that includes the first representation of the first user (e.g., while displaying the home screen user interface, or while not displaying the home screen user interface, but while the home screen user interface is configured to include the first representation of the first user), the electronic device detects (902b) a change in a status of the first user related to device activity of the first user, such as the purchase request corresponding to indication 818a in FIG. 8C being resolved/addressed. In some embodiments, after detecting the change in status of the first user related to device activity of the first user, (e.g., in response to detecting the change in the status of the first user related to device activity of the first user) the electronic device displays (902c) the home screen user interface with an updated first representation of the first user on the home screen user interface, wherein the updated first representation of the user is updated to cease display of the visual indication of the first status related to device activity of the first user, such as ceasing to display indication 818a in FIG. 8C (e.g., and to include a visual indication of a second status, different from the first status, related to device activity of the first user). For example, if the device activity of the first user with respect to the second electronic device causes the second electronic device to exit downtime or a restricted usage mode (or more generally indicative of a change away from the first status or any other status described herein), the electronic device removes display of the downtime or restricted usage mode (or any other status described herein) indication in the first representation of the first user. In some embodiments, in conjunction with the removal of the indication of the first status, if the device activity of the first user with respect to the second electronic device is indicative of a second status (e.g., working out, or any other status described herein) associated with the first user, the electronic device displays, with/in the first representation of the first user, a visual indication of the second status. The above-described manner of displaying status related to device activity of a user on a home screen user interface of the device provides a quick and efficient manner of indicating status information for users on the electronic device, which simplifies the interaction between the user and the electronic device and enhances the operability of the electronic device and makes the user-device interface more efficient (e.g., by avoiding erroneous or unsuccessful interaction attempts with that user (e.g., phone call attempts, video call attempts, etc.)), which additionally reduces power usage and improves battery life of the electronic device by enabling the user to use the electronic device more quickly and efficiently.

In some embodiments, displaying the home screen user interface with the updated first representation of the first user includes, in accordance with a determination that a current status related to device activity of the first user is a second status, different from the first status, displaying the updated first representation of the first user with a visual indication of the second status, different from the visual indication of the first status (904a), such as if an email were received from Allison Frost that causes device 500 to replace display of indication 818a in FIG. 8C with indication 818a in FIG. 8F. In some embodiments, in conjunction with the removal of the indication of the first status, if the device activity of the first user with respect to the second electronic device is indicative of a second status (e.g., working out, or any other status described herein) associated with the first user, the electronic device displays, with/in the first representation of the first user, a visual indication of the second status. In some embodiments, if the device activity of the first user with respect to the second electronic device is not indicative of any status, the electronic device displays the first representation of the first user without a visual indication of status. The above-described manner of displaying status related to device activity of a user on a home screen user interface of the device ensures updated status is reflected for the relevant user, which simplifies the interaction between the user and the electronic device and enhances the operability of the electronic device and makes the user-device interface more efficient (e.g., by avoiding erroneous or unsuccessful interaction attempts with that user (e.g., phone call attempts, video call attempts, etc.)), which additionally reduces power usage and improves battery life of the electronic device by enabling the user to use the electronic device more quickly and efficiently.

In some embodiments, the first status is a first type of status, and the second status is a second type of status, different from the first type of status (906a) (e.g., the first type of status is indicative of availability of the first user for communications, the second type of status is indicative of a request made by the first user that needs to be reviewed by the user of the electronic device. In some embodiments, the first type of status is any of the types of status described herein, and the second type of status is any of the other types of status described herein), and the visual indication of the first type of status has a different visual appearance from the visual indication of the second type of status (906b), such as indication 818a in FIG. 8C having a different visual appearance from indication 818a in FIG. 8F. For example, the visual indication of the first type and the visual indication of the second type have different colors, are and/or include different icons, have different shapes, etc. In some embodiments, the visual indications of the first type and/or the second type do not include an indication of a quantity of status updates or existence of status information for the first and second types of status, respectively. The above-described manner of displaying different types of status indications with different visual appearances provides a quick and efficient manner of conveying the type of status information that is being indicated, which simplifies the interaction between the user and the electronic device and enhances the operability of the electronic device and makes the user-device interface more efficient (e.g., by avoiding erroneous status-based interactions with the first user), which additionally reduces power usage and improves battery life of the electronic device by enabling the user to use the electronic device more quickly and efficiently.

In some embodiments, the first representation of the first user is a widget associated with a first application installed on the electronic device (e.g., a contacts application on the electronic device, an object/device/user location tracking application on the electronic device such as described with reference to method 700, etc.), and the home screen user interface further includes a widget associated with a second application, different from the first application, installed on the electronic device (908*a*), such as widgets 806*a* and 820*a* in FIG. 8D. For example, the home screen user interface includes one or more widgets from other applications installed on the electronic device, in addition to the widget associated with the first user. The above-described manner of including widgets from multiple applications on the home screen user interface ensures that information from, or interaction with, multiple different applications can be conveyed or occur, respectively, quickly and efficiently, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first representation of the first user is included in a first page of the home screen user interface (910*a*), such as widget 806*a* in FIG. 8D. In some embodiments, while displaying the first page of the home screen user interface and while not displaying a second page of the home screen user interface (e.g., the home screen user interface is divided into different pages that each can contain application icons and/or widgets, and the electronic device is configured to display one page of the home screen at a time at steady state (e.g., outside of times when the electronic device is transitioning between displaying different pages of the home screen user interface)), the electronic device receives (910*b*), via the one or more input devices, a first input corresponding to a request to display the second page of the home screen user interface, such as the swipe of contact 803 in FIGS. 8D-8E (e.g., a horizontal swipe input detected on a touch screen). In some embodiments, in response to detecting the first input, the electronic device displays (910*c*), via the display generation component, the second page of the home screen user interface that does not include the first representation of the first user, such as shown in FIG. 8E. Switching from displaying the first page of the home screen user interface to displaying the second page of the home screen user interface. In some embodiments, because the widget associated with the first user was included in the first page of the home screen user interface, when the device displays the second page of the home screen user interface, the device no longer displays the widget associated with the first user. The above-described manner of allowing for navigating between different pages of the home screen user interface provide for a quick and efficient manner of browsing the widgets and/or applications configured on the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the home screen user interface further includes a second representation of a second user, different from the first user (912*a*), such as user interface 802 including widgets 806*a* and 806*b* in FIG. 8C. For example, the second user is a contact of the user of the electronic device who has agreed to share status and/or a location associated with the second user (e.g., a location of an electronic device, such as a smartphone, of the second user) with the user of the electronic device. Thus, in some embodiments, the home screen user interface includes multiple widgets that are associated with different users. In some embodiments, the widget associated with the second user has one or more of the characteristics of the widget associated with the first user described herein and/or one or more of the characteristics of widgets associated with users described with reference to methods 700, 1100 and/or 1300. The above-described manner of including multiple widgets for different users on the home screen user interface provides for a quick and efficient manner of conveying information associated with different users, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the second representation of the second user includes a visual indication of a second status related to device activity of the second user (914*a*), such as indication 818*b* in FIG. 8C. For example, the widget associated with the second user includes visual indication of status associated with the second user in ways the same as or similar to the indication of status included in the widget associated with the first user. The above-described manner of displaying status related to device activity of a user on a home screen user interface of the device provides a quick and efficient manner of indicating status information for users on the electronic device, which simplifies the interaction between the user and the electronic device and enhances the operability of the electronic device and makes the user-device interface more efficient (e.g., by avoiding erroneous or unsuccessful interaction attempts with that user (e.g., phone call attempts, video call attempts, etc.)), which additionally reduces power usage and improves battery life of the electronic device by enabling the user to use the electronic device more quickly and efficiently.

In some embodiments, the visual indication of the first status related to device activity of the first user is not a visual indication of status related to device activity of another user (916*a*), such as indication 818*a* in FIG. 8C being related to device activity of Allison Frost but not Betty Green. For example, a widget associated with an individual user includes status indication(s) for that individual user and does not include status indication(s) that are based on or reflect status for other users. The above-described manner of displaying status for an individual user ensures that status is accurately reflected and conveyed in association with the indicated user, which simplifies the interaction between the user and the electronic device and enhances the operability of the electronic device and makes the user-device interface more efficient (e.g., by avoiding erroneous or unsuccessful interaction attempts with a user based on status indications that do not accurately reflect the status of that user), which additionally reduces power usage and improves battery life of the electronic device by enabling the user to use the electronic device more quickly and efficiently.

In some embodiments, while displaying the home screen user interface including the first representation of the first user, the electronic device receives (918*a*), via the one or more input devices, a sequence of one or more inputs directed to the first representation of the first user, such as the inputs from contact 803 in FIGS. 8I-8M (e.g., tap and hold on the widget for the first user, followed by input to edit the widget and select one or more contacts of the user to be included in the widget, similar to the editing mode input and interaction described with reference to method 700). In some embodiments, after receiving the sequence of one or more inputs, the electronic device displays (918*b*), in the home screen user interface, a respective representation corresponding to one or more users, such as widget 806*a* in FIG. 8N (e.g., a widget corresponding to one or more users). In some embodiments, the widget that was associated with the first user is now associated with the one or more users (e.g., instead) as a result of the sequence of inputs. In some embodiments, the first user is included in the one or more users in accordance with the sequence of inputs. In some embodiments, the first user is not included in the one or more users in accordance with the sequence of inputs.

In some embodiments, in accordance with a determination that the sequence of one or more inputs corresponds to a request to display a first number of users in the respective representation, the respective representation includes the first number of representations of users (918*c*), such as widget 806*a* including two users in FIG. 8N (e.g., if the inputs include selection of three contacts of the user for inclusion in the widget, the widget includes representations of those three contacts), and in accordance with a determination that the sequence of one or more inputs corresponds to a request to display a second number, different from the first number, of users in the respective representation, the respective representation includes the second number of representations of users (918*d*), such as widget 806*a* including three users in FIG. 8O (e.g., if the inputs include selection of four contacts of the user for inclusion in the widget, the widget includes representations of those four contacts). In some embodiments, the widget associated with multiple users/contacts includes relevant status indications, as described herein, for those contacts as such status information is received by the device (e.g., an indication of status for the first user (if any), an indication of status for the second user (if any), etc.). The above-described manner of allowing for different numbers of users to be associated with the widget provides for a quick and efficient manner of changing which and/or how many users for which to display widget(s) on the home screen user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, when the respective representation includes the first number of representations of users, multiple representations of the users are displayed at a first size within the respective representation (920*a*), such as representations 812*d* and 812*a* in FIG. 8N, and when the respective representation includes the second number of representations of users, multiple representations of the users are displayed at a second size, different from the first size, within the respective representation (920*b*), such as representations 812*b*, 812*d* and 812*a* in FIG. 8O. In some embodiments, as more users are added to the widget, the avatars or representations for those users that are displayed in the widget are displayed at smaller sizes, and as fewer users are associated with the widget, the avatars or representations for those users that are displayed in the widget are displayed at larger sizes. In some embodiments, the size of the widget remains the same as the number of users associated with the widget changes. In some embodiments, the size of the widget increases (to a limit) as more users are associated with the widget, and the size of the widget decreases (to a limit) as fewer users are associated with the widget. The above-described manner of automatically adjusting the sizes of the representations of users in the widget provides for a quick and efficient manner of allowing for different numbers of users to be associated with the widget without interfering with the remainder of the home screen user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first representation of the first user is displayed, on the home screen user interface, within a respective representation corresponding to a plurality of different users including the first user and a second user, different from the first user (922*a*), such as shown in widget 806*a* in FIGS. 8N and 8O. For example, a single widget on the home screen user interface is associated with a plurality of users, including the first and second users. In some embodiments, the second user is a contact of the user of the electronic device who has agreed to share status and/or a location associated with the second user (e.g., a location of an electronic device, such as a smartphone, of the second user) with the user of the electronic device. In some embodiments, the single widget includes indications of status for the first user (if any) and the second user (if any). The above-described manner of associating a single widget with multiple users provides for a quick and efficient manner of conveying status for multiple users without the need to do so via multiple widgets, thus conserving space in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the plurality of different users are part of a family account of users including the user of the electronic device (924*a*), such as illustrated and described with reference to method 1300. In some embodiments, the user of the electronic device is part of a family account with a content delivery, purchase and/or storage service. In some embodiments, accounts that are included in the family account have access to (at least some designated portion of)

content of other accounts that are included in the family account and/or have access to a shared purchase account (e.g., credit card) for purchasing content that becomes available to the accounts within the family account. In some embodiments, one or more accounts in the family account are designated as parent accounts, and one or more accounts in the family account are designated as child accounts. In some embodiments, the parent accounts have an ability to monitor and/or control the usage of devices by child accounts in the family account (but optionally not vice versa). In some embodiments, the widget associated with the users of the family account has one or more of the characteristics of the corresponding widget described with reference to method 1300. In some embodiments, the widget associated with the users of the family account does not include users that are not included in the family account, and in some embodiments, the widget associated with the users of the family account does include users that are not included in the family account. The above-described manner of associating a single widget with multiple users of a family account provides for a quick and efficient manner of conveying status for multiple user accounts within a family account, thus conserving space in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying, via the display generation component, the respective representation corresponding to the plurality of different users including the first user and the second user, wherein the respective representation is displaying the representation of the first user and is not displaying a representation of the second user, such as widget 806a in FIG. 8P (e.g., the widget associated with the multiple users displayed the representation and/or status for a single user at a time), the electronic device receives (926a), via the one or more input devices, a first input directed to the respective representation corresponding to the plurality of different users, such as the input from contact 803 in FIGS. 8P-8Q (e.g., a swipe input detected on/within the widget, such as a horizontal or vertical swipe input). In some embodiments, in response to receiving the first input, the electronic device updates (926b) the respective representation corresponding to the plurality of different users to display the second representation of the second user without displaying the first representation of the first user, such as shown in widget 806a in FIG. 8Q. For example, swiping on/within the widget causes the electronic device to switch from displaying the representation and/or status for a first user in the widget, to displaying the representation and/or status for a second user interface widget (e.g., similar to as described with reference to method 1300). The above-described manner of displaying a subset of the users of the widget at a given moment in time provides for a quick and efficient manner of conveying status for multiple users while reducing the consumed space on the home screen user interface, thus conserving space in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective representation corresponding to the plurality of different users concurrently displays the first representation of the first user and a second representation of the second user (928a), such as widget 806a in FIG. 8O. For example, the widget associated with the multiple users concurrently displays representations and/or status for more than a single user (e.g., all of the users) associated with the widget at the same time, without the need for user input (e.g., swiping) to switch between different users. The above-described manner of displaying multiple users concurrently in the widget provides for a quick and efficient manner of conveying status for multiple users while reducing the need to accept/process input from the user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first representation of the first user is displayed, on the home screen user interface, within a respective representation corresponding to one or more different users including the first user (930a), and displaying the respective representation includes (930b): in accordance with a determination that the respective representation corresponds to a first number of users, displaying the respective representation at a first size on the home screen user interface (930c), such as the size of widget 806a in FIG. 8J, and in accordance with a determination that the respective representation corresponds to a second number of users, different from the first number of users, displaying the respective representation at a second size, different from the first size, on the home screen user interface (930d), such as the size of widget 806a in FIG. 8N. For example, the size of the widget increases (to a limit) as more users are associated with the widget, and the size of the widget decreases (to a limit) as fewer users are associated with the widget. Thus, in some embodiments, the widget is automatically resized by the device based on the number of users selected by the user for inclusion in the widget. The above-described manner of automatically resizing the widget provides for a quick and efficient manner of adapting the widget to user inputs that add/remove users from the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication of the first status related to device activity of the first user corresponds to a request made by the first user at an electronic device associated with the first user (932a), such as indication 818a corresponding to a purchase request in FIG. 8C. For example, the first user has requested approval for more device usage (e.g., because the first user has reached a device usage limit imposed by the user of the electronic device (e.g., as a parent in a family account including the user of the electronic device and the first user)). In accordance with such a request associated with the first user being outstanding, the electronic device displays a visual indication corresponding to and/or identifying the request in the widget for the first user. In some embodiments, in accordance with the request no longer being outstanding (e.g., because the user of the electronic device responds to the request or the first user withdraws/cancels the request), the electronic device ceases display of the visual indication corresponding to and/or identifying the request in the widget for the first user. In some embodiments, the widget is selectable to display a user interface from which the user of the electronic device can respond to the request. The above-described manner of displaying an indication of a request in the widget provides for a quick and efficient manner of conveying that a user of the device has an outstanding request to which to respond, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the request made by the first user at the electronic device associated with the first user includes a request to purchase an item (e.g., a movie, a television show, an application, a game, etc.) that can be approved or disapproved by the user of the electronic device (934*a*), such as described with reference to indication 818*a* in FIG. 8C. For example, the user of the electronic device is a parent in a family account, and the first user is a child in the family account. In some embodiments, the purchase request must be approved by the parent before the purchase is allowed to proceed (e.g., using the purchase account associated with the family account). In some embodiments, the widget associated with the first user is selectable to display a user interface that includes more information about the request (e.g., information not included in the widget associated with the first user) and/or one or more options that are selectable to respond to the request (e.g., to approve or disapprove of the request). In some embodiments, the user interface that is displayed in response to selection of the widget is the user interface described with reference to method 1100. The above-described manner of displaying an indication of a purchase request in the widget provides for a quick and efficient manner of conveying that a user of the device has an outstanding purchase request to which to respond, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication of the first status related to device activity of the first user corresponds to information about one or more communications associated with the first user (936*a*), such as indication 818*a* in FIG. 8F. For example, the visual indication is an indication that the user of the electronic device has a missed call from the first user, has a new (e.g., unreviewed) voicemail from the first user, has a new (e.g., unread) message (e.g., email, text message, etc.) from the first user, etc. In some embodiments, if the communication(s) associated with the first user are no longer outstanding (e.g., because the user of the electronic device has read/reviewed/consumed the communications), the electronic device ceases to display the indication of the communication in the widget associated with the first user. The above-described manner of displaying an indication of a communication associated with the first user provides for a quick and efficient manner of conveying that a user of the device has outstanding communication-related activity with the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication of the first status related to device activity of the first user corresponds to information about a location associated with the first user (938*a*), such as indication 816*a* in FIG. 8F. For example, the visual indication is an indication of a current or last-known location of or associated with the first user, such as described with reference to method 700. In some embodiments, the visual indication indicates an address and/or city for the location and/or any other type of indication of location as described with reference to method 700. In some embodiments, the widget for the first user only includes location information if the first user has approved that such location information can be shared with the user of the electronic device—otherwise, the widget for the first user optionally does not include location information for the first user. In some embodiments, the indication of the location associated with the first user updates as the location associated with the first user changes. The above-described manner of displaying an indication of location associated with the first user provides for a quick and efficient manner of conveying location information for the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication of the first status related to device activity of the first user corresponds to information about availability of the first user (940*a*), such as indication 818*b* in FIG. 8C. For example, the visual indication indicates that the first user is currently busy, is currently in a do not disturb mode of their electronic device or is within do not disturb hours set for the device of the first user, etc. In some embodiments, the indication is based on calendar event data in a calendar of the first user. In some embodiments, the indication is based on current device usage by the first user (e.g., the first user is currently engaged in a phone or video call using the device of the first user, and therefore is unavailable). In some embodiments, when the availability status of the first user changes, the electronic device ceases to display the visual indication of the availability of the first user and/or displays a visual indication of the new availability of the first user. The above-described manner of displaying an indication of availability of the first user provides for a quick and efficient manner of conveying availability information for the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user is associated with the first status related to device activity of the first user and second status, different from the first status, related to device activity of the first user (942*a*), such as Allison Frost being associated with an unread email communication and a purchase request in FIG. 8G (e.g., two different and/or independent statuses are associated with the first user. For example, the user of the electronic device has an unread email from the first user (e.g., a communication-related status) and the first user has an outstanding request for the first user), and displaying the first representation of the first user includes (942*b*) in accordance with a determination that one or more first criteria are satisfied, the first representation of the first user includes the visual indication of the first status and does not include a visual indication of the second status (942*c*), such as including indication 818*a* in FIG. 8G, and in accordance with a determination that the one or more first criteria are not satisfied, the first representation of the first user includes the visual indication of the second status and does not include the visual indication of the first status (942*d*), such as including a purchase request indication in FIG. 8G rather than indication 818*a*. For example, in some embodiments, the widget only displays one status indication at a time for the first user, even if multiple statuses are currently associated with the first user. In some embodiments, the device displays the visual indication of the status that is more recent (e.g., if the communication is more recent than the request, the device displays the visual indication of the communication and not the visual indication of the request). In some embodiments, the device displays the visual indication of the status that is defined as higher priority (e.g., if the request is defined by the electronic device to be a type of status that is higher priority than communication status, the device displays the visual indication of the request and not the visual indication of the communication, even if the communication status is more recent). In some embodiments, which status indication is displayed in the widget changes over time, as different types of status are optionally associated with a (e.g., different) priority function (e.g., a function that defines the priority of that status indication as a function of time since that status came about, including a priority value that increases over time, a priority value that remains constant over time, or a priority value that decreases over time) that defines the relative importance of a given status as a function of time since that status came into existence, such as illustrated and described with reference to FIG. 12U. Thus, in some embodiments, when a communication and a request status are both in existence, the communication status might take higher priority than the request status for a certain amount of time while its priority function is higher than the priority function of the request status (e.g., during which time the electronic device displays the visual indication of the communication status and not the visual indication of the request status), and subsequently, the request status might take higher priority than the communication status because its priority function is now higher than the priority function of the communication status (e.g., during which time the electronic device displays the visual indication of the request status and not the visual indication of the communication status). The above-described manner of displaying one indication of status at a time provides for a quick and efficient manner of conveying what is likely the more relevant or important status associated with a user without cluttering the widget with status indications, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the home screen user interface including the first representation of the first user, the electronic device receives (944*a*), via the one or more input devices, a first input that includes input from a predefined portion of the user of the electronic device that is detected for longer than a time threshold, such as the inputs provided by contact 803 in FIGS. 8I-8K (e.g., a tap on the widget and holding of the tap for longer than a time threshold (e.g., 0.2, 0.5, 1, 2, 3, 5, 10 seconds) in the case of a touch screen display, or a pinch of two fingers of the user of the electronic device directed to the widget, and holding of the pinch for longer than the time threshold in the case of a hover or spatial detection-capable input system). In some embodiments, in response to detecting the first input, the electronic device displays (944*b*), via the display generation component, a respective user interface from which one or more users can be selected to be displayed in a respective representation (e.g., the widget) on the home screen user interface, such as user interface 852 in FIG. 8L. For example, a respective user interface that includes a list of contacts of the user that can be selected/designated by the user for inclusion in the widget that is displayed on the home screen user interface. In some embodiments, the first user can be unselected/undesignated from inclusion in the widget on the home screen user interface. The above-described manner of enabling editing of the widget provides a quick and efficient manner of changing the users associated with the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes one or more representations of a first set of one or more users that are part of a family account of users that includes the user of the electronic device, and one or more representations of a second set of one or more users that are not part of the family account of users (946*a*), such as shown in user interface 852 in FIG. 8L (e.g., a list of names of contacts of the user, including names of users that are part of the family account that includes the user of the electronic device, and names of users that are not part of the family account). In some embodiments, the user of the electronic device is part of a family account with a content delivery, purchase and/or storage service. In some embodiments, accounts that are included in the family account have access to (at least some designated portion of) content of other accounts that are included in the family account and/or have access to a shared purchase account (e.g., credit card) for purchasing content that becomes available to the accounts within the family account. In some embodiments, one or more accounts in the family account are designated as parent accounts, and one or more accounts in the family account are designated as child accounts. In some embodiments, the parent accounts have an ability to monitor and/or control the usage of devices by child accounts in the family account (but optionally not vice versa). In some embodiments, a widget associated with the users of the family account has one or more of the characteristics of the corresponding widget described with reference to method 1300.

In some embodiments, the one or more representations of the first set of one or more users are visually emphasized in the respective user interface relative to the one or more representations of the second set of one or more users (946*b*), such as the Family contacts in FIG. 8L being listed higher than other contacts in FIG. 8L. For example, the list of users that are part of the family account is displayed at or near the top of the list of contacts/users that can be added to the widget, and the list of users that are not part of the family account is displayed below the list of users that are part of the family account. In some embodiments, the user is able to select individual users in the family account for inclusion in the widget or is able to batch select all users in the family account for inclusion in the widget (e.g., as described with reference to method 1300). The above-described manner of prioritizing display of family account users provides a quick and efficient manner of selecting family account users for inclusion in the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface includes one or more representations of a first set of one or more users with which the user of the electronic device has recently communicated, and one or more representations of a second set of one or more users with which the user of the electronic device has not recently communicated (948*a*), such as shown in FIG. 8L (e.g., a list of names of contacts of the user, including names of the most recent 1, 3, 5, 10, 15 users with which the user of the electronic device has most recently communicated, and names of users other than those 1, 3, 5, 10, 15 users with which the user of the electronic device has most recently communicated), and the one or more representations of the first set of one or more users are visually emphasized in the respective user interface relative to the one or more representations of the second set of one or more users (948*b*), such as the Recent contacts in FIG. 8L being listed higher than other contacts in FIG. 8L. For example, the list of recent-communication users is displayed at or near the top of the list of contacts/users that can be added to the widget, and the list of other users is displayed below the list of recent-communication users. In some embodiments, the user is able to select individual users in the recent-communication users for inclusion in the widget or is able to batch select all recent-communication users for inclusion in the widget. The above-described manner of prioritizing display of recent-communication users provides a quick and efficient manner of selecting recent-communication users for inclusion in the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the visual indication of the first status related to device activity of the first user corresponds to information about usage of an electronic device by the first user (950*a*), such as indication 818*b* in FIG. 8O. For example, the first user is optionally a child user in a family account that includes the user of the electronic device, and the user of the electronic device is optionally a parent user in the family account. The parent user optionally has access to device usage information for the child user. In some embodiments, the visual indication is an indication of an amount of usage by the child user of the device(s) of the child user (e.g., an indication of an amount of usage time in the current day, an amount of usage time in the last seven days, and/or an average daily usage time over the last seven days, etc.). In some embodiments, the visual indication is an indication that the child user has reached a device usage limit set (e.g., by the user of the electronic device) for the child user (e.g., the child user has reached the usage limit for their device(s) for the day, and/or the child user has reached the usage limit for one or more particular applications on their device(s) for the day, etc.). In some embodiments, the visual indication is an indication that the device(s) of the child user are within do not use or do not disturb hours set (e.g., by the user of the electronic device) for the child user (e.g., a range of times that limit the usage of the device(s) of the child user during those times, for example from 10 μm to 6 am). The above-described manner of indicating device usage restriction information provides a quick and efficient manner of indicating information about device usage of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first representation of the first user is displayed, on the home screen user interface, within a respective representation corresponding to one or more different users including the first user (952*a*), and displaying the respective representation includes (952*b*), in accordance with a determination that a size of the respective representation designated by the user of the electronic device is a first size, such as a user input designating the size of widget 806*a* to be the size shown in FIG. 8I (e.g., the user of the electronic device has provided an input to the device to set the size of the widget as a 2-unit high by 4-unit wide widget), displaying the respective representation as corresponding to a first number of users (952*c*), such as corresponding to one user in FIG. 8I (e.g., the widget is associated with and/or displays representations of two users), and in accordance with a determination that the size of the respective representation designated by the user of the electronic device is a second size, such as a user input designating the size of widget to be the size shown in FIG. 8N (e.g., the user of the electronic device has provided an input to the device to set the size of the widget as a 4-unit high by 4-unit wide widget), different from the first size, displaying the respective representation as corresponding to a second number of users (e.g., the widget is associated with and/or displays representations of four users), different from the first number of users (952*d*), such as corresponding to two users in FIG. 8N. Thus, in some embodiments, the widget automatically includes and/or is associated with different numbers of users in response to user input setting the size of the widget. The above-described manner of automatically associating the widget with users provides for a quick and efficient manner of adapting the widget to user inputs that resize the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIGS. 9A-9J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100 and 1300) are also applicable in an analogous manner to method 900 described above with respect to FIGS. 9A-9J. For example, displaying information or status for users or groups of users described above with reference to method 900 optionally has one or more of the characteristics of displaying information or status for users, objects, tracked entities, etc., described herein with reference to other methods described herein (e.g., methods 700, 1100 and 1300). For brevity, these details are not repeated here.

The operations in the information processing methods described above are, optionally, implemented by running one or more functional modules in an information processing apparatus such as general-purpose processors (e.g., as described with respect to FIGS. 1A-1B, 3, 5A-5H) or application specific chips. Further, the operations described above with reference to FIGS. 9A-9J are, optionally, implemented by components depicted in FIGS. 1A-1B. For example, displaying operations 902*a* and 902*c* and detecting operation 902*b* are optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Aggregated User Information User Interfaces

Users interact with electronic devices in many different manners. In some embodiments, an electronic device has access to various information about consenting users selected by the user of the electronic device (e.g., location, battery status, device status, etc.). The embodiments described below provide ways in which an electronic device presents such information in an aggregated matter that makes accessing and interacting with such information more efficient, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10B:
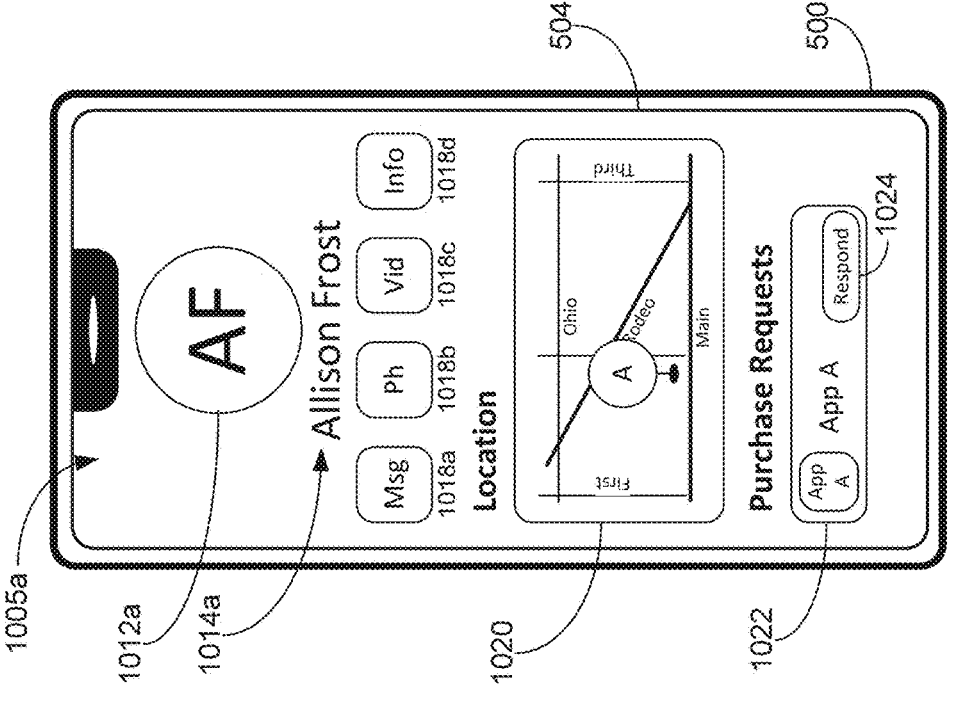
FIGS. 10A-10T illustrate exemplary ways in which an electronic device presents information about consenting users selected by the user of the electronic device in an aggregated matter that makes accessing and interacting with such information more efficient in accordance with some embodiments of the disclosure.
Figure 10B:
Figure 10A:
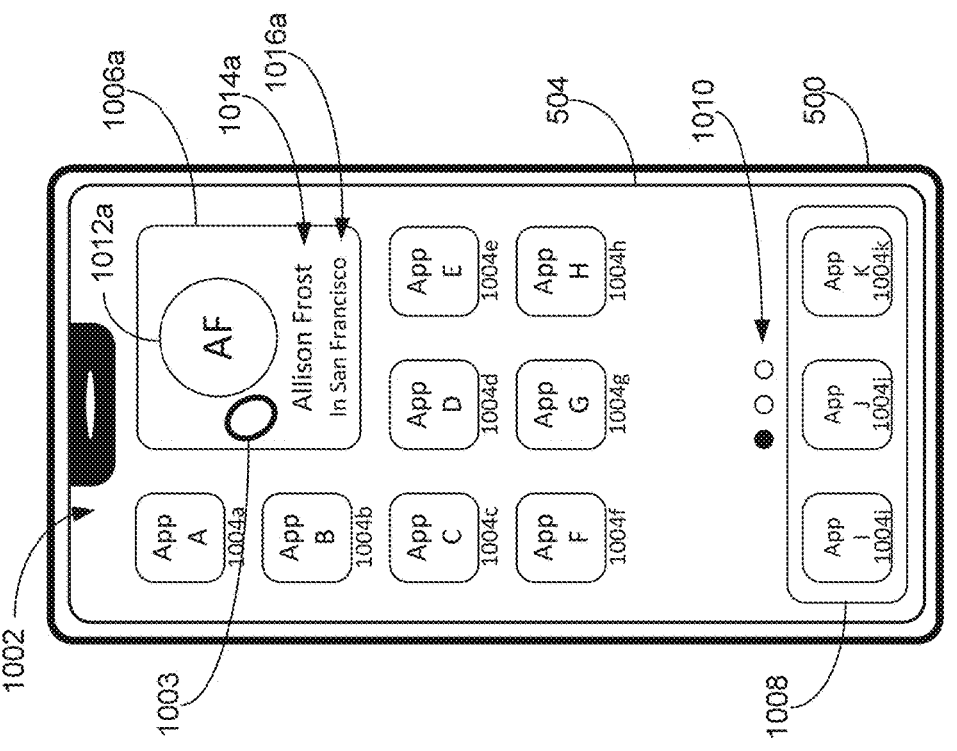
Figure 10D:
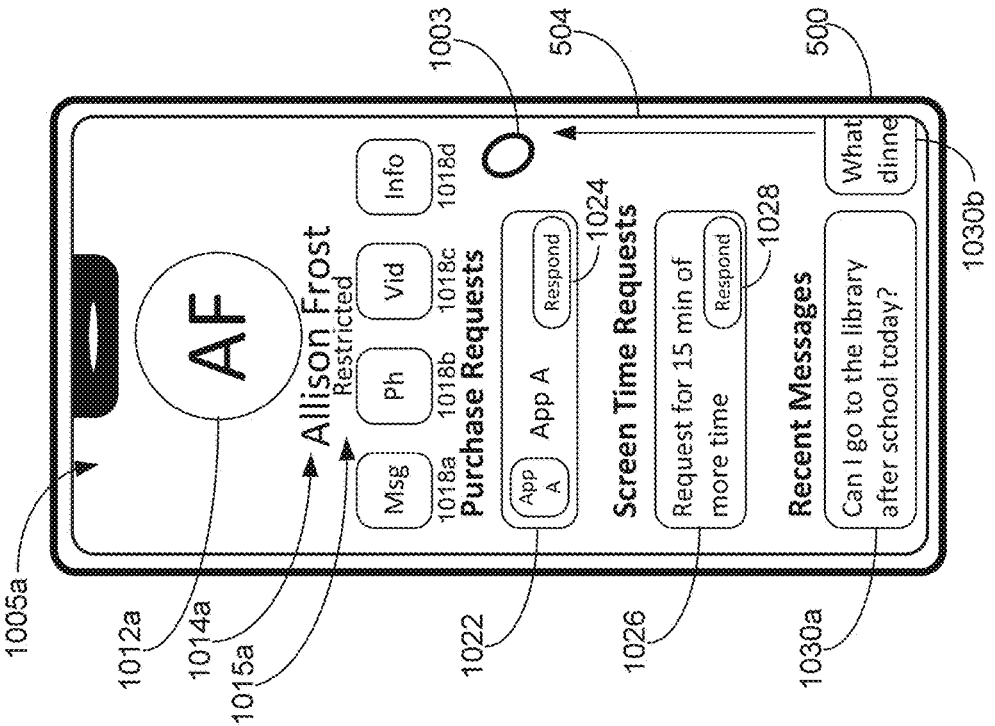
Figure 10C:
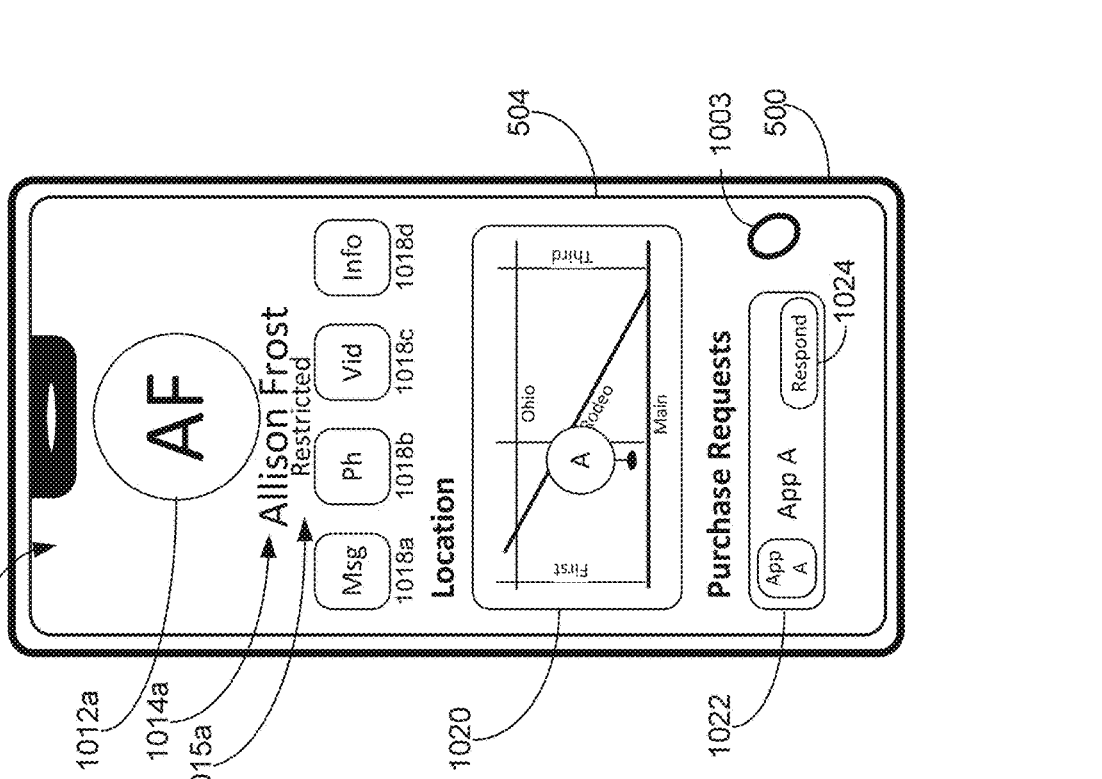
Figure 10F:
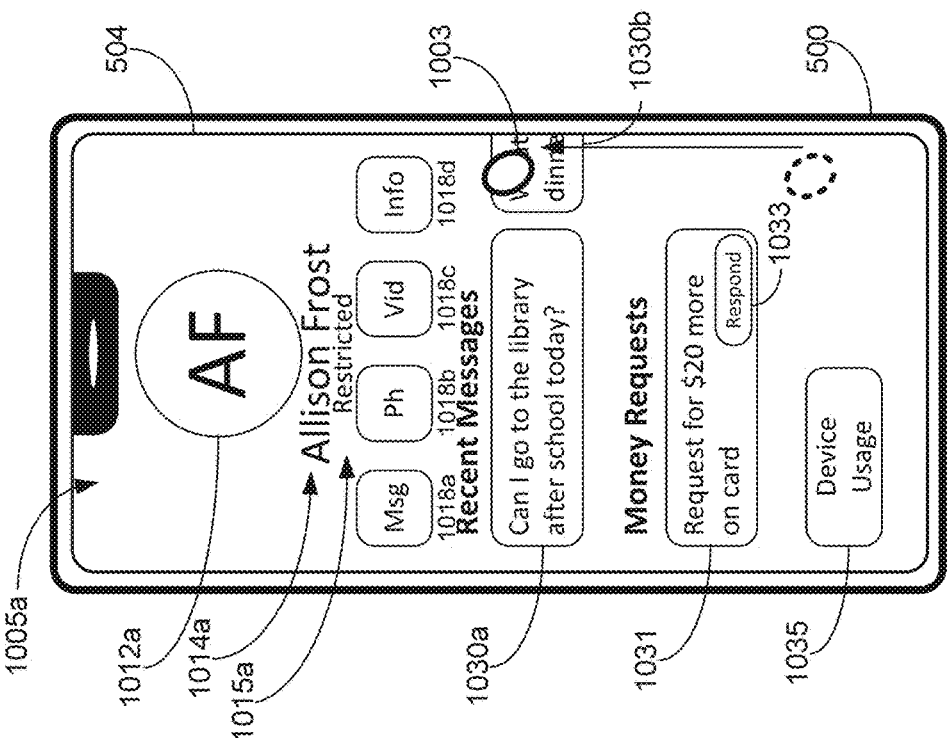
Figure 10E:
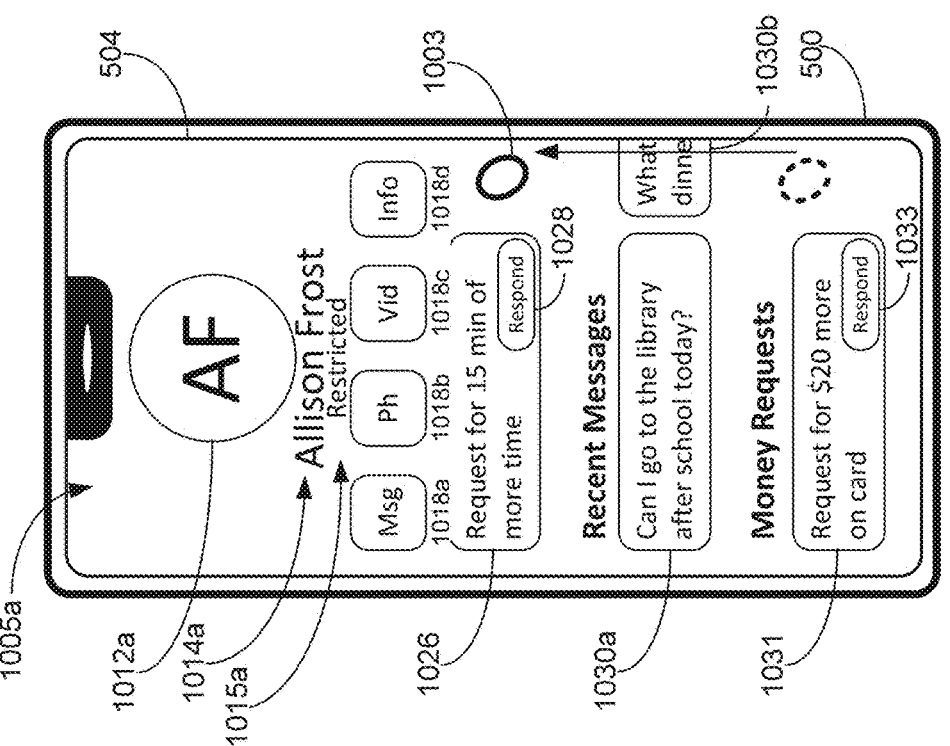
Figure 10H:
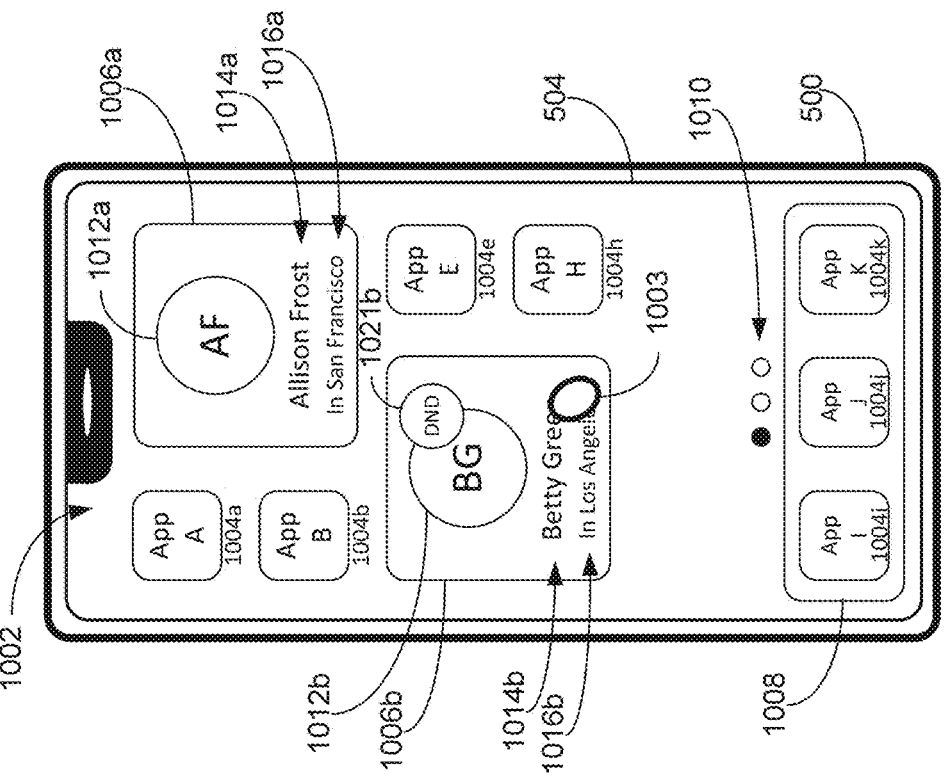
Figure 10G:
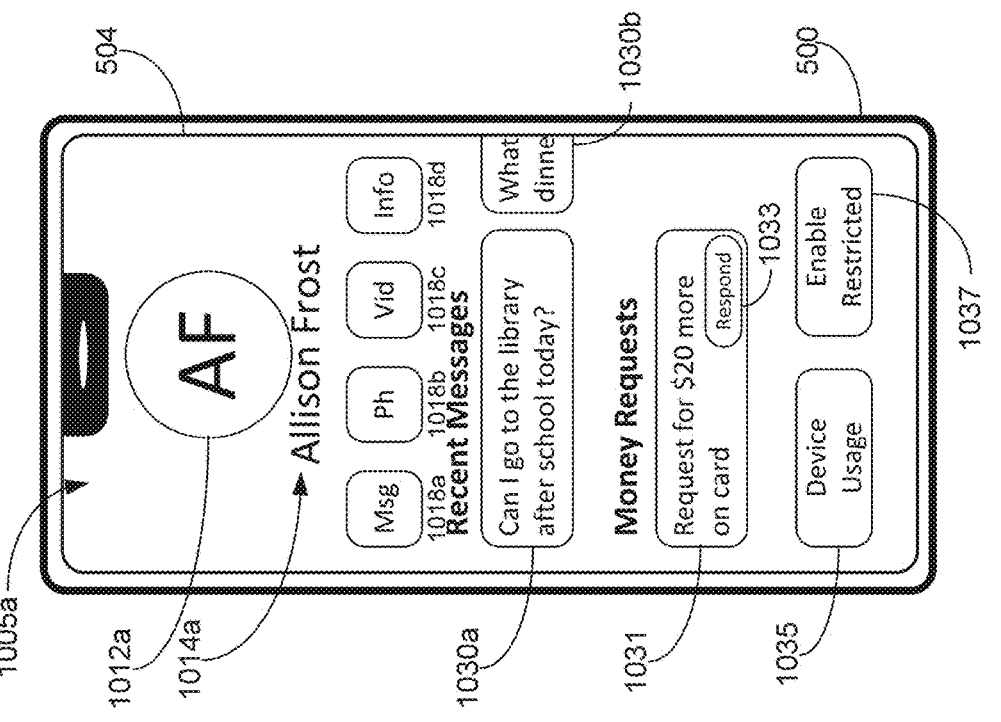
Figure 10J:
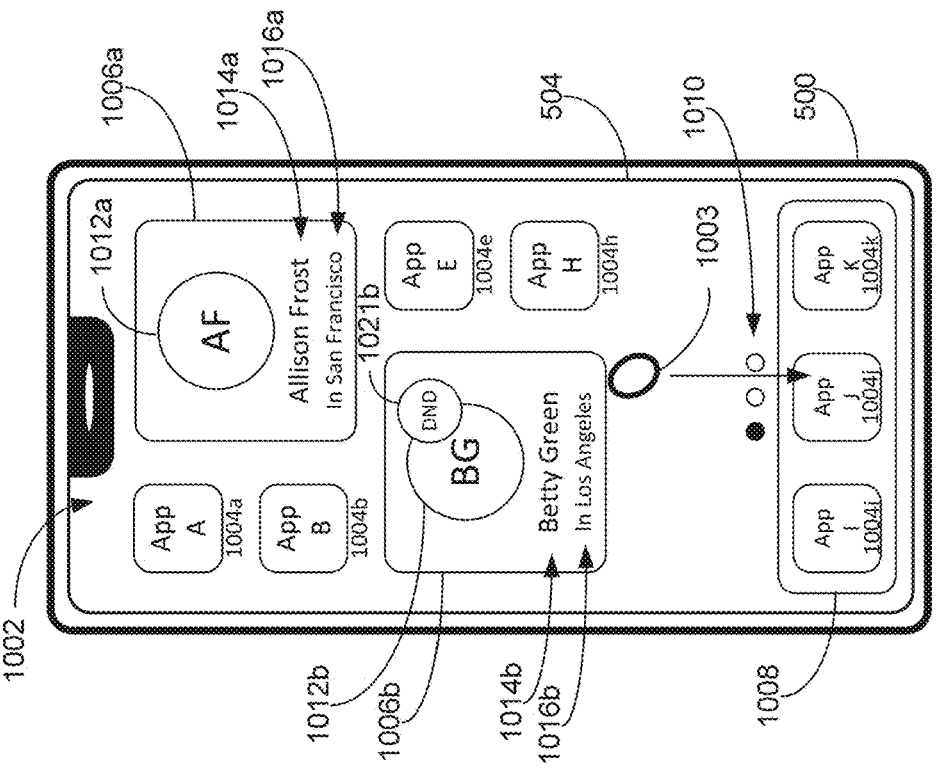
Figure 10I:
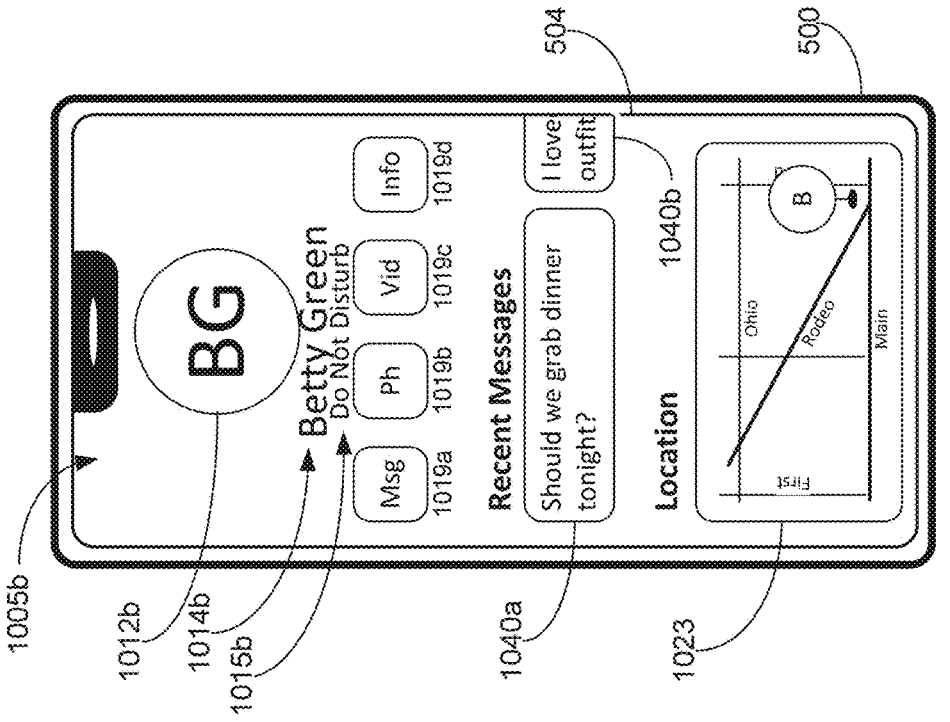
Figure 10L:
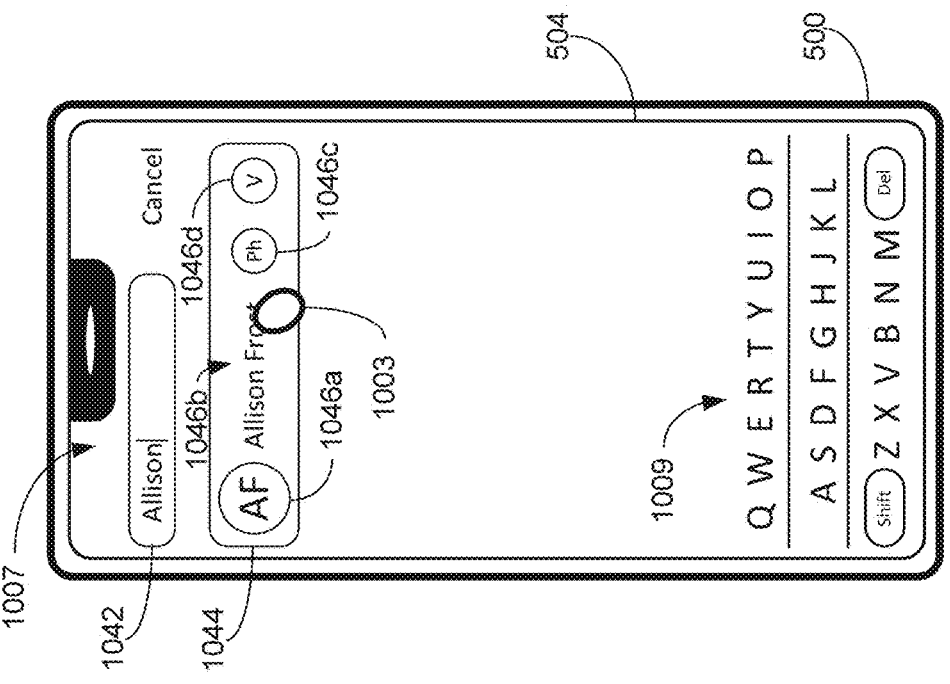
Figure 10K:
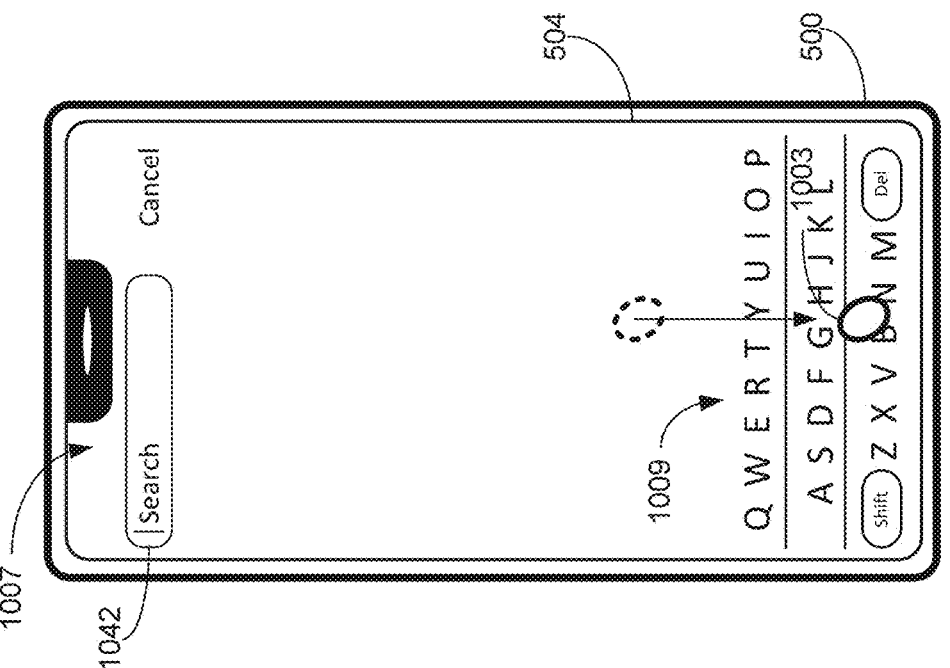
Figure 10N:
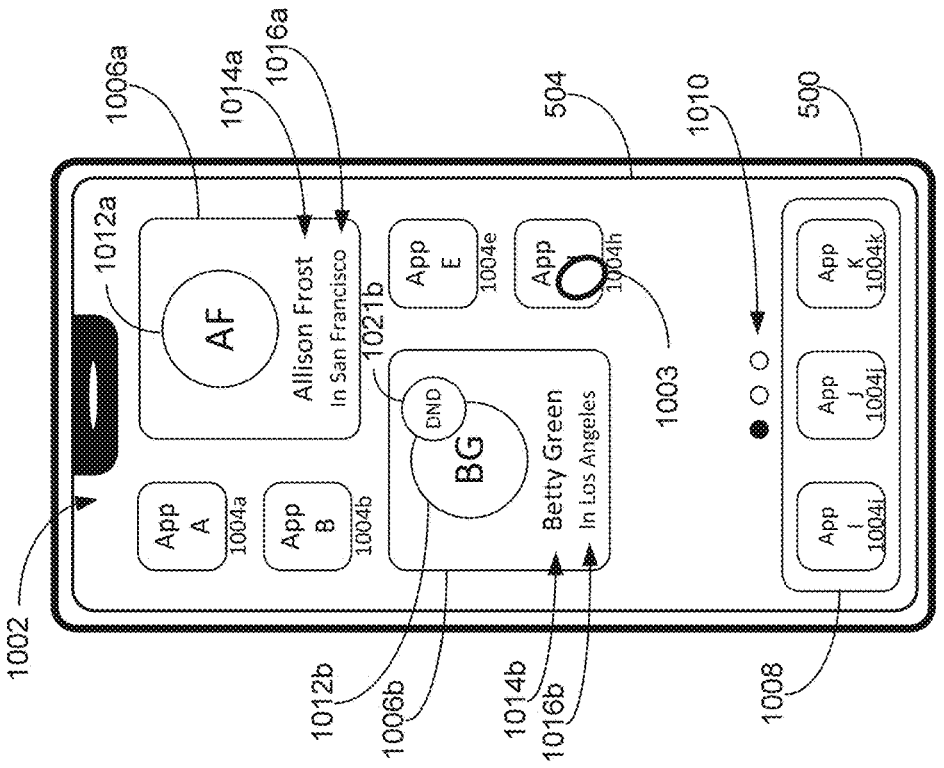
Figure 10M:
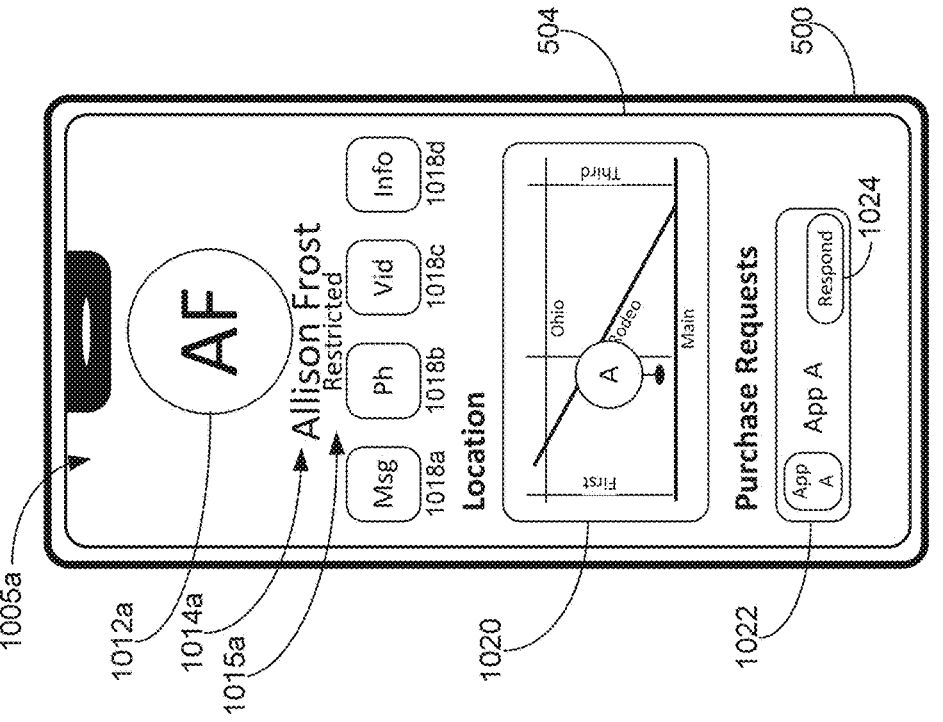
Figure 10P:
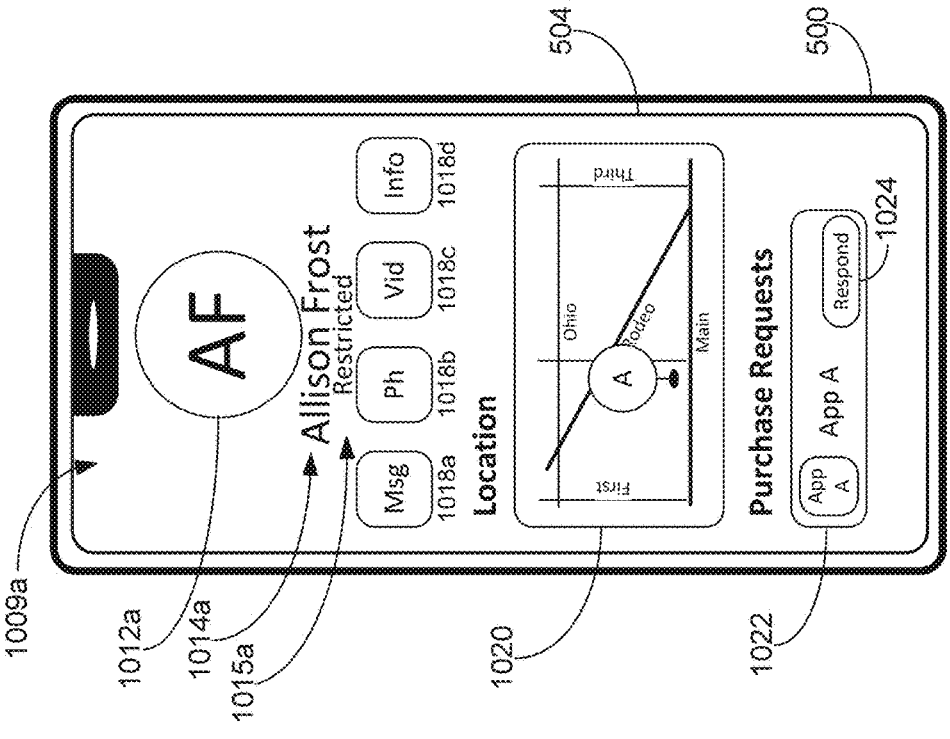
Figure 10P:
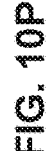
Figure 10O:
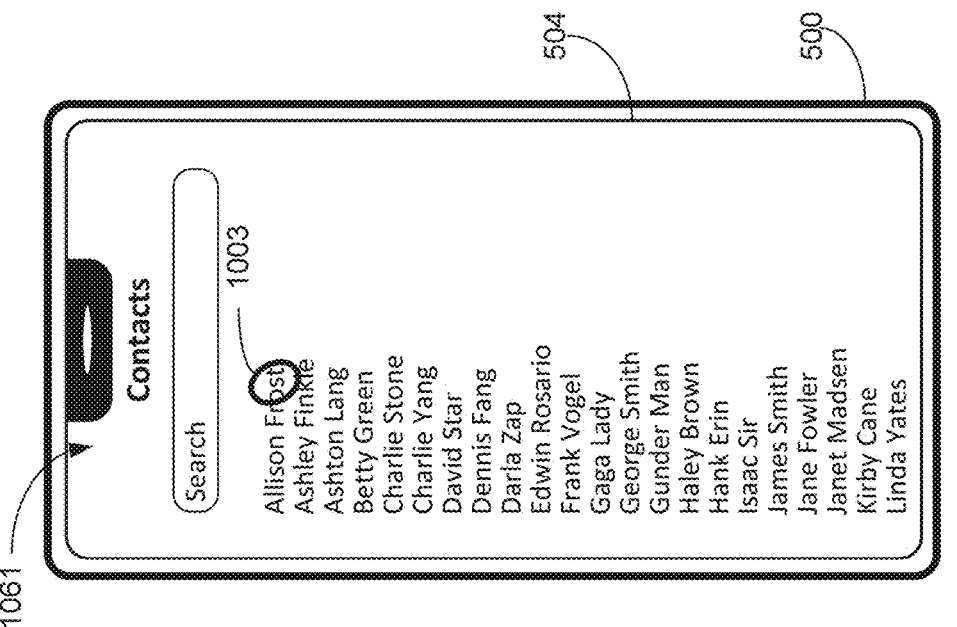
Figure 10R:
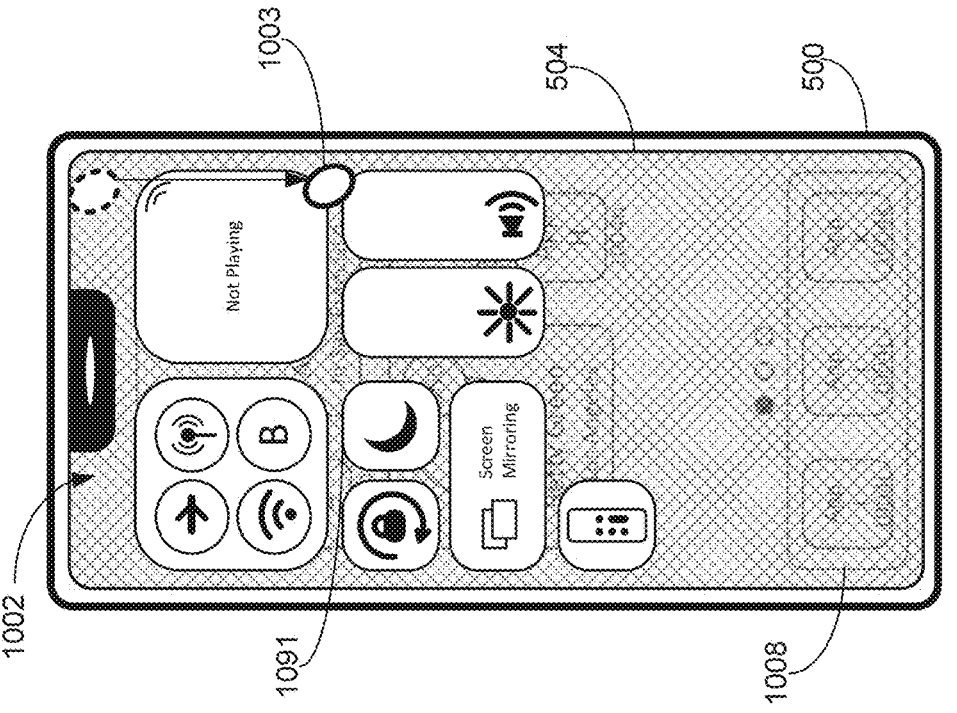
Figure 10Q:
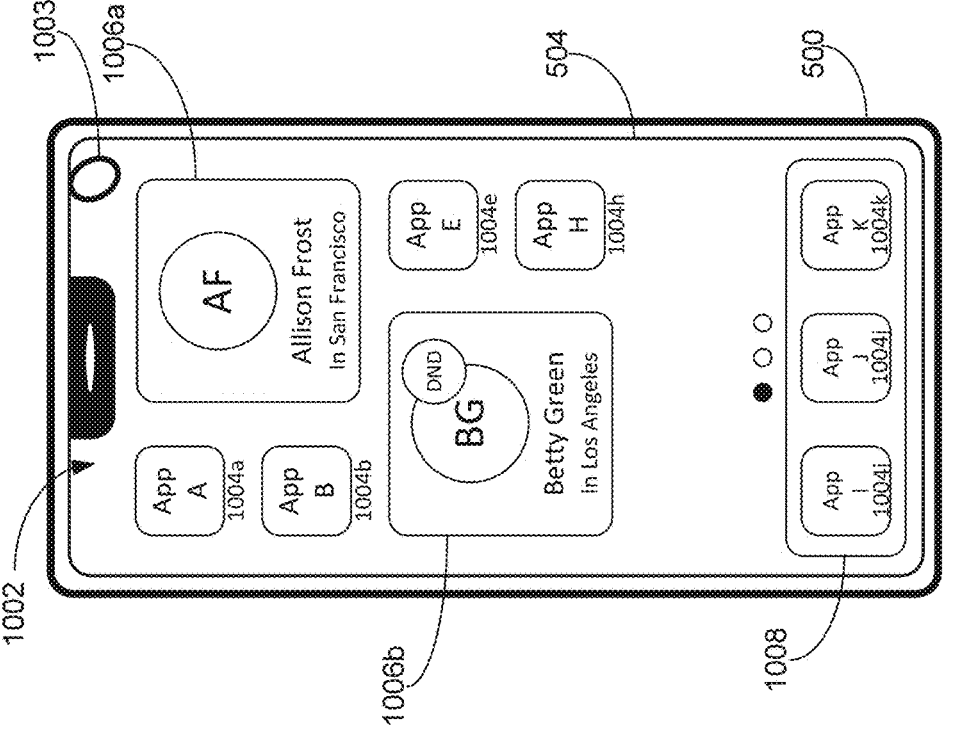
Figure 10T:
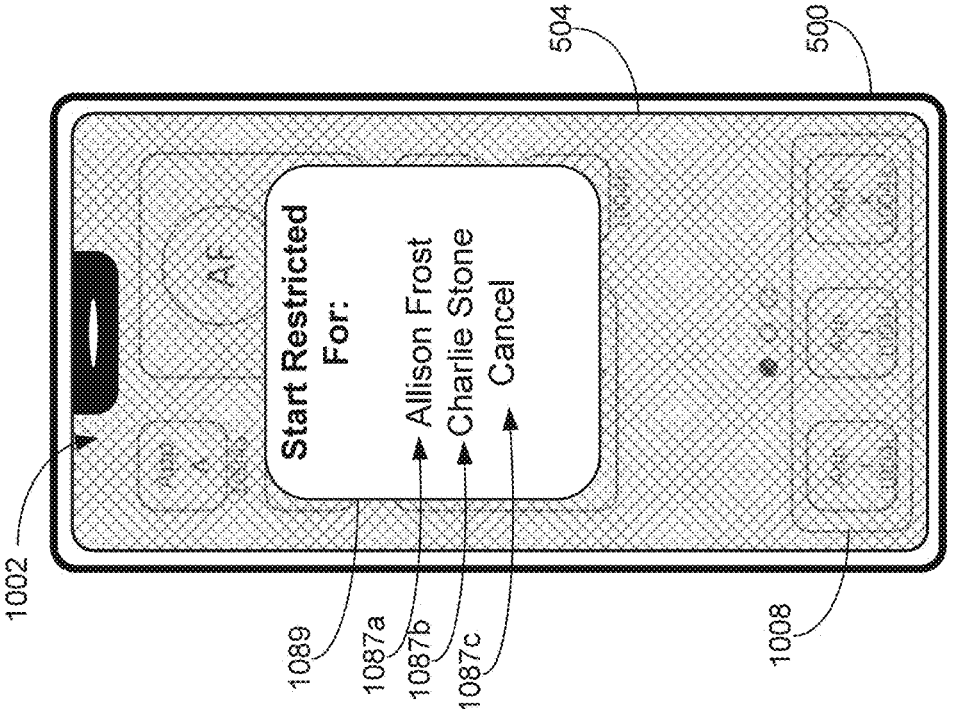
Figure 10T:

FIGS. 10A-10T illustrate exemplary ways in which an electronic device presents information about consenting users selected by the user of the electronic device in an aggregated matter that makes accessing and interacting with such information more efficient in accordance with some embodiments of the disclosure. The embodiments in these figures are used to illustrate the processes described below, including the processes described with reference to FIGS. 11A-11F.

FIG. 10A illustrates electronic device 500 displaying user interface 1002 (e.g., via a display device, via a display generation component, etc.). In some embodiments, user interface 1002 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

User interface 1002 in FIG. 10A is a home screen user interface (e.g., as described with reference to FIG. 4A) of device 500. User interface 1002 includes application icons 1004*a*-1004*k* that are selectable to cause device 500 to display respective user interfaces of the selected application (e.g., device 500 launches the selected application). User interface 1002 is optionally divided into two or more pages, and device optionally displays one page of user interface 1002 at a time. For example, in FIG. 10A, device 500 is displaying the first page of user interface 1002 (e.g., as indicated by the left-most dot of indicator 1010 being filled, and the other two dots of indicator 1010 being unfilled). Further, application icons 1004*i*-1004*k* are displayed in dock 1008, which is optionally displayed by device 500 regardless of which page of user interface 1002 is currently being displayed.

In some embodiments, user interface 1002 includes one or more widgets associated with different users. For example, in FIG. 10A, user interface 1002 includes widget 1006*a*. Widget 1006*a* is optionally a widget of a contacts or people application that is installed on device 500 that has access to and/or displays information about the status of and/or location of users designated by a user of device 500. For example, a user of device 500 is able to select users whose location and/or status to track using the contacts or people application, and the user of device 500 is able to associate one or more widgets with one or more of those users for inclusion on user interface 1002 (or any other user interface of device 500 that can display widgets).

In FIG. 10A, widget 1006*a* is associated with Allison Frost (e.g., a contact of the user of device 500). Widget 1006*a* includes a graphical representation 1012*a* of Allison Frost (e.g., a photo, an avatar, etc.), an indication 1014*a* of the name of Allison Frost and an indication 1016*a* of the current or last known location for Allison Frost. In some embodiments, if the location of Allison Frost is not available to device 500 (e.g., because Allison Frost has disabled or not allowed such access and/or because the location of Allison Frost is unable to be determined), widget 1006*a* does not include indication 816*a*. Widget 1006*a* (and other widgets associated with users, devices, objects, etc. described herein) optionally has one or more of the characteristics of such widgets described with reference to methods 700, 900, 1100 and/or 1300.

In some embodiments, selection of a widget associated with a user causes device 500 to display a user interface associated with that user that includes information associated with that user that has been aggregated from one or more sources. For example, in FIG. 10A, device 500 detects selection of widget 1006*a* (e.g., via a tap of contact 1003). In response, device displays user interface 1005*a* as shown in FIG. 10B. User interface 1005*a* is optionally a user interface that includes information about and/or selectable options for interacting with Allison Frost. For example, user interface 1005*a* includes a graphical representation 1012*a* of Allison Frost (e.g., a photo, an avatar, etc.), an indication 1014*a* of the name of Allison Frost, a selectable option 1018*a* that is selectable to initiate a messaging communication between the user of device 500 and Allison Frost, a selectable option 1018*b* that is selectable to initiate a phone communication between the user of device 500 and Allison Frost, a selectable option 1018*c* that is selectable to initiate a video call communication between the user of device 500 and Allison Frost, and a selectable option 1018*d* that is selectable to display additional contact information (e.g., email address, phone number, home address, etc.) for Allison Frost. User interface 1005*a* in FIG. 10B also includes a representation 1020 of a map that includes a representation (e.g., icon, avatar, etc.) of Allison Frost displayed at a location on map 1020 corresponding to the current or last known location of Allison Frost. If Allison Frost is not sharing location information with the user of device 500, user interface 1005*a* optionally does not include map 1020. Finally, in FIG. 10B, user interface 1005*a* includes element 1022 corresponding to a purchase request from Allison Frost (e.g., that was previously detected by device 500, such as described with reference to FIG. 8G). In FIG. 10B, the purchase request is a request to purchase App A. Thus, element 1022 optionally includes information about App A (e.g., an icon for App A, the name of App A, a description of App A, etc.), and option 1024 that is selectable to respond to (e.g., approve or deny) the purchase request made by Allison Frost for purchasing App A.

In some embodiments, user interface 1005*a* additionally or alternatively includes an indication of a current device status for Allison Frost (e.g., if device 500 has access to such information, as approved by Allison Frost). For example, in FIG. 10C, user interface 1005*a* additionally includes indication 1015*a* indicating that one or more devices associated with Allison Frost are in a restricted usage mode. For example, Allison Frost is optionally a child user in a family account that includes the user of device 500, and the user of device 500 is optionally a parent user in the family account. The parent user optionally has access to control device usage information for the child user (e.g., set usage limits for the device(s) of the child user, set do not use hours during which the child user is restricted from using their device(s), etc.). In some embodiments, the restricted usage mode is a do not use mode on the device(s) of the child user that restricts the ability of the child user to use their device(s) (e.g., between set hours, such as 10 pm to 6 am, during which the device(s) are restricted from being used). In some embodiments, if the user of device 500 does not have access to (e.g., control) device usage for Allison Frost (e.g., Allison Frost is not a child user in the family account, the user of device 500 is not part of the family account and/or not a parent user in the family account, the user of device 500 and Allison Frost are not in the same family account, etc.), device 500 does not display indication 1015*a* in user interface 1005*a*. If device 500 does display indication 1015*a*, and the device(s) of Allison Frost exit the restricted usage mode, device 500 optionally ceases display of indication 1015*a* in user interface 1005*a*.

User interface 1005*a* optionally includes additional information relating to Allison Frost. For example, in FIGS. 10C-10D, device 500 detects an upward swipe on contact 1003. In response, device 500 scrolls downward in user interface 1005*a* to reveal a screen time management request 1026 from Allison Frost, as well as indications 1030 of recent (and/or unread) messages received by the user of device 500 from Allison Frost. Indication 1030*a* includes at least a portion of the content of a communication (e.g., a text message) sent by Allison Frost to the user of device 500, and indication 1030*b* includes at least a portion of the content of an earlier communication (e.g., text message) sent by Allison Frost to the user of device 500. In some embodiments, more recent communications are displayed to the left of less recent communications in user interface 1005*a*. Further, in some embodiments, indications 1030 are selectable to initiate reply communications to the selected communication. For example, indication 1030*a* is selectable to display a user interface of a messaging application associated with the communication to reply to the communication associated with indication 1030*a*, and indication 1030*b* is selectable to display a user interface of a messaging application associated with the communication to reply to the communication associated with indication 1030*b*.

With respect to the screen time management request shown in user interface 1005*a*, in some embodiments, device(s) of Allison Frost is within do not use or do not disturb hours set (e.g., by the user of device 500) for Allison Frost (e.g., a range of times that limit the usage of the device(s) of the child user during those times, for example from 10 pm to 6 am) and/or has reached an aggregate time usage limit set by the user of device 500 for the usage of device(s) of Allison Frost. In one or more of the above scenarios, Allison Frost is able to request, from the user of device 500, approval for more usage time of Allison's device. If Allison Frost makes such a request, the device 500 optionally displays element 1026 in user interface 1005*a* (e.g., until the user of device 500 responds to the request). If Allison Frost has not made such a request, the device 500 optionally does not display element 1026 in user interface 1005*a*. In FIG. 10D, the screen time management request is a request for 15 minutes of more device usage time. Thus, element 1026 optionally includes information about the request (e.g., the amount of additional usage time requested), and option 1028 that is selectable to respond to (e.g., approve or deny) the screen time management request made by Allison Frost.

User interface 1005*a* optionally includes additional information relating to Allison Frost. For example, in FIG. 10E, device 500 detects an upward swipe on contact 1003, and in response, device 500 scrolls downward in user interface 1005*a* to reveal a request 1031 for a transfer of money received from Allison Frost. In some embodiments, if Allison Frost had not requested a transfer of money from the user of device 500, device 500 would not display element 1031 in user interface 1005*a*. For example, Allison Frost optionally has an account, such as a transit account or card, or a cash account or card, and the user of device 1005*a* has permission from Allison Frost to add money to Allison's account. Element 1031 in user interface 1005*a* includes information about the request for money (e.g., indicating the amount of the request and/or the requested destination account for the transfer), and option 1033 that is selectable to respond to (e.g., approve or deny) the request for money made by Allison Frost. In some embodiments, in response to detecting selection of option 1033, device 500 displays a pop-up user interface (e.g., overlaid on user interface 1005*a*) via which the user is able to approve or deny the request for the transfer and/or specify a different amount of money to transfer to the account associated with Allison Frost. In some embodiments, the money is transferred from an account associated with the user of device 500.

User interface 1005*a* optionally includes additional information relating to Allison Frost. For example, in FIG. 10F, device 500 detects an upward swipe on contact 1003, and in response, device 500 scrolls downward in user interface 1005*a* to reveal option 1035. Option 1035 is optionally selected to display a user interface that includes information about device usage by Allison Frost. If device 500 does not have access to device usage for Allison Frost (e.g., because the user of device 500 is not a parent user in a family account in which Allison Frost is a child user), user interface 1005*a* optionally does not include option 1035.

In some embodiments, if the user of device 500 has access to control device usage of Allison Frost (e.g., because the user of device 500 is a parent user in a family account in which Allison Frost is a child user), and if the device(s) of Allison Frost are not already in a restricted usage mode, user interface 1005*a* includes an option 1037 that is selectable to initiate the restricted usage mode on device(s) associated with Allison Frost, as shown in FIG. 10G. Selection of option 1037 optionally enables the restricted usage mode on-demand at the device(s) associated with Allison Frost, irrespective of whether times of day normally associated with the restricted usage mode have been reached.

Device 500 optionally displays different user interfaces with different information in response to detecting selection of different widgets associated with different users. For example, in FIG. 10H, device 500 detects selection of widget 1006*b* associated with Betty Green (e.g., via a tap of contact 1003 on widget 1006*b*). In response, device 500 displays user interface 1005*b*, as shown in FIG. 10I, which is optionally a user interface associated with Betty Green that includes information associated with Betty Green that has been aggregated from one or more sources. User interface 1005*b* optionally has one or more of the characteristics of user interface 1005*a*, but respect to Betty Green rather than Allison Frost. For example, user interface 1005*b* includes a graphical representation 1012*b* of Betty Green (e.g., a photo, an avatar, etc.), an indication 1014*b* of the name of Betty Green, a selectable option 1019*a* that is selectable to initiate a messaging communication between the user of device 500 and Betty Green, a selectable option 1019*b* that is selectable to initiate a phone communication between the user of device 500 and Betty Green, a selectable option 1019*c* that is selectable to initiate a video call communication between the user of device 500 and Betty Green, and a selectable option 1019*d* that is selectable to display additional contact information (e.g., email address, phone number, home address, etc.) for Betty Green. User interface 1005*b* in FIG. 10I also includes a representation 1023 of a map that includes a representation (e.g., icon, avatar, etc.) of Betty Green displayed at a location on map 1023 corresponding to the current or last known location of Betty Green. If Betty Green is not sharing location information with the user of device 500, user interface 1005*b* optionally does not include map 1023.

In some embodiments, user interface 1005*b* additionally or alternatively includes an indication of a current device status for Betty Green (e.g., if device 500 has access to such information, as approved by Betty Green). For example, in FIG. 10I, user interface 1005*b* additionally includes indication 1015*b* indicating that one or more devices associated with Betty Green are in a Do Not Disturb mode (e.g., a mode during which communication attempts with Betty Green are optionally not indicated (e.g., via displayed notifications, via audible ringtones, etc.) by the device(s) of Betty Green).

In FIG. 10I, user interface 1005*b* also includes indications 1040 of recent (and/or unread) messages received by the user of device 500 from Betty Green. Indication 1040*a* includes at least a portion of the content of a communication (e.g., text message) sent by Betty Green to the user of device 500, and indication 1040*b* includes at least a portion of the content of an earlier communication (e.g., text message) sent by Betty Green to the user of device 500. In some embodiments, more recent communications are displayed to the left of less recent communications in user interface 1005*b*. Further, in some embodiments, indications 1040 are selectable to initiate reply communications to the selected communication. For example, indication 1040*a* is selectable to display a user interface of a messaging application associated with the communication to reply to the communication associated with indication 1040*a*, and indication 1040*b* is selectable to display a user interface of a messaging application associated with the communication to reply to the communication associated with indication 1040*b*.

In some embodiments, user interfaces 1005*a* and/or 1006*a* and/or the information displayed in user interfaces 1005*a* and/or 1006*b* are also accessible from other user interfaces displayed by device 500. For example, in FIG. 10J, device 500 is displaying user interface 1002. In FIGS. 10J-10K, while displaying user interface 1002, device 500 detects a downward swipe of contact 1003, and in response, displays a search user interface 1007 for searching content accessible from device 500, as shown in FIG. 10K. User interface 1007 includes a search field 1042 into which text can be entered to search the content accessible from device 500 based on the entered text. User interface 1007 also includes soft keyboard 1009 for entering such text into search field 1042. In FIG. 10L, the text "Allison" has been entered into search field 1042 (e.g., using soft keyboard 1009), and in response, device 500 displays, in user interface 1007, one or more search results corresponding to "Allison". For example, in FIG. 10L, user interface 1007 includes element 1044 corresponding to Allison Frost, including representation 1046*a* (e.g., a graphical representation, such as an avatar or photo, of Allison Frost), an indication 1046*b* of the name of Allison Frost, option 1046*c* that is selectable to initiate an audio call with Allison Frost, and option 1046*d* that is selectable to initiate a video call with Allison Frost. In FIG. 10L, device 500 detects selection of element 1044 (e.g., via a tap of contact 1003 in element 1044 outside of options 1046*c* and 1046*d*), and in response, device 500 displays user interface 1005*a*, as shown in FIG. 10M.

As another example, in some embodiments, user interfaces 1005*a* and/or 1006*a* and/or the information displayed in user interfaces 1005*a* and/or 1006*b* are also accessible from a contacts application installed on device 500. For example, in FIG. 10N, device 500 is displaying user interface 1002. Device 500 detects selection of application icon 1004*h* (e.g., corresponding to the contacts application), such as via a tap of contact 1003 on application icon 1004*h*. In response, device 500 displays user interface, as shown in FIG. 10O. User interface 1061 is optionally a user interface of the contacts application via which information about contacts of the user of device 500 can be accessed. User interface 1061 includes a search field for searching the contacts of the user, and a list of contacts of the user of device 500. In FIG. 10O, device 500 detects selection of Allison Frost (e.g., via a tap of contact 1003) in the list of contacts. In response, device 500 displays user interface 1009*a*, as shown in FIG. 10P. User interface 1009*a* is optionally the same user interface as user interface 1005*a* described earlier, or is optionally a different user interface than user interface 1005*a* (e.g., a user interface of a different application, such as the contacts application, than is user interface 1005*a*), but includes the information and/or features described with reference to user interface 1005*a*.

In some embodiments, in addition to being able to initiate Downtime for a device of a user via user interfaces 1005*a*, 1005*b* and/or 1009*a*, device 500 provides for an option in a control center user interface that is selectable to initiate downtime on a user's device. For example, in FIG. 10Q, device 500 is displaying user interface 1002. In FIGS. 10Q-10R, device 500 detects contact 1003 performing a downward edge swipe gesture from the top-right portion of touch screen 504, which causes device 500 to display a control center user interface overlaid on user interface 1002, as shown in FIG. 10R. The control center user interface includes one or more controls for controlling various operations or functionalities of device 500, such as a selectable option for toggling on/off a Wi-Fi radio of device 500, a control for controlling the brightness of touch screen 504, a control for controlling the volume of device 500, etc. In FIG. 10R, the control center user interface also includes option 1091 that is interactable to initiate a Do Not Disturb or Downtime mode on device 500 and/or on the device of a user associated with a widget displayed on user interface 1002 (e.g., Allison Frost). For example, in response to detecting a tap of a contact on option 1091 (e.g., a touchdown of a contact followed by a liftoff of the contact within a time threshold (e.g., 0.1, 0.3, 0.5, 1, 2, 3 seconds) of the touchdown of the contact), device 500 initiates a Do Not Disturb mode at device 500. In response to detecting a tap and hold of a contact on option 1091 (e.g., a touchdown of a contact followed by a liftoff of the contact after the time threshold (e.g., 0.1, 0.3, 0.5, 1, 2, 3 seconds) of the touchdown of the contact), device 500 optionally instead facilitates initiating a Do Not Disturb or Downtime mode on another device of another user.

Figure 10S:
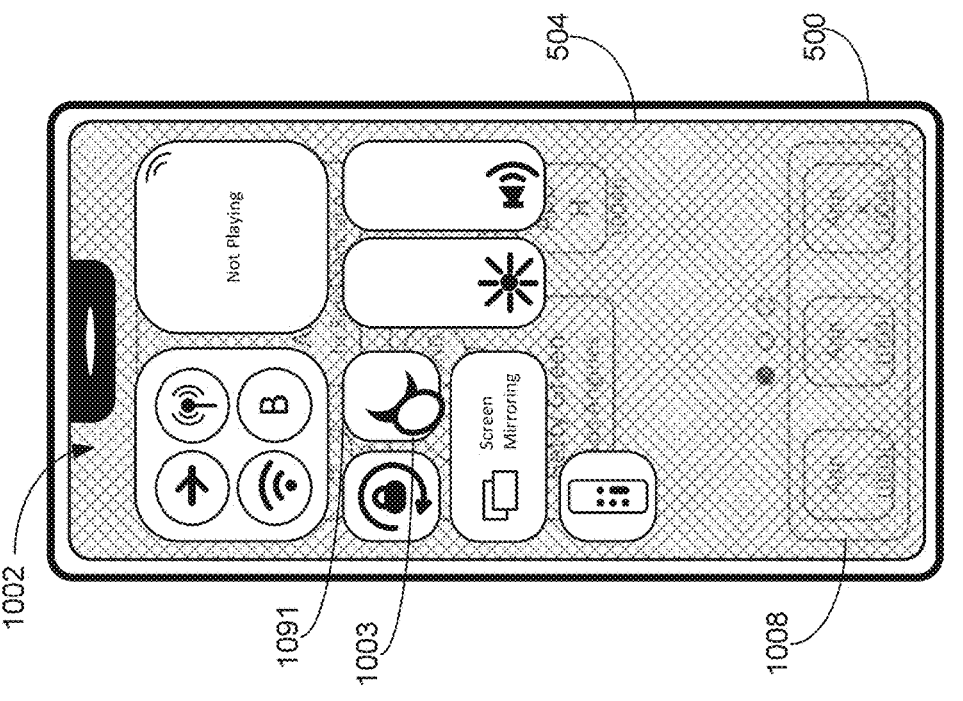
Figure 11A:
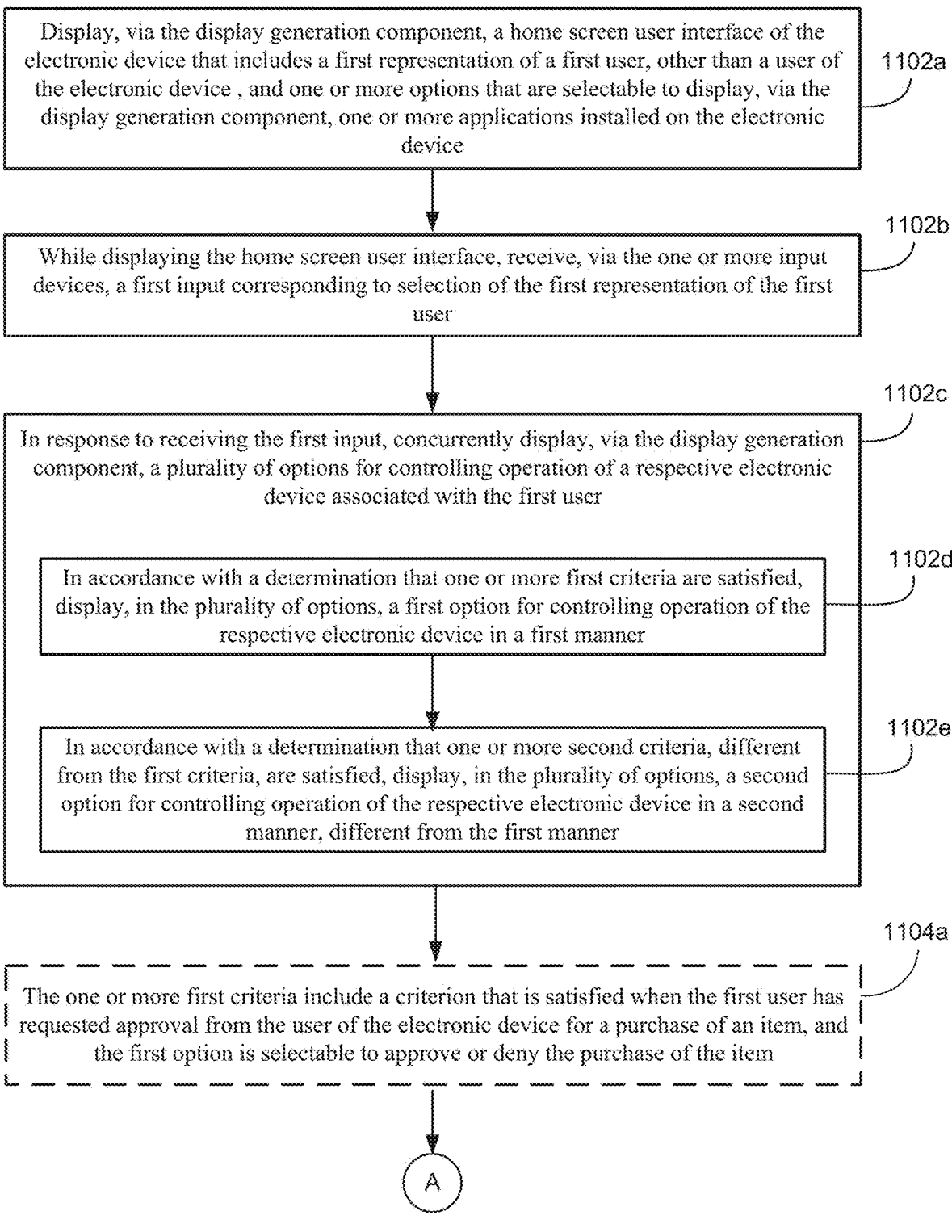
Figure 11B:
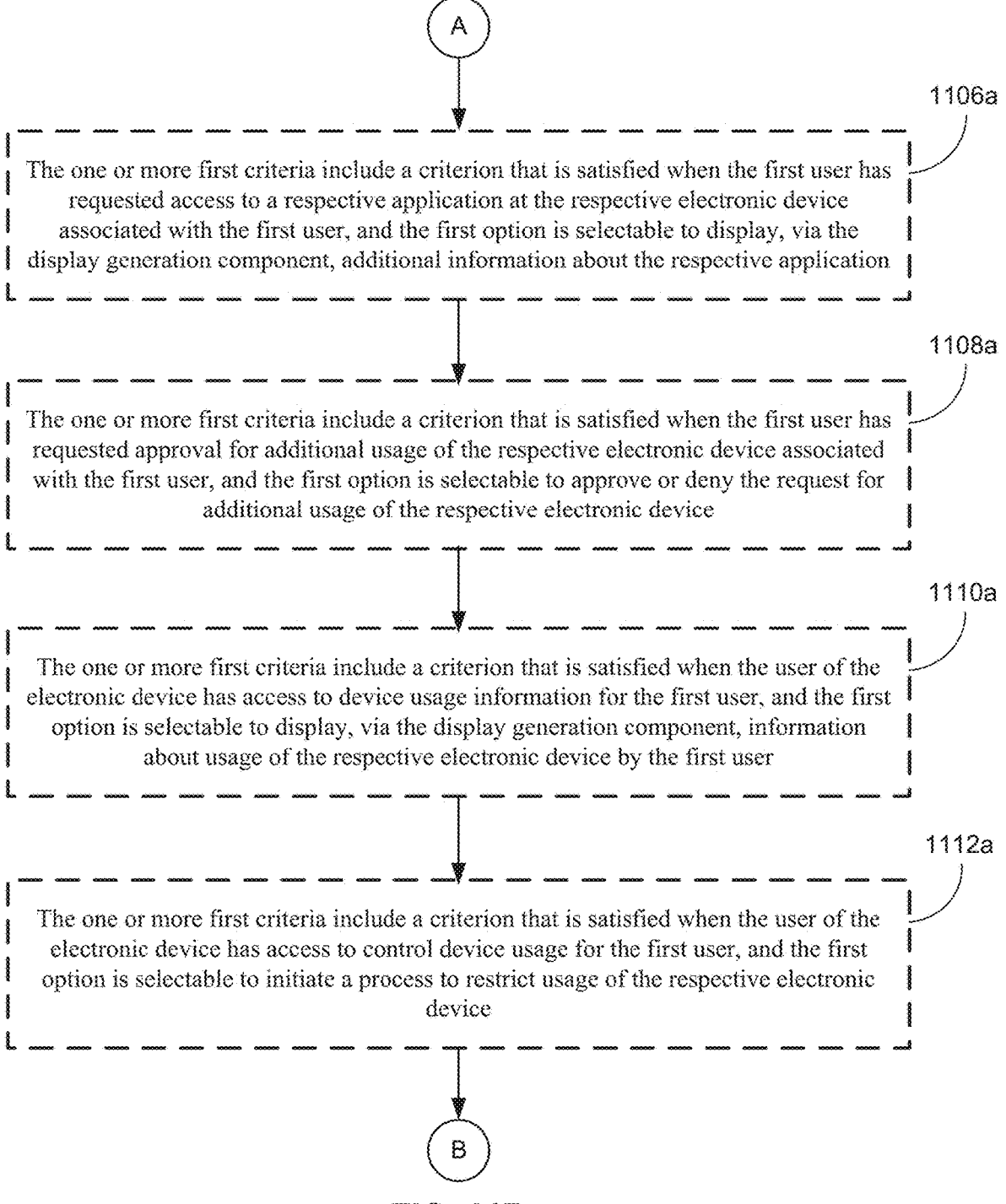
Figure 11E:
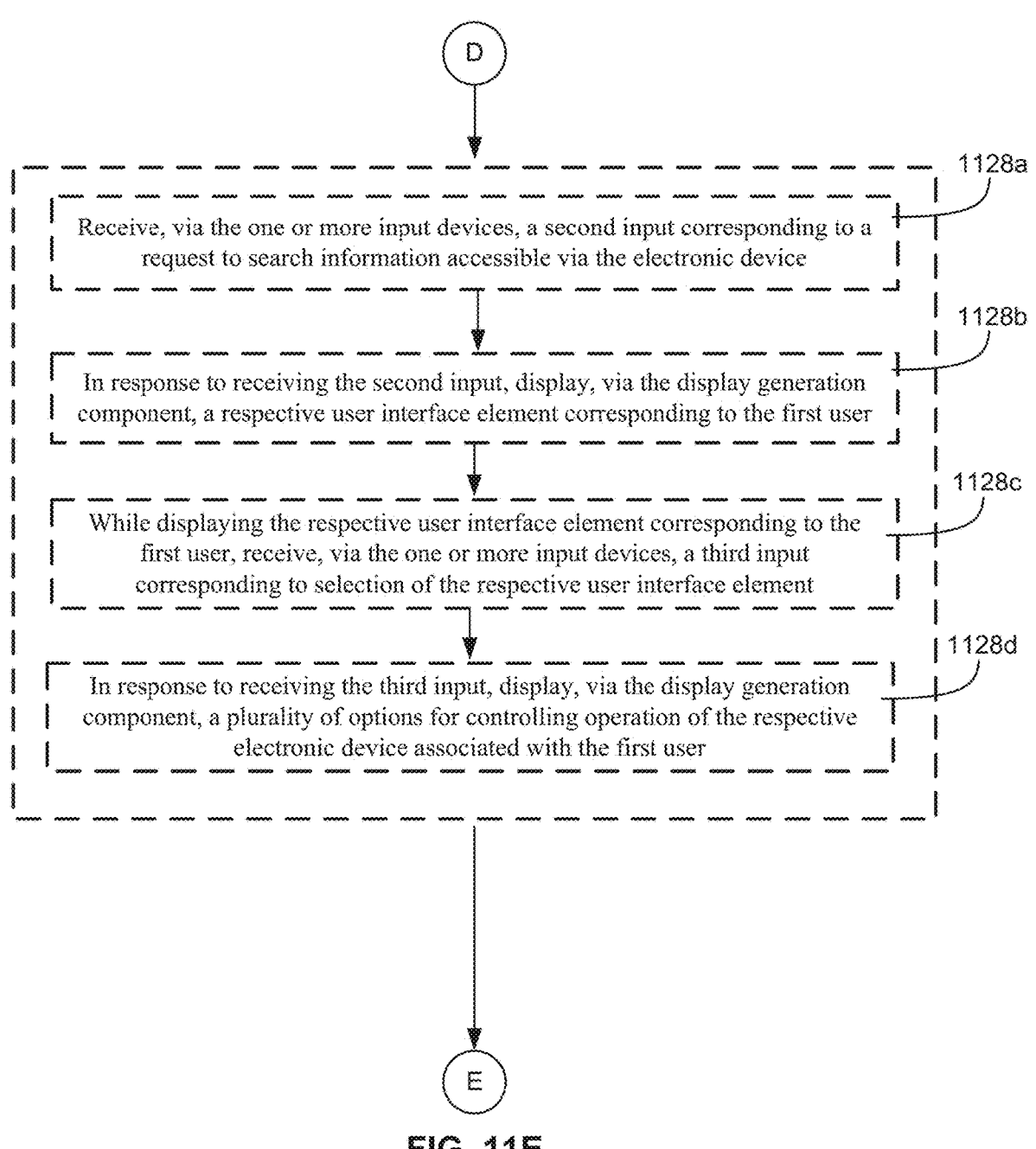

For example, in FIG. 10S, device 500 detects a tap and hold of contact 1003 on option 1091. In response, device 500 displays user interface 1089 (e.g., overlaid on the control center user interface and/or user interface 1002) that includes options for enabling a Do Not Disturb or Downtime mode on device(s) of users associated with widgets displayed by device 500 (e.g., Allison Frost) and/or users that are child users in a family account in which the user of device 500 is a parent user (e.g., Charlie Stone). For example, in FIG. 10T, user interface 1089 includes an option 1087a that is selectable to enable a Downtime mode on device(s) of Allison Frost (e.g., associated with widget 1006a and/or a child user in a family account in which the user of device 500 is a parent user), an option 1087b that is selectable to enable a Downtime mode on device(s) of Charlie Stone (e.g., a child user in a family account in which the user of device 500 is a parent user), and/or option 1087c that is selectable to close user interface 1089 without enabling a Downtime mode on device(s) of Allison Frost or Charlie Stone.

FIGS. 11A-11F are flow diagrams illustrating a method 1100 of presenting information about consenting users selected by the user of the electronic device in an aggregated matter that makes accessing and interacting with such information more efficient in accordance with some embodiments, such as in FIGS. 10A-10P. The method 1100 is optionally performed at an electronic device such as device 100, device 300, or device 500 as described above with reference to FIGS. 1A-1B, 2-3, 4A-4B and 5A-5H. Some operations in method 1100 are, optionally combined and/or order of some operations is, optionally, changed.

As described below, the method 1100 provides ways to present information about consenting users selected by the user of the electronic device in an aggregated matter that makes accessing and interacting with such information more efficient. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1100 is performed at an electronic device in communication with a display generation component and one or more input devices. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the electronic device displays (1102a), via the display generation component, a home screen user interface of the electronic device, such as user interface 1002 in FIG. 10A (e.g., a home screen user interface such as described with reference to FIG. 4A, such as a user interface that includes a plurality of application icons and/or widgets that are selectable to display respective applications that are (e.g., installed) on the electronic device) that includes a first representation of a first user, other than a user of the electronic device, such as widget 1006a in FIG. 10A (e.g., a representation or widget or "card" that corresponds to a user other than the user associated with the electronic device, a contact of the user of the electronic device). In some embodiments, the first user is designated in response to input from the user of the electronic device. In some embodiments, the representation of the first user includes an image associated with or of the first user (e.g., avatar of a user) and/or a name of the user. In some embodiments, the first representation of the first user has one or more of the characteristics of corresponding representations or user interface elements described with reference to methods 700, 900 and/or 1300. In some embodiments, the home screen user interface further includes one or more options that are selectable to display, via the display generation component, one or more applications installed on the electronic device, such as icons 1004a-1004k in FIG. 10A (e.g., one or more application icons that are selectable to display the selected application).

In some embodiments, while displaying the home screen user interface, the electronic device receives (1102b), via the one or more input devices, a first input corresponding to selection of the first representation of the first user, such as selection by contact 1003 in FIG. 10A (e.g., a tap on the first representation of the first user, a tap and hold (e.g., a long tap) on the first representation of the first user, etc.). In some embodiments, in response to receiving the first input, the electronic device concurrently displays (1102c), via the display generation component, a plurality of options for controlling operation of a respective electronic device (e.g., other than the electronic device) associated with the first user, such as shown in user interface 1005a in FIGS. 10B-10G (e.g., in a user interface associated with the first user, other than the home screen user interface of the electronic device). In some embodiments, the user interface that is displayed also concurrently includes one or more of a name of the first user, a graphical representation of the first user (e.g., an avatar or photo associated with the first user), contact information (e.g., address, phone number, email address, etc.) for the first user, and/or communication or contact affordances that are selectable to initiate communication (e.g., phone call, video call, text message, etc.) with the first user, etc.).

In some embodiments, displaying the plurality of options includes in accordance with a determination that one or more first criteria are satisfied (e.g., a respective electronic device associated with the first user, different from the electronic device, has performed a first operation with respect to the electronic device associated with the user. For example, the first user has provided input to the respective electronic device to purchase an item of content using the account of the first user on the respective electronic device, and the account of the user on the electronic device is configured to approve or deny such purchases before the account of the first user is permitted to proceed with the purchase), displaying, in the plurality of options, a first option for controlling operation of the respective electronic device in a first manner (1102*d*), such as option 1024 in FIG. 10C (e.g., the user interface that is associated with the first user that is displayed in response to receiving the first input includes selectable option(s) that are selectable to deny or approve the purchase request of the first user if the first user made the purchase request. If the first user did not make the purchase request, the user interface that is associated with the first user that is displayed in response to receiving the first input optionally does not include the option(s) to deny or approve the purchase request).

In some embodiments, displaying the plurality of options includes in accordance with a determination that one or more second criteria, different from the first criteria, are satisfied (e.g., if the first user is configured as a child member of a family account that includes the user of the electronic device and the first user, and if the user of the electronic device is configured as a parent member of the family account), displaying, in the plurality of options, a second option for controlling operation of the respective electronic device in a second manner, different from the first manner (1102*e*), such as option 1028 in FIG. 10D (e.g., the user interface that is associated with the first user that is displayed in response to receiving the first input includes selectable option(s) that are selectable to initiate usage restrictions at the respective electronic device that is associated with the first user, such as initiating hours during which the respective electronic device cannot be used by the first user, in some embodiments except for a subset of one or more operations that have been configured by the first user to be permitted during the restricted usage hours). In some embodiments, if the first user is not configured as a child member of a family account that includes the user of the electronic device and the first user, or if the user of the electronic device is not configured as a parent member of the family account, the user interface that is associated with the first user that is displayed in response to receiving the first input does not include such option(s) to initiate usage restrictions at the respective electronic device that is associated with the first user. Thus, in some embodiments, in response to receiving the first input, the electronic device displays information and/or selectable options related to aggregated pluralities of different activities or different operations that have been performed by the first user and/or the respective electronic device of the first user that are relevant to and/or involve the user of the electronic device and/or the electronic device. The above-described manner of displaying different options for interacting with the first user and/or the respective electronic device provides a quick and efficient manner of accessing and interacting with different actions of the first user that are relevant to and/or involve the user of the electronic device and/or controlling operation of the respective electronic device, which simplifies the interaction between the user and the electronic device and enhances the operability of the electronic device and makes the user-device interface more efficient (e.g., by avoiding the need for additional inputs to individually separately locate and access options for performing such controlling of the respective electronic device), which additionally reduces power usage and improves battery life of the electronic device by enabling the user to use the electronic device more quickly and efficiently.

In some embodiments, the one or more first criteria include a criterion that is satisfied when the first user has requested approval from the user of the electronic device for a purchase of an item (e.g., content item, movie, television show, application, game, subscription to a content streaming service, etc.), and the first option is selectable to approve or deny the purchase of the item (1104*a*), such as option 1024 in FIG. 10C. In some embodiments, the user of the electronic device is part of a family account with a content delivery, purchase and/or storage service. In some embodiments, accounts that are included in the family account have access to (at least some designated portion of) content of other accounts that are included in the family account and/or have access to a shared purchase account (e.g., credit card) for purchasing content that becomes available to the accounts within the family account. In some embodiments, one or more accounts in the family account are designated as parent accounts, and one or more accounts in the family account are designated as child accounts. In some embodiments, the first user is a child account in the family account. In some embodiments, the purchase request must be approved by the parent before the purchase is allowed to proceed (e.g., using the purchase account associated with the family account). In some embodiments, if the first user has not requested approval from the user of the electronic device for the purchase of an item, the electronic device does not display the first option in response to the first input. The above-described manner of displaying an option to respond to a purchase request provides for a quick and efficient manner of responding to a purchase request, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more first criteria include a criterion that is satisfied when the first user has requested access to a respective application at the respective electronic device associated with the first user (e.g., the first user has made a request to purchase and/or download the respective application to the respective electronic device. In some embodiments, the user of the electronic device must approve of the request before the request can proceed), and the first option is selectable to display, via the display generation component, additional information about the respective application (1106*a*), such as element 1022 in FIG. 10C (e.g., information not displayed concurrently with the first option). For example, the first option is selectable to display, via the display generation component, a user interface of an application store application via which applications are downloadable and/or can be purchased. In some embodiments, the user interface that is displayed is a user interface associated with the requested application in the application store, and includes various information about the application such as information about the consumer ratings of the application, awards earned by the application, age-based ratings of the application (e.g., rated for ages 3+, 5+, 8+, 13+, etc.), a description of the application, etc. In some embodiments, if the first user has not requested access to the respective application, the electronic device does not display the first option in response to the first input. The above-described manner of displaying additional information about the application provides for a quick and efficient manner of accessing relevant information for responding to the request of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more first criteria include a criterion that is satisfied when the first user has requested approval for additional usage of the respective electronic device associated with the first user, and the first option is selectable to approve or deny the request for additional usage of the respective electronic device (1108*a*), such as option 1028 in FIG. 10D. For example, the first user is optionally a child user in a family account that includes the user of the electronic device, and the user of the electronic device is optionally a parent user in the family account. The parent user optionally has access to device usage information for the child user. In some embodiments, the child user has reached a device usage limit set (e.g., by the user of the electronic device) for the child user (e.g., the child user has reached the usage limit for their device(s) for the day, and/or the child user has reached the usage limit for one or more particular applications on their device(s) for the day, etc.). In some embodiments, the child user's device is within do not use or do not disturb hours set (e.g., by the user of the electronic device) for the child user (e.g., a range of times that limit the usage of the device(s) of the child user during those times, for example from 10 pm to 6 am). In one or more of the above scenarios, the child user is able to request, from the parent user(s), approval for more usage time of the child's device. If the child user makes such a request, the electronic device optionally displays the first option in response to the first input. In some embodiments, if the first user has not requested additional usage of the respective electronic device, the electronic device does not display the first option in response to the first input. The above-described manner of providing for an option to respond to the request for additional usage time provides for a quick and efficient manner of approving or denying the request for additional usage time, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more first criteria include a criterion that is satisfied when the user of the electronic device has access to device usage information for the first user, and the first option is selectable to display, via the display generation component, information about usage of the respective electronic device by the first user (1110*a*), such as option 1035 in FIG. 10F. For example, the first user is optionally a child user in a family account that includes the user of the electronic device, and the user of the electronic device is optionally a parent user in the family account. The parent user optionally has access to device usage information for the child user (e.g., information about how long the child user has used their device(s) today or in the last week, information about how long the user has used particular applications on their device(s) today or in the last week, etc.). In some embodiments, selection of the first option causes the electronic device to display a user interface that includes such information about the usage of the respective electronic device by the first user, and from which information about the usage of other devices by other child members of the family account is also accessible. In some embodiments, if the user of the electronic device does not have access to device usage information for the first user (e.g., the first user is not a child user in the family account, the user of the electronic device is not a parent user in the family account, the user of the electronic device and the first user are not in the same family account, etc.), the electronic device does not display the first option in response to the first input. The above-described manner of providing for an option to view device usage information provides for a quick and efficient manner of accessing such usage information, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more first criteria include a criterion that is satisfied when the user of the electronic device has access to control device usage for the first user, and the first option is selectable to initiate a process to restrict usage of the respective electronic device (1112*a*), such as option 1037 in FIG. 10G. For example, the first user is optionally a child user in a family account that includes the user of the electronic device, and the user of the electronic device is optionally a parent user in the family account. The parent user optionally has access to control device usage information for the child user (e.g., set usage limits for the device(s) of the child user, set do not use hours during which the child user is restricted from using their device(s), etc.). In some embodiments, selecting the first option causes the electronic device to activate a do not use mode on the device(s) of the child user that restricts the ability of the child user to use their device(s) (e.g., as if the device(s) of the child user are within set hours, such as 10 μm to 6 am, during which the device(s) are restricted from being used, even though those hours have not yet been reached). In some embodiments, if the user of the electronic device does not have access to control device usage for the first user (e.g., the first user is not a child user in the family account, the user of the electronic device is not a parent user in the family account, the user of the electronic device and the first user are not in the same family account, etc.), the electronic device does not display the first option in response to the first input. The above-described manner of providing for an option to restrict usage of the respective electronic device provides for a quick and efficient manner of controlling usage of the electronic device of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device receives (1114a), via the one or more input devices, a second input corresponding to a request to display a control center user interface for controlling one or more functionalities of the electronic device, such as input from contact 1003 in FIGS. 10Q-10R (e.g., detection of a downward swipe from an upper-right corner of the displayed user interface). In some embodiments, in response to receiving the second input, the electronic device displays (1114b), via the display generation component, the control center user interface, such as shown in FIG. 10R (e.g., as an overlay on the user interface that was displayed when the second input was received) that includes a first respective option that is selectable to control a first functionality of the electronic device (e.g., the control center user interface is optionally a user interface that includes one or more options for toggling or controlling various device functionalities, such as toggling Wi-Fi, toggling Bluetooth, controlling device speaker volume, etc.), and a second respective option that is selectable to initiate a process to restrict usage of the respective electronic device associated with the first user, such as option 1091 in FIG. 10R. For example, the control center user interface also includes an option to activate a do not use mode on the device(s) of the first user. The first user is optionally a child user in a family account that includes the user of the electronic device, and the user of the electronic device is optionally a parent user in the family account. The parent user optionally has access to control device usage information for the child user (e.g., set usage limits for the device(s) of the child user, set do not use hours during which the child user is restricted from using their device(s), etc.). In some embodiments, selecting the second respective option causes the electronic device to activate a do not use mode on the device(s) of the child user that restricts the ability of the child user to use their device(s) (e.g., as if the device(s) of the child user are within set hours, such as 10 pm to 6 am, during which the device(s) are restricted from being used, even though those hours have not yet been reached). In some embodiments, if the user of the electronic device does not have access to control device usage for the first user (e.g., the first user is not a child user in the family account, the user of the electronic device is not a parent user in the family account, the user of the electronic device and the first user are not in the same family account, etc.), the second respective option in the control center user interface is not selectable to initiate the do not use mode on the device(s) of the first user. In some embodiments, the second respective option is selectable to initiate a do not use mode on the electronic device. The above-described manner of providing for an option to restrict usage of the respective electronic device provides for a quick and efficient manner of controlling usage of the electronic device of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the control center user interface, the electronic device receives (1116a), via the one or more input devices, a third input directed to the second respective option, such as input from contact 1003 in FIG. 10S (e.g., a tap, a tap and hold, etc.). In some embodiments, in response to receiving the third input (1116b): in accordance with a determination that the third input satisfies one or more first criteria (e.g., if the third input is a tap and hold input (e.g., holding for longer than 0.1, 0.3, 0.5, 1, 2, 5 seconds)), the electronic device initiates (1116c) the process to restrict usage of the respective electronic device, such as shown in FIG. 10T (e.g., displaying one or more options that are selectable (e.g., via a tap without a hold) to cause the respective electronic device to enter the do not use mode). Thus, in some embodiments, detecting a tap without the subsequent hold on the second respective option causes the electronic device to enter the do not use mode (e.g., without causing the respective electronic device to enter the do not use mode and/or without displaying an option that is selectable to cause the respective electronic device to enter the do not use mode). In some embodiments, detecting a tap and hold on the second respective option displays an option that is selectable to cause the respective electronic device to enter the do not use mode (e.g., without causing the electronic device to enter the do not use mode). In some embodiments, if the user of the electronic device does not have access to control device usage for the first user (e.g., the first user is not a child user in the family account, the user of the electronic device is not a parent user in the family account, the user of the electronic device and the first user are not in the same family account, etc.), a tap a hold input on the second respective option does not cause display of the one or more options that are selectable (e.g., via a tap without a hold) to cause the respective electronic device to enter the do not use mode and/or does not cause the respective electronic device to enter the do not use mode. The above-described manner of providing for an option to restrict usage of the respective electronic device provides for a quick and efficient manner of controlling usage of the electronic device of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the one or more first criteria include a criterion that is satisfied when the user of the electronic device is able to transfer money to an account associated with the first user (e.g., the first user has an account, such as a transit account or card, or a cash account or card; the user of the electronic device has permission to add money to such an account of the first user; the first user is a child user in a family account that includes the user of the electronic device; and/or the user of the electronic device is a parent user in the family account), and the first option is selectable to initiate a process to transfer money to the account associated with the first user (1118a), such as option 1033 in FIG. 10F. For example, the first option is selectable to cause the electronic device to display a pop-up user interface via which the user is able to specify an amount of money to transfer to the account associated with the first user. In some embodiments, the money is transferred from an account associated with the user of the electronic device. In some embodiments, if the user of the electronic device is not able to transfer money to the account associated with the user, the electronic device does not display the first option in response to receiving the first input. The above-described manner of providing for an option to restrict usage of the respective electronic device provides for a quick and efficient manner of controlling usage of the electronic device of the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the home screen user interface further includes a second representation of a second user, different from the first user (1120*a*), such as user interface 1002 including widgets 1006*a* and 1006*b* in FIG. 10H (e.g., the home screen user interface includes multiple widgets that are associated with different users, such as described with reference to methods 700, 900 and/or 1300). In some embodiments, while displaying the home screen user interface, the electronic device receives (1120*b*), via the one or more input devices, a second input corresponding to selection of the second representation of the second user, such as via contact 1003 in FIG. 10H (e.g., a tap on the second representation of the second user, a tap and hold (e.g., a long tap) on the second representation of the second user, etc.). In some embodiments, in response to receiving the second input, the electronic device concurrently displays (1120*c*), via the display generation component, a plurality of options for controlling operation of a second respective electronic device (e.g., other than the electronic device) associated with the second user, such as shown in user interface 1005*b* in FIG. 10I (e.g., in a user interface associated with the second user, other than the home screen user interface of the electronic device). In some embodiments, the user interface that is displayed also concurrently includes one or more of a name of the second user, a graphical representation of the second user (e.g., an avatar or photo associated with the second user), contact information (e.g., address, phone number, email address, etc.) for the second user, and/or communication or contact affordances that are selectable to initiate communication (e.g., phone call, video call, text message, etc.) with the second user, etc. The plurality of options for controlling operation of a second respective electronic device optionally has one or more analogous characteristics of the plurality of options for controlling operation of the respective electronic device associated with the first user, including the first option for controlling operation of the respective electronic device in the first manner and/or the second option for controlling operation of the respective electronic device in the second manner. The above-described manner of displaying different options for interacting with the second user and/or the second respective electronic device provides a quick and efficient manner of accessing and interacting with different actions of the second user that are relevant to and/or involve the user of the electronic device and/or controlling operation of the second respective electronic device, which simplifies the interaction between the user and the electronic device and enhances the operability of the electronic device and makes the user-device interface more efficient (e.g., by avoiding the need for additional inputs to individually separately locate and access options for performing such controlling of the second respective electronic device), which additionally reduces power usage and improves battery life of the electronic device by enabling the user to use the electronic device more quickly and efficiently.

In some embodiments, in response to receiving the first input, the electronic device displays (1122*a*), via the display generation component, information about a location associated with the first user, such as shown in map 1020 in FIG. 10B. For example, the plurality of options for controlling operation of the respective electronic device is displayed in a user interface that also includes a representation of a map that includes an indication of the first user at a location on the map that corresponds to a current or last known location for the first user (e.g., as described with reference to methods 700 and/or 900). In some embodiments, the user interface does not include the map if the first user is not sharing location information with the user of the electronic device. In some embodiments, the map is selectable to display a user interface of a location tracking application, such as described with reference to methods 700 and/or 900, for viewing additional location-related information about the first user. The above-described manner of displaying location information for the first user with the plurality of options provides a quick and efficient manner of accessing location information for the first user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the first input, the electronic device displays (1124*a*), via the display generation component, information about one or more recent communications associated with the first user, such as representations 1030*a* and 1030*b* in FIG. 10D. For example, the plurality of options for controlling operation of the respective electronic device is displayed in a user interface that also includes representations of one or more recent and/or unread communications to the first user and/or from the first user. For example, the user interface includes representations of recent (e.g., a communication that was sent within the last 1 hr., 6 hrs., 24 hrs., 48 hrs., etc.) and/or unread text messages from the first user, representations of unread emails from the first user, representations of unread voicemails from the first user, etc. In some embodiments, the representations are selectable to access corresponding applications for responding to such communications (e.g., a representation of an unread text message is selectable to display a text message application user interface via which to respond to the communication, a representation of an unread email is selectable to display an email application user interface via which to respond to the communication, etc.). In some embodiments, communications associated with the first user that are not recent and/or not unread are not displayed by the electronic device in response to receiving the first input. The above-described manner of displaying representations of recent communications provides a quick and efficient manner of accessing communications likely to be of interest to the user of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the first input, the electronic device displays (1126*a*), via the display generation component, information about a current status of the first user, such as indication 1015*a* in FIG. 10C. For example, the plurality of options for controlling operation of the respective electronic device is displayed in a user interface that also includes a visual indication of the current status of the first user. For example, if the first user is currently in a do not disturb mode, the user interface includes a visual indication that indicates that the first user is in a do not disturb mode. If the first user is currently busy (e.g., based on calendar data for the first user), the user interface optionally includes a visual indication that indicates that the first user is currently busy. If the first user is in a do not use mode (e.g., as defined by a family account as described above), the user interface optionally includes a visual indication that indicates that the first user is currently in a do not use mode. If the first user does not currently have the above status(es), the user interface optionally does not include the indication(s) of the above status(es). The above-described manner of indicating status for the first user provides a quick and efficient manner of avoiding inputs for interaction with the first user if the status of the first user is not conducive to such interactions, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device receives (1128a), via the one or more input devices, a second input corresponding to a request to search information accessible via the electronic device, such as the inputs shown in FIGS. 10J-10K (e.g., a user input to display a search user interface via the display generation component and/or enter one or more search terms into the search user interface to search for content, applications, emails, text messages, contacts, etc. associated with the one or more search terms). In some embodiments, in response to receiving the second input, the electronic device displays (1128b), via the display generation component, a respective user interface element corresponding to the first user, such as element 1044 in FIG. 10L (e.g., a search result in response to receiving the second input). In some embodiments, the search result is a search result indicating that the first user is a contact of the user of the electronic device in a contacts application on the electronic device. In some embodiments, the search result includes the name of the first user, a graphical representation of the first user (e.g., an avatar), and/or a selectable option that is selectable to initiate communication with the first user (e.g., text message initiation, phone call invitation, and/or video call initiation). In some embodiments, the search result is displayed with other types of search results associated with the second input, including representations of other contacts, representations of content from applications other than the contacts application, etc.

In some embodiments, while displaying the respective user interface element corresponding to the first user, the electronic device receives (1128c), via the one or more input devices, a third input corresponding to selection of the respective user interface element, such as input provided by contact 1003 in FIG. 10L (e.g., a tap on the respective user interface element, outside of the selectable option to initiate communication with the first user). In some embodiments, in response to receiving the third input, the electronic device displays (1128d), via the display generation component, a plurality of options for controlling operation of the respective electronic device associated with the first user, such as shown in user interface 1005a in FIG. 10M. For example, displaying the same information, options and/or user interface for the first user as is displayed in response to receiving the first input corresponding to selection of the first representation of the first user from the home screen user interface of the electronic device. The above-described manner of displaying the options for controlling operation of the respective electronic device provides a quick and efficient manner of accessing the plurality of options in different manners (e.g., via search or via the home screen in response to selection of the first representation of the first user), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device receives (1130a), via the one or more input devices, a second input corresponding to a request to display a plurality of contacts associated with the user of the electronic device, such as input provided by contact 1003 in FIG. 10N (e.g., an input to display a user interface of a contacts application on the electronic device that stores and/or displays information about contacts of the user of the electronic device). In some embodiments, in response to receiving the second input, the electronic device displays (1130b), via the display generation component, a user interface that includes representations of the plurality of contacts associated with the user of the electronic device, including a respective user interface element corresponding to the first user, such as shown in user interface 1061 in FIG. 10O (e.g., displaying a list of contacts of the user of the electronic device in the contacts application). In some embodiments, while displaying the respective user interface element corresponding to the first user, the electronic device receives (1130c), via the one or more input devices, a third input corresponding to selection of the respective user interface element, such as selection of "Allison Frost" in FIG. 10O (e.g., a tap on the respective user interface element). In some embodiments, in response to receiving the third input, the electronic device displays (1130d), via the display generation component, a plurality of options for controlling operation of the respective electronic device associated with the first user, such as shown in user interface 1009a in FIG. 10P. For example, displaying the same information, options and/or user interface for the first user as is displayed in response to receiving the first input corresponding to selection of the first representation of the first user from the home screen user interface of the electronic device. In some embodiments, selection of a different contact in the list of contacts in the contacts application would, instead, result in displaying a plurality of options for controlling operation of an electronic device associated with that contact. The above-described manner of displaying the options for controlling operation of the respective electronic device provides a quick and efficient manner of accessing the plurality of options in different manners (e.g., via a contacts application or via the home screen in response to selection of the first representation of the first user), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, in response to receiving the first input, the electronic device displays, via the display generation component, a graphical representation corresponding to the first user (1132a), such as representation 1012a in FIG. 10B. For example, the plurality of options for controlling operation of the respective electronic device is displayed in a user interface that also includes a photograph, avatar, etc. of and/or associated with the first user. The above-described manner of displaying the graphical representation corresponding to the first user clearly conveys which user the plurality of options are associated with, which simplifies the interaction between the user and the electronic device and enhances the operability of the electronic device and makes the user-device interface more efficient (e.g., by avoiding erroneous inputs for controlling operation of device(s) associated with the wrong user), which additionally reduces power usage and improves battery life of the electronic device by enabling the user to use the electronic device more quickly and efficiently.

It should be understood that the particular order in which the operations in FIGS. 11A-11F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900 and 1300) are also applicable in an analogous manner to method 1100 described above with respect to FIGS. 11A-11F. For example, the display of information or status for users or groups of users described above with reference to method 1100 optionally has one or more of the characteristics of displaying information or status for users, objects, tracked entities, etc., described herein with reference to other methods described herein (e.g., methods 700, 900 and 1300). For brevity, these details are not repeated here.

The operations in the information processing methods described above are, optionally, implemented by running one or more functional modules in an information processing apparatus such as general-purpose processors (e.g., a as described with respect to FIGS. 1A-1B, 3, 5A-5H) or application specific chips. Further, the operations described above with reference to FIGS. 11A-11F are, optionally, implemented by components depicted in FIGS. 1A-1B. For example, displaying operations 1102a and 1102c, and receiving operation 1102b are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Widgets Associated with Family Account Users

Users interact with electronic devices in many different manners. In some embodiments, an electronic device has access to information associated with other users that are in a family account with a user of the electronic device. The embodiments described below provide ways in which an electronic device facilitates display of widgets associated with such users of the family account, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12B:
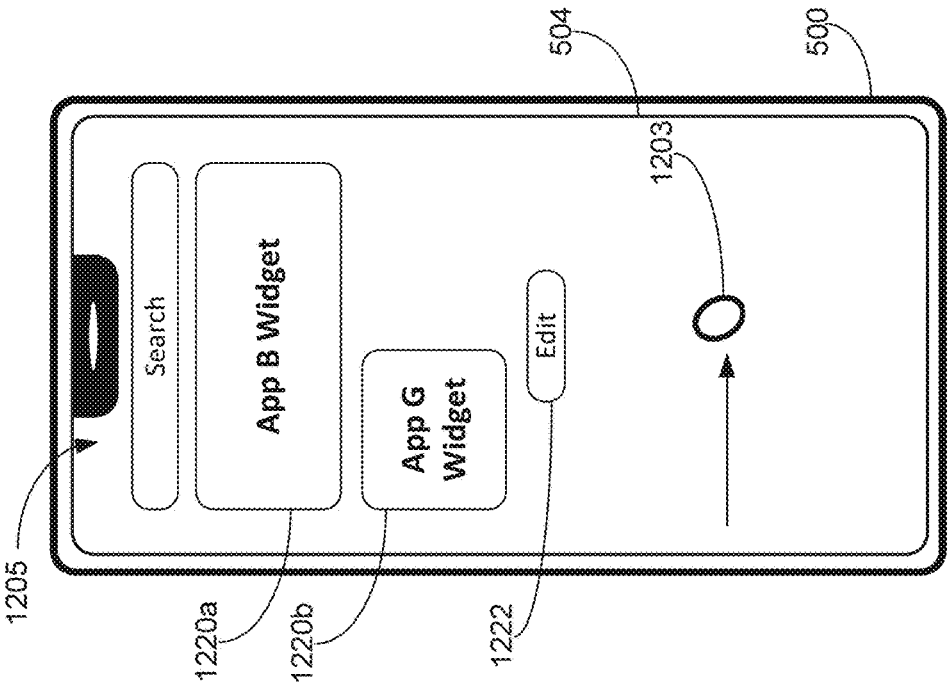
FIGS. 12A-12X illustrate exemplary ways in which an electronic device facilitates display of widgets associated with users of a family account in accordance with some embodiments of the disclosure
Figure 12A:
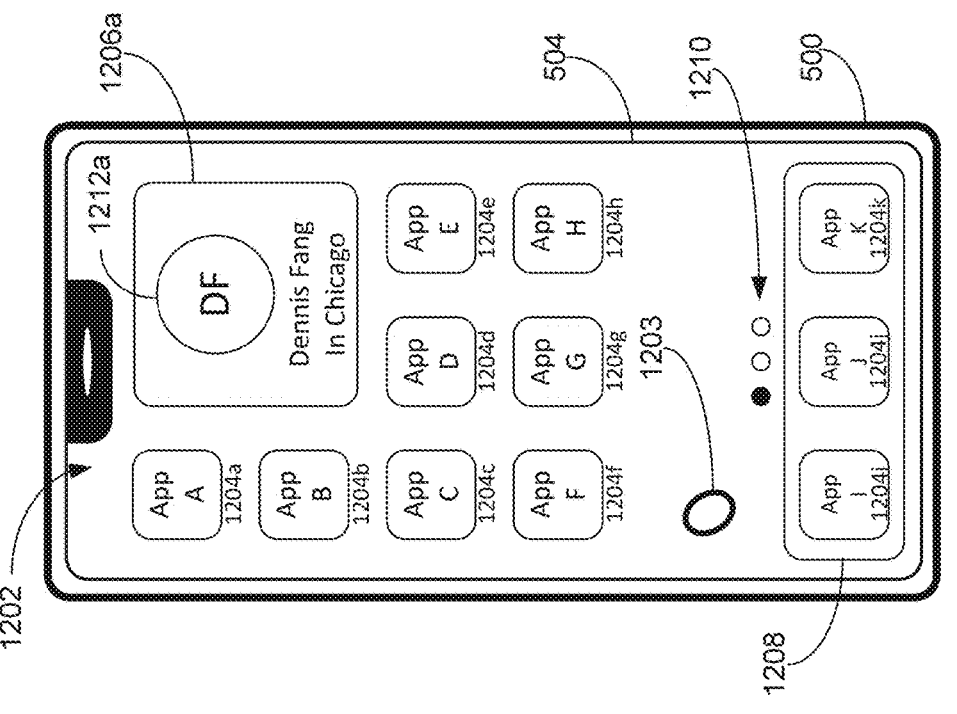
Figure 12D:
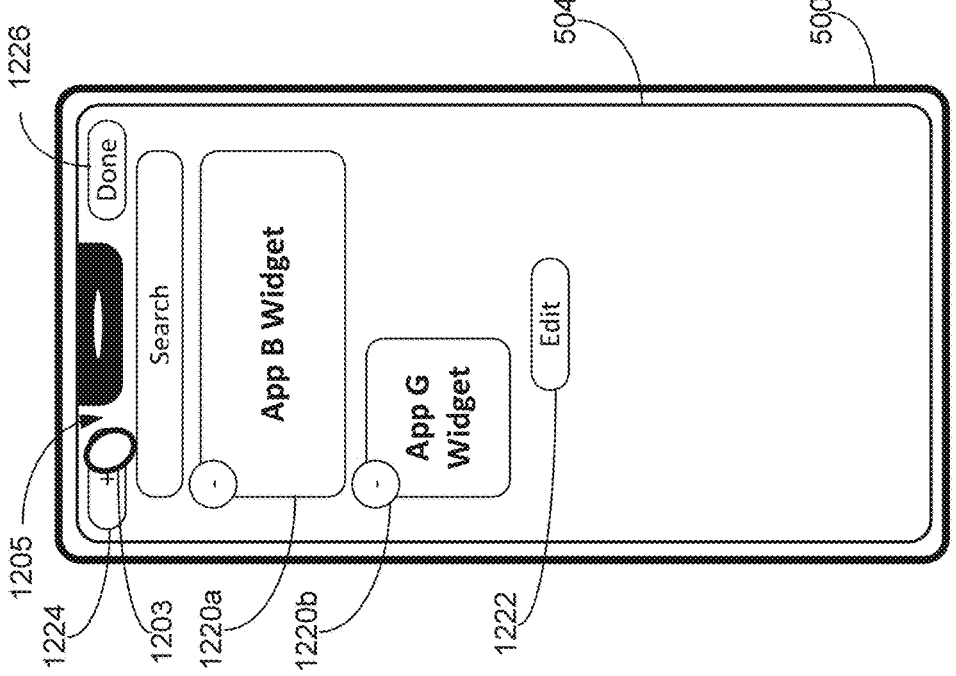
Figure 12D:
Figure 12C:
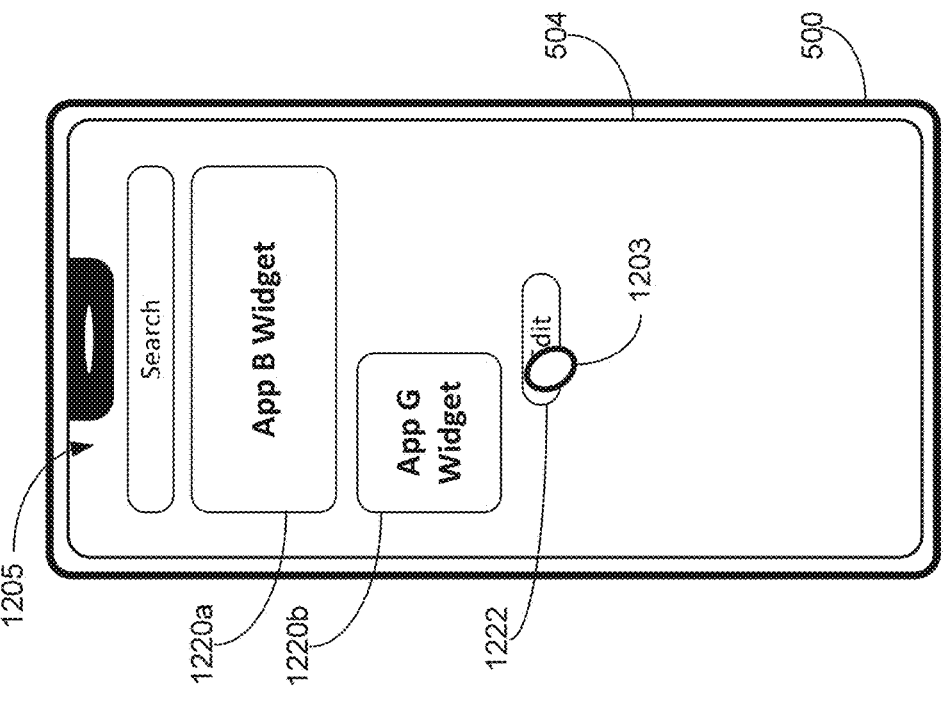
Figure 12F:
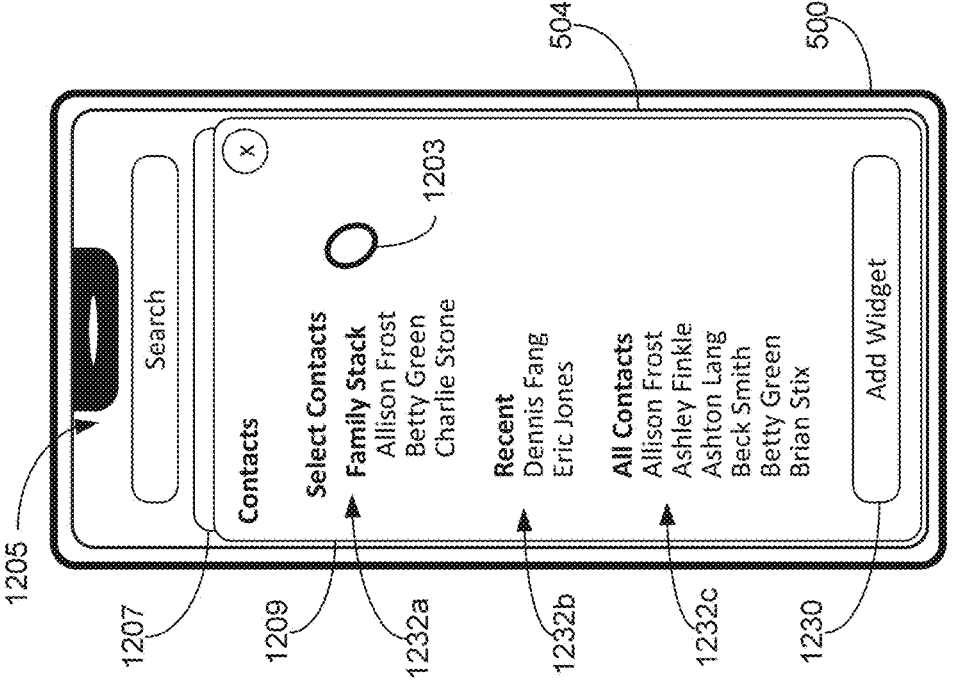
Figure 12E:
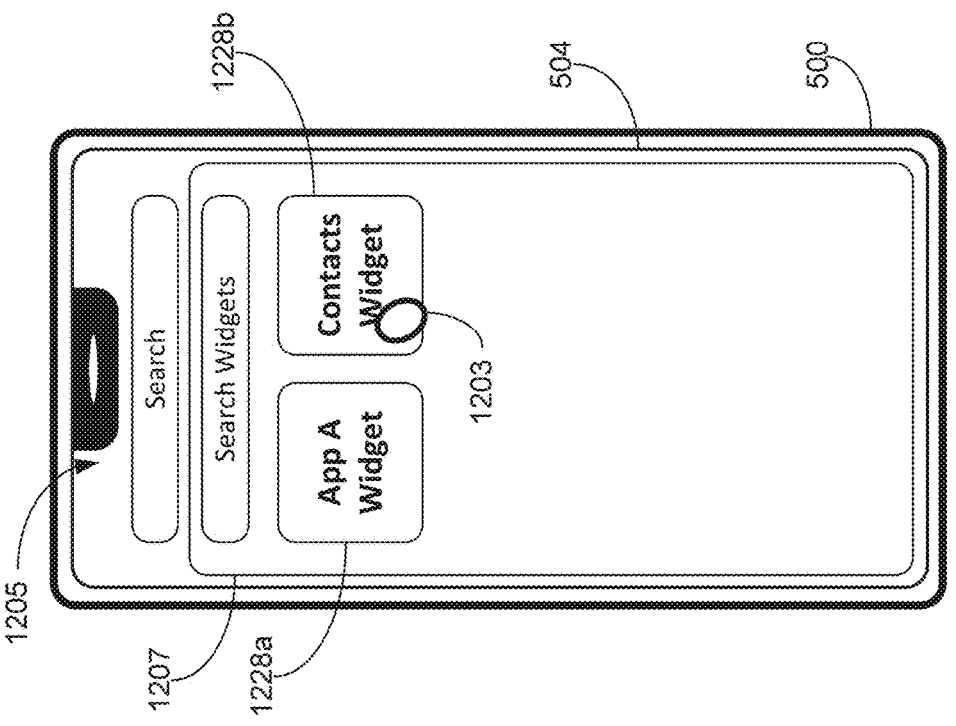
Figure 12H:
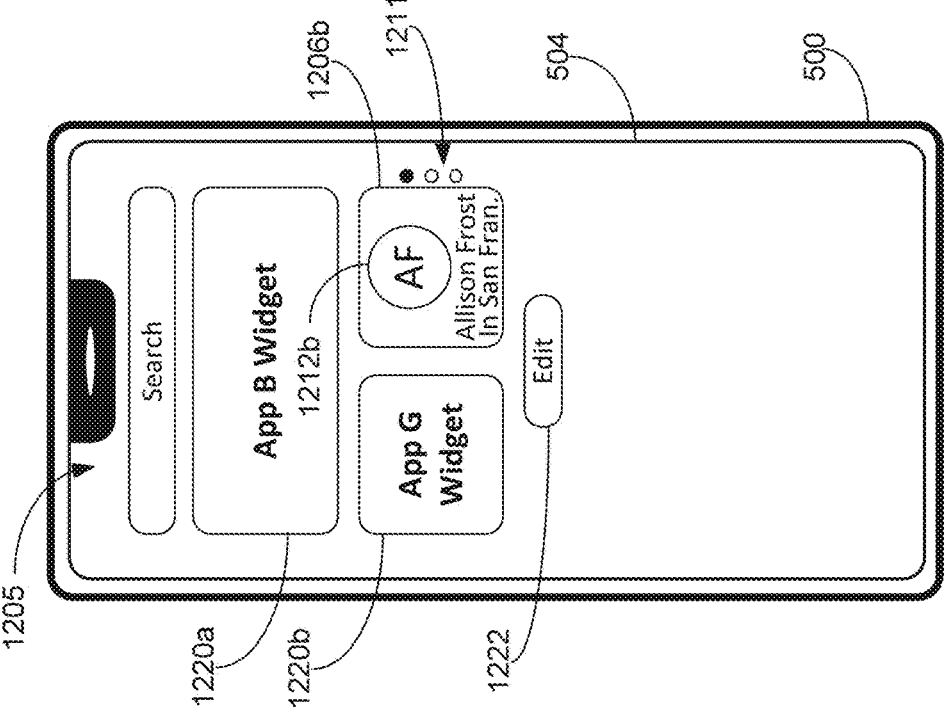
Figure 12G:
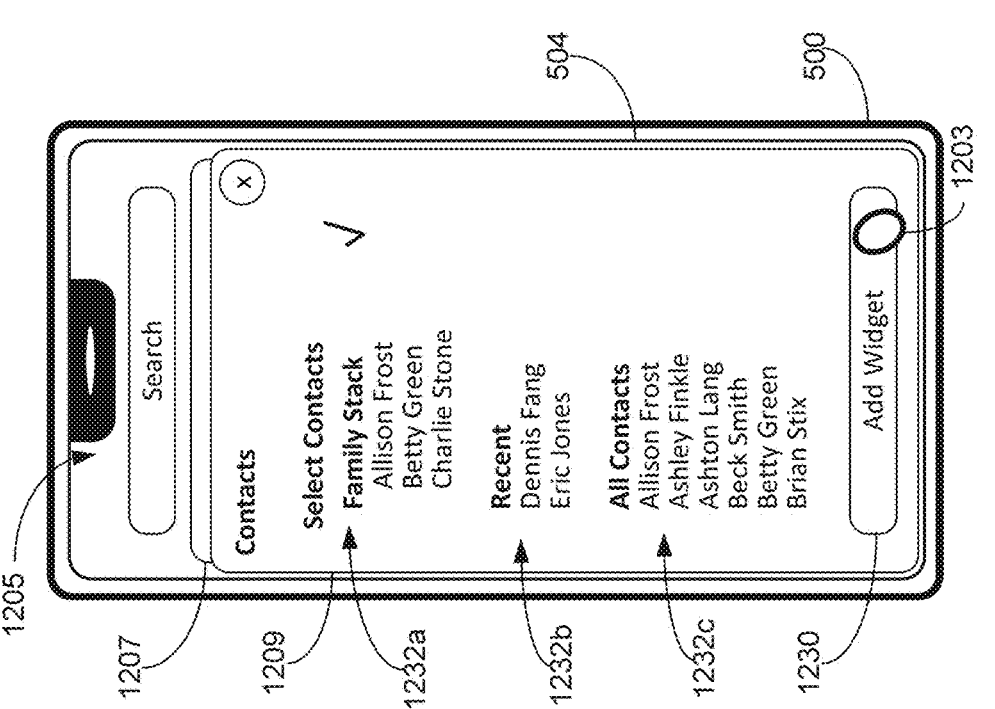
Figure 12J:
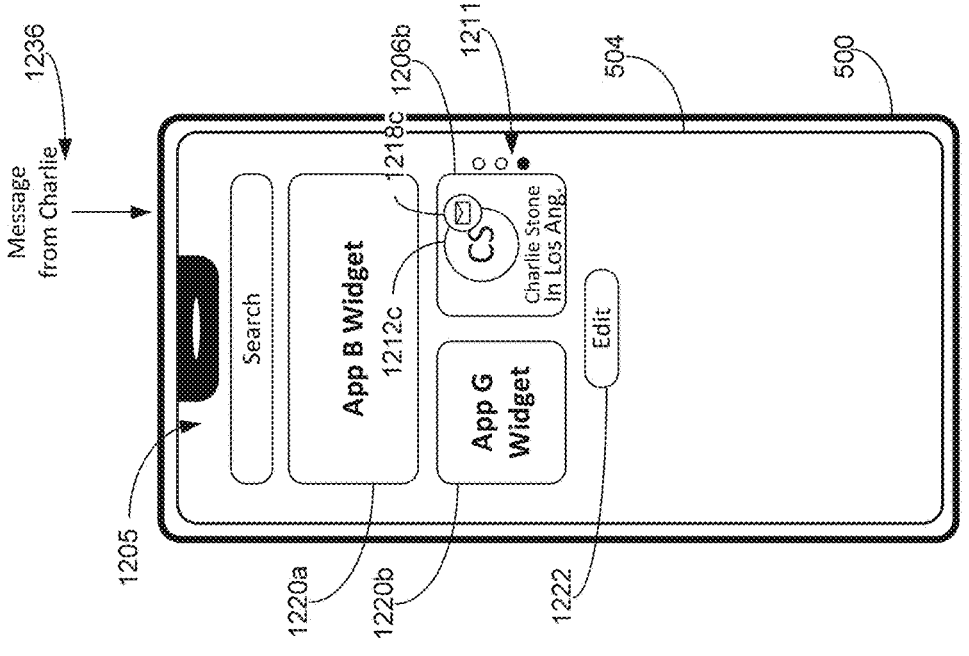
Figure 12I:
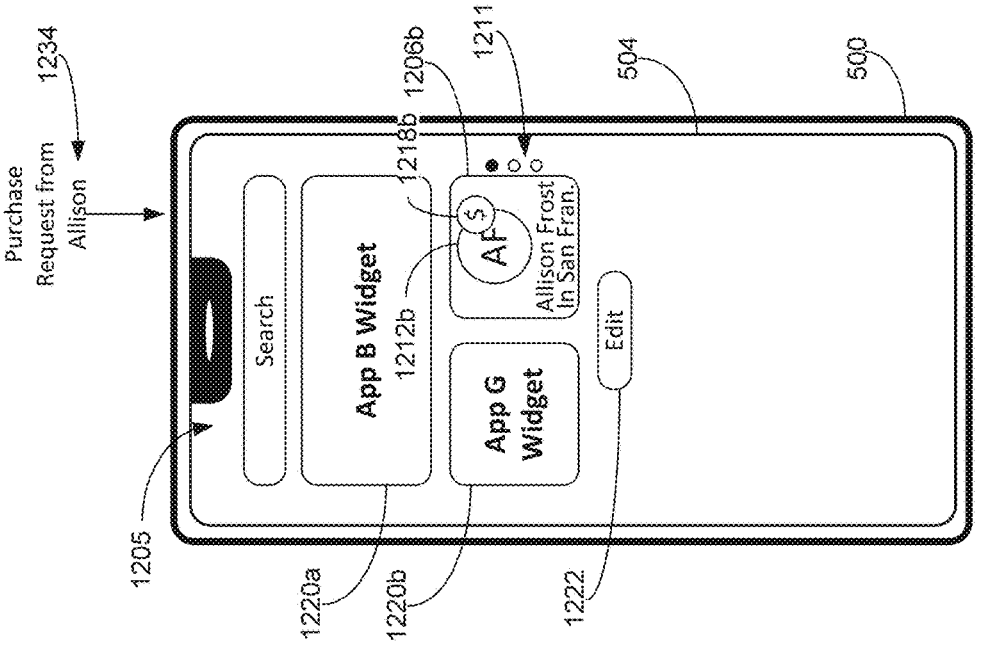
Figure 12L:
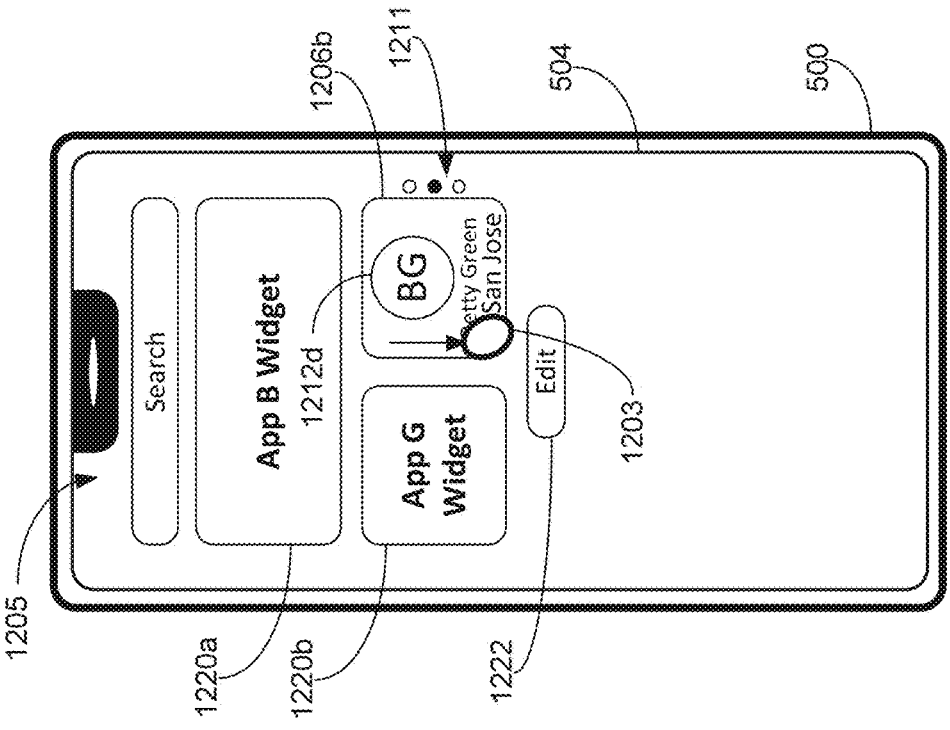
Figure 12K:
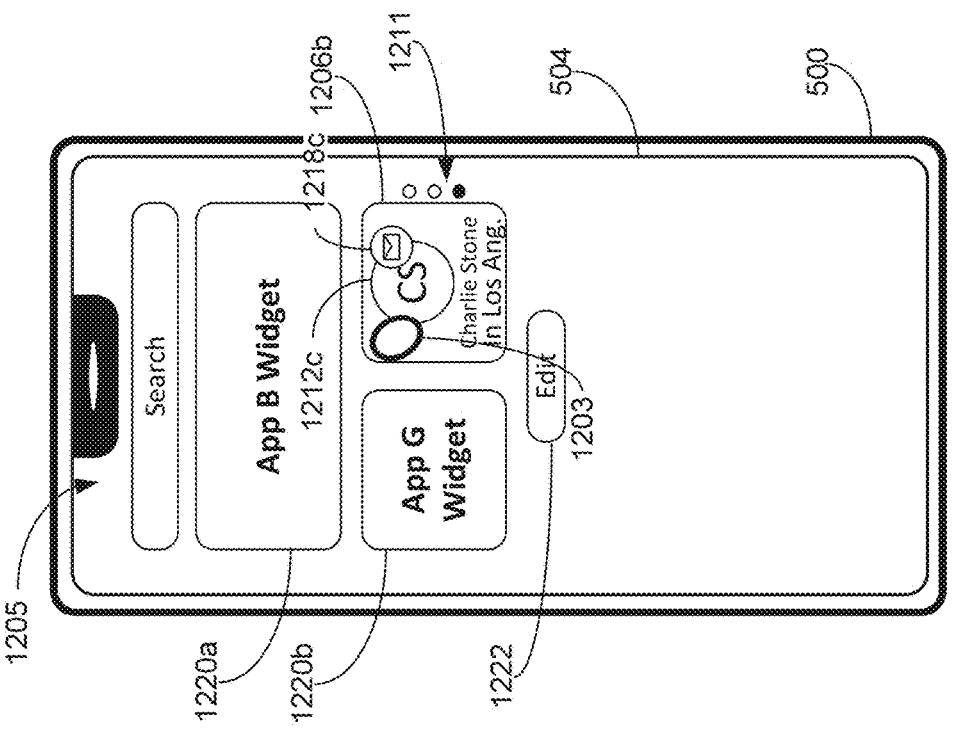
Figure 12N:
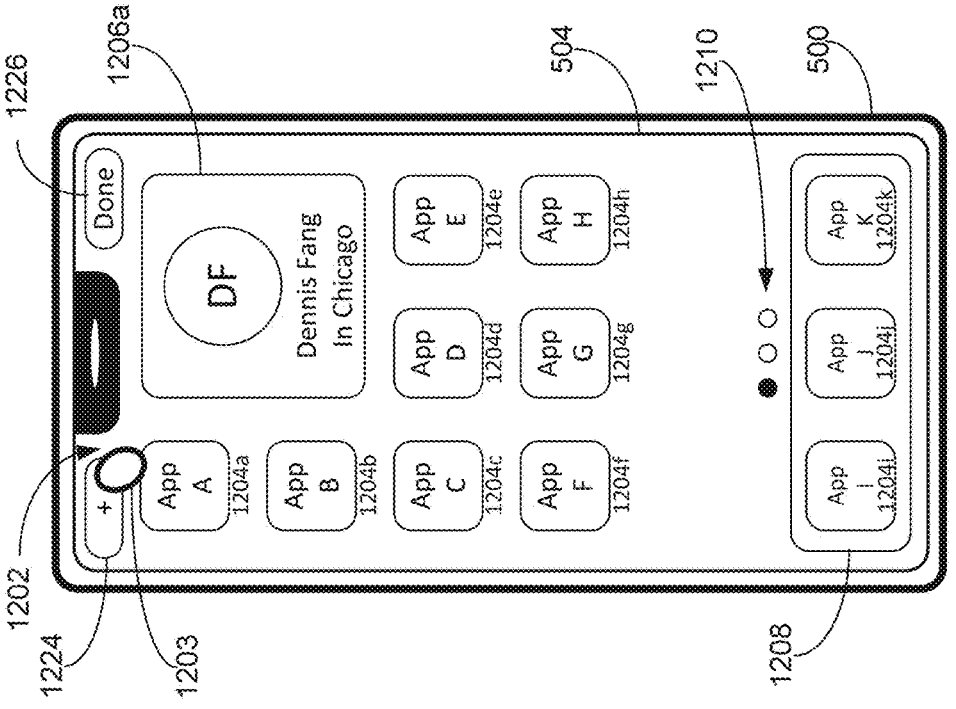
Figure 12N:
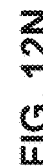
Figure 12M:
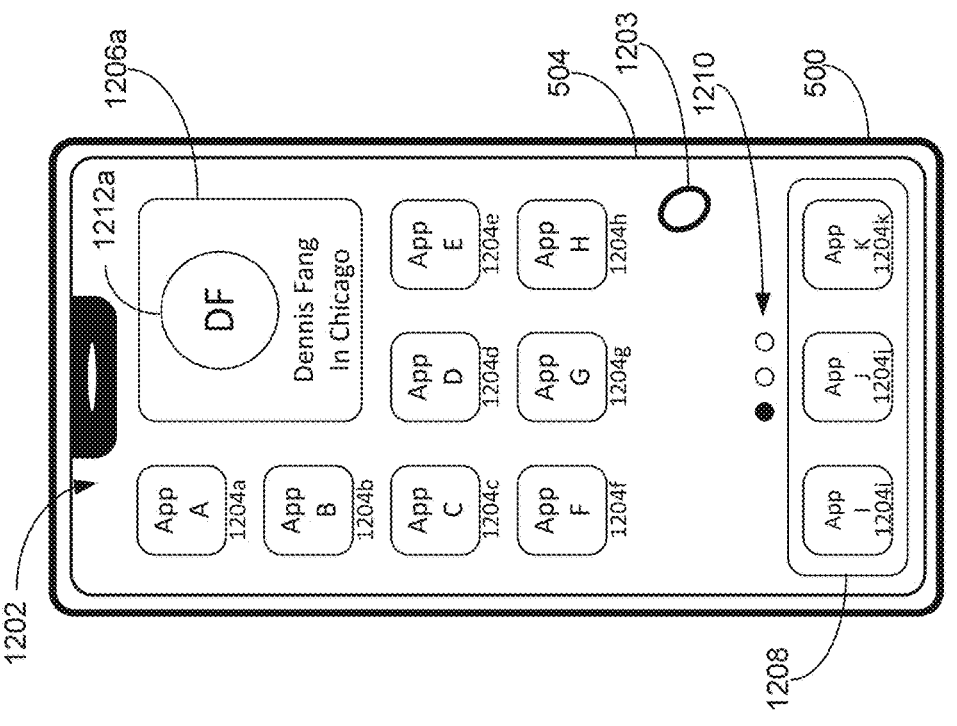
Figure 12P:
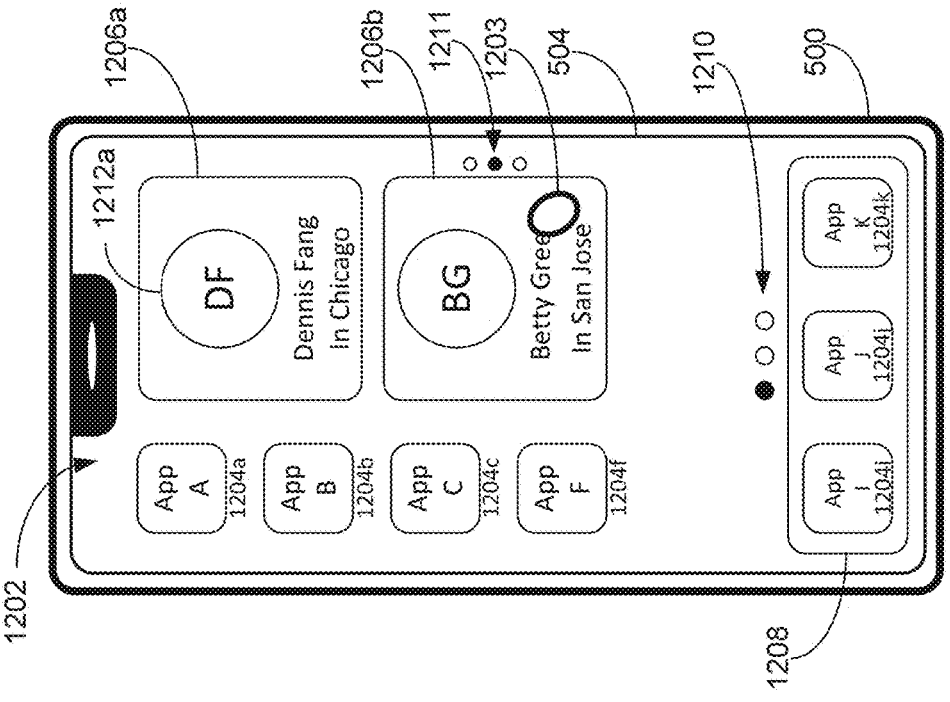
Figure 12O:
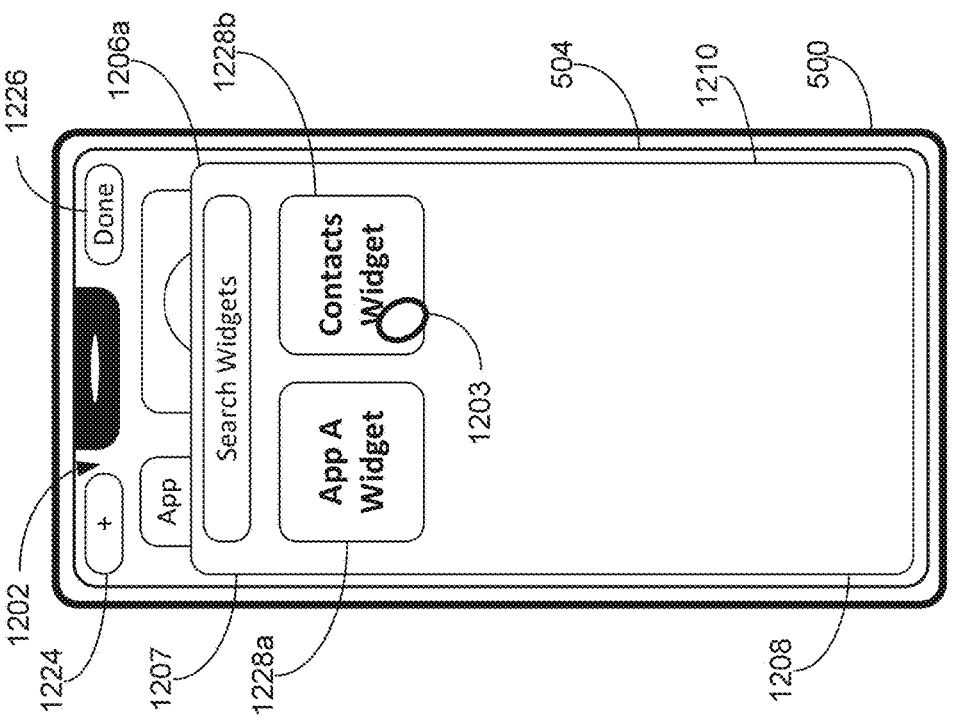
Figure 12R:
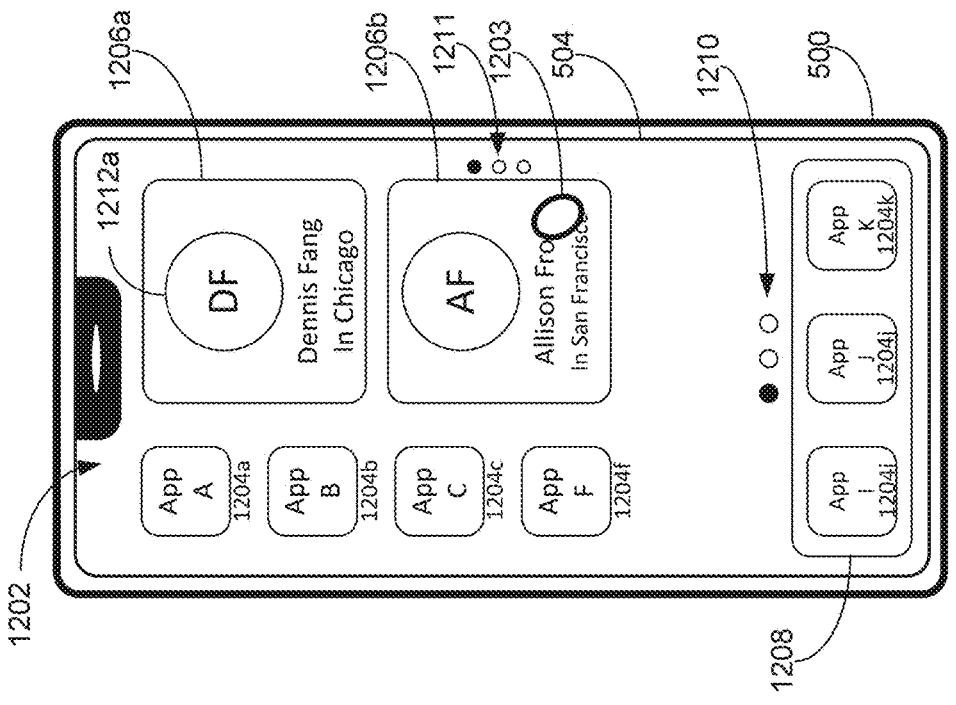
Figure 12Q:
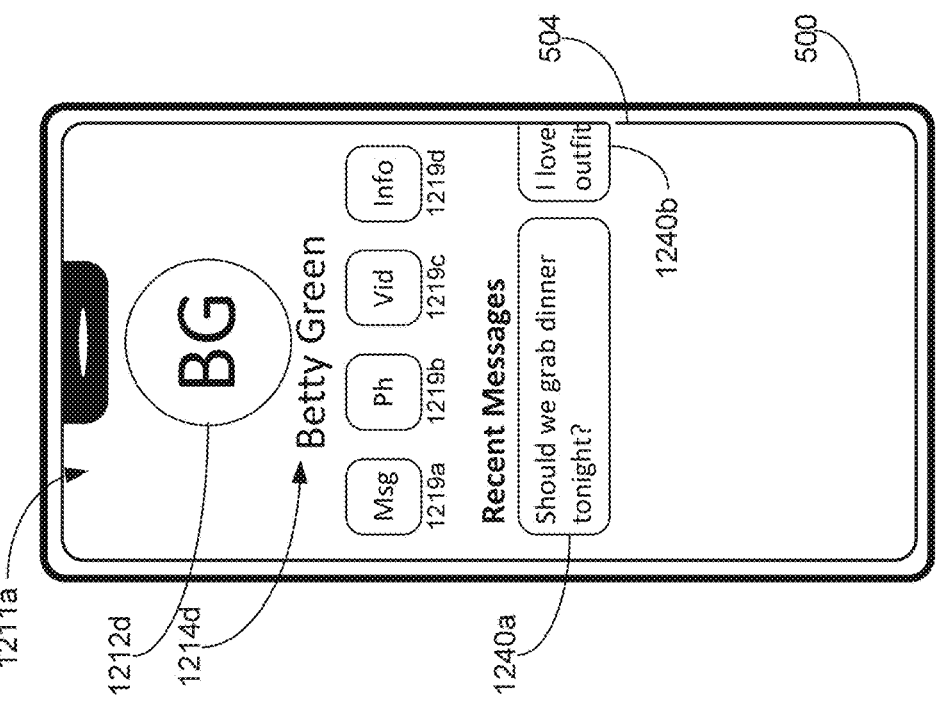
Figure 12T:
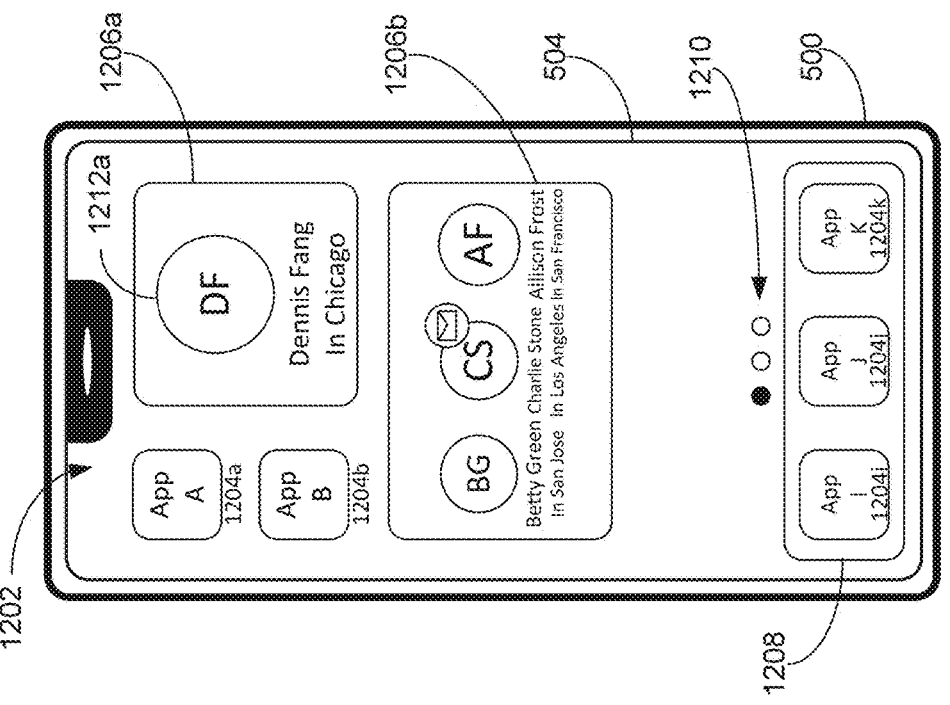
Figure 12S:
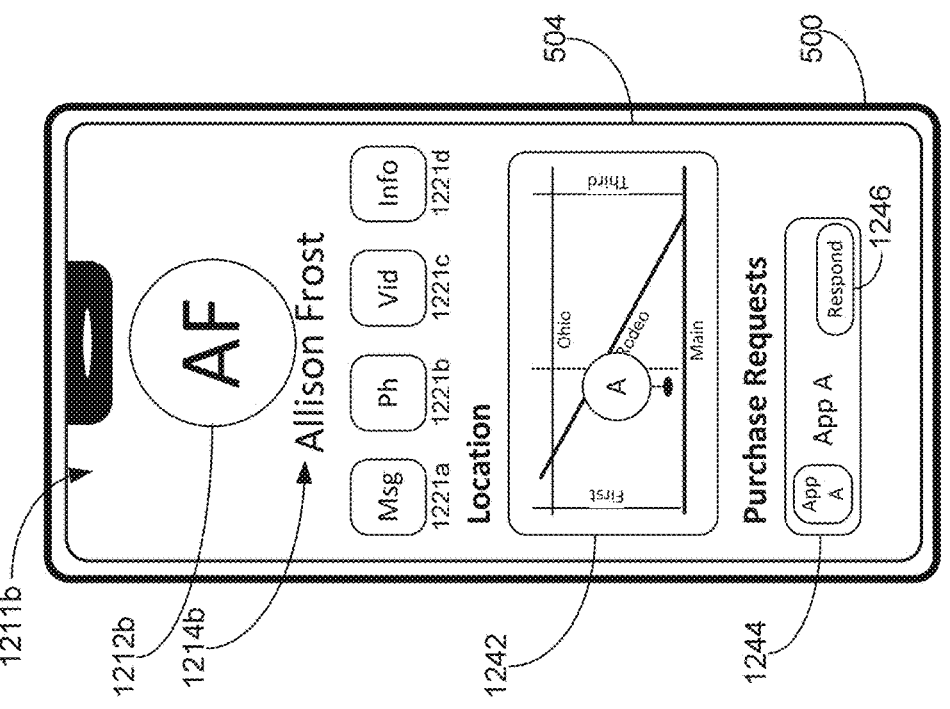
Figure 12V:
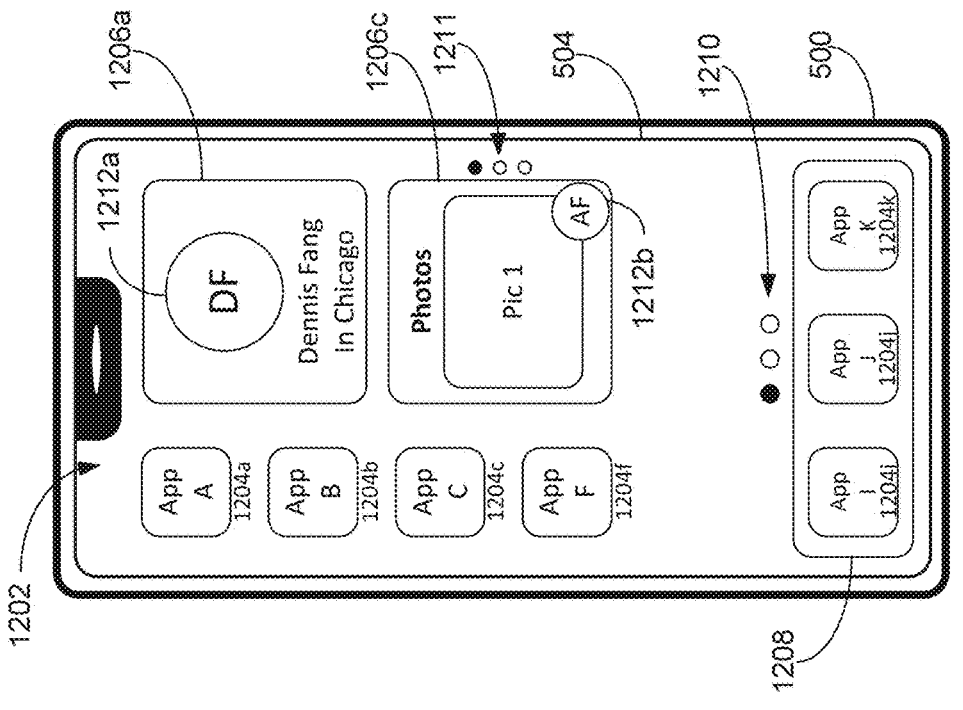
Figure 12U:
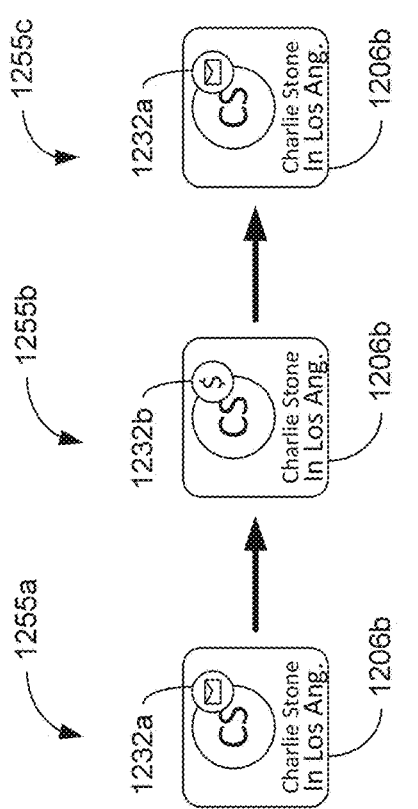
Figure 12U:
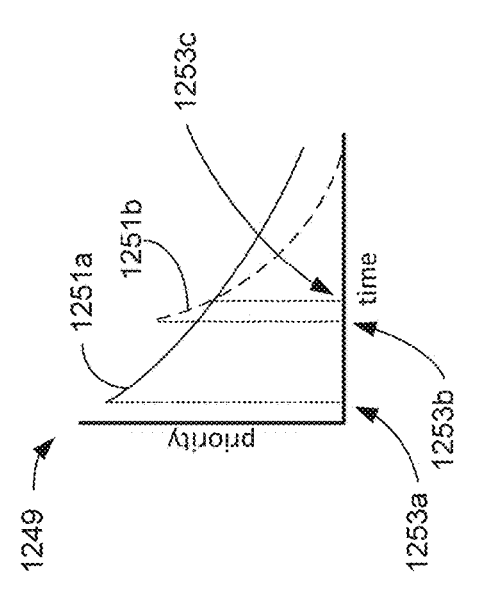
Figure 12X:
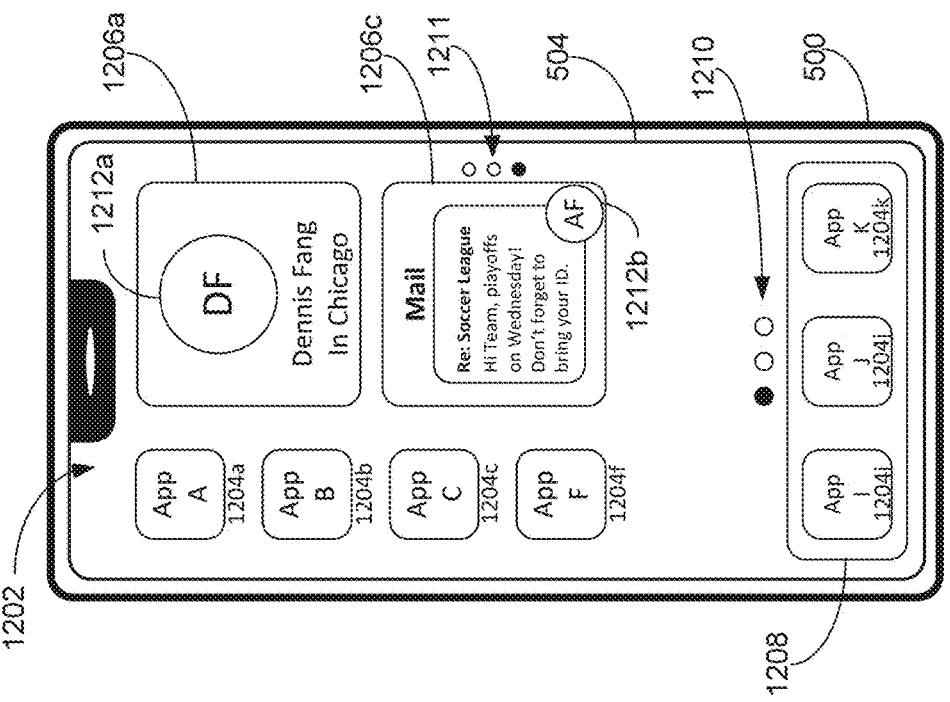

FIGS. 12A-12X illustrate exemplary ways in which an electronic device facilitates display of widgets associated with users of a family account in accordance with some embodiments of the disclosure. The embodiments in these figures are used to illustrate the processes described below, including the processes described with reference to FIGS. 13A-13J.

FIG. 12A illustrates electronic device 500 displaying user interface 1202 (e.g., via a display device, via a display generation component, etc.). In some embodiments, user interface 1202 is displayed via a display generation component. In some embodiments, the display generation component is a hardware component (e.g., including electrical components) capable of receiving display data and displaying a user interface. In some embodiments, examples of a display generation component include a touch screen display (such as touch screen 504), a monitor, a television, a projector, an integrated, discrete, or external display device, or any other suitable display device that is in communication with device 500.

User interface 1202 in FIG. 12A is a home screen user interface (e.g., as described with reference to FIG. 4A) of device 500. User interface 1202 includes application icons 1204a-1204k that are selectable to cause device 500 to display respective user interfaces of the selected application (e.g., device 500 launches the selected application). User interface 1202 is optionally divided into two or more pages, and device 500 optionally displays one page of user interface 1202 at a time. For example, in FIG. 12A, device 500 is displaying the first page of user interface 1202 (e.g., as indicated by the left-most dot of indicator 1210 being filled, and the other two dots of indicator 1210 being unfilled). Further, application icons 1204i-1204k are displayed in dock 1208, which is optionally displayed by device 500 regardless of which page of user interface 1202 is currently being displayed.

In some embodiments, user interface 1202 includes one or more widgets associated with users. For example, in FIG. 12A, user interface 1202 includes widget 1206a. Widget 1206a is optionally a widget of a contacts or people application that is installed on device 500 that has access to and/or displays information about the status of and/or location of users designated by a user of device 500. For example, a user of device 500 is able to select users whose location and/or status to track using the contacts or people application, and the user of device 500 is able to associate one or more widgets with one or more of those users for inclusion on user interface 1202 (or any other user interface of device 500 that can display widgets).

In FIG. 12A, widget 1206a is associated with Dennis Fang (e.g., a contact of the user of device 500). Widget 1206a includes a graphical representation 1212a of Dennis Fang (e.g., a photo, an avatar, etc.), an indication of the name of Dennis Fang and an indication of the current or last known location for Dennis Fang. In some embodiments, if the location of Dennis Fang is not available to device 500 (e.g., because Dennis Fang has disabled or not allowed such access and/or because the location of Dennis Fang is unable to be determined), widget 1206a does not include an indication of location. Widget 1206a (and other widgets associated with users, devices, objects, etc. described herein)

optionally has one or more of the characteristics of such widgets described with reference to methods 700, 900, 1100 and/or 1300.

In some embodiments, a widget that comprises a stack of widgets associated with different users can be displayed by device 500 in response to input for displaying such a widget, as will be described below. For example, in FIGS. 12A-12B, device 500 detects a rightward swipe of contact 1203 on touch screen 504 while user interface 1202 is being displayed. In response, device 500 displays a widget dashboard user interface 1205 that is a user interface configured to display one or more widgets (e.g., selected and/or installed by the user of device 500). For example, user interface 1205 optionally includes a search field for searching for content accessible via device 500 (e.g., applications installed on device 500, applications available for installation on device 500 from an application store, web content, music, photos, etc.), widget 1220a that is a widget associated with Application B (e.g., previously selected/installed by the user of device 500), widget 1220b that is a widget associated with Application G (e.g., previously selected/installed by the user of device 500), and option 1222 that is selectable to edit the widgets included in user interface 1205.

In FIG. 12C, device 500 detects selection of option 1222 (e.g., via a tap of contact 1203). In response, as shown in FIG. 12D, device 500 updates user interface 1205 to include option 1224 and option 1226, as well as including minus ("−") indicators overlaid on widgets 1220a and 1220b that are selectable to remove the selected widget from user interface 1205. Option 1224 is selectable to initiate a process to add a widget to user interface 1205. Option 1226 is selectable to exit the widget editing mode of FIG. 12D. In FIG. 12D, device 500 detects selection of option 1224, and in response, displays user interface 1207 (e.g., overlaid on user interface 1205), as shown in FIG. 12E. User interface 1207 is optionally a user interface for searching for and/or selecting a widget for inclusion in user interface 1205. For example, user interface 1207 includes a search field for searching for available widgets for inclusion in user interface 1205, representation 1228a and representation 1228b. Representation 1228a corresponds to a widget for Application A on device 500, and representation 1228b corresponds to a widget for a Contacts Application on device 500 (e.g., an application that has access to and/or displays information about the status of and/or location of users designated by a user of device 500). Representation 1228a is optionally selectable to (e.g., initiate a process to) add a widget for Application A to user interface 1205, and representation 1228b is optionally selectable to (e.g., initiate a process to) add a widget for the Contacts Application to user interface 1205.

In FIG. 12E, device 500 detects selection of representation 1228b (e.g., via a tap of contact 1203). In response, device 500 displays user interface 1209 (e.g., overlaid on user interfaces 1205 and/or 1207), as shown in FIG. 12F. User interface 1209 includes a list of potential users to be associated with the widget to be added to user interface 1205. The potential users in user interface 1209 are optionally contacts of the user of device 500. Further, user interface 1209 is optionally organized to promote users that are in a family account with the user of the device 500 and/or users with which the user of device 500 has recently been in contact. For example, in FIG. 12F, user interface 1209 includes a group of users listed at the top of user interface 1209 corresponding to users that are in the same family account as the user of device 500 (e.g., Allison Frost, Betty Green and Charlie Stone under the "Family Stack" entry

1232a). User interface 1209 also includes a group of users listed at or towards the top of user interface 1209 corresponding to user with which the user of device 500 has recently communicated (e.g., Dennis Fang and Eric Jones in the "Recent" section 1232b). After the "Family" and/or "Recent" users, user interface 1209 includes a listing of all contacts of the user of device 500 (e.g., listed in alphabetical order) in the "All Contacts" section 1232c. User interface 1209 is optionally vertically scrollable to reveal additional contacts of the user of device 500. Further, user interface 1209 includes option 1230 that is selectable to add a widget to user interface 1205 that is associated with the contact(s) designated/selected in user interface 1209 in response to user input.

In some embodiments, individual contacts listed in user interface 1209 are selectable to individually designate contacts for inclusion in the widget to be added to user interface 1205. For example, in response to detecting selection of Dennis Fang and Betty Green in user interface 1209, followed by detecting selection of option 1230, device 500 would optionally add a widget associated with Dennis Fang and Betty Green to user interface 1205. In some embodiments, the contacts that are included in the family account with the user of device 500 can be collectively selected (e.g., with a single input) for inclusion in the widget to be added to user interface 1205. For example, in FIG. 12F, device 500 detects selection of the "Family Stack" entry 1232a (e.g., via a tap of contact 1203). In response, in FIG. 12G, device 500 displays the "Family Stack" entry 1232a with a check mark. In FIG. 12G, device 500 also detects selection of option 1230 (e.g., via a tap of contact 1203).

In response to the input in FIG. 12G, device 500 displays widget 1206b in user interface 1205, as shown in FIG. 12H. Widget 1206b is associated with all of the users in the family account of which the user of device 500 is a part, except for the user of device 500 (e.g., Allison Frost, Betty Green, and Charlie Stone). In some embodiments, as shown in FIG. 12H, widget 1206b only displays the information (e.g., representation 1212, name, location, status, etc.) for one user at a time (e.g., similar to as described with reference to widget 806a in FIGS. 8P-8R). Further, device 500 optionally changes the user displayed in widget 1206b in response to user input to do so (e.g., swipes detected on widget 1206b) and/or activity of the users associated with widget 1206b (e.g., cycling through widgets automatically based on activity of users associated with those widgets), as will be described later. Device 500 optionally indicates that there are multiple users associated with widget 1206b and/or which of those users is currently being displayed by displaying indicator 1211 adjacent to widget 1206b. Indicator 1211 in FIG. 12H includes three dots to indicate that widget 1206b is associated with three users, and the top-most dot in indicator 1211 is filled (while the other two dots are unfilled) to indicate that the first of those three users is currently displayed in widget 1206b.

In FIG. 12I, device 500 detects a purchase request 1234 from Allison Frost (e.g., as described with reference to method 900). In response, device 500 updates widget 1206b, which is displaying information associated with Allison Frost, to include indication 1218b that indicates that the user of device 500 has an outstanding purchase request to review and/or to which to respond (e.g., as described with reference to method 900), as shown in FIG. 12I. In FIG. 12J, device 500 detects an incoming message (e.g., email) from Charlie Stone (e.g., as described with reference to method 900). In response, because the activity of Charlie Stone is more recent than the activity of Allison Frost, device 500 automatically updates widget 1206*b* to display information associated with Charlie Stone (e.g., and to not display information associated with Allison Frost), including indication 1218*c* that indicates that the user of device 500 has an outstanding unread email from Charlie Stone (e.g., as described with reference to method 900). Device 500 also updates indicator 1211 to indicate that the currently displayed user in widget 1206*b* is the third of the three users associated with widget 1206*b*. Thus, in some embodiments, device 500 automatically cycles through the users displayed in widget 1206*b* based on activity of those users.

In FIGS. 12K-12L, device 500 detects a downward swipe of contact 1203 in widget 1206*b*. In response, as shown in FIG. 12L, device 500 updates widget 1206*b* to display information associated with Betty Green (e.g., and to not display information associated with Charlie Stone). Device 500 also updates indicator 1211 to indicate that the currently displayed user in widget 1206*b* is the second of the three users associated with widget 1206*b*. Thus, in some embodiments, device 500 cycles through the users displayed in widget 1206*b* based on user input directed to widget 1206*b*.

In some embodiments, the widget associated with users in the family account of the user of device 500 can similarly be added to the home screen user interface of device 500 and has one or more (or all) of the characteristics of the widget added to user interface 1205. For example, in FIG. 12M, while displaying user interface 1202 device 500 detects a long press (e.g., a tap and hold for longer than a time threshold, such as 0.1, 0.2, 0.5, 1, 2, 5, 10 seconds) of contact 1203 on user interface 1202. In response, device 500 updates user interface 1202 to include options 1224 and 1226 (e.g., as described with reference to FIG. 12D). In FIG. 12N, device 500 detects selection of option 1224 (e.g., via a tap of contact 1203). In response, device 500 displays user interface 1207 overlaid on user interface 1202, as shown in FIG. 12O. User interface 1207 is optionally the same as user interface 1207 described with reference to FIG. 12E, except that widgets selected in user interface 1207 in FIG. 12O are added to user interface 1202 (e.g., rather than user interface 1205). In FIG. 12O, device 500 detects selection of representation 1228*b*, and in response to such selection and after display of user interfaces and detection of inputs such as described with reference to FIGS. 12F-12G, device 500 displays widget 1206*b* in user interface 1202, as shown in FIG. 12P. Widget 1206*b* displayed in user interface 1202 optionally has the characteristics previously described with reference to widget 1206*b* displayed in user interface 1205.

In some embodiments, selection of widget 1206*b* causes device 500 to display a user interface associated with the user that is currently displayed by widget 1206*b*. For example, in FIG. 12P, device 500 detects selection of widget 1206*b* (e.g., via a tap of contact 1203) while widget 1206*b* is displaying information for Betty Green. In response, in FIG. 12Q, device 500 displays user interface 1211*a* that includes additional information associated with Betty Green. User interface 1211*a* optionally has one or more of the characteristics of user interfaces 1005*a* and/or 1005*b* described with reference to FIGS. 10A-10T and/or method 1100. For example, user interface 1211*a* in FIG. 12Q includes a graphical representation 1212*d* of Betty Green (e.g., a photo, an avatar, etc.), an indication 1214*d* of the name of Betty Green, a selectable option 1219*a* that is selectable to initiate a messaging communication between the user of device 500 and Betty Green, a selectable option 1219*b* that is selectable to initiate a phone communication between the user of device 500 and Betty Green, a selectable option 1219*c* that is selectable to initiate a video call communication between the user of device 500 and Betty Green, and a selectable option 1219*d* that is selectable to display additional contact information (e.g., email address, phone number, home address, etc.) for Betty Green. User interface 1211*a* in FIG. 12Q also includes indications 1240 of recent (and/or unread) messages received by the user of device 500 from Betty Green. Indication 1240*a* includes at least a portion of the content of a communication (e.g., text message) sent by Betty Green to the user of device 500, and indication 1240*b* includes at least a portion of the content of an earlier communication (e.g., text message) sent by Betty Green to the user of device 500. In some embodiments, more recent communications are displayed to the left of less recent communications in user interface 1211*a*. Further, in some embodiments, indications 1240 are selectable to initiate reply communications to the selected communication. For example, indication 1240*a* is selectable to display a user interface of a messaging application associated with the communication to reply to the communication associated with indication 1240*a*, and indication 1240*b* is selectable to display a user interface of a messaging application associated with the communication to reply to the communication associated with indication 1240*b*.

In FIG. 12R, device 500 detects selection of widget 1206*b* (e.g., via a tap of contact 1203) while widget 1206*b* is displaying information for Allison Frost. In response, in FIG. 12S, device 500 displays user interface 1211*b* that includes additional information associated with Allison Frost. User interface 1211*b* optionally has one or more of the characteristics of user interfaces 1005*a* and/or 1005*b* described with reference to FIGS. 10A-10T and/or method 1100. For example, user interface 1211*b* in FIG. 12S includes a graphical representation 1212*b* of Allison Frost (e.g., a photo, an avatar, etc.), an indication 1214*b* of the name of Allison Frost, a selectable option 1221*a* that is selectable to initiate a messaging communication between the user of device 500 and Allison Frost, a selectable option 1221*b* that is selectable to initiate a phone communication between the user of device 500 and Allison Frost, a selectable option 1221*c* that is selectable to initiate a video call communication between the user of device 500 and Allison Frost, and a selectable option 1221*d* that is selectable to display additional contact information (e.g., email address, phone number, home address, etc.) for Allison Frost. User interface 1211*b* in FIG. 12S also includes a representation 1242 of a map that includes a representation (e.g., icon, avatar, etc.) of Allison Frost displayed at a location on map 1242 corresponding to the current or last known location of Allison Frost. If Allison Frost is not sharing location information with the user of device 500, user interface 1211*b* optionally does not include map 1242. Finally, in FIG. 12S, user interface 1211*b* includes element 1244 corresponding to a purchase request from Allison Frost (e.g., that was previously detected by device 500, such as described with reference to FIG. 12I). In FIG. 12S, the purchase request is a request to purchase App A. Thus, element 1244 optionally includes information about App A (e.g., an icon for App A, the name of App A, a description of App A, etc.), and option 1246 that is selectable to respond to (e.g., approve or deny) the purchase request made by Allison Frost for purchasing App A.

In some embodiments, instead of being a stack of widgets, the widget associated with the users in the family account displays multiple (e.g., all) users associated with the widget concurrently. For example, in FIG. 12T, widget 1206*b* displays information (e.g., representations, names, locations, status badges, etc.) for Betty Green, Charlie Stone, and Allison Frost concurrently on user interface 1202.

In some embodiments, device 500 only displays one indication of status in associated with a given user in widget 1206*b* at a time. For example, if Charlie Stone has both an outstanding purchase request and an unread email for the user of device 500, device 500 optionally does not display two separate status indications in widget 1206*b* for Charlie Stone, but optionally rather selects from one of those two status indications to display. In some embodiments, which of the multiple status indications is displayed changes over time. For example, FIG. 12U illustrates a priority plot 1249, as well as widget 1206*b* displayed at different times, as will be described. Widget 1206*b* in FIG. 12U is associated with Charlie Stone, but it is understood that the details described with reference to FIG. 12U optionally apply analogously to any widget associated with any user described herein (e.g., with reference to methods 700, 900, 1100 and/or 1300).

With reference to plot 1249, at time 1253*a*, Charlie Stone sends a message to the user of the electronic device (e.g., device 500), which optionally causes the device to display message indication 1232*a* (e.g., as previously described) in widget 1206*b*, as shown in arrangement 1255*a*. Message indication 1232*a* is optionally associated with a priority curve or function 1251*a* that defines the priority of message indication 1232*a* as a function of time since the message from Charlie Stone was sent/received. In some embodiments, the priority of a given status (e.g., message received, purchase request received, etc.) decreases over time, remains constant over time, or increases over time, depending on the given status. In FIG. 12U, the priority of the message received status (corresponding to priority function 1251*a*) decreases over time, as shown in plot 1249. Because the priority of message indication 1232*a* is the highest (or only) priority indication from time 1253*a* to 1253*b*, device 500 optionally displays message indication 1232*a* in widget 1206*b* from time 1253*a* to 1253*b*, as shown in arrangement 1255*a*.

At time 1253*b*, while the message associated with message indication 1232*a* remains outstanding (e.g., has not been read by the user of device 500), Charlie Stone sends a purchase request to the user of the electronic device. The purchase request is optionally associated with a priority curve or function 1251*b*—optionally different from the priority function of message requests and/or other statuses associated with Charlie Stone—that defines the priority of the purchase request as a function of time since the purchase request from Charlie Stone was sent/received. Because the priority of the purchase request is the highest priority status from time 1253*b* to 1253*c*, device 500 optionally displays purchase request indication 1232*b* in widget 1206*b* from time 1253*b* to 1253*c*, as shown in arrangement 1255*b*, without displaying message indication 1232*a* in widget 1206*b*.

At time 1253*c*, while both the message status and the purchase request status associated with Charlie Stone are outstanding, the priority associated with the purchase request from Charlie Stone (reflected by function 1251*b*) crosses over and becomes lower than the priority associated with the message status associated with Charlie Stone (e.g., because the priority of the purchase request status decays more quickly as a function of time than does the priority of the message status). As a result, device 500 optionally displays message indication 1232*a* in widget 1206*b* from time 1253*c* and onward, as shown in arrangement 1255*c*, without displaying purchase request indication 1232*b* in widget 1206*b*. Therefore, as described with reference to FIG. 12U, in some embodiments device 500 automatically switches between displaying different outstanding status indications in widget 1206*b* over time based on one or more priority functions associated with those status indications. In some embodiments, if a given status indication is no longer outstanding (e.g., because the user of device 500 has addressed that status, such as by reading the message associated with a message status indication), the priority function of that status indication drops to zero and/or is no longer considered by device 500 in determining which status indication to display in widget 1206*b* for a given user.

In some embodiments, rather than a stack of widgets including widgets associated with different users of a family account, device 500 displays a stack of widgets including widgets associated with different applications, and the widgets in the stack are associated with the same user. For example, in FIG. 12V, device 500 is displaying user interface 1202 that includes widget 1206*c*. Widget 1206*c* is a widget that is associated with Allison Frost (e.g., in the family account of the user of device 500). In some embodiments, device 500 displays a representation 1212*b* (e.g., avatar, photo, etc.) of Allison Frost overlaid on a portion of widget 1206*c* (e.g., the lower-right portion of the widget) to indicate that widget 1206*c* is associated with Allison Frost. Further, in FIG. 12V, device 500 is displaying indicator 1211 to indicate that the currently displayed widget is the first of three widgets associated with different applications that are included in widget 1206*c*.

In FIG. 12V, widget 1206*c* is displaying a photos application widget of a photo browsing and/or editing application on device 500. While displaying the photos widget, widget 1206*c* includes representations of one or more photos or videos associated with Allison Frost (e.g., Pic 1), such as photos or videos that include Allison Frost and/or were sent to the user of device 500 by Allison Frost and/or were sent by the user of device 500 to Allison Frost. The photos widget optionally does not include photos or videos that are accessible via the photos application on device 500 that are not associated with Allison Frost. If widget 1206*c* were instead associated with Charlie Stone, the photos widget shown in FIG. 12V would optionally instead include representations of one or more photos or videos associated with Charlie Stone, such as photos or videos that include Charlie Stone and/or were sent to the user of device 500 by Charlie Stone and/or were sent by the user of device 500 to Charlie Stone, and would optionally not include photos or videos that are accessible via the photos application on device 500 that are not associated with Charlie Stone (e.g., Pic 1).

Figure 12W:
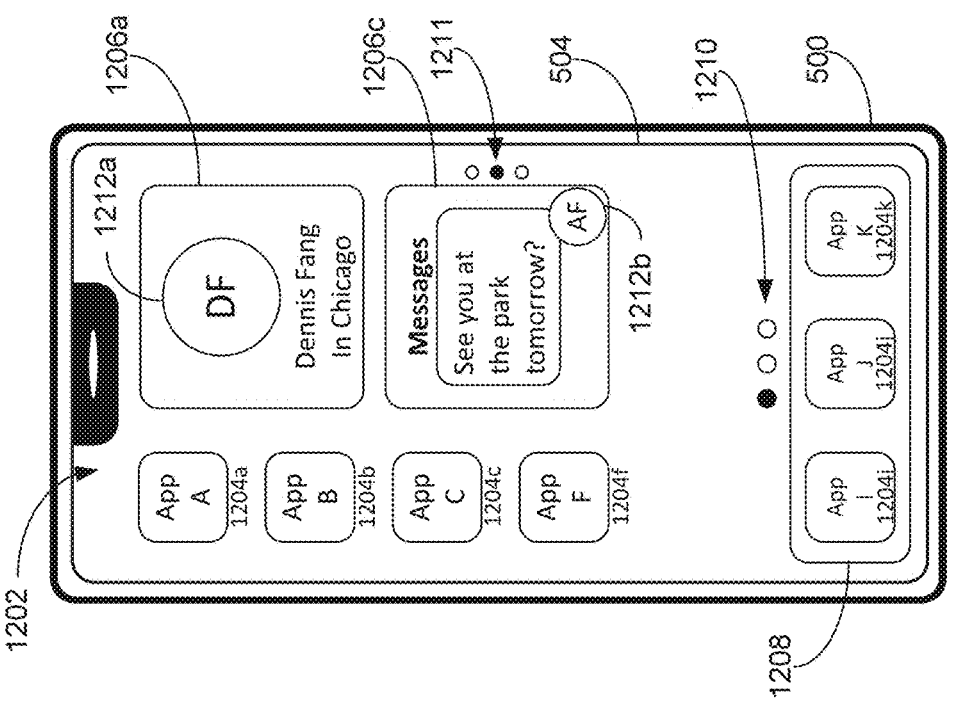
Figure 13A:
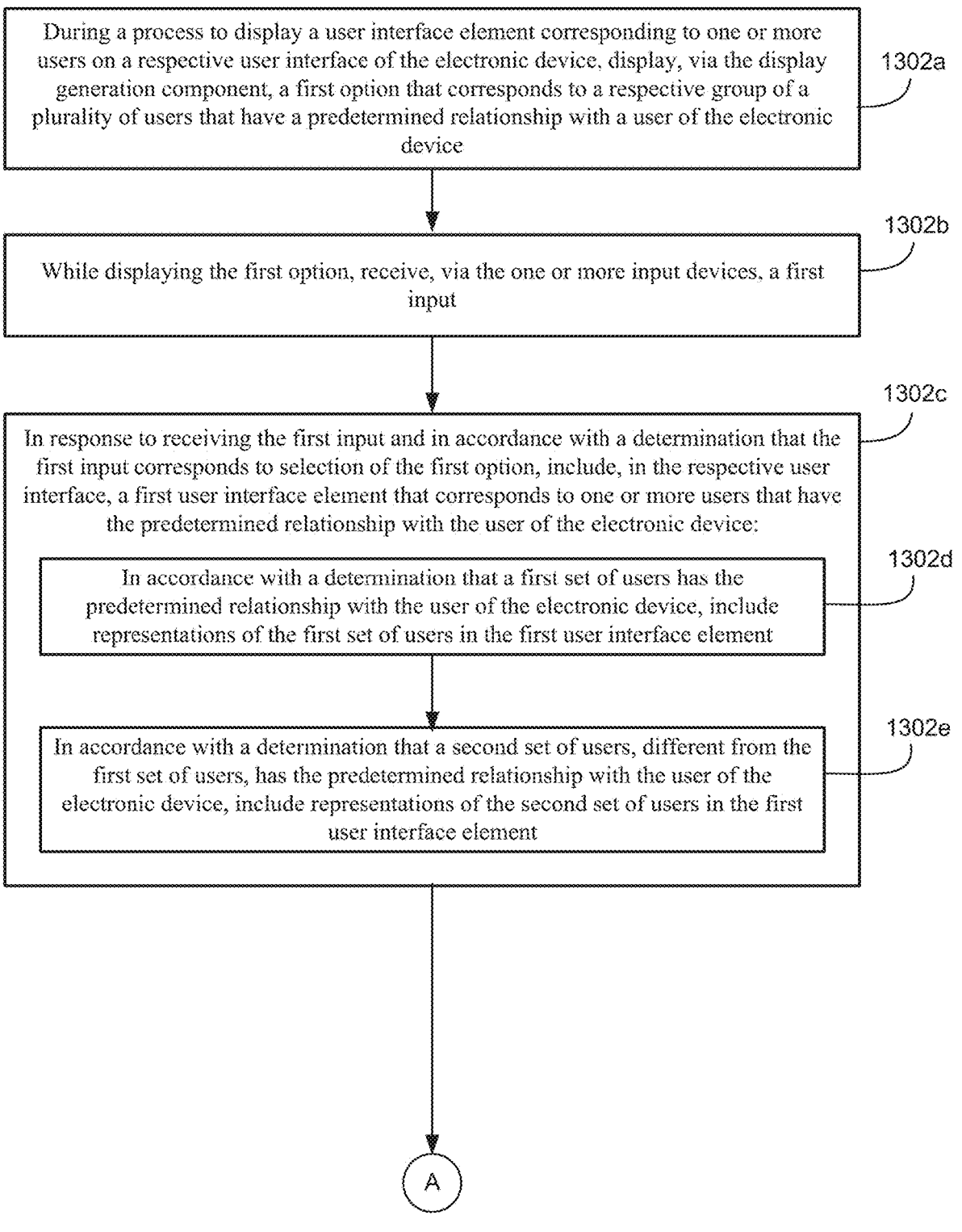
Figure 13B:
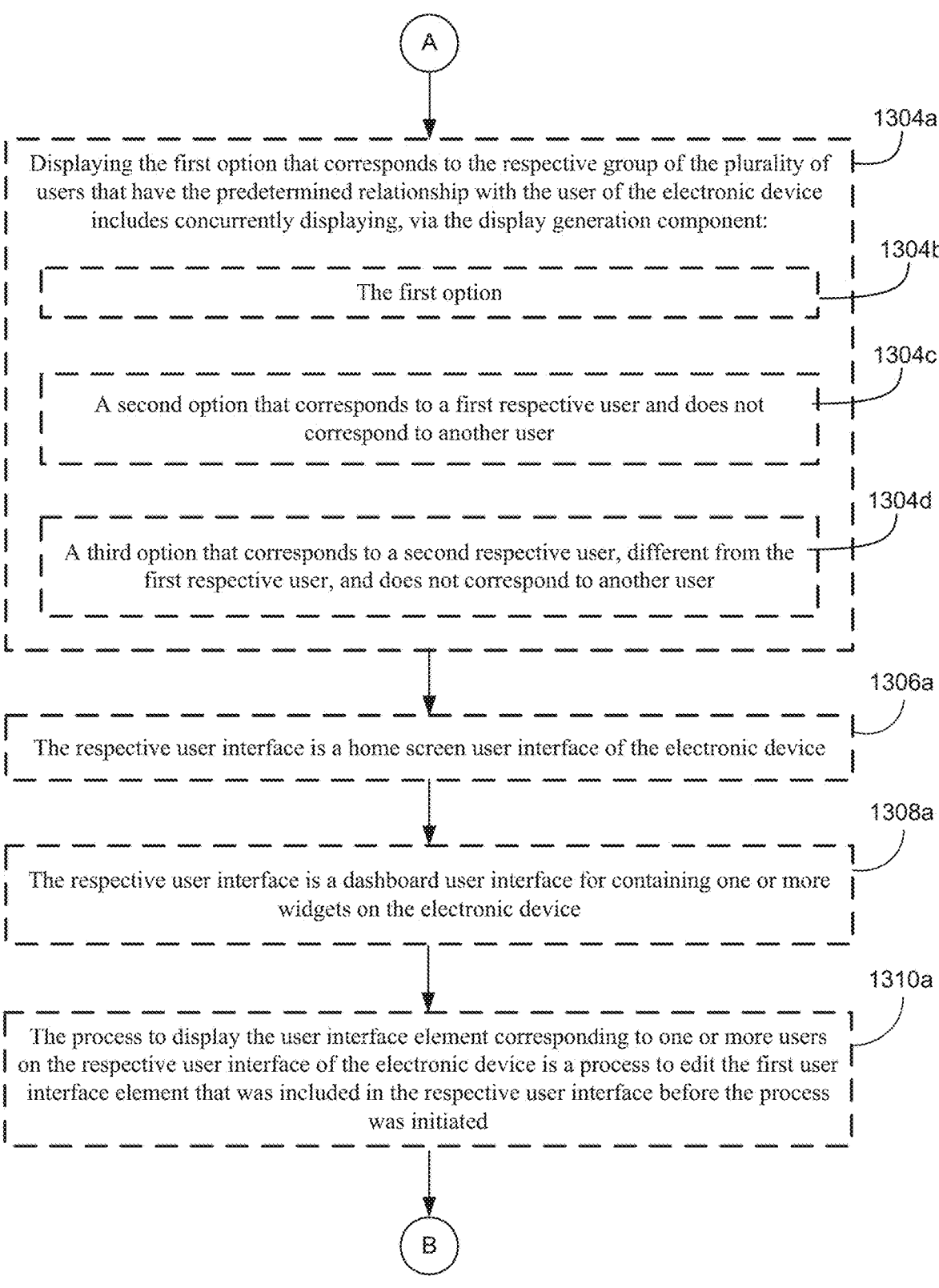
Figure 13C:
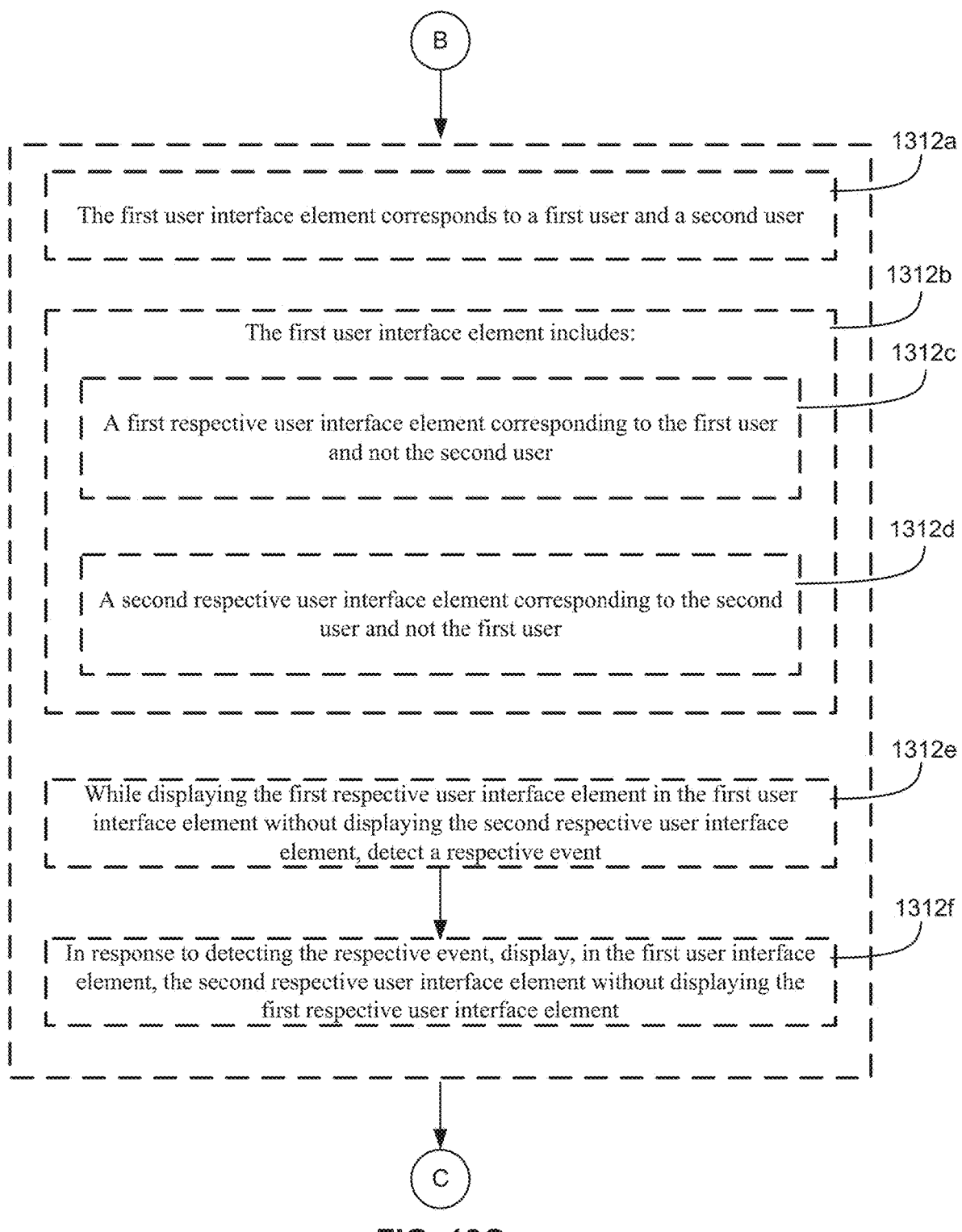
Figure 13D:
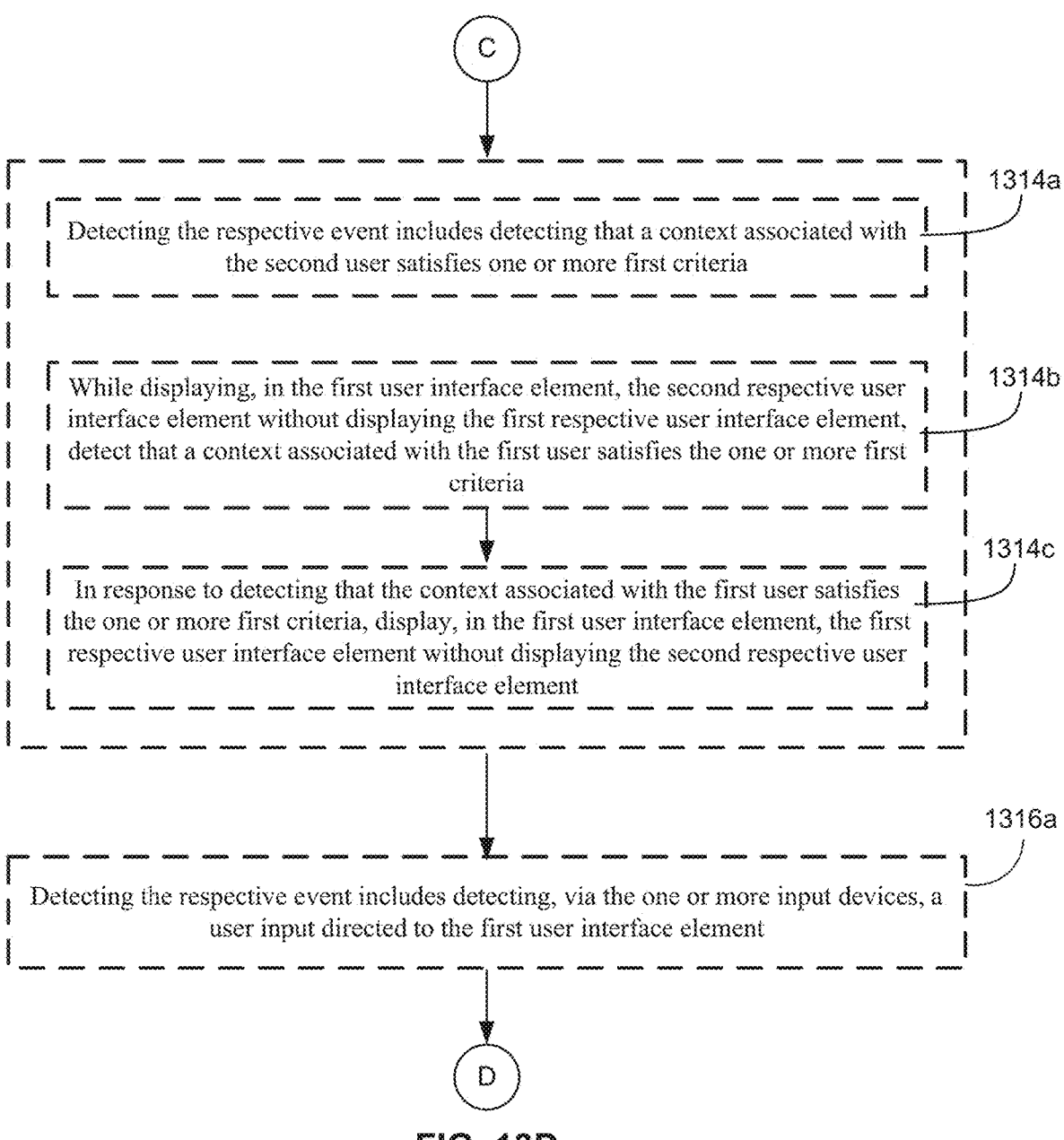
Figure 13E:
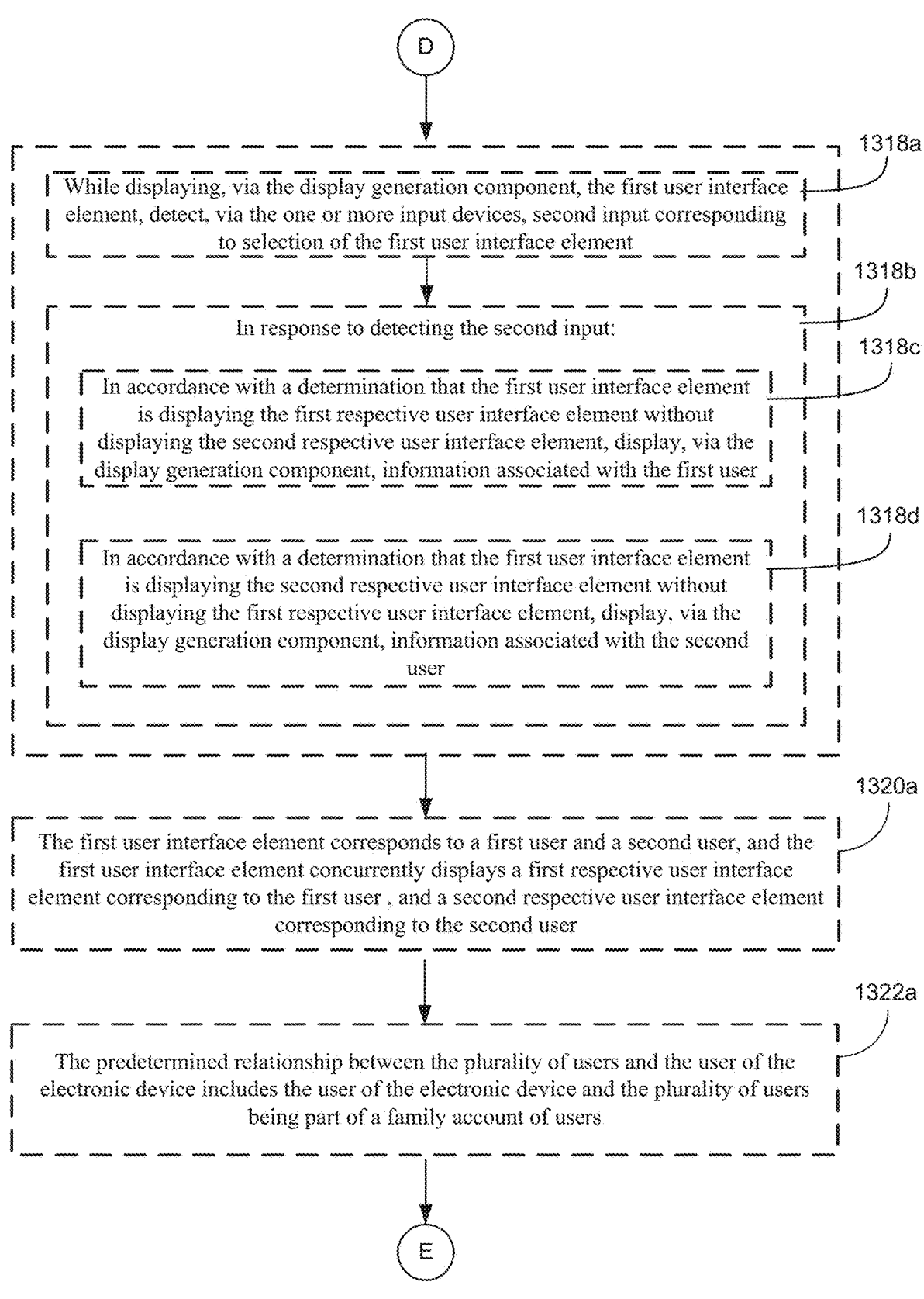
Figure 13G:
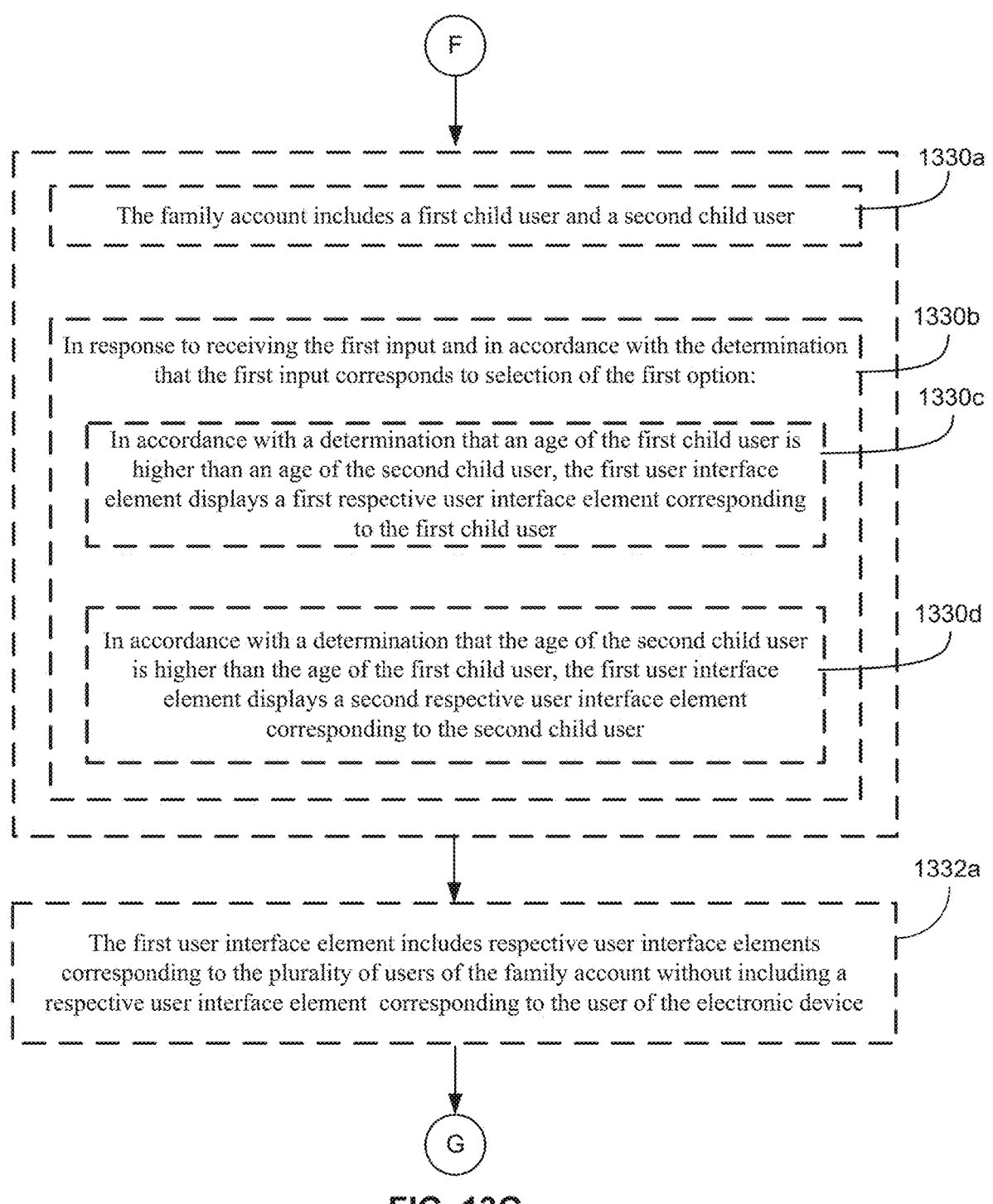
Figure 13I:
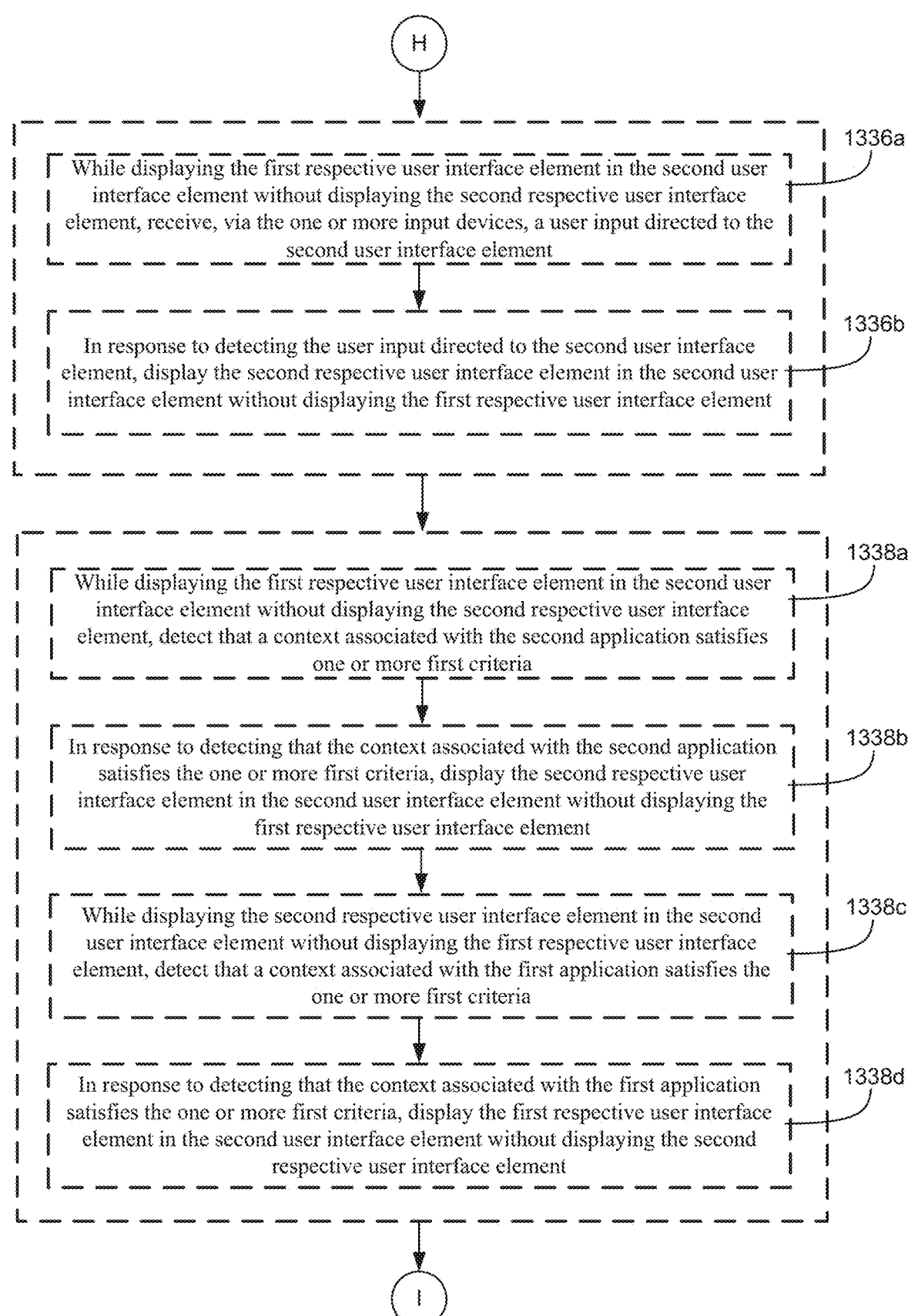
Figure 13J:
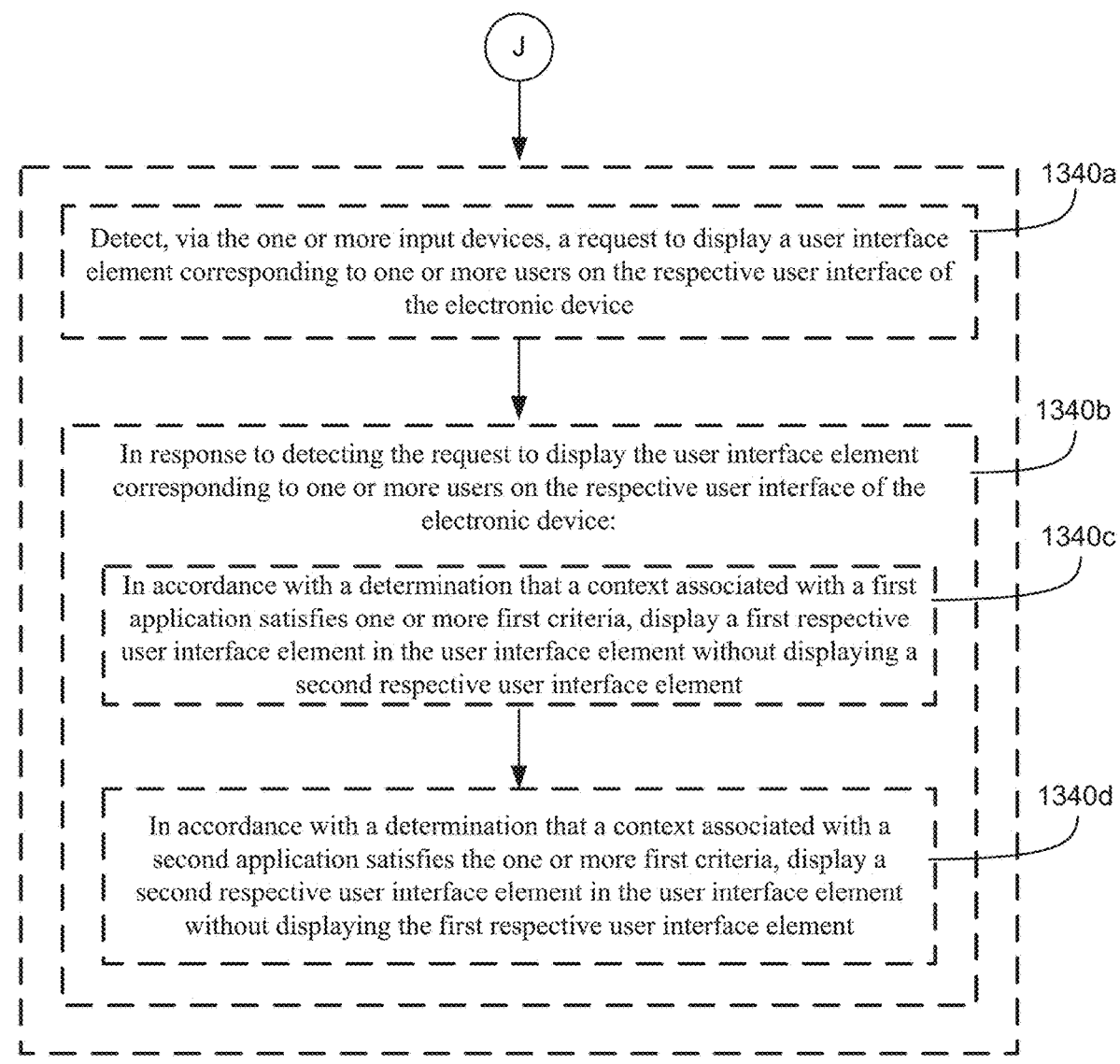

In FIG. 12W, device 500 has rearranged widget 1206*c* (e.g., in response to user input, such as described with reference to FIGS. 12K-12L or based on the contexts of the applications associated with widgets included in widget 1206*c*, analogous to as described with reference to FIGS. 12I-12J). In particular, widget 1206*c* is displaying a messaging application widget of a messaging application on device 500. While displaying the messaging widget, widget 1206*c* includes representations of one or more messages associated with Allison Frost (e.g., including at least a portion of the content of the message, such as "See you at the park tomorrow?"), such as messages that include mention of Allison Frost and/or were sent to the user of device 500 by Allison Frost and/or were sent by the user of device 500 to Allison Frost. The messaging widget optionally does not include messages that are accessible via the messaging application on device 500 that are not associated with Allison Frost. If widget 1206*c* were instead associated with Charlie Stone, the messaging widget shown in FIG. 12W would optionally instead include representations of one or more messages associated with Charlie Stone, such as messages that include mention of Charlie Stone and/or were sent to the user of device 500 by Charlie Stone and/or were sent by the user of device 500 to Charlie Stone, and would optionally not include messages that are accessible via the messaging application on device 500 that are not associated with Charlie Stone (e.g., the message shown in widget 1206c in FIG. 12W).

In FIG. 12X, device 500 has rearranged widget 1206c (e.g., in response to user input, such as described with reference to FIGS. 12K-12L or based on the contexts of the applications associated with widgets included in widget 1206c, analogous to as described with reference to FIGS. 12I-12J). In particular, widget 1206c is displaying an email application widget of an email application on device 500. While displaying the email widget, widget 1206c includes representations of one or more emails associated with Allison Frost (e.g., including at least a portion of the subject line of the email and/or the content of the email, such as the subject line "Re: Soccer League" and the content "Hi Team, playoffs on Wednesday! Don't forget to bring your ID"), such as emails that include mention of Allison Frost and/or include Allison Frost as an addressee and/or were sent to the user of device 500 by Allison Frost and/or were sent by the user of device 500 to Allison Frost. The email widget optionally does not include emails that are accessible via the email application on device 500 that are not associated with Allison Frost. If widget 1206c were instead associated with Charlie Stone, the email widget shown in FIG. 12X would optionally instead include representations of one or more emails associated with Charlie Stone, such as emails that include mention of Charlie Stone and/or include Charlie Stone as an addressee and/or were sent to the user of device 500 by Charlie Stone and/or were sent by the user of device 500 to Charlie Stone, and would optionally not include emails that are accessible via the email application on device 500 that are not associated with Charlie Stone (e.g., the email shown in widget 1206c in FIG. 12X).

FIGS. 13A-13J are flow diagrams illustrating a method 1300 of facilitating display of widgets associated with users of a family account in accordance with some embodiments, such as in FIGS. 12A-12X. The method 1300 is optionally performed at an electronic device such as device 100, device 300, or device 500 as described above with reference to FIGS. 1A-1B, 2-3, 4A-4B and 5A-5H. Some operations in method 1300 are, optionally combined and/or order of some operations is, optionally, changed.

As described below, the method 1300 provides ways of facilitating display of widgets associated with users of a family account. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1300 is performed at an electronic device in communication with a display generation component and one or more input devices. For example, a mobile device (e.g., a tablet, a smartphone, a media player, or a wearable device) including wireless communication circuitry, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, during a process to display a user interface element corresponding to one or more users on a respective user interface of the electronic device, such as shown in FIG. 12F (e.g., during a process to add a representation or widget or "card" that corresponds to a user or a group of users other than the user associated with the electronic device or a process to edit an existing representation or widget or "card" that corresponds to a user or a group of users other than the user associated with the electronic device. In some embodiments, the process is to add the representation or widget or "card" to a home screen user interface such as described with reference to FIG. 4A (or edit such a widget that is already included in the home screen user interface), such as a user interface that includes a plurality of application icons that are selectable to display respective applications that are (e.g., installed) on the electronic device. In some embodiments, the representation or widget or "card" has one or more of the characteristics of corresponding representations or user interface elements or "cards" described with reference to methods 700, 900 and/or 1100), the electronic device displays (1302a), via the display generation component, a first option that corresponds to a respective group of a plurality of users that have a predetermined relationship with a user of the electronic device, such as the "Family Stack" option in FIG. 12G. For example, in some embodiments, during the process to add a widget associated with a user to the respective user interface of the electronic device, the electronic device displays a user interface that includes representations of a plurality of users (e.g., contacts of the user of the electronic device) that are selectable to associate the widget to be added with those selected user(s). In some embodiments, included in the user interface is an option that is selectable to associate a group of users, rather than a single user, with the widget to be added (e.g., without the user needing to individually select each user of the group of users). In some embodiments, the group of users is defined based on a relationship between the user of the electronic device and the users included in the group of users (e.g., the user of the electronic device and the users included in the group of users are all part of a family account such that the users included in the family account are able to access (at least some of the) content of other users included in the family account, are able to (at least partially) utilize a shared payment source (e.g., credit card) for making purchases of movies, songs, applications, etc. within the family account, etc.).

In some embodiments, while displaying the first option, the electronic device receives (1302b), via the one or more input devices, a first input (e.g., selection of one or more of the options in the user interface displayed by the electronic device that includes the various users and/or groups of users to be associated with the widget to be added). In some embodiments, in response to receiving the first input and in accordance with a determination that the first input corresponds to selection of the first option, such as shown in FIGS. 12F-12G, the electronic device includes (1302c), in the respective user interface, a first user interface element that corresponds to one or more users that have the predetermined relationship with the user of the electronic device, such as widget 1206b in FIG. 12H or 12P (e.g., selection of the option corresponding to the group of users). In some embodiments, in accordance with a determination that a first set of users has the predetermined relationship with the user of the electronic device, the first user interface element includes representations of the first set of users in the first user interface element (1302d), such as the three users associated with widget 1206b in FIG. 12H or 12P (e.g., without including the representations of a second set of users in the first user interface element). In some embodiments, in accordance with a determination that a second set of users, different from the first set of users, has the predetermined relationship with the user of the electronic device, the first user interface element includes representations of the second set of users in the first user interface element (1302e), such as a different widget than 1206b in FIG. 12H or 12P that is associated with two users or four users depending on the number of users in the family account (e.g., without including the representations of the first set of users in the first user interface element). For example, if the predetermined relationship is inclusion in a family account, as previously described, if the family account of the user includes User A (the user) and Users B, C and D, the electronic device adds a widget to the respective user interface of the electronic device that is associated with Users A, B, C and D. If instead the family account of the user includes User A (the user) and Users B and C (and not User D), the electronic device adds a widget to the respective user interface of the electronic device that is associated with Users A, B, C (and not associated with User D). The user is optionally not required to individually select each user to be associated with the widget. Instead, in some embodiments, the only input required from the user to associate the widget to be added with the group of users is selection of the first option that corresponds to the group of users that has the predetermined relationship with the user of the electronic device. The above-described manner of adding a widget to a user interface or editing a widget already included in a user interface provides a quick and efficient manner of associating the widget with a plurality of users with which the user is likely to interact, which simplifies the interaction between the user and the electronic device and enhances the operability of the electronic device and makes the user-device interface more efficient (e.g., by avoiding the need for additional inputs to individually and separately designate all of the users to be associated with the widget), which additionally reduces power usage and improves battery life of the electronic device by enabling the user to use the electronic device more quickly and efficiently. Further, associating a single widget with a plurality of users avoids the need for a plurality of widgets, each associated with a different user, thus providing a more efficient use of display area.

In some embodiments, displaying the first option that corresponds to the respective group of the plurality of users that have the predetermined relationship with the user of the electronic device includes concurrently displaying, via the display generation component (1304a) (e.g., in a user interface for editing and/or adding the widget to the respective user interface), the first option (1304b), a second option that corresponds to a first respective user and does not correspond to another user (1304c) (e.g., in a list of contacts, the second option corresponds to John Doe), and a third option that corresponds to a second respective user, different from the first respective user, and does not correspond to another user (1304d), such as the options shown in user interface 1209 in FIG. 12F (e.g., in a list of contacts, the third option corresponds to Lisa Appleseed). For example, the first, second and third options are displayed in a user interface for editing the widget, or are displayed in a user interface for adding the widget to the respective user interface. The user interface optionally includes a list of contacts of the user of the electronic device, that also includes an entry that corresponds to the group of users that has the predetermined relationship with the user of the electronic device (e.g., those users, other than the user of the electronic device, that are included in a family account that includes the user of the electronic device). In some embodiments, the individual users in the list of contacts are selectable to add/remove those users from the widget, and the entry corresponding to the group of users (e.g., the family account) is selectable to add/remove that group of users from the widget. The above-described manner of including individual users along with the group of users for selection provides a quick and efficient manner of editing the inclusion of the group and/or of individual users in the widget, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface is a home screen user interface of the electronic device (1306a), such as user interface 1202 in FIG. 12R (e.g., such as described with reference to FIG. 4A). The above-described manner of including the widget on the home screen user interface provides a quick and efficient manner of displaying information about the users associated with the widget alongside other content of the home screen user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the respective user interface is a dashboard user interface for containing one or more widgets on the electronic device (1308a), such as user interface 1205 in FIG. 12H (e.g., a dashboard user interface that is accessible from the home screen user interface, such as in response to a horizontal swipe gesture detected on the home screen user interface). The dashboard user interface is optionally a user interface dedicated to widgets and does not include application icons. In contrast, the home screen user interface (e.g., such as described with reference to FIG. 4A) is optionally a user interface that concurrently includes or can concurrently include widgets and application icons. The above-described manner of including the widget on the dashboard user interface provides a quick and efficient manner of displaying information about the users associated with the widget alongside other widgets (e.g., widgets associated with other applications, etc.), which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the process to display the user interface element corresponding to one or more users on the respective user interface of the electronic device is a process to edit the first user interface element that was included in the respective user interface (e.g., a home screen user interface or a dashboard user interface) before the process was initiated (1310*a*), such as a process as described with reference to FIGS. 8I-8M (e.g., for example, in response to detecting a tap and hold input on the first user interface element, the electronic device displays a menu that includes an "edit" element that is selectable to initiate a process by which the user(s) to be associated with the first user interface element are selectable). Thus, in some embodiments, the process is a process to edit an existing widget as opposed to a process for adding a new widget to the respective user interface. The above-described manner of allowing for associating a group of users with the widget during an editing process for the widget provides a quick and efficient manner of associating the widget with a relevant group of users without having to create a new widget to do so, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface element corresponds to a first user and a second user (1312*a*) (e.g., the first user interface element is associated with a plurality of users, such as users in a family account along with the user of the electronic device), and the first user interface element includes (1312*b*) a first respective user interface element corresponding to the first user and not the second user (1312*c*) (e.g., including a graphical representation (e.g., avatar, photograph) of the first user, a name of the first user and/or status information associated with the first user, such as described with reference to methods 700, 900, 1100 and/or 1300), and a second respective user interface element corresponding to the second user and not the first user (1312*d*), such as widget stack 1206*b* in FIG. 12H including a widget for Allison Frost and Charlie Stone (e.g., including a graphical representation (e.g., avatar, photograph) of the second user, a name of the second user and/or status information associated with the second user, such as described with reference to methods 700, 900, 1100 and/or 1300).

In some embodiments, while displaying the first respective user interface element in the first user interface element without displaying the second respective user interface element (e.g., the first user interface element is a stack of widgets, each widget corresponding to a different user with which the first user interface element is associated. In some embodiments, the stack of widgets, at steady state, displays a single widget for a single user at a given moment in time (e.g., without displaying widgets for other users in the stack)), the electronic device detects (1312*e*) a respective event, such as the message from Charlie Stone 1236 in FIG. 12J (e.g., detecting a user input directed to the stack of widgets, detecting a change in status or context associated with a user associated with the stack of widgets, etc.). In some embodiments, in response to detecting the respective event, the electronic device displays (13120, in the first user interface element, the second respective user interface element without displaying the first respective user interface element, such as displaying the widget for Charlie Stone in FIG. 12J without displaying the widget for Allison Frost. For example, the electronic device cycles through the widgets in the stack of widgets to move the widget associated with the first user towards the bottom of the stack of widgets (e.g., no longer displaying the widget associated with the first user), and move the widget associated with the second user to the top of the stack (e.g., to now display the widget associated with the second user). Thus, in some embodiments, the stack of widgets is rearranged or cycled to cause different widgets in the stack of widgets to be displayed on the respective user interface at a given moment in time. The above-described manner of displaying the widgets as a stack of widgets reduces the consumed space on the respective user interface while maintaining the ability to access the widgets in the stack of widgets, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, detecting the respective event includes detecting that a context associated with the second user satisfies one or more first criteria (1314*a*), such as the message from Charlie Stone 1236 in FIG. 12J (e.g., detecting that information displayed on the widget associated with the second user is the most recently updated information included in widgets in the stack of widgets (and/or is more recently updated than the information included in the widget for the first user), detecting that information displayed on the widget associated with the second user is the most relevant (e.g., based on a predetermined relevance or importance value or function) information included in widgets in the stack of widgets (and/or is more relevant than the information included in the widget for the first user), etc.). In some embodiments, while displaying, in the first user interface element, the second respective user interface element without displaying the first respective user interface element, such as in FIG. 12J, the electronic device detects (1314*b*) that a context associated with the first user satisfies the one or more first criteria, such as if a purchase request is detected from Allison Frost (similar to as shown in FIG. 12I) (e.g., detecting that information displayed on the widget associated with the first user is the most recently updated information included in widgets in the stack of widgets (and/or is more recently updated than the information included in the widget for the second user), detecting that information displayed on the widget associated with the first is the most relevant (e.g., based on a predetermined relevance or importance value or function) information included in widgets in the stack of widgets (and/or is more relevant than the information included in the widget for the second user), etc.). In some embodiments, in response to detecting that the context associated with the first user satisfies the one or more first criteria, the electronic device displays (1314*c*), in the first user interface element, the first respective user interface element without displaying the second respective user interface element, such as shown in widget stack 1206*b* in FIG. 12I. For example, the electronic device automatically (e.g., without user input for doing so) cycles through the widgets in the stack of widgets to move the widget associated with the context of the user that satisfies the one or more first criteria to the top of the stack (e.g., to now display the widget associated with that user, and to no longer display the widget(s) associated with other users). For example, if the stack of widgets is currently displaying the widget for the first user, and the second user sends a text message to the user of the electronic device, the electronic device optionally switches to displaying the widget for the second user (e.g., including an indication that the user has unread communications from the second user, such as described with reference to method 900) and stops displaying the widget for the first user in the stack. Similarly, if subsequently the first user makes a request of the user of the electronic device (e.g., as described with reference to methods 900 and/or 1100), the electronic device optionally switches to displaying the widget for the first user (e.g., including an indication that the user has an outstanding request from the first user, such as described with reference to method 900) and stops displaying the widget for the second user in the stack. Further, in some embodiments, the automatic reordering performed by the electronic device applies to and/or is maintained for widgets other than the currently displayed widget in the stack. For example, each widget in the stack could be associated with an ordering index or number or position, and based on activity of users associated with those widgets (as described above and herein), the electronic device optionally updates that index/number/position to define that widget's position in the stack of widgets. Thus, in response to user input to switch between widget in the stack, the next widget displayed by the electronic device is optionally different based on the activity of the users associated with the widgets in the stack. For example, if widget 1 associated with user 1 is currently displayed in the stack, and user input is received to switch to the next widget in the stack (e.g., as described below), if user 2 associated with widget 2 provided the next most-recent activity of the users associated with the stack, the electronic device optionally displays widget 2 in response to the user input. Instead, if user 3 associated with widget 3 provided the next most-recent activity of the users associated with the stack (e.g., user 3 activity was more recent than user 2 activity), the electronic device optionally displays widget 3 in response to the user input (e.g., and does not display widget 2 in response to the user input—additional user input while widget 2 is displayed is optionally required to display widget 3). The above-described manner of automatically cycling through the widgets in the stack based on context provides a quick and efficient way of surfacing relevant information from multiple widgets at the appropriate times while reducing the amount of space consumed by the widgets on the respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, detecting the respective event includes detecting, via the one or more input devices, a user input directed to the first user interface element (1316*a*), such as input from contact 1203 in FIGS. 12K-12L. For example, in addition or alternatively to automatically cycling through the widgets in the stack of widgets, the electronic device cycles through the widgets in response to user inputs (e.g., horizontal or vertical swipe inputs) detected by the device directed to the stack of widgets. The above-described manner of cycling through the widgets in the stack based on user input provides a quick and efficient way of allowing access to multiple widgets while reducing the amount of space consumed by the widgets on the respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying, via the display generation component, the first user interface element, the electronic device detects (1318*a*), via the one or more input devices, second input corresponding to selection of the first user interface element (e.g., a tap of a contact detected on the stack of widgets, and not a swipe or tap and hold input on the stack of widgets). In some embodiments, in response to detecting the second input (1318*b*), in accordance with a determination that the first user interface element is displaying the first respective user interface element without displaying the second respective user interface element (e.g., the widget for the first user is currently at the top of the stack/is being displayed, and the widget for the second user is not at the top of the stack/is not being displayed), the electronic device displays (1318*c*), via the display generation component, information associated with the first user, such as shown with respect to widget 1206*b* in FIGS. 12P-12Q (e.g., a user interface associated with device activity of the first user such as described with reference to method 1100 and/or a user interface associated with location information for the first user as described with reference to method 700). In some embodiments, in accordance with a determination that the first user interface element is displaying the second respective user interface element without displaying the first respective user interface element (e.g., the widget for the second user is currently at the top of the stack/is being displayed, and the widget for the first user is not at the top of the stack/is not being displayed), the electronic device displays (1318*d*), via the display generation component, information associated with the second user, such as shown with respect to widget 1206*b* in FIGS. 12R-12S (e.g., a user interface associated with device activity of the second user such as described with reference to method 1100 and/or a user interface associated with location information for the second user as described with reference to method 700). Thus, in some embodiments, the electronic device displays a user interface associated with the user whose widget is currently at the top of the stack when the second input is detected. The above-described manner of accessing information related to a user in the stack of widgets provides a quick and efficient way of allowing access to user information associated with one or more widgets in the stack of widgets, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface element corresponds to a first user and a second user (e.g., the first user interface element is associated with a plurality of users, such as users in a family account along with the user of the electronic device), and the first user interface element concurrently displays a first respective user interface element corresponding to the first user (e.g., a graphical representation (e.g., avatar, photograph) of the first user, a name of the first user and/or status information associated with the first user, such as described with reference to methods 700, 900, 1100 and/or 1300), and a second respective user interface element corresponding to the second user (1320*a*), such as shown in widget 1206*b* in FIG. 12T (e.g., a graphical representation (e.g., avatar, photograph) of the second user, a name of the second user and/or status information associated with the second user, such as described with reference to methods 700, 900, 1100 and/or 1300). Thus, in some embodiments, the widget is not a stack of widgets associated with the first and second users, respectively, but is rather a widget that displays information about the first and second users concurrently. In some embodiments, the non-stack widget is larger in size on the respective user interface than the stack widget. In some embodiments, the non-stack widget is the same size on the respective user interface as is the stack widget, but the information associated with the users is smaller in the non-stack widget than the corresponding information in the stack widget. In some embodiments, a user is able to provide input to indicate whether the widget associated with the plurality of users will be a stack widget or a non-stack widget. The above-described manner of concurrently displaying information for a plurality of users provides a quick and efficient way of displaying information about a plurality of users without the need for input to display information about different users, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the predetermined relationship between the plurality of users and the user of the electronic device includes the user of the electronic device and the plurality of users being part of a family account of users (1322*a*), such as described with reference to widget 1206*b* in FIG. 12H. In some embodiments, the user of the electronic device is part of a family account with a content delivery, purchase and/or storage service, such family account having one or more of the characteristics of the family accounts described with reference to methods 700, 900 and/or 1100. In some embodiments, the widget is associated with the users of the family account (e.g., the users whose information is displayed in the widget are the users who are part of the family account, except for the user of the electronic device). In some embodiments, the widget associated with the family account has one or more of the characteristics of the corresponding widget described with reference to method 900. In some embodiments, the widget associated with the users of the family account does not include users that are not included in the family account, and in some embodiments, the widget associated with the users of the family account does include users that are not included in the family account. The above-described manner of associating a single widget with multiple users of a family account provides for a quick and efficient manner of conveying status for multiple user accounts within a family account, thus conserving space in the user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, at least some purchased content associated with a user of the family account is accessible to other users of the family account (1324*a*). For example, if a user in a family account purchases access to content (e.g., purchases a movie/television show/song/album/etc., rents the movie/television show/song/album/etc., obtains a subscription to a content delivery service that has access to the movie/television show/song/album/etc.), other users in the family account also have access to that content by virtue of membership in the family account without having to separately purchase access to that content. In some embodiments, the user has purchased access to the content using a shared purchase account that is shared by members of the family account, such as described with reference to method 900. The above-described manner of sharing access to content with multiple users of a family account provides for a quick and efficient manner of managing content access amongst related user accounts without the need for repetitive content purchases, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, at least one purchased application associated with a user of the family account is accessible to other users of the family account (1326*a*). For example, if a user in a family account purchases access to an application (e.g., purchases a game/application/etc., rents the game/application/etc., obtains a subscription to an application delivery service that has access to the game/application/etc.), other users in the family account also have access to that application by virtue of membership in the family account without having to separately purchase access to that application. In some embodiments, the user has purchased access to the application using a shared purchase account that is shared by members of the family account, such as described with reference to method 900. The above-described manner of sharing access to content with multiple users of a family account provides for a quick and efficient manner of managing content access amongst related user accounts without the need for repetitive content purchases, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the family account includes one or more parent users and one or more child users, and at least one child user of the one or more child users is subject to one or more device usage restrictions (e.g., time-based device usage limits, content rating-based device usage limits, etc.) set by at least one parent user of the one or more parent users (1328*a*). For example, in some embodiments, the parent account(s) in a family account have an ability to monitor and/or control the usage of devices by child account(s) in the family account (but optionally not vice versa), such as described with reference to methods 900 and/or 1100. The users in the family account with which the widget is associated optionally include at least one child user and/or at least one parent user in the family account. The above-described manner of including in the widget users associated with device usage restrictions provides for a quick and efficient manner of making information related to such users available, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the family account includes a first child user and a second child user (1330*a*), and, in response to receiving the first input and in accordance with the determination that the first input corresponds to selection of the first option (1330*b*), in accordance with a determination that an age of the first child user is higher than an age of the second child user (e.g., the first child user is older than the second child user. In some embodiments, the first child user is the oldest child in the family account), the first user interface element displays a first respective user interface element (e.g., widget) corresponding to the first child user (1330*c*) (e.g., without displaying a second respective user interface element corresponding to the second child user). In some embodiments, in accordance with a determination that the age of the second child user is higher than the age of the first child user (e.g., the second child user is older than the first child user. In some embodiments, the second child user is the oldest child in the family account), the first user interface element displays a second respective user interface element (e.g., widget) corresponding to the second child user (1330*d*) (e.g., without displaying a second respective user interface element corresponding to the second child user), such as if Allison Frost and Charlie Stone were child users in the family account and determining whose widget would be displayed first in FIG. 12H based on the relative ages of Allison Frost and Charlie Stone. For example, the widget associated with the family account optionally includes the widget associated with the oldest child at the top of the stack of widgets (e.g., by default, absent user input or context for cycling through the widgets), and therefore widget(s) associated with other users in the family account are optionally included (e.g., by default, absent user input or context for cycling through the widgets) under the widget associated with the oldest child (e.g., not at the top of the stack of widgets). In some embodiments, the electronic device orders the widgets in a different way based on the ages of the users in the family account (e.g., includes the widget for the youngest child user at the top of the stack of widgets, by default). The above-described manner of ordering the widgets based on age provides for a quick and efficient manner of locating users in the family account in the widget based on age and/or surfacing the user whose information is likely more relevant to the user of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the first user interface element includes respective user interface elements (e.g., widgets) corresponding to the plurality of users of the family account without including a respective user interface element (e.g., widget) corresponding to the user of the electronic device (1332*a*), such as shown with respect to widget 1206*b* in FIGS. 12H-12L. For example, the widget that is associated with the users of the family account optionally does not include a widget or information for the user of the electronic device, even though the user of the electronic device is a member of the family account. The above-described inclusion of family users in the widget provides for a quick and efficient manner of indicating information associated with users in the family account without consuming resource for indicating information about the user of the electronic device, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, during the process to display the user interface element corresponding to one or more users on the respective user interface of the electronic device, the electronic device displays (1334*a*), via the display generation component, a second option that corresponds to a plurality of applications associated with a respective user, such as if user interface 1209 in FIG. 12F included an option for creating a widget associated with a plurality of applications and a given user (e.g., the editing or setup user interface for the widget includes an option to create or display a widget or widget stack that is associated with a single user, and that includes a plurality of widgets associated with different applications (e.g., a text message application, a location tracking application, an email application, a phone application, etc.) that display information associated with that single user (e.g., information about text messages between the user of the electronic device and the single user, information about location for the single user, information about emails between the user of the electronic device and the single user, information about phone calls and/or voicemails between the user of the electronic device and the single user, etc.)).

In some embodiments, while displaying the second option, the electronic device receives (1334*b*), via the one or more input devices, a second input (e.g., selection of one or more of the options in the user interface displayed by the electronic device that includes the various users and/or groups of users to be associated with the widget to be added). In some embodiments, in response to receiving the second input and in accordance with a determination that the second input corresponds to selection of the second option (e.g., selection of the option corresponding to the single user and the plurality of applications), the electronic device includes (1334*c*), in the respective user interface, a second user interface element (e.g., widget or stack of widgets) that corresponds to the respective user, including, a first respective user interface element (e.g., widget) corresponding to a first application and including data from the first application corresponding to the respective user (1334*d*), and a second respective user interface element (e.g., widget) corresponding to a second application, different from the first application, and including data from the second application corresponding to the respective user (1334*e*), such as widget 1206*c* in FIGS. 12V-12X. For example, selecting the second option optionally causes the electronic device to display, on the respective user interface, a stack of widgets that correspond to a single user (e.g., indicated by the second input), and that correspond to different applications. The stack of application widgets optionally has one or more of the characteristics of the stack of user widgets described herein. For example, a stack of application widgets associated with User A optionally includes an email widget (associated with an email application) that includes information about recent emails between User A and the user of the electronic device, and a text message widget (e.g., associated with a text message application) that includes information about recent text messages between User A and the user of the electronic device. In some embodiments, the stack of widgets is selectable (e.g., via a tap) to display the application corresponding to the currently displayed widget (e.g., the widget on the top of the stack). In some embodiments, the stack of widgets is interactable to interact with User A via the widget (and/or corresponding application) that is currently displayed (e.g., the widget on the top of the stack). For example, the user of the electronic device is able to respond to a text message from User A from within the text message widget in the stack of widgets (e.g., navigating away from the stack of widgets and/or the respective user interface). The above-described manner of providing for a stack of application widgets for a given user provides for a quick and efficient manner of indicating information associated with a plurality of applications for a given user, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first respective user interface element in the second user interface element without displaying the second respective user interface element (e.g., the second user interface element is a stack of widgets, each widget corresponding to a different application with which the second user interface element is associated. In some embodiments, the stack of widgets, at steady state, displays a single widget for a single application at a given moment in time (e.g., without displaying widgets for other applications in the stack), analogous to as described earlier with reference to the stacked widgets for the family account users), the electronic device receives (1336a), via the one or more input devices, a user input directed to the second user interface element, such as a swipe input directed to widget 1206c in FIG. 12V (e.g., a vertical or horizontal swipe directed to the stack of widgets). In some embodiments, in response to detecting the user input directed to the second user interface element, the electronic device displays (1336b) the second respective user interface element in the second user interface element without displaying the first respective user interface element, such as shown in widget 1206c in FIG. 12W. For example, the electronic device cycles through the widgets in the stack of widgets to move the widget associated with the first application towards the bottom of the stack of widgets (e.g., no longer displaying the widget associated with the first application), and move the widget associated with the second application to the top of the stack (e.g., to now display the widget associated with the second application). Thus, in some embodiments, the stack of widgets is rearranged or cycled in response to the user input to cause different widgets in the stack of widgets to be displayed on the respective user interface at a given moment in time. The above-described manner of cycling through the widgets in the stack based on user input provides a quick and efficient way of allowing access to multiple widgets while reducing the amount of space consumed by the widgets on the respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, while displaying the first respective user interface element in the second user interface element without displaying the second respective user interface element (e.g., the second user interface element is a stack of widgets, each widget corresponding to a different application with which the second user interface element is associated. In some embodiments, the stack of widgets, at steady state, displays a single widget for a single application at a given moment in time (e.g., without displaying widgets for other applications in the stack), analogous to as described earlier with reference to the stacked widgets for the family account users), the electronic device detects (1338a) that a context associated with the second application satisfies one or more first criteria, such as if while widget 1206c is displaying the Photos widget (e.g., as shown in FIG. 12V), activity from the Messages widget is detected (e.g., detecting that information displayed on the widget associated with the second application is the most recently updated information included in widgets in the stack of widgets (and/or is more recently updated than the information included in the widget for the first application), detecting that information displayed on the widget associated with the second application is the most relevant (e.g., based on a predetermined relevance or importance value or function) information included in widgets in the stack of widgets (and/or is more relevant than the information included in the widget for the first application), etc.).

In some embodiments, in response to detecting that the context associated with the second application satisfies the one or more first criteria, the electronic device displays (1338b) the second respective user interface element in the second user interface element without displaying the first respective user interface element, such as switching widget 1206c to the Messages widget as shown in FIG. 12W (e.g., in addition to or alternatively to cycling through the stack of widgets based on user input, the electronic device automatically (e.g., without user input to do so) cycles through the widgets in the stack of widgets based on activity occurring in those widgets to move the widget associated with the first application towards the bottom of the stack of widgets (e.g., no longer displaying the widget associated with the first application), and move the widget associated with the second application to the top of the stack (e.g., to now display the widget associated with the second application)). Thus, in some embodiments, the stack of widgets is rearranged or cycled in response to activity and/or context changes associated with the applications and/or corresponding widgets in the stack to cause different widgets in the stack of widgets to be displayed on the respective user interface at a given moment in time.

In some embodiments, while displaying the second respective user interface element in the second user interface element without displaying the first respective user interface element, the electronic device detects (1338c) that a context associated with the first application satisfies the one or more first criteria, such as if while widget 1206c is displaying the Messages widget (e.g., as shown in FIG. 12W), activity from the Photos widget is detected (e.g., detecting that information displayed on the widget associated with the first application is the most recently updated information included in widgets in the stack of widgets (and/or is more recently updated than the information included in the widget for the second application), detecting that information displayed on the widget associated with the first application is the most relevant (e.g., based on a predetermined relevance or importance value or function) information included in widgets in the stack of widgets (and/or is more relevant than the information included in the widget for the second application), etc.).

In some embodiments, in response to detecting that the context associated with the first application satisfies the one or more first criteria, the electronic device displays (1338d) the first respective user interface element in the second user interface element without displaying the second respective user interface element, such as switching widget 1206c to the Photos widget as shown in FIG. 12V. For example, the electronic device automatically (e.g., without user input for doing so) cycles through the widgets in the stack of widgets to move the widget associated with the context of the application that satisfies the one or more first criteria to the top of the stack (e.g., to now display the widget associated with that application, and to no longer display the widget(s) associated with other applications). For example, if the stack of widgets is currently displaying the widget for the first application (e.g., an email application), and the user associated with the stack of widgets sends a text message to the user of the electronic device, the electronic device optionally switches to displaying the widget for the second application (e.g., a text messaging application) that includes information about text messages between the user of the electronic device and the user associated with the stack of widgets and/or options that are selectable to send text messages from the user of the electronic device to the user associated with the stack of widgets. In some embodiments, the electronic device also stops displaying the widget for the first application in the stack. Similarly, if subsequently the user associated with the stack of widgets sends an email to the user of the electronic device, the electronic device optionally switches to displaying the widget for the first application (e.g., including information about emails between the user of the electronic device and the user associated with the stack of widgets and/or options that are selectable to send emails from the user of the electronic device to the user associated with the stack of widgets) and stops displaying the widget for the second application in the stack. The above-described manner of automatically cycling through the widgets in the stack based on context provides a quick and efficient way of surfacing relevant information from multiple widgets at the appropriate times while reducing the amount of space consumed by the widgets on the respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

In some embodiments, the electronic device detects (1340a), via the one or more input devices, a request (e.g., an input to display the home screen user interface of the electronic device) to display a user interface element (e.g., widget) corresponding to one or more users on the respective user interface of the electronic device (e.g., a widget or widget stack that is associated with a single user, and that includes a plurality of widgets associated with different applications (e.g., a text message application, a location tracking application, an email application, a phone application, etc.) that display information associated with that single user (e.g., information about text messages between the user of the electronic device and the single user, information about location for the single user, information about emails between the user of the electronic device and the single user, information about phone calls and/or voicemails between the user of the electronic device and the single user, etc.), such as described above). In some embodiments, in response to detecting the request to display the user interface element corresponding to one or more users on the respective user interface of the electronic device (1340b), in accordance with a determination that a context associated with a first application satisfies one or more first criteria (e.g., detecting that information displayed on the widget associated with the first application is the most recently updated information included in widgets in the stack of widgets (and/or is more recently updated than the information included in the widget for the second application), detecting that information displayed on the widget associated with the first application is the most relevant (e.g., based on a predetermined relevance or importance value or function) information included in widgets in the stack of widgets (and/or is more relevant than the information included in the widget for the second application), etc.), the electronic device displays (1340c) a first respective user interface element in the user interface element without displaying a second respective user interface element, such as displaying widget 1206c with the Photos widget (e.g., as in FIG. 12V) in response to an input to display user interface 1202 (e.g., in addition to or alternatively to cycling through the stack of widgets based on user input, the electronic device automatically (e.g., without user input to do so) cycles through the widgets in the stack of widgets based on activity occurring in those widgets, as previously described). Thus, in some embodiments, the stack of widgets is rearranged or cycled in response to activity and/or context changes associated with the applications and/or corresponding widgets in the stack to cause different widgets in the stack of widgets to be displayed on the respective user interface at a given moment in time. Thus, the widget stack optionally displays a different widget "on top" when the respective user interface is displayed based on the contexts of the applications associated with the widget.

In some embodiments, in accordance with a determination that a context associated with a second application satisfies the one or more first criteria (e.g., detecting that information displayed on the widget associated with the second application is the most recently updated information included in widgets in the stack of widgets (and/or is more recently updated than the information included in the widget for the first application), detecting that information displayed on the widget associated with the second application is the most relevant (e.g., based on a predetermined relevance or importance value or function) information included in widgets in the stack of widgets (and/or is more relevant than the information included in the widget for the first application), etc.), the electronic device displays (1340d) a second respective user interface element in the user interface element without displaying the first respective user interface element, such as displaying widget 1206c with the Messages widget (e.g., as in FIG. 12W) in response to an input to display user interface 1202. Thus, different widgets are optionally displayed at the top of the stack of widgets when the electronic device displays the home screen user interface depending on the contexts of the applications associated with the stack of widgets. For example, a user input is received to display the home screen user interface, and the stack of widgets is currently displaying the widget for the first application (e.g., an email application), and the user associated with the stack of widgets subsequently sends a text message to the user of the electronic device (e.g., while the home screen user interface is not displayed), the next time a user input is received to display the home screen user interface, the electronic device optionally instead displays the widget for the second application (e.g., a text messaging application) that includes information about text messages between the user of the electronic device and the user associated with the stack of widgets and/or options that are selectable to send text messages from the user of the electronic device to the user associated with the stack of widgets. In some embodiments, the electronic device does not display the widget for the first application in the stack. Similarly, if subsequently the user associated with the stack of widgets sends an email to the user of the electronic device (e.g., while the home screen user interface is not displayed), the next time a user input is received to display the home screen user interface, the electronic device optionally switches to displaying the widget for the first application in the stack (e.g., including information about emails between the user of the electronic device and the user associated with the stack of widgets and/or options that are selectable to send emails from the user of the electronic device to the user associated with the stack of widgets) and stops displaying the widget for the second application in the stack. The above-described manner of automatically cycling through the widgets in the stack based on context provides a quick and efficient way of surfacing relevant information from multiple widgets at the appropriate times while reducing the amount of space consumed by the widgets on the respective user interface, which simplifies the interaction between the user and the electronic device and enhances the operability of the electronic device and makes the user-device interface more efficient, which additionally reduces power usage and improves battery life of the electronic device by enabling the user to use the electronic device more quickly and efficiently.

It should be understood that the particular order in which the operations in FIGS. 13A-13J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900 and 1100) are also applicable in an analogous manner to method 1300 described above with respect to FIGS. 13A-13J. For example, displaying information or status for users or groups of users described above with reference to method 1300 optionally has one or more of the characteristics of displaying information or status for users, objects, tracked entities, etc., described herein with reference to other methods described herein (e.g., methods 700, 900 and 1100). For brevity, these details are not repeated here.

The operations in the information processing methods described above are, optionally, implemented by running one or more functional modules in an information processing apparatus such as general-purpose processors (e.g., a as described with respect to FIGS. 1A-1B, 3, 5A-5H) or application specific chips. Further, the operations described above with reference to FIGS. 13A-13J are, optionally, implemented by components depicted in FIGS. 1A-1B. For example, displaying operation 1302a, receiving operation 1302b, and including operation 1302c are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the ability for users to receive information and/or status for objects, users, etc. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to identify the location of a user. Accordingly, use of such personal information data enables users to have access to information and/or status for objects, users, etc. Further, other uses for personal information data that benefit the user are also contemplated by the present disclosure. For instance, health and fitness data may be used, in accordance with the user's preferences to provide insights into their general wellness, or may be used as positive feedback to individuals using technology to pursue wellness goals.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide personal data and/or device or object location data.

In yet another example, users can select to limit the length of time personal data and/or device or object location data is maintained or entirely block the development of a baseline location profile. In addition to providing "opt in" and "opt out" options, the present disclosure contemplates providing notifications relating to the access or use of personal information. For instance, a user may be notified upon downloading an application that their personal information data and/or location data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, location data can be delivered to users based on aggregated non-personal information data or a bare minimum amount of personal information.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. A method comprising:
at an electronic device in communication with a display generation component and one or more input devices:
displaying, via the display generation component, a home screen user interface of the electronic device that includes a respective user interface object that includes a first representation of a first tracked entity that is separate from the electronic device, and one or more options that are selectable to display, via the display generation component, one or more applications installed on the electronic device, wherein the respective user interface object is associated with a location information application on the electronic device that has access to location information for a plurality of tracked entities including one or more tracked users and one or more tracked objects, and wherein displaying the first representation of the first tracked entity includes:
in accordance with a determination that a current status of the first tracked entity is a first status, wherein the first status is determined based on one or more characteristics of movement of the first tracked entity:
in accordance with a determination that the first tracked entity is a tracked user of the one or more tracked users, displaying the first representation of the first tracked entity in the respective user interface object, wherein the first representation of the first tracked entity includes a visual indication of a mode of transport corresponding to one or more characteristics of movement of the first tracked entity, and
in accordance with a determination that the first tracked entity is a tracked object of the one or more tracked objects, displaying the first representation of the first tracked entity in the respective user interface object, wherein the first representation of the first tracked entity does not include a visual indication of a mode of transport;
while displaying the home screen user interface with the respective user interface object, receiving, via the one or more input devices, a first input directed to the respective user interface object that includes the first representation of the first tracked entity; and
in response to receiving the first input:
in accordance with a determination that the first input is a first type of input, displaying, via the display generation component, a first user interface of the location information application associated with the first tracked entity that includes further information about the first tracked entity.

2. The method of claim 1, wherein the first tracked entity is a first user, and the first representation of the first tracked entity includes an indication of a location associated with the first user.

3. The method of claim 1, wherein:
the first representation of the first tracked entity is displayed, on the home screen user interface, within a respective representation corresponding to a plurality of different tracked entities including the first tracked entity and a second tracked entity, different from the first tracked entity, and
the respective representation corresponding to the plurality of different tracked entities further includes a second representation of the second tracked entity.

4. The method of claim 3, wherein:
in accordance with a determination that one or more locations of a first set of tracked entities satisfy location criteria, the respective representation corresponding to the plurality of different tracked entities includes representations of the first set of tracked entities; and
in accordance with a determination that one or more locations of a second set of tracked entities, different from the first set of tracked entities, satisfy the location criteria, the respective representation corresponding to the plurality of different tracked entities includes representations of the second set of tracked entities.

5. The method of claim 1, wherein the first tracked entity is a first user, and the home screen user interface further includes a second representation of a second user, different from the first user, that includes an indication of a current status of the second user.

6. The method of claim 1, wherein the first tracked entity is a respective user, and the home screen user interface further includes a second representation of a respective object that includes an indication of a current status of the respective object.

7. The method of claim 1, wherein displaying the first representation of the first tracked entity includes:

in accordance with a determination that the first tracked entity is an object, displaying the first representation of the first tracked entity with a first visual appearance; and in accordance with a determination that the first tracked entity is a user, displaying the first representation of the first tracked entity with a second visual appearance, different from the first visual appearance.

8. The method of claim 1, wherein in accordance with a determination that one or more criteria are satisfied, the first representation of the first tracked entity includes a representation of a map that indicates information associated with a location of the first tracked entity.

9. The method of claim 8, wherein:

in accordance with a determination that a current status of tracking a location of the first tracked entity is a first tracking status, the representation of the map is displayed in a first state, and in accordance with a determination that the current status of tracking the location of the first tracked entity is a second tracking status, different from the first tracking status, the representation of the map is displayed in a second state, different from the first state.

10. The method of claim 9, wherein:

the first tracking status corresponds to location information being available for the first tracked entity, displaying the representation of the map in the first state includes displaying the representation of the map at a first level of visual emphasis, the second tracking status corresponds to location information being unavailable for the first tracked entity, and displaying the representation of the map in the second state includes displaying the representation of the map at a second level of visual emphasis, less than the first level of visual emphasis.

11. The method of claim 8, wherein:

the one or more criteria include a criterion that is satisfied when the first tracked entity is available for tracking, and not satisfied when the first tracked entity is not available for tracking, and in accordance with a determination that the one or more criteria are not satisfied, the first representation of the first tracked entity does not include the representation of the map.

12. The method of claim 1, wherein the first representation of the first tracked entity includes a graphical indication of the first tracked entity, and a visual indication of a location associated with the first tracked entity.

13. The method of claim 1, wherein the first representation of the first tracked entity includes a graphical indication of the first tracked entity, and a visual indication of a current status of the first tracked entity.

14. The method of claim 1, wherein the first representation of the first tracked entity includes a visual indication of a battery status of the first tracked entity.

15. The method of claim 1, wherein the first representation of the first tracked entity includes a semantic indication of a location associated with the first tracked entity.

16. The method of claim 1, wherein the first representation of the first tracked entity includes a landmark indication associated with a location of the first tracked entity.

17. The method of claim 1, wherein the first representation of the first tracked entity includes a visual indication of a time zone associated with a location associated with the first tracked entity.

18. The method of claim 1, wherein the first representation of the first tracked entity includes a visual indication of an amount of time the first tracked entity has been located at a current location associated with the first tracked entity.

19. The method of claim 1, wherein the first tracked entity is an entity whose status is temporarily shared with the electronic device, the method further comprising:

detecting that the status of the first tracked entity is no longer shared with the electronic device; and in response to detecting that the status of the first tracked entity is no longer shared with the electronic device, ceasing display of the status of the first tracked entity in the first representation of the first tracked entity.

20. The method of claim 1, further comprising:

while displaying the home screen user interface with the respective user interface object, receiving, via the one or more input devices, a second input directed to the respective user interface object that includes the first representation of the first tracked entity; and in response to receiving the second input, performing an operation associated with the first representation of the first tracked entity, wherein:

the second input includes a first portion from a predefined portion of a user of the electronic device, followed by movement of the predefined portion of the user, and the operation associated with the first representation of the first tracked entity includes repositioning the first representation of the first tracked entity on the home screen user interface in accordance with the movement of the predefined portion of the user.

21. The method of claim 1, further comprising:

while displaying the home screen user interface with the respective user interface object, receiving, via the one or more input devices, a second input directed to the respective user interface object that includes the first representation of the first tracked entity; and in response to receiving the second input, performing an operation associated with the first representation of the first tracked entity, wherein:

the home screen user interface includes a first region and a second region, when the second input is received, the first region of the home screen user interface is displayed via the display generation component, and the second region of the home screen user interface is not displayed via the display generation component, the second input includes movement of a predefined portion of a user of the electronic device, and the operation associated with the first representation of the first tracked entity includes ceasing display of the first region of the home screen user interface, and displaying, via the display generation component, the second region of the home screen user interface, wherein the first representation of the first tracked entity is displayed in the second region of the home screen user interface.

22. The method of claim 1, wherein displaying, via the display generation component, the first user interface of the location information application associated with the first tracked entity that includes further information about the first tracked entity includes displaying, via the display generation component, tracking information for the first tracked entity.

23. The method of claim 1, further comprising:

in response to receiving the first input:

in accordance with a determination that the first input is a second type of input different from the first type of input, initiating a process for switching the respective user interface object from displaying status information for the first tracked entity to displaying status information for a second tracked entity that is different from the first tracked entity, wherein initiating the process for switching the respective user interface object from displaying status information for the first tracked entity to displaying status information for the second tracked entity includes displaying a second user interface, different from the first user interface.

24. An electronic device, comprising:

one or more processors;

memory; and one or more programs, wherein the one or more programs are stored in the memory and configured to be executed by the one or more processors, the one or more programs including instructions for:

displaying, via a display generation component, a home screen user interface of the electronic device that includes a respective user interface object that includes a first representation of a first tracked entity that is separate from the electronic device, and one or more options that are selectable to display, via the display generation component, one or more applications installed on the electronic device, wherein the respective user interface object is associated with a location information application on the electronic device that has access to location information for a plurality of tracked entities including one or more tracked users and one or more tracked objects, and wherein displaying the first representation of the first tracked entity includes:

in accordance with a determination that a current status of the first tracked entity is a first status, wherein the first status is determined based on one or more characteristics of movement of the first tracked entity:

in accordance with a determination that the first tracked entity is a tracked user of the one or more tracked users, displaying the first representation of the first tracked entity in the respective user interface object, wherein the first representation of the first tracked entity includes a visual indication of a mode of transport corresponding to one or more characteristics of movement of the first tracked entity, and in accordance with a determination that the first tracked entity is a tracked object of the one or more tracked objects, displaying the first representation of the first tracked entity in the respective user interface object, wherein the first representation of the first tracked entity does not include a visual indication of a mode of transport;

while displaying the home screen user interface with the respective user interface object, receiving, via one or more input devices, a first input directed to the respective user interface object that includes the first representation of the first tracked entity; and in response to receiving the first input:

in accordance with a determination that the first input is a first type of input, displaying, via the display generation component, a first user interface of the location information application associated with the first tracked entity that includes further information about the first tracked entity.

25. A non-transitory computer readable storage medium storing one or more programs, the one or more programs comprising instructions, which when executed by one or more processors of an electronic device, cause the electronic device to perform a method comprising:

displaying, via a display generation component, a home screen user interface of the electronic device that includes a respective user interface object that includes a first representation of a first tracked entity that is separate from the electronic device, and one or more options that are selectable to display, via the display generation component, one or more applications installed on the electronic device, wherein the respective user interface object is associated with a location information application on the electronic device that has access to location information for a plurality of tracked entities including one or more tracked users and one or more tracked objects, and wherein displaying the first representation of the first tracked entity includes:

in accordance with a determination that a current status of the first tracked entity is a first status, wherein the first status is determined based on one or more characteristics of movement of the first tracked entity:

in accordance with a determination that the first tracked entity is a tracked user of the one or more tracked users, displaying the first representation of the first tracked entity in the respective user interface object, wherein the first representation of the first tracked entity includes a visual indication of a mode of transport corresponding to one or more characteristics of movement of the first tracked entity, and in accordance with a determination that the first tracked entity is a tracked object of the one or more tracked objects, displaying the first representation of the first tracked entity in the respective user interface object, wherein the first representation of the first tracked entity does not include a visual indication of a mode of transport;

while displaying the home screen user interface with the respective user interface object, receiving, via one or more input devices, a first input directed to the respective user interface object that includes the first representation of the first tracked entity; and in response to receiving the first input:

in accordance with a determination that the first input is a first type of input, displaying, via the display generation component, a first user interface of the location information application associated with the first tracked entity that includes further information about the first tracked entity.

26. The electronic device of claim 24, wherein:

the first representation of the first tracked entity is displayed, on the home screen user interface, within a respective representation corresponding to a plurality of different tracked entities including the first tracked entity and a second tracked entity, different from the first tracked entity, the respective representation corresponding to the plurality of different tracked entities further includes a second representation of the second tracked entity, in accordance with a determination that one or more locations of a first set of tracked entities satisfy location criteria, the respective representation corresponding to the plurality of different tracked entities includes representations of the first set of tracked entities; and in accordance with a determination that one or more locations of a second set of tracked entities, different from the first set of tracked entities, satisfy the location criteria, the respective representation corresponding to the plurality of different tracked entities includes representations of the second set of tracked entities.

27. The electronic device of claim 24, wherein displaying the first representation of the first tracked entity includes:

in accordance with a determination that the first tracked entity is an object, displaying the first representation of the first tracked entity with a first visual appearance; and in accordance with a determination that the first tracked entity is a user, displaying the first representation of the first tracked entity with a second visual appearance, different from the first visual appearance.

28. The electronic device of claim 24, wherein in accordance with a determination that one or more criteria are satisfied, the first representation of the first tracked entity includes a representation of a map that indicates information associated with a location of the first tracked entity.

29. The electronic device of claim 28, wherein:

in accordance with a determination that a current status of tracking a location of the first tracked entity is a first tracking status, the representation of the map is displayed in a first state, and in accordance with a determination that the current status of tracking the location of the first tracked entity is a second tracking status, different from the first tracking status, the representation of the map is displayed in a second state, different from the first state.

30. The electronic device of claim 28, wherein:

the one or more criteria include a criterion that is satisfied when the first tracked entity is available for tracking, and not satisfied when the first tracked entity is not available for tracking, and in accordance with a determination that the one or more criteria are not satisfied, the first representation of the first tracked entity does not include the representation of the map.

31. The electronic device of claim 24, wherein the one or more programs further include instructions for:

in response to receiving the first input:

in accordance with a determination that the first input is a second type of input different from the first type of input, initiating a process for switching the respective user interface object from displaying status information for the first tracked entity to displaying status information for a second tracked entity that is different from the first tracked entity, wherein initiating the process for switching the respective user interface object from displaying status information for the first tracked entity to displaying status information for the second tracked entity includes displaying a second user interface, different from the first user interface.

32. The non-transitory computer readable storage medium of claim 25, wherein:

the first representation of the first tracked entity is displayed, on the home screen user interface, within a respective representation corresponding to a plurality of different tracked entities including the first tracked entity and a second tracked entity, different from the first tracked entity, the respective representation corresponding to the plurality of different tracked entities further includes a second representation of the second tracked entity, in accordance with a determination that one or more locations of a first set of tracked entities satisfy location criteria, the respective representation corresponding to the plurality of different tracked entities includes representations of the first set of tracked entities; and in accordance with a determination that one or more locations of a second set of tracked entities, different from the first set of tracked entities, satisfy the location criteria, the respective representation corresponding to the plurality of different tracked entities includes representations of the second set of tracked entities.

33. The non-transitory computer readable storage medium of claim 25, wherein displaying the first representation of the first tracked entity includes:

in accordance with a determination that the first tracked entity is an object, displaying the first representation of the first tracked entity with a first visual appearance; and in accordance with a determination that the first tracked entity is a user, displaying the first representation of the first tracked entity with a second visual appearance, different from the first visual appearance.

34. The non-transitory computer readable storage medium of claim 25, wherein in accordance with a determination that one or more criteria are satisfied, the first representation of the first tracked entity includes a representation of a map that indicates information associated with a location of the first tracked entity.

35. The non-transitory computer readable storage medium of claim 34, wherein:

in accordance with a determination that a current status of tracking a location of the first tracked entity is a first tracking status, the representation of the map is displayed in a first state, and in accordance with a determination that the current status of tracking the location of the first tracked entity is a second tracking status, different from the first tracking status, the representation of the map is displayed in a second state, different from the first state.

36. The non-transitory computer readable storage medium of claim 34, wherein:

the one or more criteria include a criterion that is satisfied when the first tracked entity is available for tracking, and not satisfied when the first tracked entity is not available for tracking, and in accordance with a determination that the one or more criteria are not satisfied, the first representation of the first tracked entity does not include the representation of the map.

37. The non-transitory computer readable storage medium of claim 25, wherein the one or more programs further include instructions for:

in response to receiving the first input:

in accordance with a determination that the first input is a second type of input different from the first type of input, initiating a process for switching the respective user interface object from displaying status information for the first tracked entity to displaying status information for a second tracked entity that is different from the first tracked entity, wherein initiating the process for switching the respective user interface object from displaying status information for the first tracked entity to displaying status information for the second tracked entity includes displaying a second user interface, different from the first user interface.

* * * * *